(12) United States Patent
Kim et al.

(10) Patent No.: US 8,195,243 B2
(45) Date of Patent: Jun. 5, 2012

(54) TRANSPARENT DISPLAY AND OPERATION METHOD THEREOF

(75) Inventors: Jong-Hwan Kim, Gyeonggi-Do (KR); Nam-Yong Park, Gyeonngi-Do (KR)

(73) Assignee: LG Electronics Inc., Seoul (KR)

( * ) Notice: Subject to any disclaimer, the term of this patent is extended or adjusted under 35 U.S.C. 154(b) by 272 days.

(21) Appl. No.: 12/352,425

(22) Filed: Jan. 12, 2009

(65) Prior Publication Data

US 2009/0298546 A1 Dec. 3, 2009

(30) Foreign Application Priority Data

May 29, 2008 (KR) .................. 10-2008-0050460
Jun. 12, 2008 (KR) .................. 10-2008-0055334

(51) Int. Cl.
*H04B 1/38* (2006.01)
(52) U.S. Cl. .................. 455/566; 455/575.1; 455/575.2; 455/575.3; 455/575.4; 455/575.8; 345/156; 345/158
(58) Field of Classification Search .... 455/575.1–575.8, 455/566; 345/156, 173
See application file for complete search history.

(56) References Cited

U.S. PATENT DOCUMENTS

| | | | |
|---|---|---|---|
| 5,160,920 A | 11/1992 | Harris | |
| 5,469,185 A | 11/1995 | Lebby et al. | |
| 5,798,744 A | 8/1998 | Tanaka et al. | |
| 5,801,758 A | 9/1998 | Heirich | |
| 5,896,575 A | 4/1999 | Higginbotham et al. | |
| 6,132,048 A | 10/2000 | Gao et al. | |
| 6,327,482 B1 | 12/2001 | Miyashita | |
| 6,466,202 B1* | 10/2002 | Suso et al. | 345/169 |
| 6,662,244 B1 | 12/2003 | Takahashi | |
| 6,753,842 B1 | 6/2004 | Williams et al. | |
| 6,998,772 B2 | 2/2006 | Terumoto | |
| 7,205,959 B2 | 4/2007 | Henriksson | |
| 7,420,585 B2 | 9/2008 | Fredlund et al. | |
| 7,460,108 B2* | 12/2008 | Tamura | 345/169 |
| 7,504,770 B2 | 3/2009 | Choong | |
| 7,532,173 B2 | 5/2009 | Yamazaki et al. | |
| 7,573,522 B2 | 8/2009 | Kim | |
| 7,724,208 B1 | 5/2010 | Engel et al. | |
| 7,738,912 B1 | 6/2010 | Hawkins et al. | |
| 7,876,288 B1 | 1/2011 | Huang | |
| 8,022,977 B2 | 9/2011 | Kanade et al. | |
| 2002/0094846 A1* | 7/2002 | Kishimoto et al. | 455/566 |
| 2004/0017524 A1 | 1/2004 | Li | |
| 2004/0100510 A1* | 5/2004 | Milic-Frayling et al. | 345/864 |
| 2004/0248621 A1* | 12/2004 | Schon | 455/566 |
| 2004/0257473 A1 | 12/2004 | Miyagawa | |

(Continued)

FOREIGN PATENT DOCUMENTS

EP 0 967 511 A1 12/1999

(Continued)

*Primary Examiner* — Dai A Phuong

(74) *Attorney, Agent, or Firm* — Birch, Stewart, Kolasch & Birch, LLP

(57) ABSTRACT

A terminal including a first body, a second body connected to the first body, a first display disposed on the first body, a second display disposed on the second body and having a transparency such that information displayed on the first display can be seen though the second display having the transparency when the first and second displays overlap each other, and a controller configured to control a movement of a displayable object between the first and second displays based on an opening and closing of the first and second bodies of the terminal.

13 Claims, 108 Drawing Sheets

U.S. PATENT DOCUMENTS

| | | |
|---|---|---|
| 2005/0001796 A1 | 1/2005 | Liu |
| 2005/0012842 A1 | 1/2005 | Miyagawa et al. |
| 2005/0024339 A1 | 2/2005 | Yamazaki et al. |
| 2005/0030518 A1 | 2/2005 | Nishi et al. |
| 2005/0037815 A1 | 2/2005 | Besharat et al. |
| 2005/0070347 A1* | 3/2005 | Ogura .................. 455/575.1 |
| 2005/0078227 A1 | 4/2005 | Kobayashi et al. |
| 2005/0083642 A1 | 4/2005 | Senpuku et al. |
| 2005/0117096 A1 | 6/2005 | Voloschenko et al. |
| 2005/0164745 A1* | 7/2005 | Oe et al. .................. 455/566 |
| 2005/0183040 A1 | 8/2005 | Kondo et al. |
| 2006/0044286 A1 | 3/2006 | Kohlhaas et al. |
| 2006/0079302 A1 | 4/2006 | Kota et al. |
| 2007/0002130 A1 | 1/2007 | Hartkop |
| 2007/0075915 A1* | 4/2007 | Cheon et al. .................. 345/1.1 |
| 2007/0188450 A1 | 8/2007 | Hernandez et al. |
| 2007/0287506 A1 | 12/2007 | Kim et al. |
| 2008/0106591 A1 | 5/2008 | Border et al. |
| 2008/0129719 A1 | 6/2008 | Jonsson et al. |
| 2008/0220821 A1 | 9/2008 | Okuzako et al. |
| 2009/0009628 A1 | 1/2009 | Janicek |
| 2009/0091513 A1* | 4/2009 | Kuhn .................. 345/4 |
| 2009/0231244 A1 | 9/2009 | Lee |
| 2009/0298546 A1 | 12/2009 | Kim et al. |
| 2010/0222110 A1 | 9/2010 | Kim et al. |
| 2011/0171942 A1* | 7/2011 | Kokubo .................. 455/414.1 |

FOREIGN PATENT DOCUMENTS

| | | |
|---|---|---|
| EP | 1 510 994 A1 | 3/2005 |
| EP | 1 770 473 A2 | 4/2007 |
| EP | 1 804 113 A1 | 7/2007 |
| EP | 1 843 563 A1 | 10/2007 |
| JP | 61-21561 A | 1/1986 |
| WO | WO-98/38822 A1 | 9/1998 |
| WO | 2007/047685 A2 | 4/2007 |
| WO | 2007/138543 A2 | 12/2007 |

* cited by examiner

FIG. 5
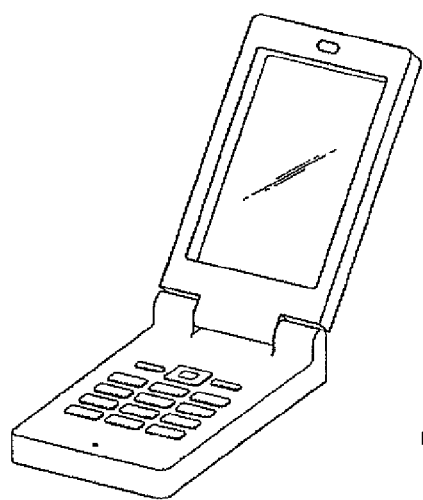
(a)
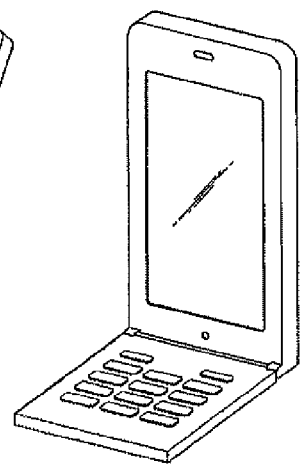
(b)
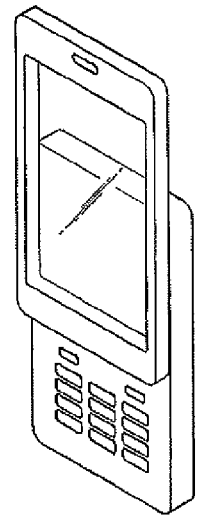
(c)
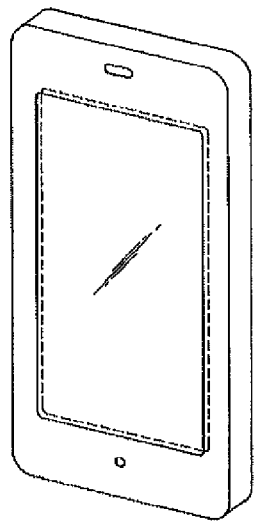
(d)
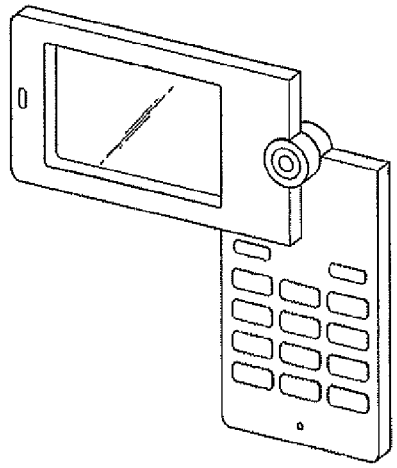
(e)
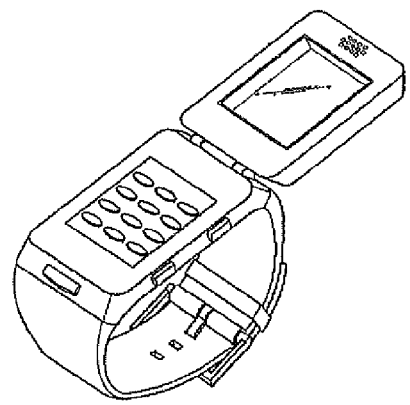
(f)

FIG. 6
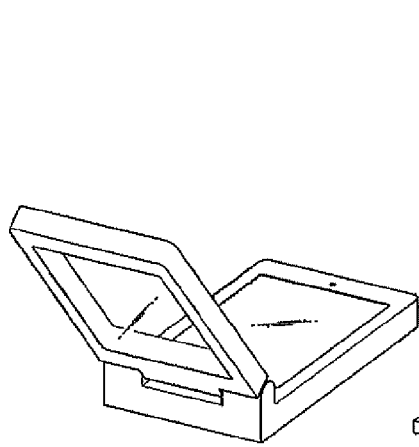
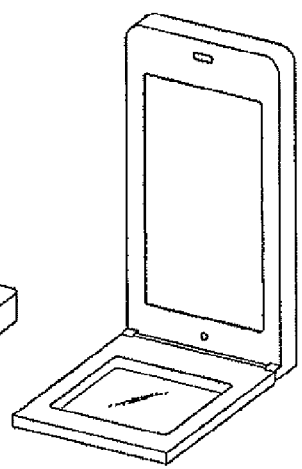
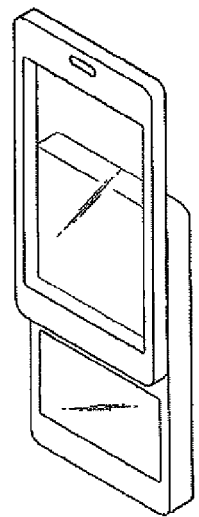
(a)　　　　　　　(b)　　　　　　　(c)
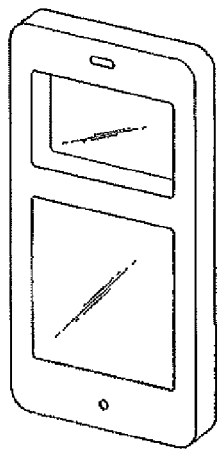
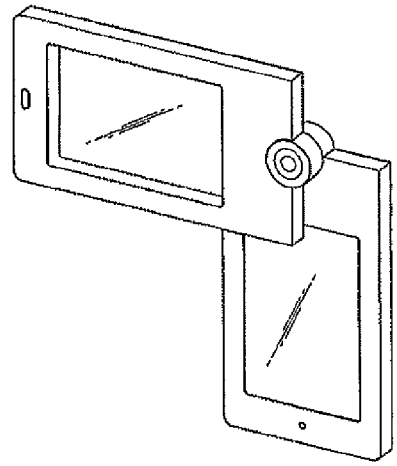
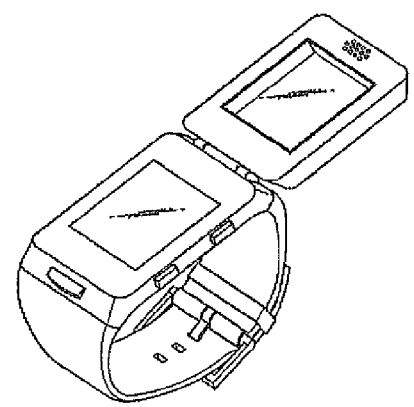
(d)　　　　　　　(e)　　　　　　　(f)

(a)　　　　　　　　　　　(b)

(a)　　　　　　　　　　　(b)

FIG. 8
(a) 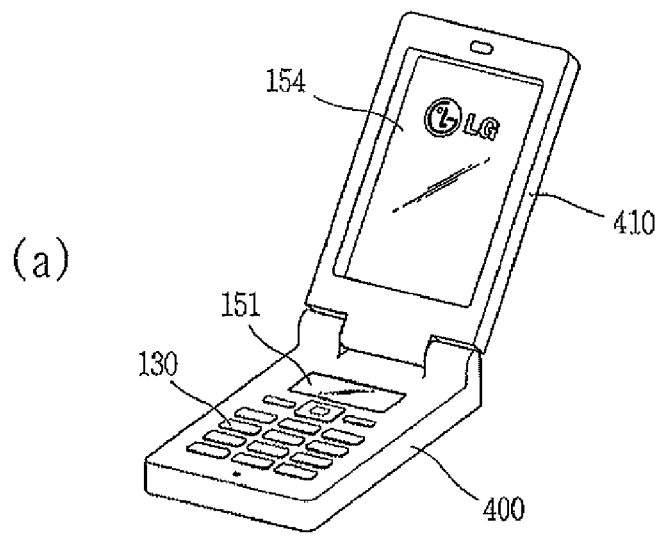
(b) 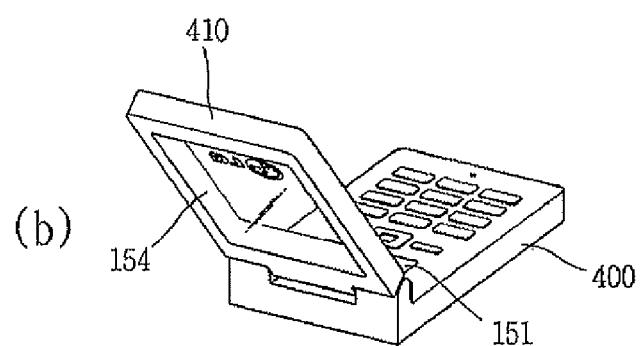

FIG. 9
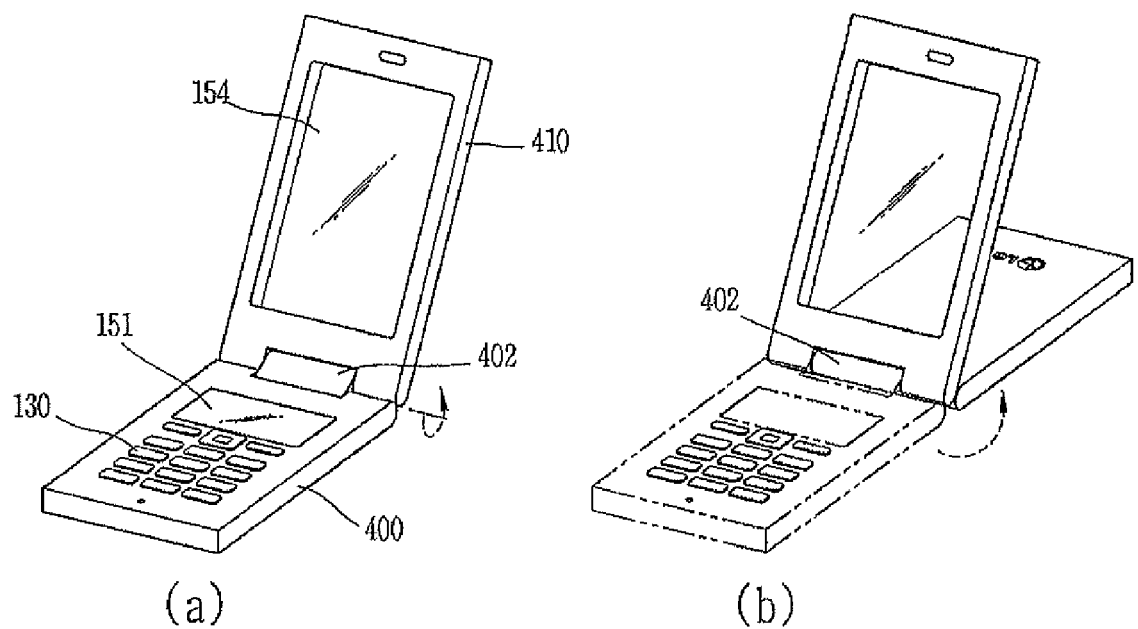
(a)    (b)
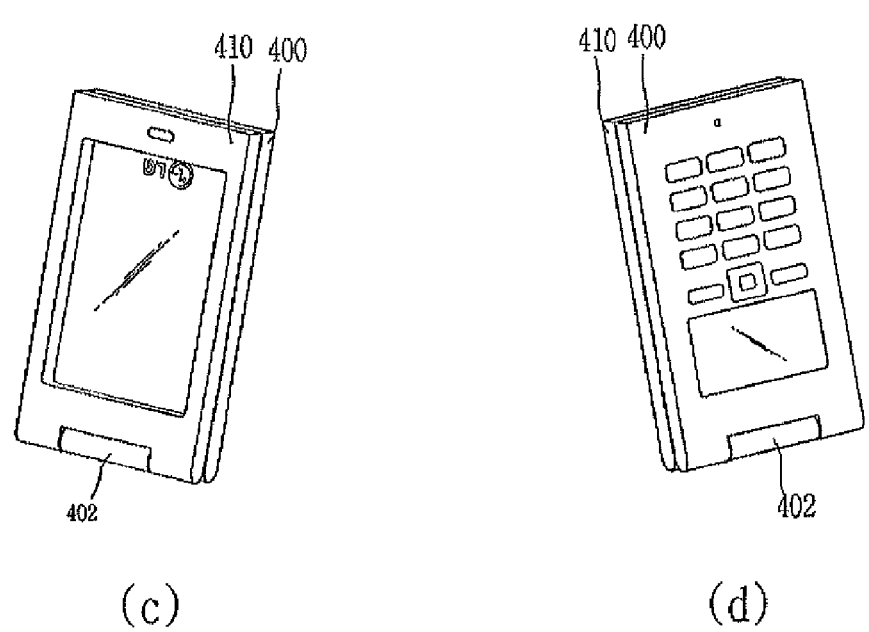
(c)    (d)

FIG. 10
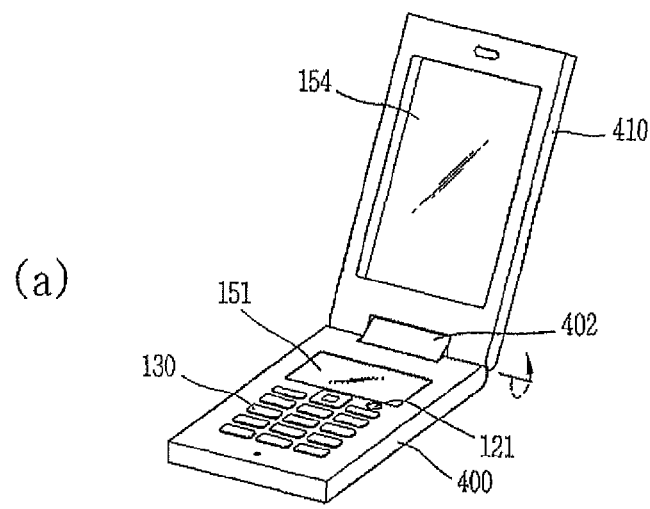
(a)
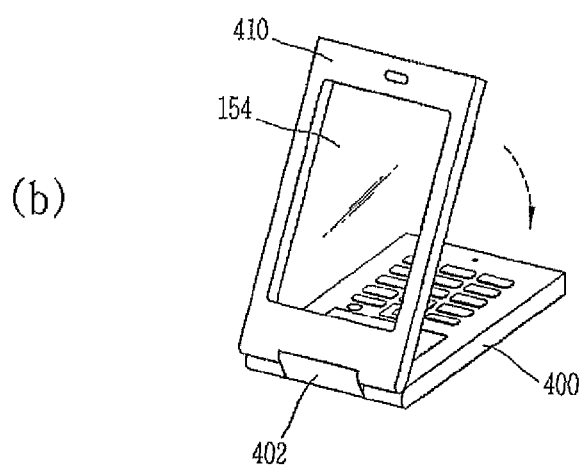
(b)
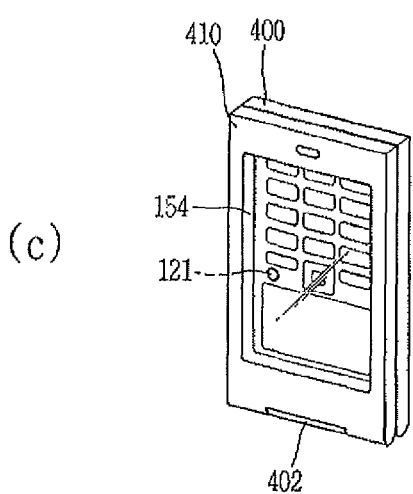
(c)

FIG. 11
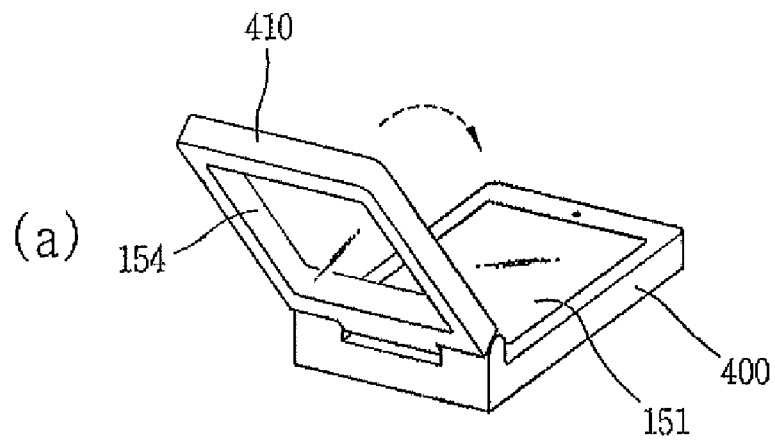
(a)
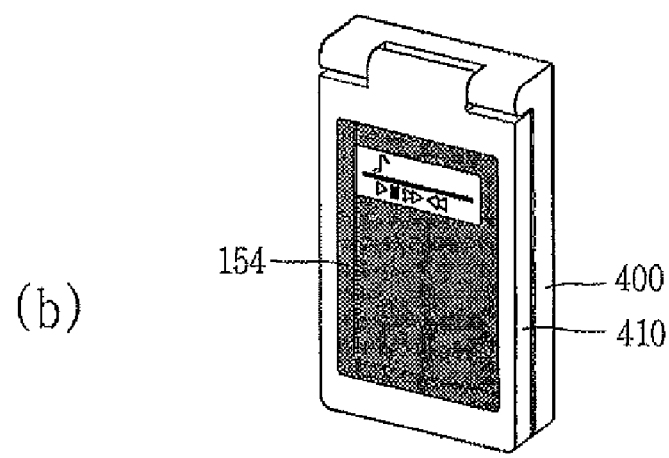
(b)
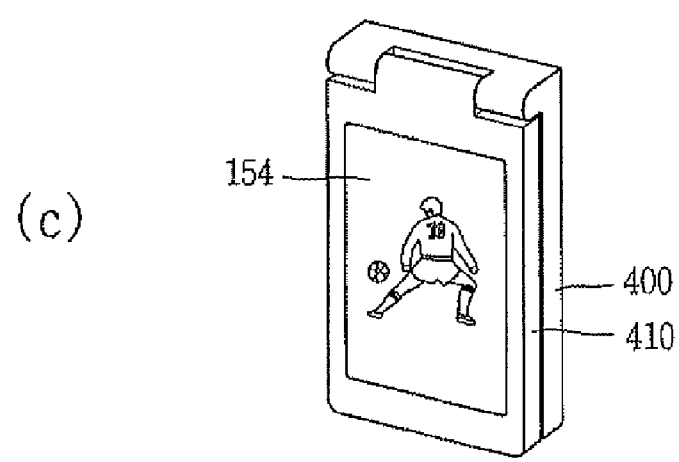
(c)

FIG. 12A
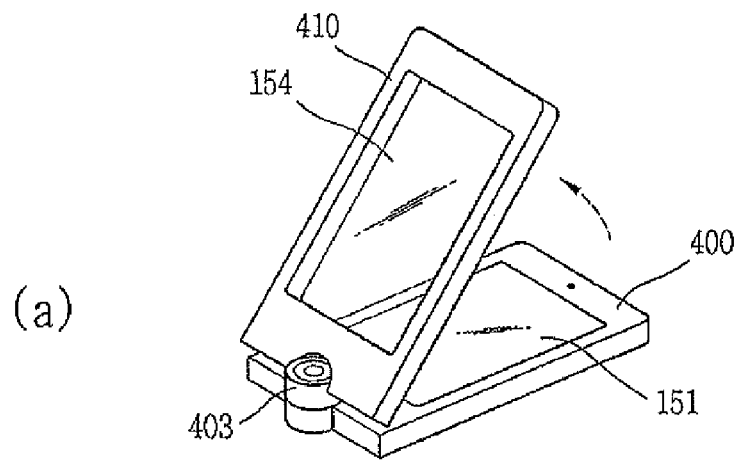
(a)
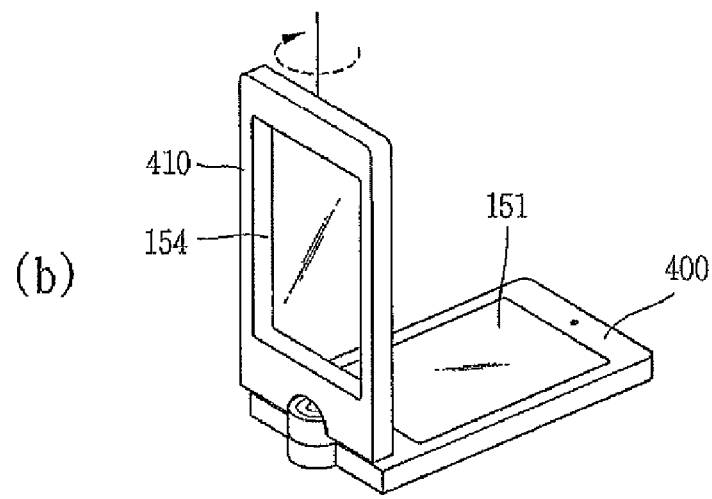
(b)
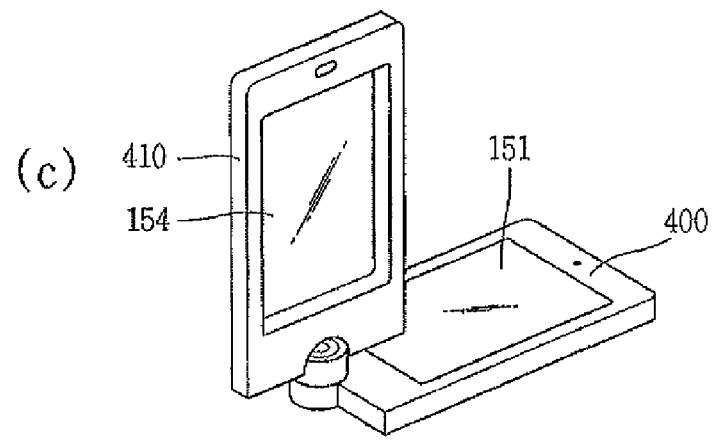
(c)

FIG. 15
(a) 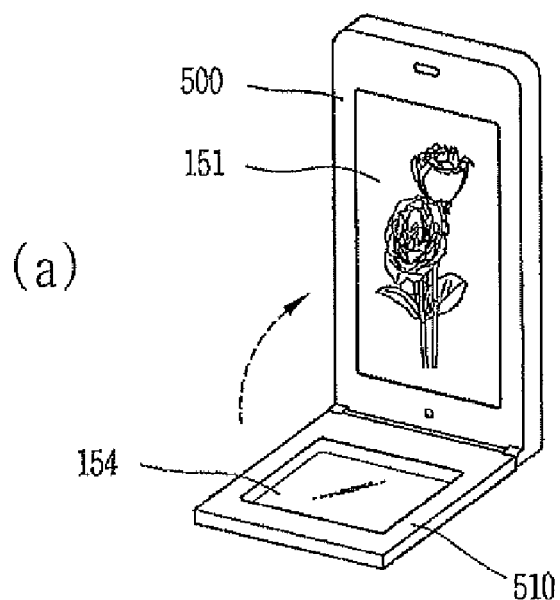
(b) 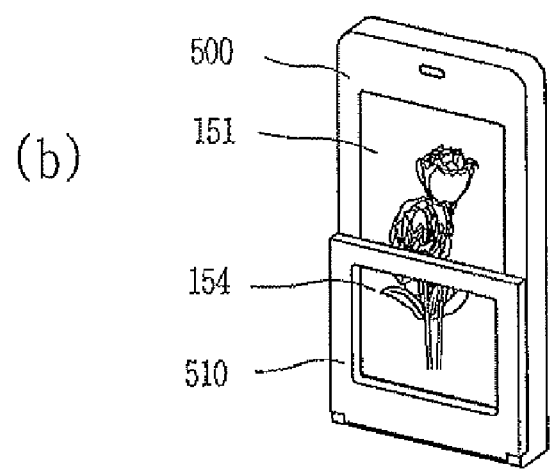

(a)  (b)

FIG. 20
(a) 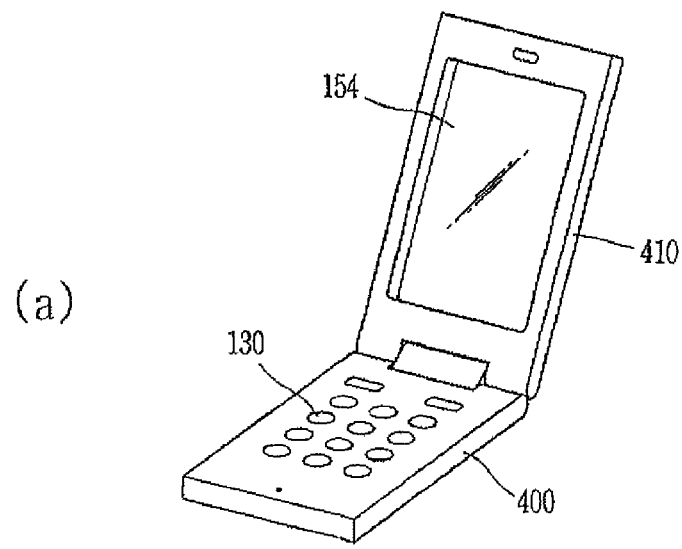
(b) 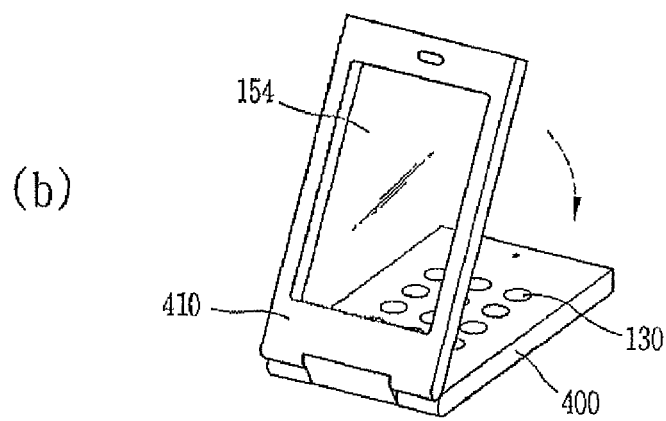
(c) 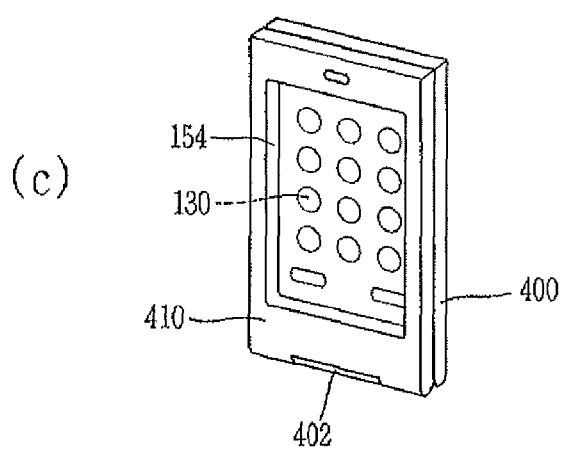

FIG. 21
(a) 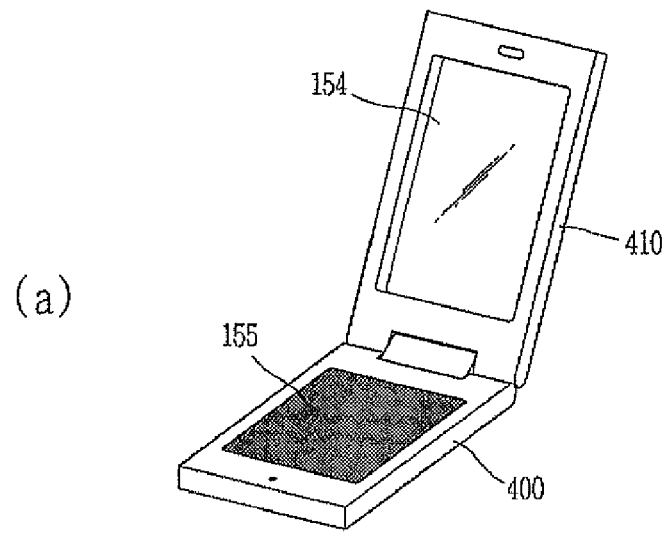
(b) 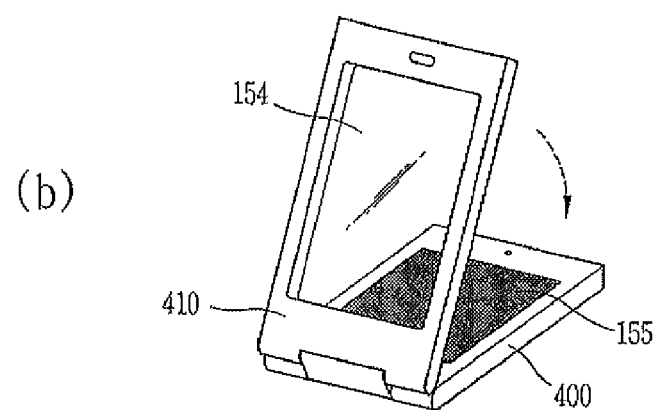
(c) 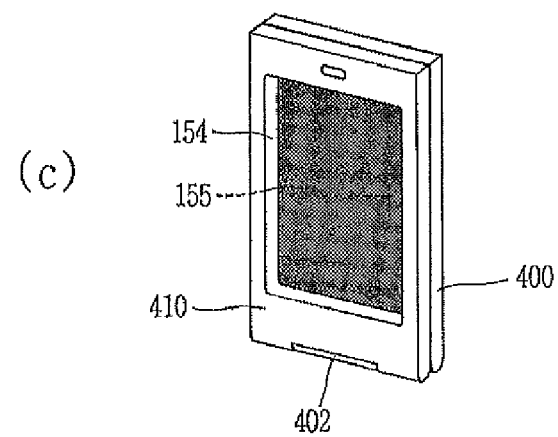

FIG. 22
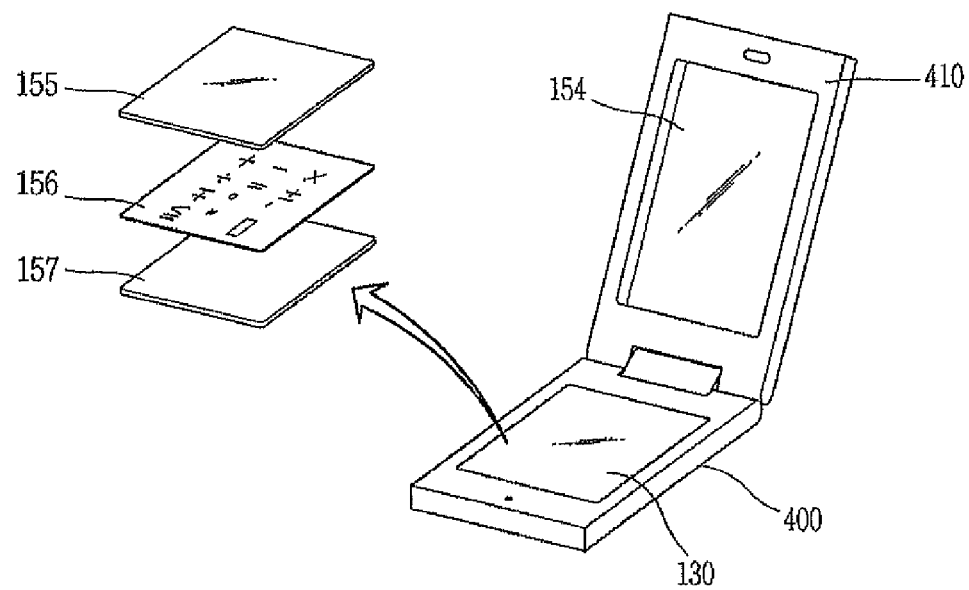
(a)
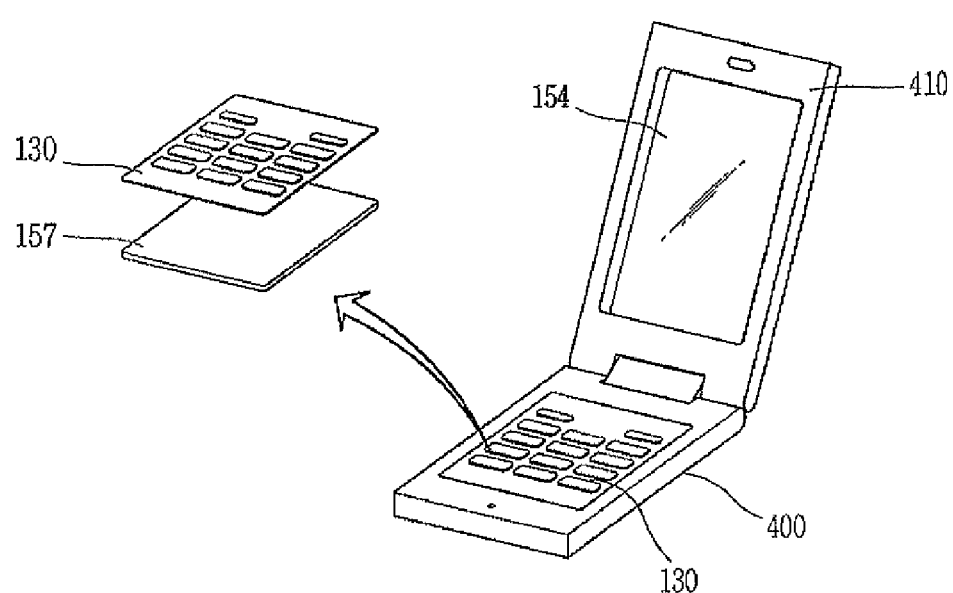
(b)

FIG. 24
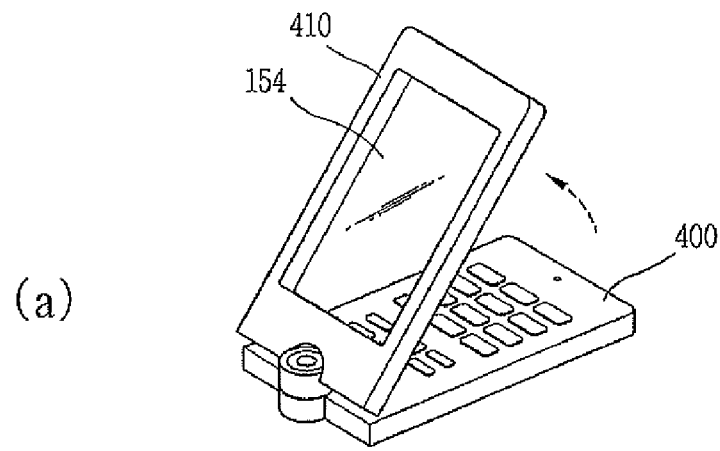
(a)
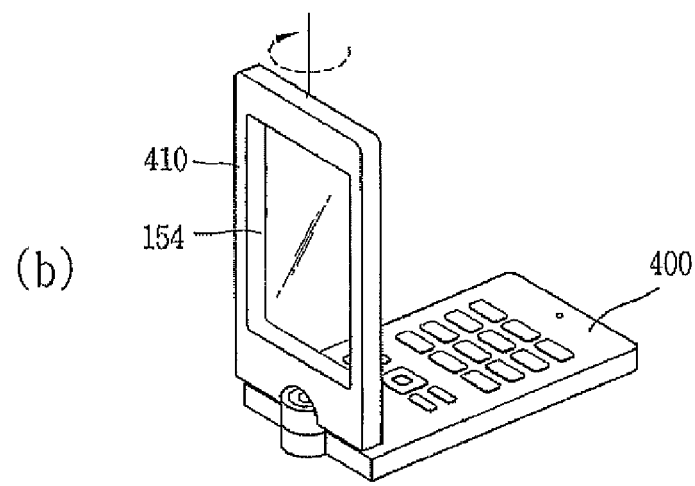
(b)
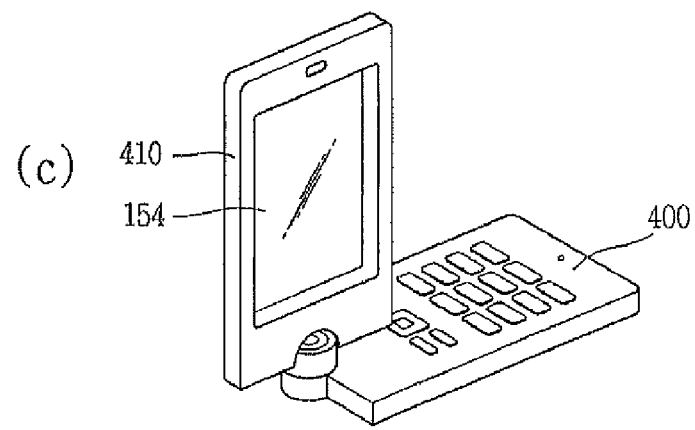
(c)

(a)　　　(b)

(a)　　　(b)

(a)  (b)

FIG. 39
(a) 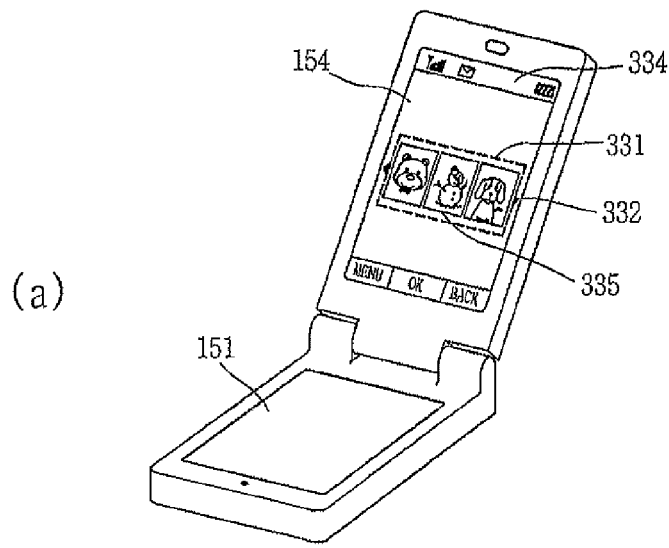
(b) 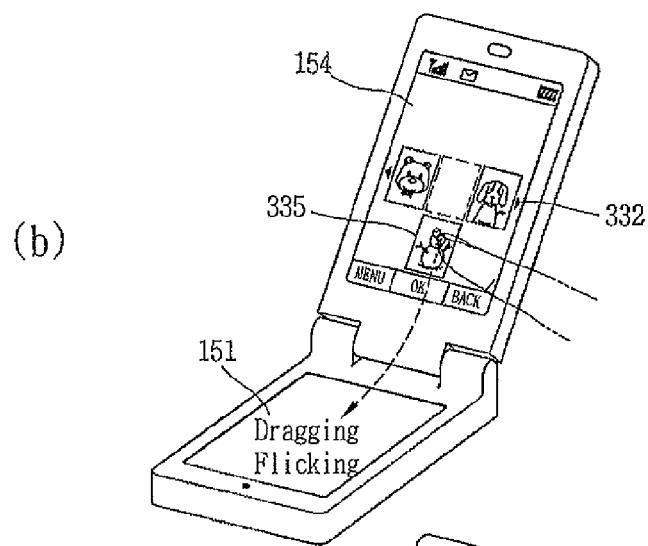
(c) 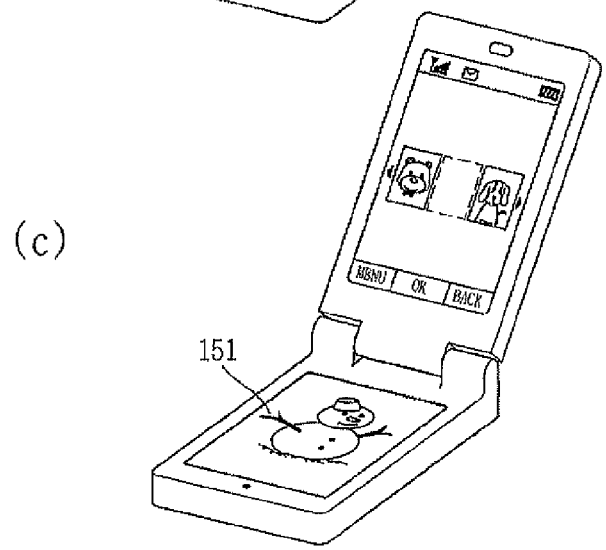

FIG. 40
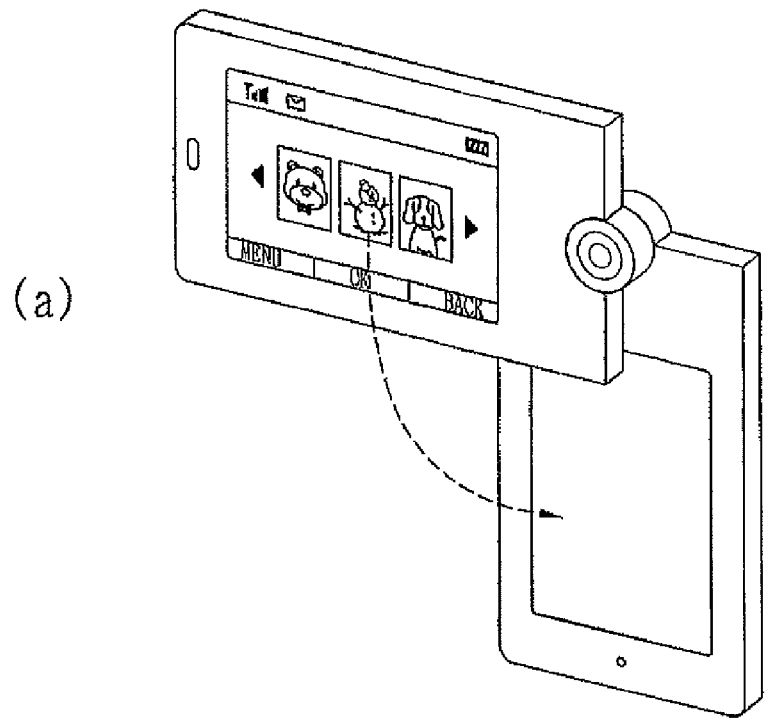
(a)
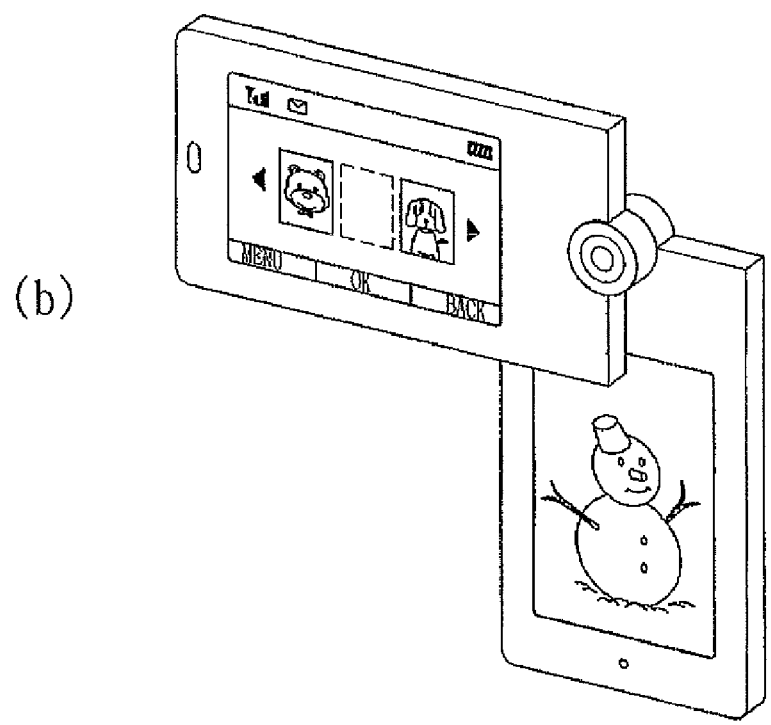
(b)

FIG. 41
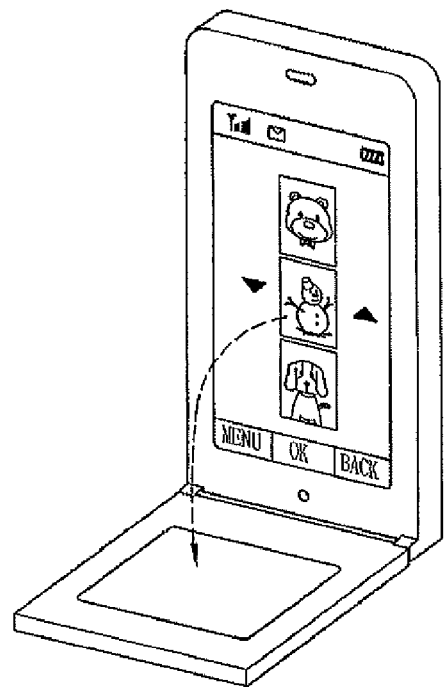
(a)
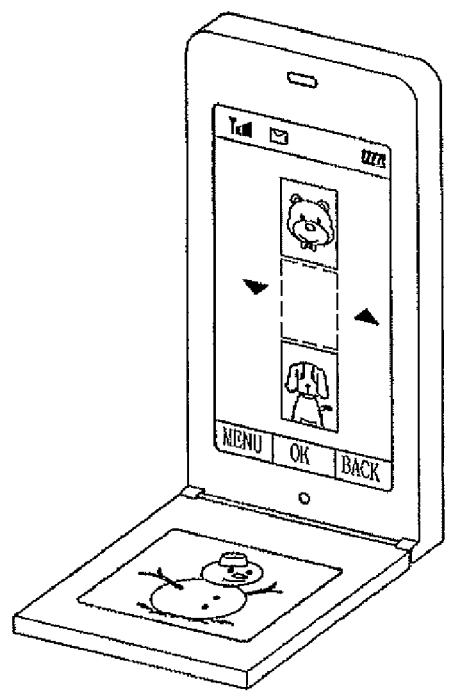
(b)

FIG. 42
(a) 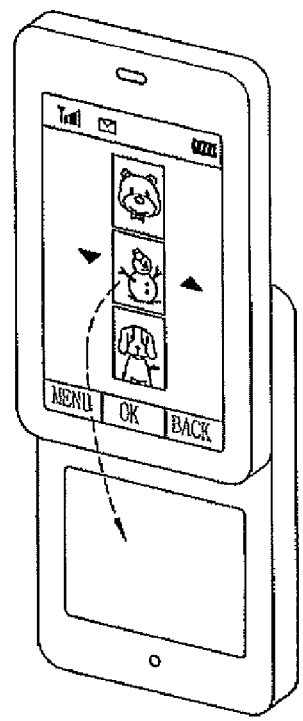
(b) 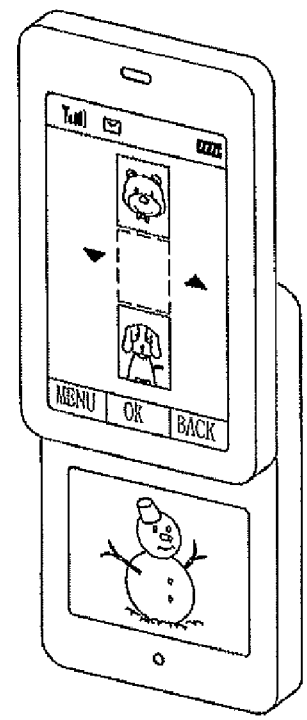

FIG. 43
(a) 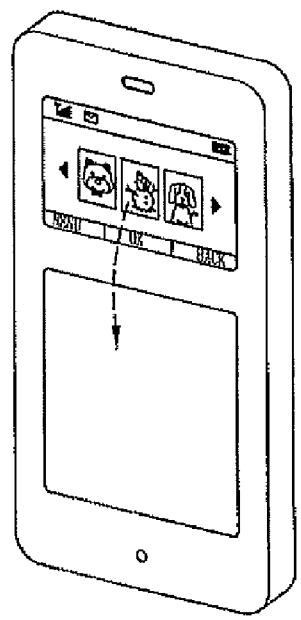
(b) 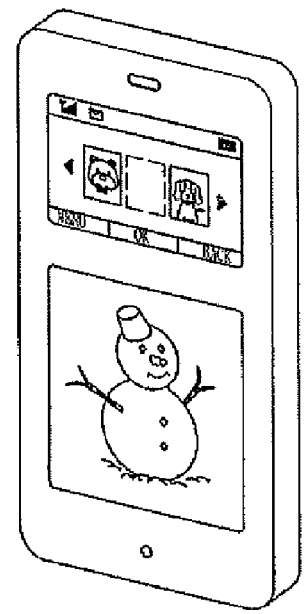

FIG. 44
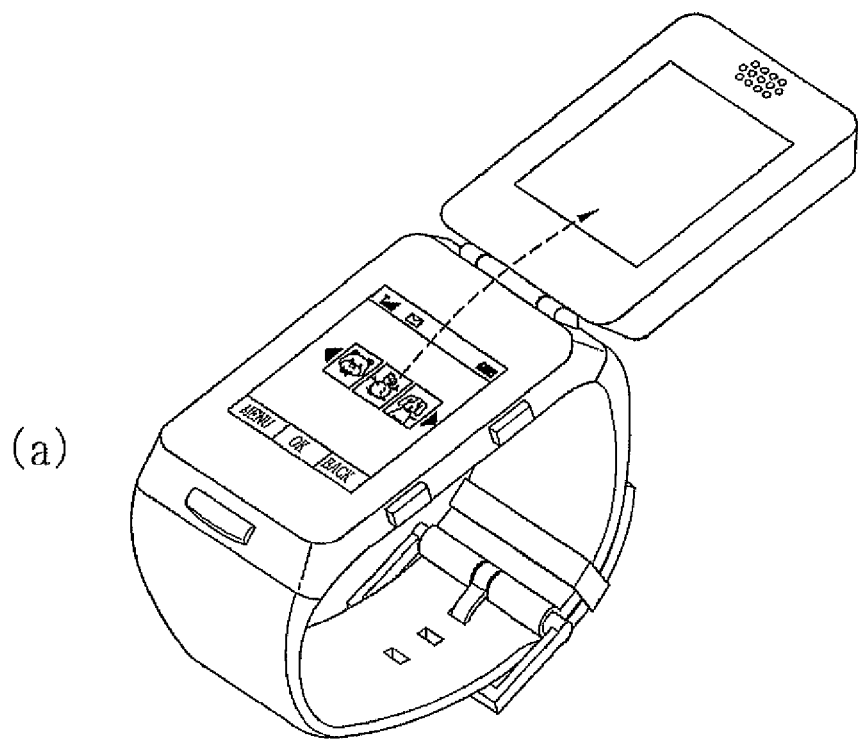
(a)
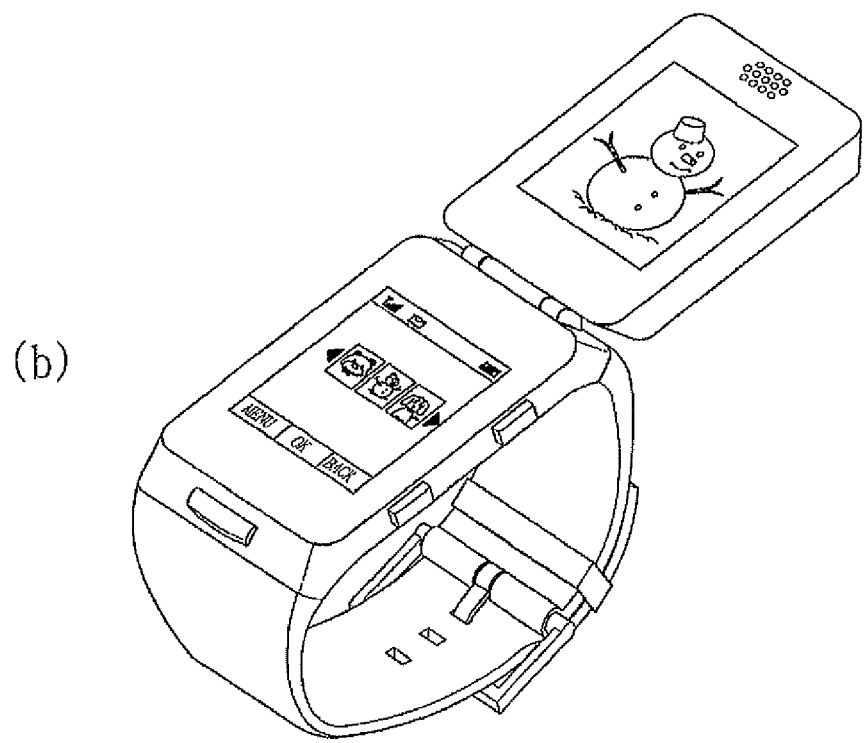
(b)

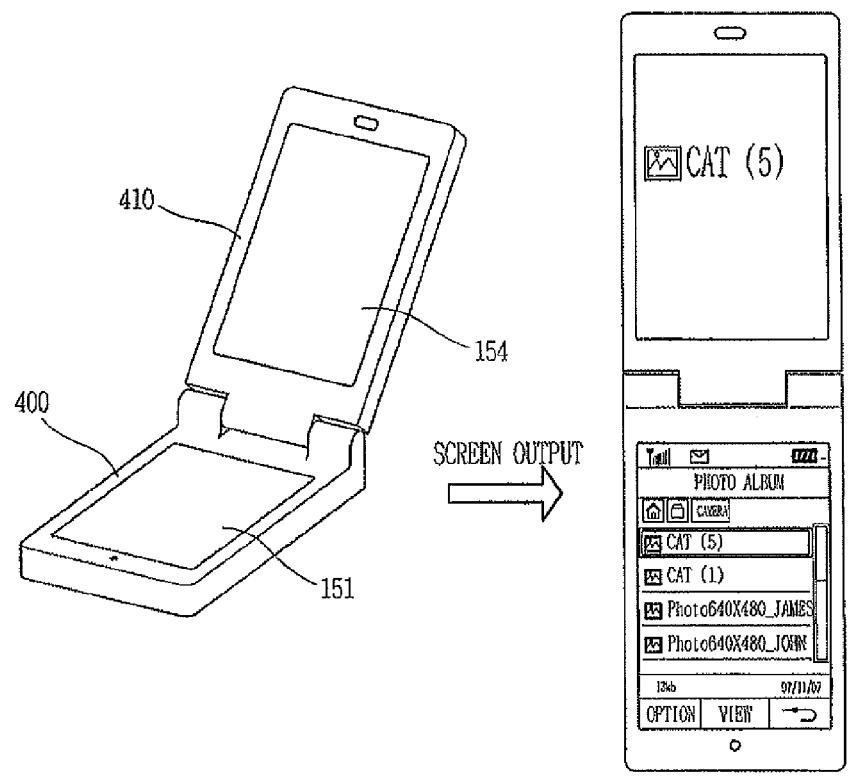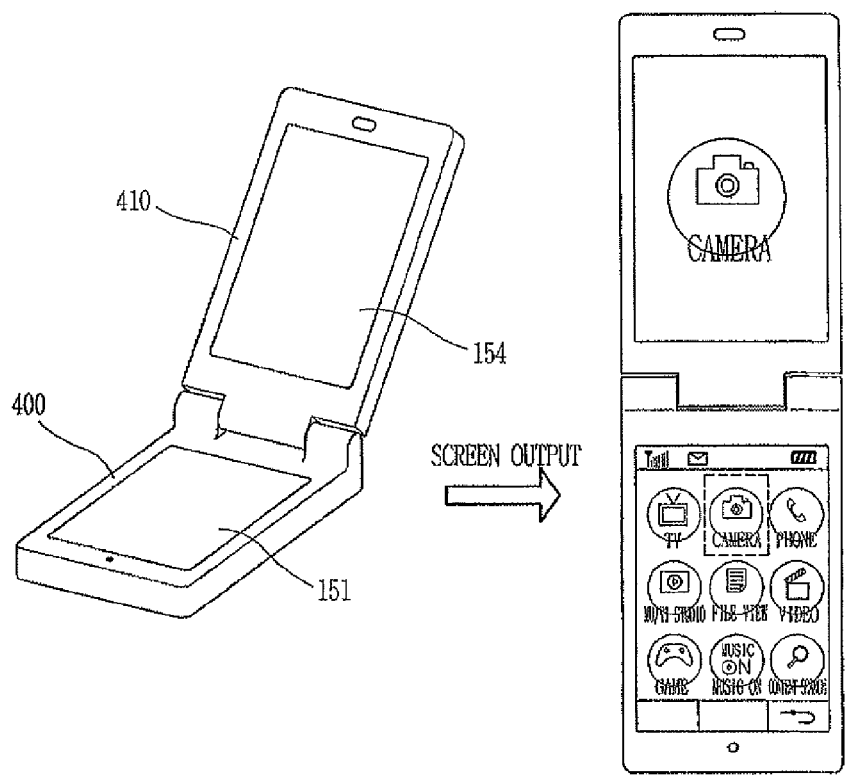

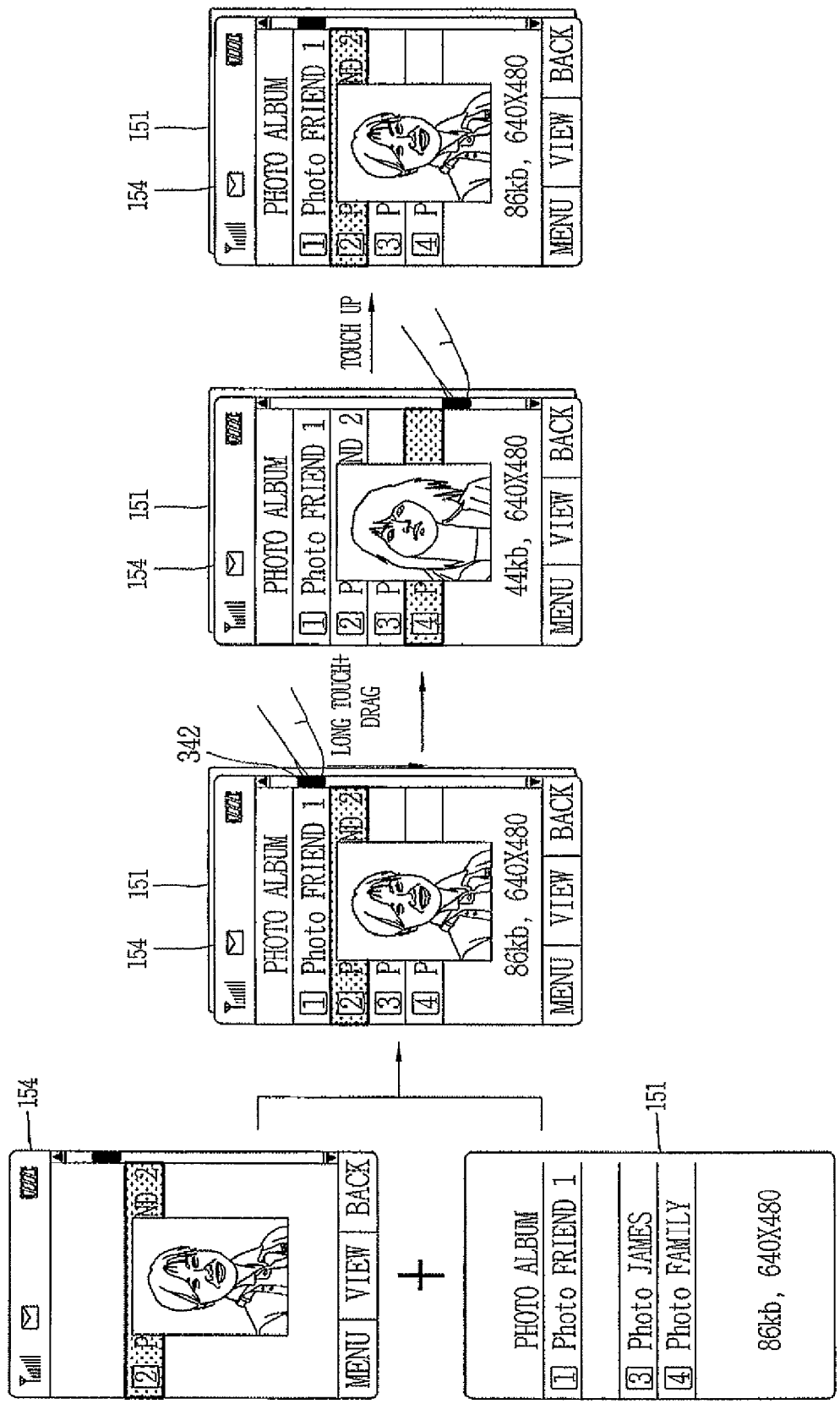

TRANSPARENT DISPLAY AND OPERATION METHOD THEREOF

CROSS-REFERENCE TO A RELATED APPLICATION

The present application claims priority to Korean Application No. 10-2008-0055334, filed on Jun. 12, 2008 and Korean Application No. 10-2008-0050460 filed in Korea on May 29, 2008, the entire contents of which are hereby incorporated by reference in its entirety.

BACKGROUND OF THE INVENTION

1. Field of the Invention

The present invention relates to a mobile terminal, and more particularly to a transparent display of a mobile terminal and a method for operating the same.

2. Background of the Invention

Mobile terminals may be configured to perform various functions, for example, data and voice communication, capturing images or video, storing voice, reproducing music files via a speaker system, displaying images or video and the like. Some mobile terminals may include an additional function for playing games, and other mobile terminals may be implemented as multimedia players. In addition, some mobile terminals can receive broadcast or multicast signals to allow viewing of video or television programs.

Furthermore, many efforts are undergoing to support or enhance various functions of such mobile terminals. These efforts include not only changes and improvement of structural components implementing a mobile terminal but also software or hardware improvement.

Also, different types of mobile terminals include, for example, a folder type, a slide type, a bar type, a rotary type (swivel or swing type), a watch-type and the like. The mobile terminals also include one or more displays such as a liquid crystal display (LCD), an organic light emitting diode (OLED), and the like.

SUMMARY OF THE INVENTION

Accordingly, one object of the present invention is to address drawbacks of the related art.

Another object of the present invention is to provide a transparent display for controlling a generation or movement of an object on a screen in cooperation with an opening/closing of a mobile terminal, and a method for operating the same.

To achieve these and other advantages and in accordance with the purpose of the present invention, as embodied and broadly described herein, there is provided a terminal having a transparent display according to one embodiment including a first display provided on a first body and adapted to display at least one object, a second display provided on a second body and adapted to display at least one object, and a controller adapted to detect whether the terminal is open or closed and move an object within the first display or move the object to the second display when the terminal is open. Further, when the terminal is closed, the first and second displays are overlapped with each other, and one of the first and second displays is a transparent display.

In another aspect of the present invention, a terminal having a transparent display may include a first display having a transparency and provided on a first body, a second display provided on a second body, and a controller adapted to rearrange objects on the first and second displays when the terminal is open.

In still another aspect of the present invention, a terminal having a transparent display may include a first body provided with a first display having a transparency a second body provided with a second display, and a controller adapted to control information to be appropriately displayed on a display in cooperation with the change in an information displaying direction of the corresponding display when the terminal is open/closed.

In another aspect of the present invention, a terminal having a transparent display may include a first body provided with a first display having a transparency, a second body provided with a second display, and a controller adapted to automatically execute a specific function in cooperation with opening/closing of the terminal.

In one aspect of the present invention, a method for controlling a transparent display may include displaying at least one object on a first display, detecting whether a terminal is open/closed, and moving the displayed object either within the first display or to the second display when the terminal is open, wherein when the terminal is closed, the first and second displays are overlapped with each other, and one of the first and second displays is a transparent display.

In another aspect of the present invention, a method for controlling a transparent display may include displaying objects on first and second displays, detecting whether a terminal is open/closed, and rearranging the objects on the first and second displays when the terminal is open.

In still another aspect, the present invention provides a terminal including a first body, a second body connected to the first body, a first display disposed on the first body, a second display disposed on the second body and having a transparency such that information displayed on the first display can be seen though the second display having the transparency when the first and second displays overlap each other, and a controller configured to control a movement of a displayable object between the first and second displays based on an opening and closing of the first and second bodies of the terminal. The present invention also provides a corresponding method of controlling a mobile terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is an overview of mobile terminals each having a single transparent display according to an embodiment of the present invention;

FIG. 6 is an overview of mobile terminals each having a dual transparent display according to an embodiment of the present invention;

FIG. 8 is an overview illustrating a folder type mobile terminal having a dual transparent display according to an embodiment of the present invention, which shows a mobile terminal having a keypad;

FIG. 9 is an overview illustrating a mobile terminal having a dual transparent display according to an embodiment of the present invention, which shows a mobile terminal having a folder rotatable by 360°;

FIG. 10 is an overview illustrating a mobile terminal having a dual transparent display according to an embodiment of the present invention, which shows a mobile terminal capable of capturing an image even in a closed state of a folder;

FIG. 11 is a perspective view showing a mobile terminal having a dual transparent display according to an embodiment of the present invention, which shows a method of controlling a size of information output in cooperation with an opening or closing of a folder;

FIGS. 12A and 12B are overviews illustrating a swivel type mobile terminal having a dual transparent display according to an embodiment of the present invention;

FIG. 15 is another overview of the flip type mobile terminal having a dual transparent display according to an embodiment of the present invention;

FIG. 20 is an overview illustrating a folder type mobile terminal having a single transparent display according to an embodiment of the present invention;

FIG. 21 is an overview illustrating a method for inputting information in a folder type mobile terminal having a single transparent display according to an embodiment of the present invention;

FIG. 22 is an overview illustrating a configuration of a keypad of a folder type mobile terminal having a single transparent display according to an embodiment of the present invention;

FIG. 24 is an overview illustrating a swivel type mobile terminal having a single transparent display according to an embodiment of the present invention;

FIG. 39 is an overview illustrating a display with a LCD and a TOLED in a folder type mobile terminal having a dual display according to an embodiment of the present invention;

FIG. 40 is an overview illustrating a display with a LCD and a TOLED in a rotating type mobile terminal having a dual display according to an embodiment of the present invention according to an embodiment of the present invention;

FIG. 41 is an overview illustrating a display with a LCD and a TOLED in a flip type mobile terminal having a dual display;

FIG. 42 is an overview illustrating a display with a LCD and a TOLED in a slide type mobile terminal having a dual display according to an embodiment of the present invention;

FIG. 43 is an overview illustrating a display with a LCD and a TOLED in a bar type mobile terminal having a dual display according to an embodiment of the present invention;

FIG. 44 is an overview illustrating a display with a LCD and a TOLED in a watch-type mobile terminal having a dual display according to an embodiment of the present invention;

FIGS. 50A and 50B are overviews illustrating a displaying method on LCD and TOLED according to a fourth embodiment of the present invention;

FIGS. 57A to 57C are overviews illustrating a method for controlling a touching in a completely overlapped sate of each display of FIG. 56;

DETAILED DESCRIPTION OF THE INVENTION

Reference will now be made in detail to the preferred embodiments of the present invention, examples of which are illustrated in the accompanying drawings.

Figure 1:
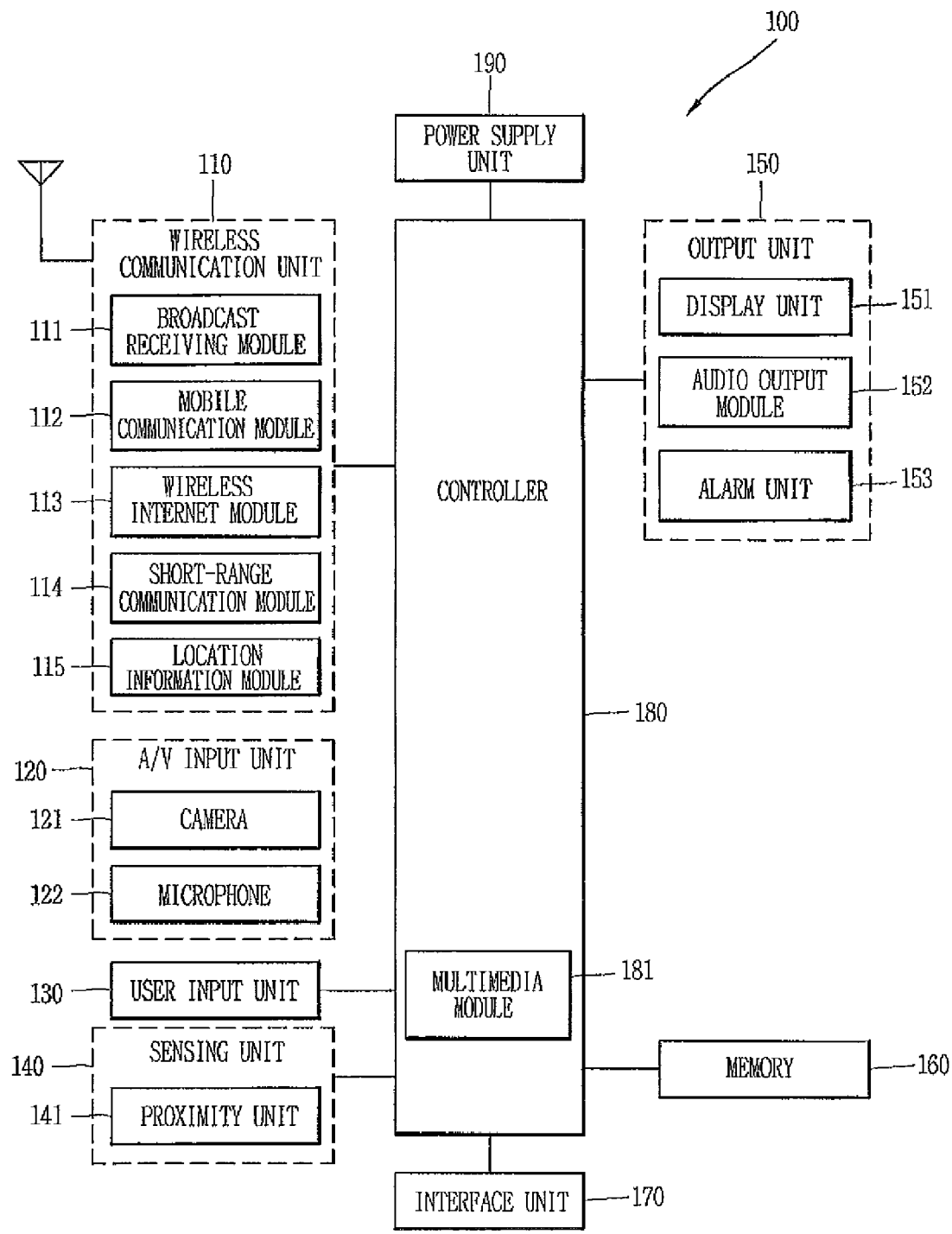
FIG. 1 is a block diagram illustrating a mobile terminal according to an embodiment of the present invention.

FIG. 1 is a block diagram illustrating a mobile terminal according to one embodiment of the present invention. As shown, the mobile terminal 100 may include components such as a wireless communication unit 110, an Audio/Video (A/V) input unit 120, a user input unit 130, a sensing unit 140, an output unit 150, a memory 160, an interface unit 170, a controller 180, a power supply 190 and the like. Further, FIG. 1 shows the mobile terminal 100 having various components, but it is understood that implementing all of the illustrated components is not a requirement. Greater or fewer components may alternatively be implemented.

In addition, the wireless communication unit 110 may include one or more components which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114 and a position location module 115.

The broadcast receiving module 111 receives a broadcast signal and/or broadcast associated information from an external broadcast managing entity via a broadcast channel. The broadcast channel may include a satellite channel and a terrestrial channel. Further, the broadcast managing entity may indicate a server which generates and transmits a broadcast signal and/or broadcast associated information or a server which receives a pre-generated broadcast signal and/or broadcast associated information and sends them to the mobile terminal. Examples of broadcast associated information may include information associated with a broadcast channel, a broadcast program, a broadcast service provider, and the like.

The broadcast signal may be implemented as a TV broadcast signal, a radio broadcast signal, and a data broadcast signal, among others. The broadcast signal may further include a data broadcast signal combined with a TV or radio broadcast signal. Also, the broadcast associated information may be provided via a mobile communication network, and received by the mobile communication module 112. In addition, the broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include the Digital Multimedia Broadcasting-Terrestrial (DMB-T) system, the Digital Multimedia Broadcasting-Satellite (DMB-S) system, the Media Forward Link Only (MediaFLO) system, the Digital Video Broadcast-Handheld (DVB-H) system, the Integrated Services Digital Broadcast-Terrestrial (ISDB-T) system, and the like. The broadcast receiving module 111 may be configured to be suitable for all broadcast system transmitting broadcast signals as well as the digital broadcasting systems. Broadcast signals and/or broadcast associated information received via the broadcast receiving module 111 may also be stored in a suitable device, such as a memory 160.

Further, the mobile communication module 112 transmits/receives wireless signals to/from at least one of network entities (e.g., base station, an external mobile terminal, a server, etc.) on a mobile communication network. In addition, the wireless signals may include audio call signal, video call signal, or various formats of data according to transmission/reception of text/multimedia messages. Also, the wireless Internet module 113 supports wireless Internet access for the mobile terminal, and may be internally or externally coupled to the mobile terminal. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

Further, the short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like. The position location module 115 denotes a module for detecting or calculating a position of a mobile terminal. An example of the position location module 115 may include a Global Position System (GPS) module.

In addition, the GPS module may receive position information in cooperation with associated multiple satellites. Further, the position information may include coordinates information represented by latitude and longitude. For example, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Specifically, the GPS module can further obtain three-dimensional speed information and an accurate time, as well as position on latitude, longitude and altitude, from the position information received from the satellites.

In addition, the A/V input unit 120 is configured to provide audio or video signal input to the mobile terminal. The A/V input unit 120 may include a camera 121 and a microphone 122. Further, the camera 121 receives and processes image frames of still pictures or video obtained by image sensors in a video call mode or a capturing mode. The processed image frames may then be displayed on a display 151

Also, the image frames processed by the camera 121 may be stored in the memory 160 or transmitted to the exterior via the wireless communication unit 110. Two or more cameras 121 may be provided according to the configuration of the mobile terminal. The microphone 122 may receive an external audio signal via a microphone while the mobile terminal is in a particular mode, such as a phone call mode, a recording mode, a voice recognition mode, or the like. This audio signal is processed into digital data, and the processed digital data is converted for output into a format transmittable to a mobile communication base station via the mobile communication module 112 for the phone call mode. The microphone 122 may also include assorted noise removing algorithms to remove noise generated in the course of receiving the external audio signal.

In addition, the user input unit 130 may generate input data input by a user to control the operation of the mobile terminal. The user input unit 130 may include a keypad, a dome switch, a touchpad (e.g., static pressure/capacitance), a jog wheel, a jog switch and the like. A specific example can be one in which the touchpad is layered with the display 151 to be explained later so as to be in cooperation with the display 151, which is referred to as a touch screen. Further, the sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100.

For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device. Here, the sensing unit 140 may include a proximity sensor 141, which will be described later in relation to a touch screen.

In addition, the interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like. The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

In addition, the interface unit 170 may receive data from an external device, or be provided with power and accordingly transfer the received data or power to each component within the mobile terminal 100 or transfer data of the mobile terminal 100 to an external device. Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals and power inputted from the cradle may operate as a signal for recognizing that the mobile terminal 100 has accurately been mounted to the cradle.

The output unit 150 is configured to output an audio signal, a video signal or an alarm signal, and may include the display 151, an audio output module 152, an alarm 153, and the like. Further, the display 151 may output information processed in the mobile terminal 100. For example, when the mobile terminal is operating in a phone call mode, the display 151 provides a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI.

Meanwhile, as mentioned above, a touch screen can be configured as the display 151 and the touchpad are layered with each other to work in cooperation with each other. This configuration permits the display 151 to function both as an input device and an output device. The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of the displays according to embodiments of the present invention can be configured to be transparent such that it is possible to see the exterior therethrough. These displays may be called transparent displays. A representative example of the transparent display may include a Transparent Organic Light Emitting Diode (TOLED), and the like. Further, the mobile terminal 100 may include two or more of such displays 151. For example, the mobile terminal 100 may simultaneously include an external display (not shown) and an internal display (not shown).

In addition, the touch screen may be configured so as to detect a touch input pressure as well as touch input position and touch input area. Also, the proximity sensor 141 may be disposed inside the touch screen or near the touch screen. The proximity sensor 141 denotes a sensor for detecting whether there is an object approaching a certain detection surface or existing near the certain detection surface by using a force of an electromagnetic field or infrared rays, without any mechanical contact. Therefore, the proximity sensor 141 has a considerably long lifespan as compared to a contact sensor and also implement considerably high utility.

Examples of the proximity sensor 141 include a transmission type photo sensor, a direct reflection type photo sensor, a mirror reflection type photo sensor, a high frequency oscillation type proximity sensor, a capacitive proximity sensor, a magnetic proximity sensor, an infrared proximity sensor and the like. Also, even without the proximity sensor 141 mounted, if an electrostatic touch screen is provided, the proximity of a pointer can be detected based upon the change in an electric field due to the proximity of the pointer.

Therefore, if the pointer is located near the touch screen without actually contacting the touch screen, the location of the pointer and the distance (gap) between the pointer and the touch screen can be detected. Hereinafter, the behavior that the pointer is located near the touch screen so as to be recognized as being located above the touch screen is referred to as a "proximity touch," and the behavior that the pointer is actually contacts the touch screen is referred to as "contact touch." Also, the location at which the proximity touch of the pointer is recognized above the touch screen denotes a location at which the pointer is located perpendicularly to the touch screen for the proximity touch of the pointer.

The use of the proximity sensor 141 allows the detection of proximity touch and proximity touch patterns (e.g., proximity touch distance, proximity touch direction, proximity touch speed, proximity touch time, proximity touch location, proximity touch movement state and the like), and also allows the output on the touch screen of information related to the detected proximity touch operation and the proximity touch pattern.

Further, the audio output module 152 may output audio data which is received from the wireless communication unit 110 in various modes including a call-receiving mode, call-placing mode, recording mode, voice recognition mode, broadcast reception mode, and the like, or audio data stored in the memory 160. Also, the audio output module 152 may output an audio signal relating to a particular function (e.g., call received, message received, etc.) performed in the mobile terminal 100. The audio output module 152 may be implemented using a speaker, a buzzer, or the like.

In addition, the alarm 153 may output a signal to inform a generation of event associated with the mobile terminal 100. Alarm events may include a call received, message received, user input received and the like. In addition to generating the audio or video signal, the alarm 153 may also inform the event generation in different manners, for example, by providing tactile sensations (e.g., vibration) to a user. The alarm 153 may also be configured to vibrate responsive to the mobile terminal receiving a call or message. As another example, vibration is provided by the alarm 153 responsive to receiving user input at the mobile terminal, thus providing a tactile feedback mechanism. Such vibration can also be provided to make a user recognize the event generation. The signal informing the event generation may be output via the display 151 or the audio output module 152.

Further, the memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio outputted upon the touch input on the touch screen. In addition, the memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

In addition, the controller 180 generally controls the overall operations of the mobile terminal. For example, the controller 180 performs the control and processing associated with voice calls, data communications, video calls, and the like. The controller 180 may also include a multimedia module 181 which provides multimedia playback. The multimedia module 181 may be configured as part of the controller 180 or as a separate component. The controller 180 can also perform a pattern recognition processing so as to recognize writing or drawing input on the touch screen as text or image. Further, the power supply 190 provides power required by various components under the control of the controller 180. The provided power may be internal power, external power, or combination thereof.

The internal components of the mobile terminal related to an embodiment of the present invention have been described from the perspective of their functions. Hereinafter, external components of the mobile terminal related to an embodiment of the present invention will be described from the perspective of their functions with reference to FIGS. 2 and 3. Further, the mobile terminal may be implemented in a variety of different configurations. Examples of such configurations include a folder type, slide type, bar type, rotating type, swing type or the like. The present description in FIGS. 2 and 3 relates to a slide-type mobile terminal, but the present invention is not limited to the slide-type mobile terminal, and can be applied to other types of terminals including the above-mentioned types of terminals.

Figure 2:
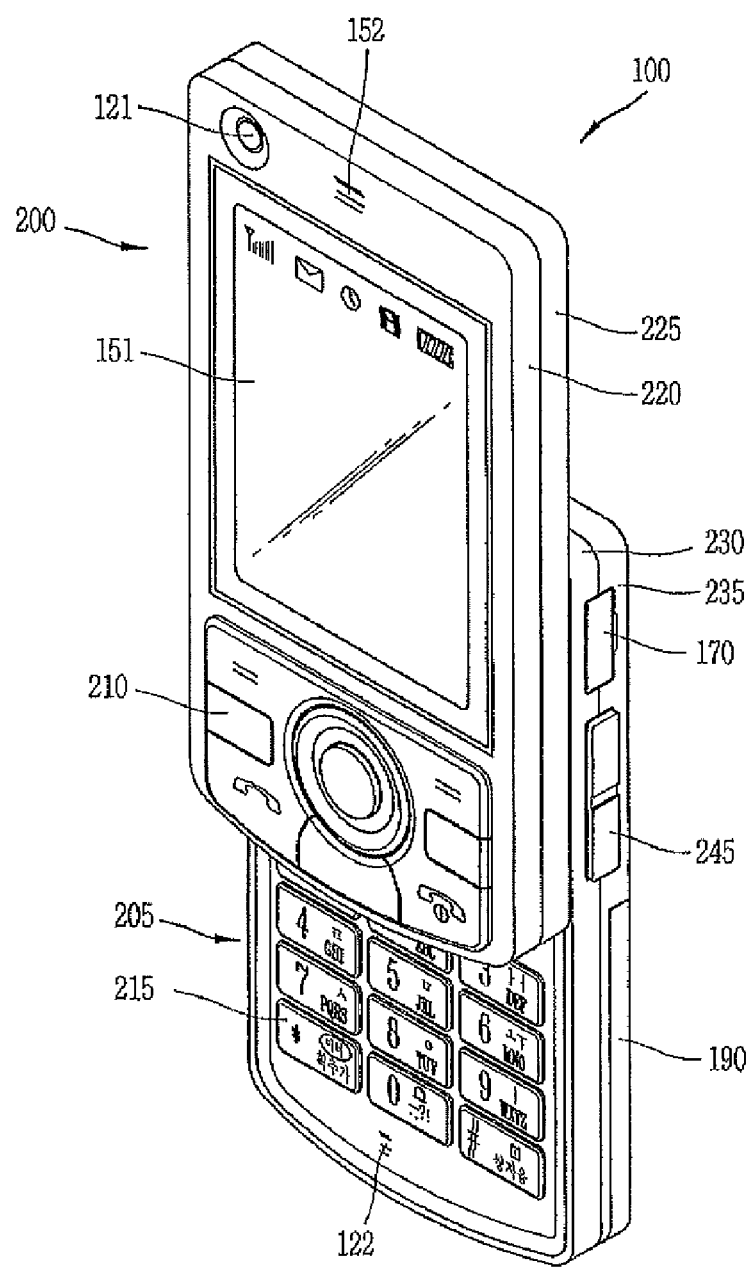
FIG. 2 is a front perspective view of a mobile terminal according to an embodiment of the present invention.

FIG. 2 is a front perspective view of a mobile terminal according to an embodiment of the present invention. As shown, the mobile terminal 100 includes a first body 200, and a second body 205 configured to slidably cooperate with the first body 200 in at least one direction. For a folder-type mobile terminal, the mobile terminal 100 may include the first body 200, and the second body 205 configured to have at least one side folded or unfolded with respect to the first body 200.

Also, the first body 200 is positioned over the second body 205 in a manner that the second body 205 is obscured by the first body 200. This state can be referred to as a closed configuration (position). As illustrated in FIG. 2, the state where the first body 200 exposes at least part of the second body 205 can be referred to as an open configuration (position). In addition, when the mobile terminal is a folder-type mobile terminal including a first body and a second body having one side folded or unfolded with respect to the first body, the folded state of the second body can be referred to as the closed configuration, whereas the unfolded state of the second body can be referred to as the open configuration.

In addition, when the mobile terminal is a swing-type mobile terminal including a first body and a second body capable of being swung with respect to the first body, the state that the first body is overlapped with the second body can be referred to as the closed configuration whereas the state that the second body is swung thus to make the first body partially exposed can be referred to as the open configuration. Also, even though a specific description is not given of the folder-type mobile terminal and the swing-type mobile terminal with respect to FIGS. 2 and 3, it can be easily understood by those skilled in the art and thus a detailed description thereof will not be repeated.

In addition, the mobile terminal may be operable in a standby (idle) mode when in the closed configuration, but this mode can be released by the user's manipulation. Also, the mobile terminal may be operable in an active (phone call) mode in the open configuration. This mode may also be changed into the idle mode according to the user's manipulation or after a certain time elapses. As shown in FIG. 2, a case (housing, casing, cover, etc.) forming the outside of the first body 200 is formed by a first front case 220 and a first rear case 225. In addition, various electronic components may be disposed in a space between the first front case 220 and the first rear case 225. One or more intermediate cases may additionally be disposed between the first front case 220 and the first rear case 225.

Further, the cases can be formed of resin in a manner of injection molding, or formed using metallic materials such as stainless steel (STS) and titanium (Ti). Also, a display 151, an audio output module 152, a camera 121 or a first user input unit 210 may be disposed at the first front case 220 of the first body 200. In addition, the display 151 may include LCD, OLED, and the like, which can visibly display information. The display 151 and a touchpad can also be layered with each other such that the display 151 can be configured to function as a touch screen so as to allow a user to input information in a touching manner.

Further, the audio output module 152 may be implemented as a speaker, and the camera 121 may be Implemented to be suitable for a user to capture still images or video. In addition, like the first body 200, a case configuring the outside of the second body 205 may be formed by a second front case 230 and a second rear case 235. Also, the second user input unit 215 may be disposed at the second body 205, and in more detail, at a front face of the second front case 230. A third user input unit 245, a microphone 122 and an interface unit 170 may also be disposed either at the second front case 230 or at the second rear case 235.

Further, the first to third user input units 210, 215 and 245 may be referred to as a user input unit 130. Any tactile manner that a user can touch, e.g., the display 151, for manipulation can be employed for the user input unit 130. For example, the user input unit 130 can be implemented as a dome switch or touchpad which a user can input information in a pushing or touching manner, or implemented in a manner of using a wheel, a jog or a joystick to rotate keys.

Regarding each function, the first user input unit 210 can be used for inputting commands such as START, END, SCROLL or the like, and the second user input unit 215 can be used for inputting numbers, characters, symbols, or the like. The first user input unit 210 may also include so-called soft keys used in cooperation with icons displayed on the display module 151, and navigation keys (usually composed of four navigation keys and a central key) for indicating and confirming an orientation. Also, the third user input unit 245 can be operated as a hot key for activating a specific function within the mobile terminal, and the microphone 122 may be implemented to be suitable for receiving user's voice or various sounds.

In addition, the interface unit 170 may be used as a passage through which the terminal related to the present invention can exchange data or the like with an external device. For example, the interface unit 170 may be implemented as one of a wired/wireless connection port for connecting an earphone to the mobile terminal, a port for short-range communications (e.g., an Infrared Data Association (IrDA) port, a BLUETOOTH port, a wireless LAN port, etc.), power supply ports for providing power to the mobile terminal, or the like.

The interface unit 170 can be a card socket for receiving an external card, such as a Subscriber Identity Module (SIM), a User Identity Module (UIM), a memory card for storing information, or the like. The power supply 190 may be disposed at a side of the second rear case 235 to provide power to the mobile terminal, and may be a rechargeable battery, for example, to be attachable/detachable for charging.

Figure 3:
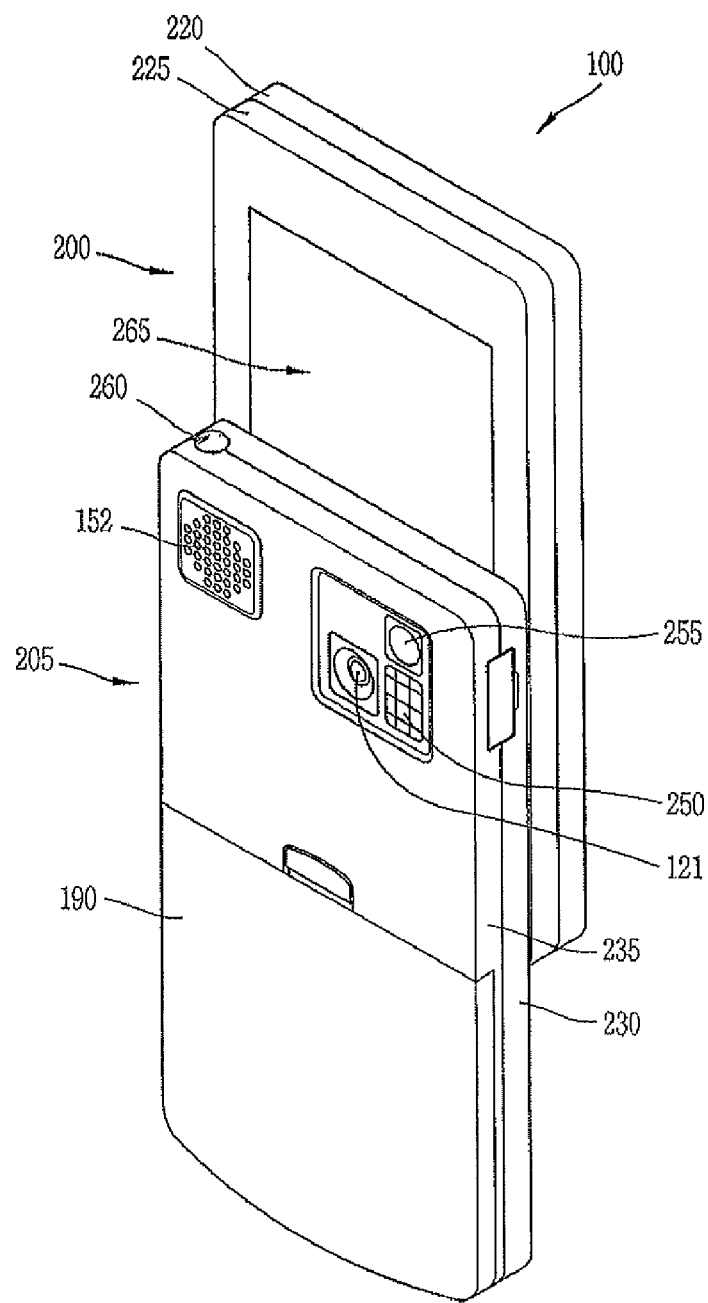
FIG. 3 is a rear perspective view of a mobile terminal according to an embodiment of the present invention.

Next, FIG. 3 is a rear perspective view of the mobile terminal according to an embodiment of the present invention. As illustrated in FIG. 3, a camera 121 may further be disposed at a rear face of the second rear case 235 of the second body 205. In addition, the camera 121 of the second body 205 faces a direction which is opposite to a direction faced by the camera 121 of the first body 200, and may have different pixels from those of the camera 121 of the first body 200.

For example, the camera 121 of the first body 200 may operate with relatively lower pixels (lower resolution). Thus, the camera 121 of the first body 200 may be useful when a user can capture his face and send it to another party during a video call or the like. On the other hand, the camera 121 of the second body 205 may operate with a relatively higher pixels (higher resolution) such that it can be useful for a user to obtain higher quality pictures for later use. Also, a flash 250 and a mirror 255 may additionally be disposed adjacent to the camera 121 of the second body 205. The flash 250 operates in conjunction with the camera 121 of the second body 250 when taking a picture using the camera 121 of the second body 205. In addition, the mirror 255 can cooperate with the camera 121 of the second body 205 to allow a user to photograph himself in a self-portrait mode.

The second rear case 235 may further include an audio output module 152. Also, the audio output module 152 of the second body 205 can cooperate with the audio output module 152 of the first body 200 to provide stereo output. In addition, the audio output module 152 may be configured to operate as a speakerphone. A broadcast signal receiving antenna 260 may also be disposed at one side of the second rear case 235, in addition to an antenna for communications. The antenna 260 can be configured to retract into the second body 205. One part of a slide module 265 which allows the first body 200 to be slidably coupled to the second body 205 may be disposed at the first rear case 225 of the first body 200.

Further, the other part of the slide module 265 may be disposed at the second front case 230 of the second body 205, such that it may not be exposed to the exterior as illustrated in the drawing of the present invention. As such, it has been described that the camera 121 is disposed at the second body 205; however, the present invention may not be limited to the configuration. For example, it is also possible that one or more of those components (e.g., 260, 121-250, 152, etc.), which have been described to be implemented on the second rear case 235, such as the camera 121, will be implemented on the first body 200, particularly, on the first rear case 225. In this configuration, the component(s) disposed on the first rear case 225 can be protected by the second body 205 in a closed position of the mobile terminal. In addition, without the camera 121 of the second body 205, the camera 121 of the first body 200 can be implemented to be rotatable so as to rotate up to a direction which the camera 121 of the second body 205 faces.

The mobile terminal 100 of FIGS. 1 to 3 may also be configured to operate within a communication system which transmits data via frames or packets, including both wireless and wireline communication systems, and satellite-based communication systems. Hereinafter, a communication system within which the mobile terminal related to the present invention can operate will be described with reference to FIG. 4. Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like. By way of non-limiting example only, further description will relate to a CDMA communication system, but such teachings apply equally to other system types including the CDMA wireless communication system.

Figure 4:
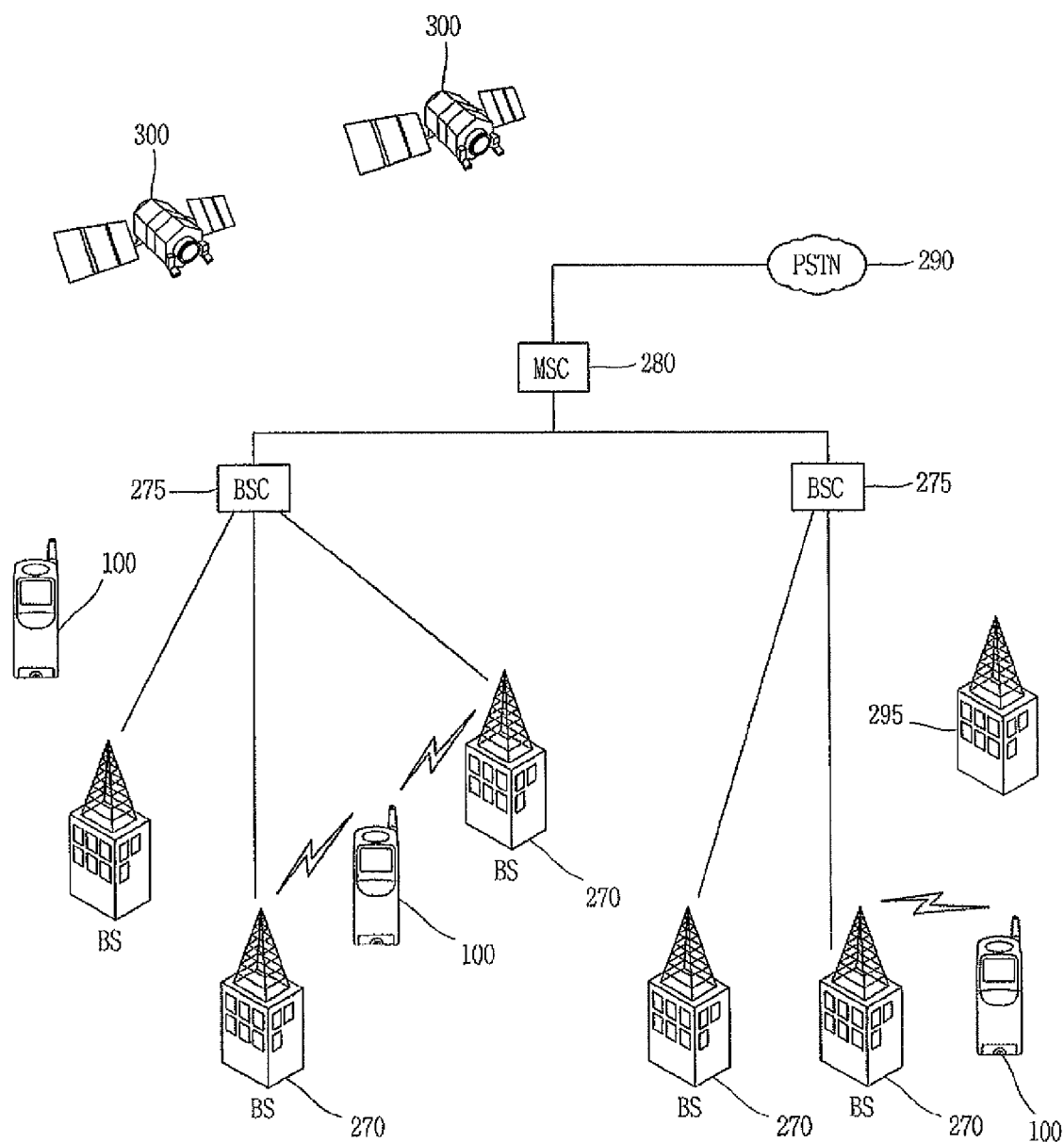
FIG. 4 is a block diagram illustrating a communication system operable with a mobile terminal according to an embodiment of the present invention.

Referring now to FIG. 4, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 4.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some instances, the term "base station" may be used to refer collectively to a BSC 275, and one or more base stations 270. The base stations may also be denoted as "cell sites." Alternatively, individual sectors of a given base station 270 may be referred to as cell sites. A broadcasting transmitter (BT) 295, as shown in FIG. 4, transmits a broadcast signal to the mobile terminals 100 operating within the system. The broadcast receiving module 111 (FIG. 1) can also be configured inside the mobile terminal 100 to receive broadcast signals transmitted by the BT 295.

FIG. 4 further depicts several Global Positioning System (GPS) satellites 300. Such satellites 300 facilitate locating the position of at least one of plural mobile terminals 100. Two satellites are depicted in FIG. 4, but it is understood that useful position information may be obtained with greater or fewer satellites than two satellites. The GPS module 115 (FIG. 1) can also be configured to cooperate with the satellites 300 to obtain desired position information. It is to be appreciated that other types of position detection technology (i.e., location technology that may be used in addition to or instead of GPS location technology) may alternatively be implemented. If desired, at least one of the GPS satellites 300 may alternatively or additionally be configured to provide satellite DMB transmissions.

During an operation of the wireless communication system, the base stations 270 receive sets of reverse-link signals from various mobile terminals 100. The mobile terminals 100 are engaging in calls, messaging, and executing other communications, and each reverse-link signal received by a given base station 270 is processed within that base station 270. The resulting data is then forwarded to an associated BSC 275. Further, the BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Operations and functions of mobile terminals according to the present invention will now be described from the perspective of their configurations and interfacing methods.

Configuration of a Mobile Terminal According to an Embodiment of the Present Invention A mobile terminal according to an embodiment of the present invention will be divided, according to a structure of a display, into a mobile terminal having a dual display and a mobile terminal having a single display. In more detail, FIG. 5 shows various types of mobile terminals each having the single display, and FIG. 6 shows various types of mobile terminals each having the dual display. Each mobile terminal having the dual display and the single display as shown in FIGS. 5 and 6 may be applicable to various types of mobile terminals, including folder-type (a), flip-type (b), slide-type (c), bar-type (d), rotating-type (e) (e.g., swivel-type or swing-type), watch-type (f), or the like.

Hereinafter, a mobile terminal having the single or dual display may have a transparent display. In addition, a non-transparent display may further be provided. The transparent display and the non-transparent display may be configured to be overlapped with each other or be separately provided. That is, the single display shown in FIG. 5 may be configured as one display module having the transparent display and the non-transparent display being overlapped with each other or be implemented only with the transparent display, whereas the dual display shown in FIG. 6 may be configured to have the transparent display and the non-transparent display separately provided.

In addition, in all embodiments, the transparent display may be defined as a Transparent OLED (TOLED), and the non-transparent display may be defined as the display module 151 or a Liquid Crystal Display (LCD). However, the transparent and non-transparent displays are not limited to the TOLED and the LCD, respectively. Also, the transparent display may be a permeable display having both displayable surfaces (e.g., inner surface-outer surface, or lower surface-upper surface). Further, the embodiments disclosed in the present invention may be applied to all types of mobile terminal; however, depending on embodiments, a certain type of mobile terminal may be illustrated, which is appropriate for the sake of explanation.

Dual Display—Folder-Type Mobile Terminal

Figure 7A:
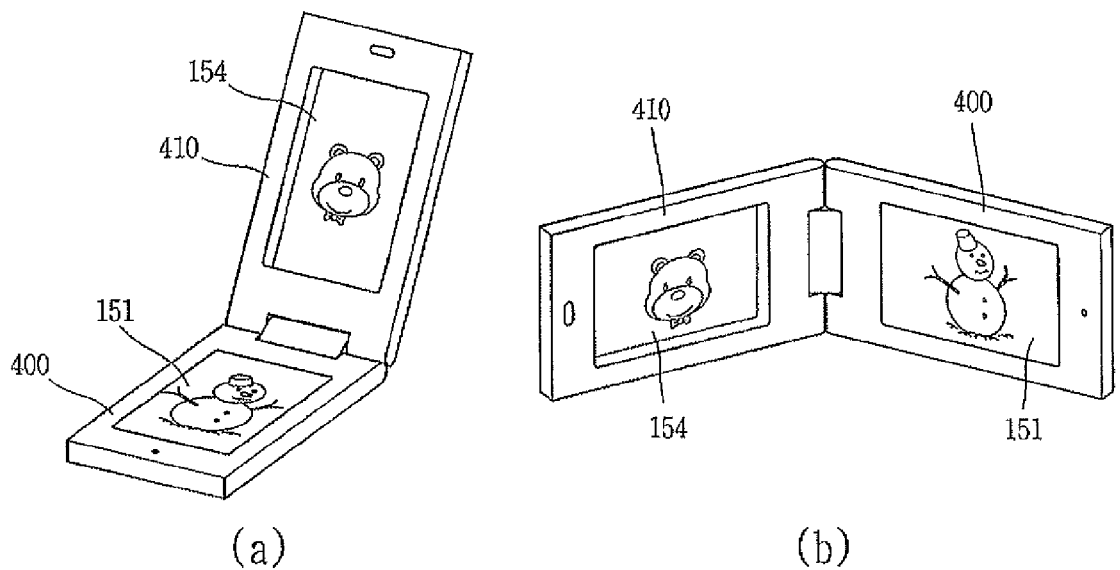
FIGS. 7A and 7B are overviews illustrating a folder type mobile terminal having a dual transparent display according to an embodiment of the present invention, which shows a mobile terminal capable of changing an information displaying direction according to the posture of the mobile terminal.
Figure 7B:
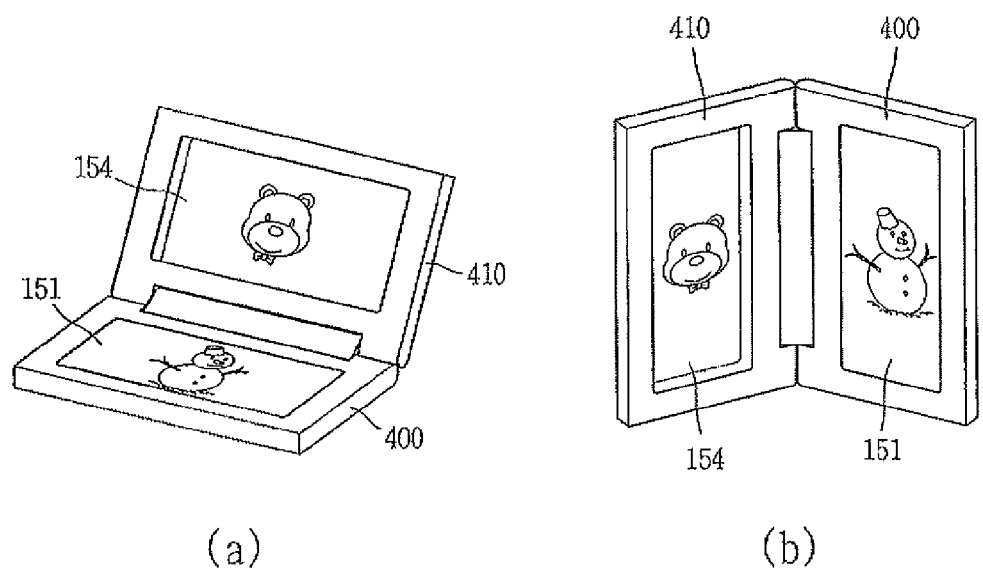

FIGS. 7A and 7B are overviews of a folder-type mobile terminal having a dual transparent display according to an embodiment of the present invention, which shows a mobile terminal having variable directions to display information according to a posture of the mobile terminal. As shown in FIGS. 7A and 7B, a folder-type mobile terminal according to an embodiment of the present invention may be configured such that a TOLED 154 is disposed at a folding portion 410 and a LCD 151 is disposed at a main body portion 400. Further, the LCD 151 may operate as a main display and the TOLED 154 may operate as a sub display.

Such positions of the TOLED 154 and the LCD 151 may also be changed, and accordingly, their functions as the main and sub displays may also be changed. For example, under the open position of the folding portion 410, the TOLED 154 may serve as a main display while the LCD 151 may serve as a sub display. Also, the LCD 151 can display an interactive keypad in one embodiment. In addition, under the closed state of the folding portion 410 of the mobile terminal, if the TOLED 154 independently operates, the operation of the LCD 151 at the main body portion 400 can be blocked such that it cannot interrupt the displaying of the TOLED 154.

Further, the TOLED 154 and the LCD 151 may be overlapped by a touchpad on any one of their upper or lower surface, so as to be useable as touch screens. Hereinafter, although not separately mentioned in every embodiment of the present invention, it is assumed that the TOLED 154 and the LCD 151 function as a touch screen. Also, the folder-type mobile terminal may be configured for its folding portion to be folded (closed) or unfolded (opened) in a vertical direction (i.e., up and down direction) or in a horizontal direction (i.e., right and left direction), according to its posture (i.e., its rotational direction). Thus, the mobile terminal may detect its posture (i.e., the rotational direction) and also rotate information output on the TOLED 154 or the LCD 151 for output according to its detected posture (i.e. the rotational direction).

In addition, FIG. 7A is an overview illustrating a method for displaying information when the folding portion 410 is open or closed in the vertical direction, and FIG. 7B is an overview illustrating a method for displaying information when the folding portion 410 is open or closed in the horizontal direction. Further, FIG. 8 is an overview of a folder-type mobile terminal having a dual transparent display according to an embodiment of the present invention, which shows a mobile terminal further having a keypad and a display. Also, the mobile terminal shown in FIG. 8 may be configured such that TOLED 154 is disposed at the folding portion 410 and the LCD 151 and keypad of the user input unit 130 are disposed at the main body portion 400. The TOLED 154 may also operate as a main display.

Preferably, the TOLED 154 serving as the main display executes and displays most of functions and operations of the mobile terminal including a multimedia function and communication function. On the other hand, the LCD 151 at the main body portion 400 executes operations associated with the keypad of the user input unit 130 and calls. When the TOLED 154 independently operates under the closed state of the folding portion 410, the emission of backlights in a dome keypad may preferably be prevented, so as to protect the displaying of the TOLED 154 from the interference of the emission.

FIG. 8(*a*) is a perspective view of a front face of the folder-type mobile terminal having a transparent display according to an embodiment of the present invention, and FIG. 8(*b*) is a perspective view of a rear face thereof. Further, FIG. 9 is an overview of a mobile terminal having a dual transparent display according to an embodiment of the present invention, which shows a mobile terminal having a folding portion rotatable by 360°.

Also, the mobile terminal shown in FIG. 9 may be configured to have the TOLED 154 disposed at the folding portion 410 and the LCD 151 and a keypad of the user input unit 130 both disposed on the main body portion 400. Also, the TOLED 154 and the LCD 151 can display various types of information by dividing them according to their purposes of use. For instance, the TOLED 154 may display as the main display information related to most of the functions and operations executed in the mobile terminal as well as the multimedia function and the communication function, while the LCD 151 may display as the sub display telephone numbers input for placing a call or additional information.

Further, the mobile terminal according to this embodiment can implement a dual look by configuring a hinge 402 disposed between the folding portion 410 and the main body portion 400 to be rotatable by 360°. That is, as shown in FIGS.

9(a) to 9(d), the mobile terminal can be folded by rotating the main body portion 400 by 360° centering around the hinge 402.

Next, FIG. 10 is an overview of a mobile terminal having a dual transparent display according to an embodiment of the present invention, which shows the mobile terminal being capable of photographing in a state of a folder being closed. As shown, the mobile terminal may be configured such that TOLED 154 is disposed at the folding portion 410 and the LCD 151 and keypad of the input unit 130 are both disposed at the main body portion 400. Further, the TOLED 154 may operate as a main display and the LCD 151 may operate as a sub display. For example, the TOLED 154 serving as the main display can display information related to most of the functions and operations of the mobile terminal including the multimedia function and communication function, while the LCD 151 can display a telephone number input for placing a call on the keypad and additional information such as an indicator.

In addition, the mobile terminal may further be provided with the camera 121 disposed between the LCD 151 and the keypad of the input unit 130. By disposing the camera 121 between the LCD 151 and the keypad of the input unit 130, a user can photograph an object to be taken or photograph himself in a self-portrait mode not only in the open sate of the folding portion 410 but also in the closed state. This is because the photographing operation can be executed through the TOLED 154.

Also, in the closed state of the folding portion 410, the camera 121 is located at a central portion of the rear side of the TOLED 154. Hence, assuming as mentioned above that a video call is attempted in the closed state of the folding portion 410, another party's image is displayed on the TOLED 154, and the camera 121 is located at the rear side of the other party's image displayed on the TOLED 154. Accordingly, when the user faces the other party's image displayed on the TOLED 154, an effect is generated as if the user directly faces the camera 121. Therefore, the controller 180 can send the user's face image to the other party's terminal by using the camera 121. Thus, the other party can feel like they are directly talking with the user. That is, because the parties are looking directly into the cameras when they are conducting a video call between each other, the parties feel as if they are directly talking to each other.

In another embodiment, a bar-type mobile terminal can be configured such that the camera 121 is disposed at a central portion of a lower side of the TOLED 154 and an object viewed through the TOLED 154 can be photographed. Here, an image (interference image) displayed on the TOLED 154 may be photographed together with the object. In this instance, such image of the object can be compensated using preset compensation data. If the interference image is included in the image of the object by more than a certain reference, the transparency of the TOLED 154 increases such that the interference image can be reduced by a compensatable level.

Also, when using a self-portrait mode, the mobile terminal having the TOLED 154 may be configured to display a preview image of the camera 121 on a non-overlapped portion between the camera 121 and the TOLED 154. For example, when a folding portion having the TOLED 154 is slid up to operate a self-portrait mode in a slide-type mobile terminal, the preview image can be displayed on the slid-up portion of the TOLED 154.

In addition, if other information (e.g., multimedia image information) is being displayed on the TOLED 154, the controller 180 can simultaneously display both the multimedia image information and the preview image of the camera 121 by adjusting the transparency and color of the TOLED 154. Further, an image to be displayed on the TOLED 154 can manually be changed by the user's input. Also, to receive the user's input, the mobile terminal may include a sensor for detecting information such as an inclination, touching, key input, pressure, proximity, voice or the like.

Next, FIG. 11 is an overview of a mobile terminal having a dual transparent display according to an embodiment of the present invention, which shows a method for controlling a size of information output in cooperation with the opening or closing of a folding portion.

Further, as shown, the TOLED 154 is disposed on the folding portion 410 and the LCD 151 is disposed on the main body portion 400. Also, each of the TOLED 154 and the LCD 151 may be obscured by a touchpad on their upper surface or a lower surface, so as to operate as a touch screen. As discussed above, any one of the TOLED 154 or LCD 151 may serve as a main display, and the other as a sub display. For example, the TOLED 154 may be used to display menu information for displaying operational states of the mobile terminal or to control a multimedia playback under the closed state of the mobile terminal. Also, the TOLED 154 may serve as a sub display to assist a main display (e.g., LCD 151) according to various scenarios of user interfaces under the open state of the mobile terminal.

Figure 12B:
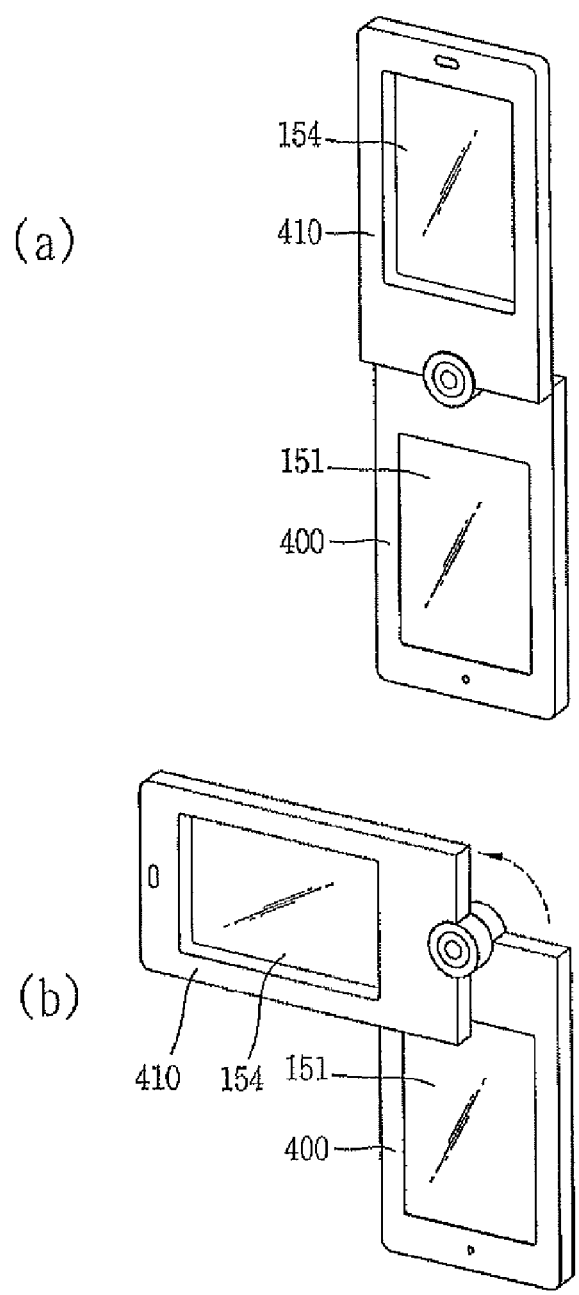

FIGS. 12A and 12B are overviews illustrating a swivel-type mobile terminal having a dual transparent display according to an embodiment of the present invention. As shown in FIGS. 12A and 12B, the swivel-type mobile terminal may be separately provided with the TOLED 154 and LCD 151. Similar to the different types of mobile terminals having the dual display as above, the TOLED 154 and the LCD 151 may serve respectively as main display and sub display so as to display different information from each other.

For example, the TOLED 154 may be used as the main display in the open state of the folding portion 410, the LCD 151 may serve as the sub display to display a keypad in a software configuration. Also, as shown in FIGS. 12A and 12B, the mobile terminal may have a swivel hinge 403 that allows the folding portion 410 to be rotated or moved to a certain angle (or position).

Dual Display—Flip-Type Mobile Terminal

Figure 13:
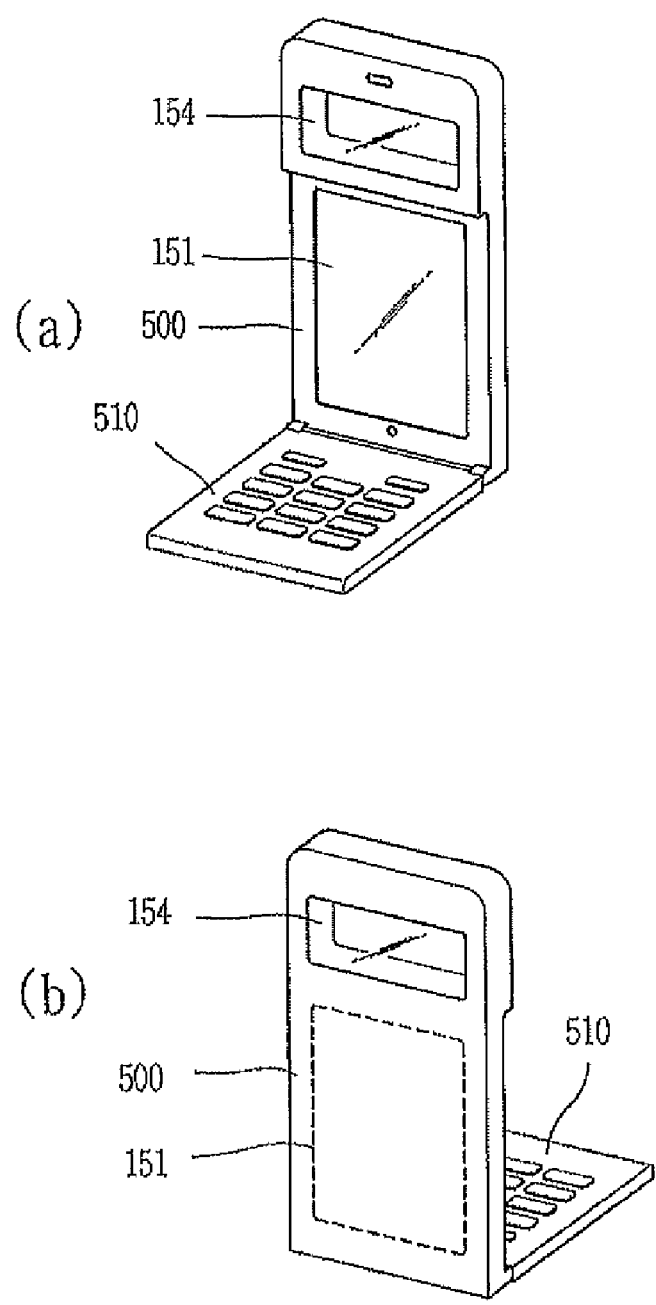
FIG. 13 is an overview illustrating a flip type mobile terminal having a dual transparent display according to an embodiment of the present invention.

FIG. 13 is an overview illustrating a flip-type mobile terminal having a dual transparent display according to an embodiment of the present invention. As shown in FIG. 13, the flip-type mobile terminal may be configured such that a keypad is disposed on a flip portion 510 and the TOLED 154 and LCD 151 are all disposed on a main body portion 500. Further, the TOLED 154 and the LCD 151 may operate as any of a main display or a sub display. For example, for displaying various information related to the mobile terminal (e.g., a current time, absent calls, message received, additional service related information, and the like) on the TOLED 154, a user can check such information on any portion of a front or rear surface of the mobile terminal even in the closed state.

Figure 14:
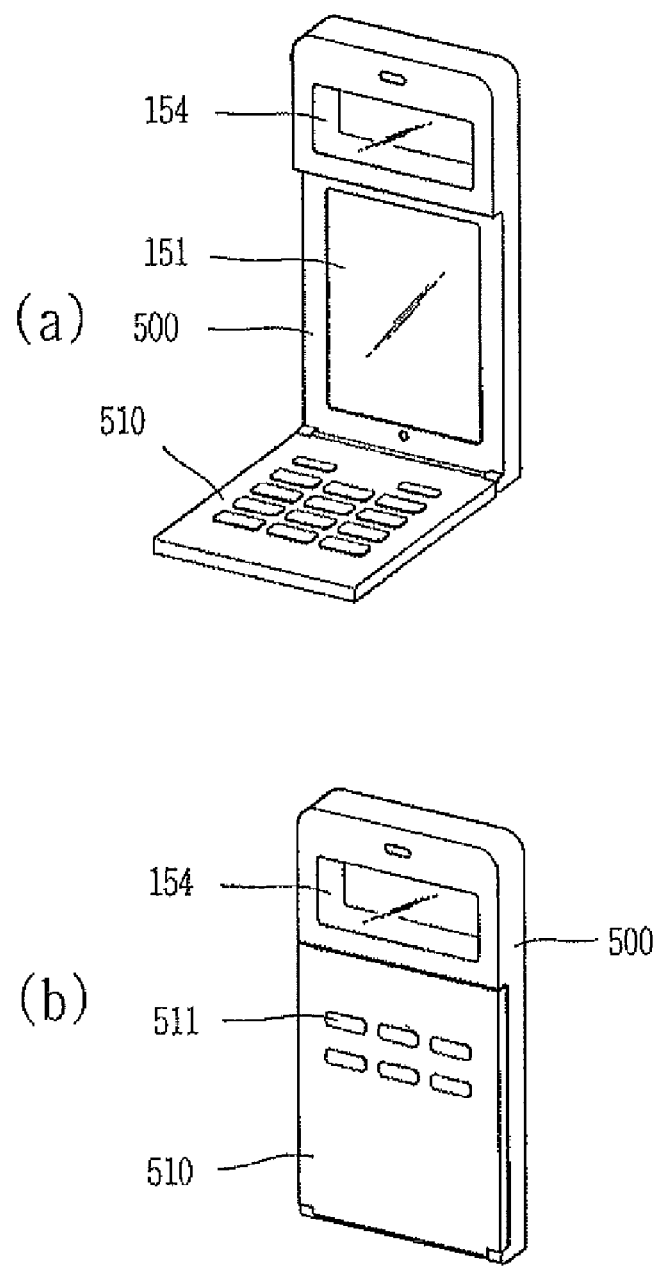
FIG. 14 is another overview illustrating the flip type mobile terminal of FIG. 13.

Next, FIG. 14 is an overview illustrating another embodiment of the flip-type mobile terminal of FIG. 13, in which a separate sub-keypad 511 may be disposed on an outer surface of the flip portion 510. Such arrangement of the sub-keypad 511 on the outer surface of the flip portion 510 allows the user to control the operation of the mobile terminal with reference to information displayed on the TOLED 154 even in the closed state of the flip portion 510.

Further, FIG. 15 is another overview illustrating the flip-type mobile terminal of FIG. 13. As shown in FIG. 15, the TOLED 154 is disposed on the flip portion 510 and the LCD 11 is disposed on the LCD 151. The TOLED 154 and the LCD 151 may operate as any of a main display or a sub display. For example, assuming that the TOLED 154 operates as a main display in the open state of the flip portion 510, the LCD 151 serves as a sub display so as to display a keypad in a software configuration.

Also, if the TOLED 154 operates as a sub display in the closed state of the flip portion 510, the TOLED 154 can display for example, a software key for manipulating the mobile terminal, an operational state of the mobile terminal, wireless (radio) information transmitted/received to/from the mobile terminal, and various additional information (e.g., current time, absent calls, message received, additional service related information, and the like).

Dual Display—Slide-Type Mobile Terminal

Figure 16:
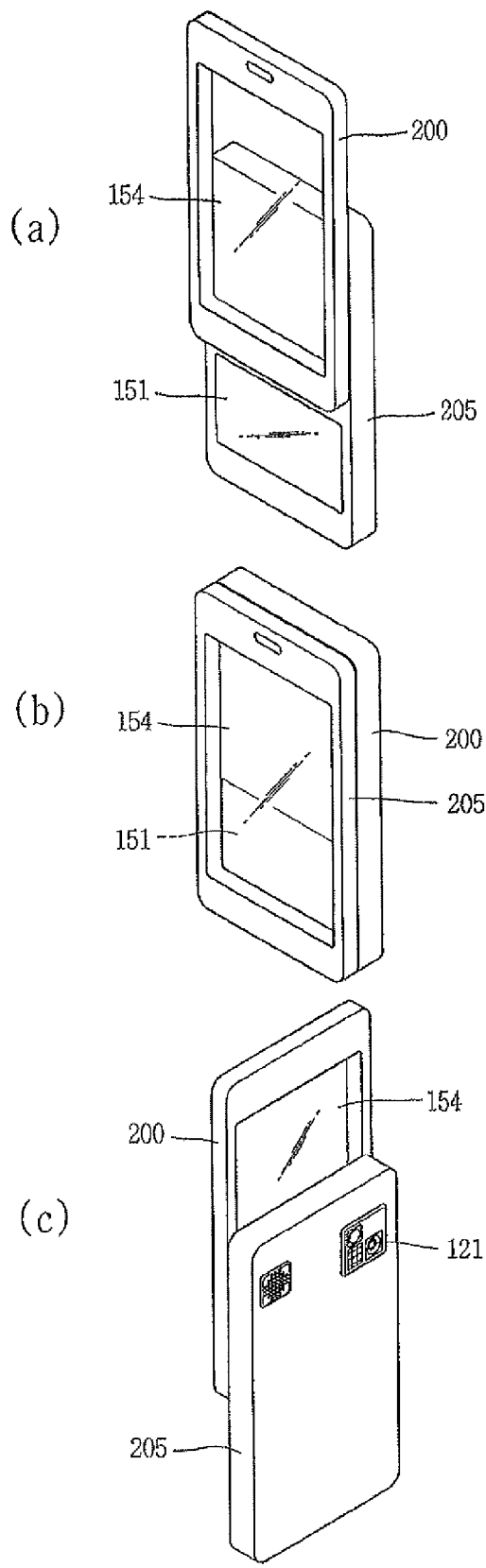
FIG. 16 is an overview of a mobile terminal having a dual transparent display according to an embodiment of the present invention, which shows a method of displaying information on the transparent display in cooperation with an opening or closing of a sliding portion.

FIG. 16 is an overview illustrating a mobile terminal having a dual transparent display according to an embodiment of the present invention, which shows a method for displaying information on a transparent display in cooperation with the opening or closing of a sliding portion of the mobile terminal.

As shown in FIG. 16, the slide-type mobile terminal may be configured to have TOLED 154 disposed on a first body 200 and the LCD 151 disposed on a second body 205. Further, the TOLED 154 and the LCD 151 may operate as any of a main display or a sub display, and each can display various different types of information. As one example, when the user photographs himself in a self-portrait mode, the user can easily do photograph himself based upon image information output on the TOLED 154.

For example, previously, the user had to photographed himself in the self-portrait mode by using a mirror disposed adjacent to a camera. However, in the embodiment of the present invention, as shown in FIG. 16(c), an image reflected on the camera 121 can be output as a preview image on a partial display region of the TOLED 154 (e.g., a display region seen from the rear side of the mobile terminal when being slid up). Hence, the user can photograph himself more easily by viewing an image displayed on the TOLED 154. Also, as shown in FIG. 16(a), the TOLED 154 transmits an image output on the LCD 151 when the sliding portion is in the closed state. Accordingly, even in the closed state of the sliding portion, it is possible to output and control basic information required to control the mobile terminal.

Dual Display—Bar-Type Mobile Terminal

Figure 17:
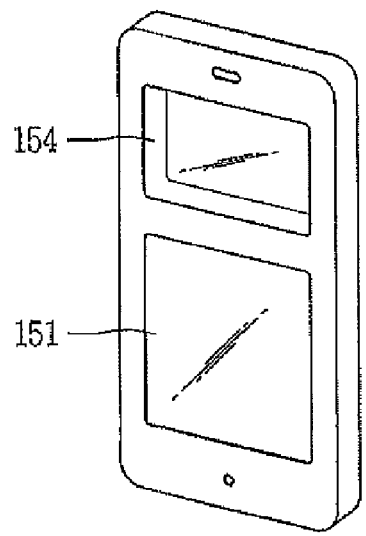
FIG. 17 is an overview of a bar type mobile terminal having a dual transparent display according to an embodiment of the present invention.

FIG. 17 is an overview illustrating a bar-type mobile terminal having a dual transparent display according to an embodiment of the present invention. As shown in FIG. 17, the bar-type mobile terminal may be configured to have the TOLED 154 disposed on an upper portion of a terminal body and the LCD 151 disposed on a lower portion thereof. Further, the TOLED 154 and the LCD 151 may operate as any of a main display or a sub display, and each can display various different types of information.

Figure 18:
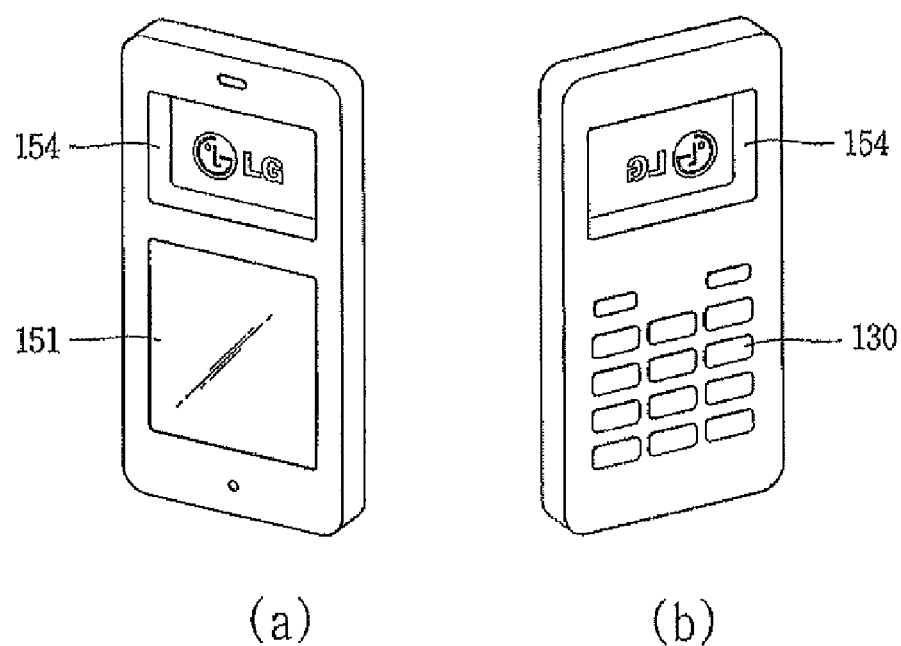
FIG. 18 is an overview illustrating a mobile terminal configured to utilize a rear surface of the bar type mobile terminal of FIG. 17.

FIG. 18 is an overview of another embodiment of the bar-type mobile terminal of FIG. 17, in which the mobile terminal is configured such that its rear surface can be used as another type of mobile terminal. As shown in FIG. 18, the mobile terminal may be configured such that the LCD 151 is disposed below the TOLED 154 on a front surface of the mobile terminal and the keypad 131 is disposed below the TOLED 154 on a rear surface of the mobile terminal. Further, information displayed on the TOLED 154 is provided in order to represent that the information displayed on the front surface of the TOLED 154 is transmitted and displayed on the rear surface. Such information may be displayed by converting or rotating a displaying direction according to the user's manipulation.

Watch-Type Mobile Terminal

Figure 19:
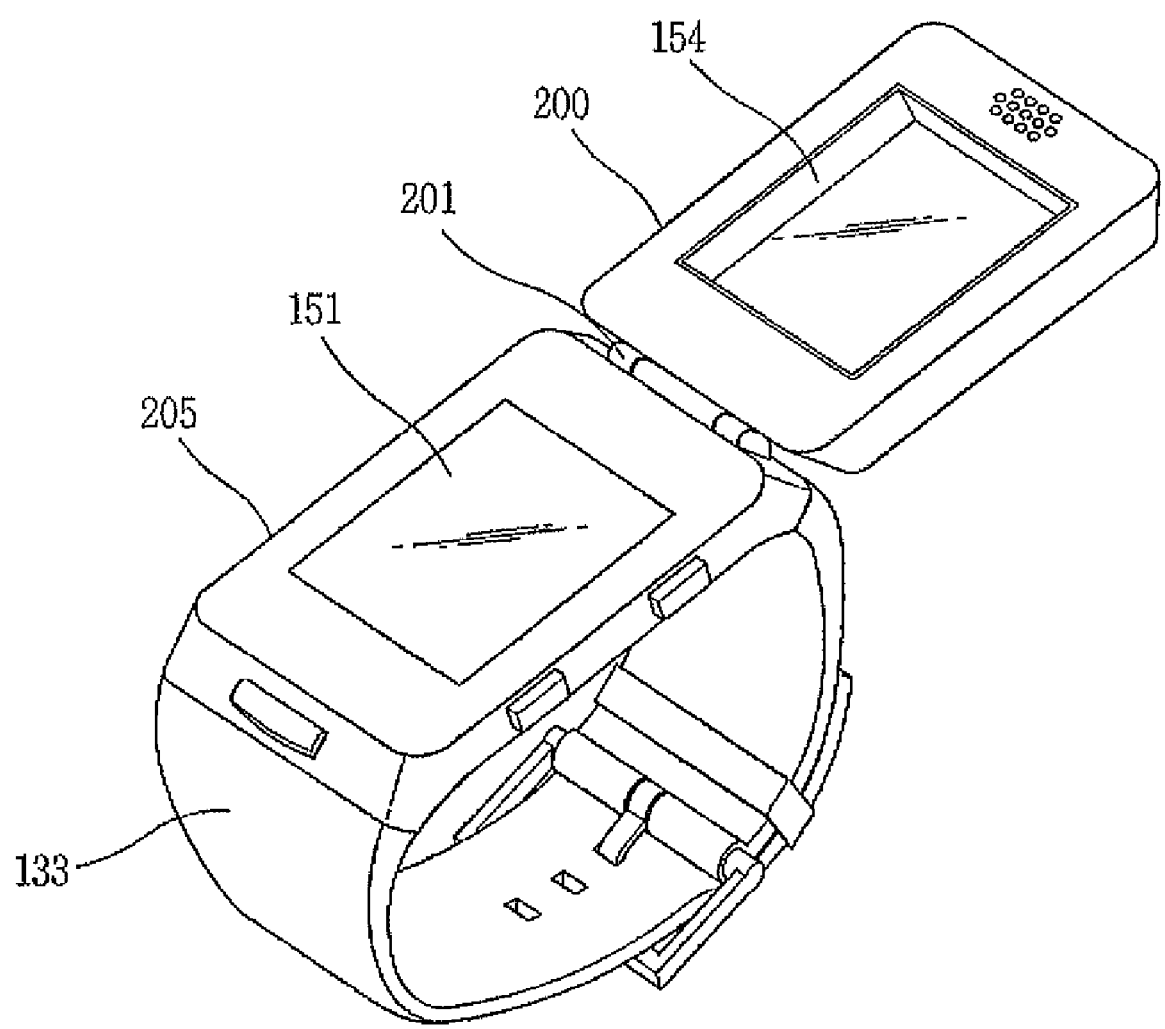
FIG. 19 is an overview illustrating a watch-type mobile terminal having a dual transparent display according to an embodiment of the present invention.

FIG. 19 is an overview illustrating a watch-type mobile terminal having a dual transparent display according to an embodiment of the present invention. As shown FIG. 19, the watch-type mobile terminal may include the second body 205 having a watchstrap 133 connected thereto and having the LCD 151, and the first body 200 connected to one side of the second body 205 by a hinge 201 to be open or closed and having the TOLED 154. Hereinafter, the first body 200 may also be referred to as a cover.

Similar to the different types of mobile terminals having the dual display as discussed above, the TOLED 154 and the LCD 151 may operate as any of a main display or a sub display, and each can display various different types of information. Also, because the TOLED 154 is transparent, it can transmit information displayed on the LCD 151 in the closed state of the cover so as to output such information thereon, namely, the first body 200. Also, in the open state of the first body 200, the TOLED 154 and the LCD 151 can display different information from each other. Further, in the open state of the first body 200, the TOLED 154 and the LCD 151 may be used either as displays or keypads.

Single Display—Folder-Type Mobile Terminal

FIG. 20 is an overview illustrating a folder-type mobile terminal having a single transparent display according to an embodiment of the present invention. As shown in FIG. 20, the mobile terminal may be configured to have the TOLED 164 disposed on the folding portion 410 and the keypad of the input unit 130 disposed on the main body portion 400. The keypad may also be configured as a dome key or have backlights (not shown). Thus, when the folding portion 410 is in the open state, a user can input information by pressing the keypad. Conversely, when the folding portion 410 is in the closed state, the user can input information by touching keys on corresponding positions with referring to the positions of the keys on the keypad of the input unit 130, which is viewable by being transmitted through the TOLED 154.

Next, FIG. 21 is an overview illustrating an information input method in a folder-type mobile terminal having a single transparent display according to an embodiment of the present invention. As shown in FIG. 21, the mobile terminal may be configured to have the TOLED 154 disposed on the folding portion 410 and a keypad or touchpad 155 disposed on the main body portion 400. Further, the TOLED 154 may operate as a touch screen with a touchpad (or touch film) attached on its upper surface or lower surface. In addition, the keypad may include dome keys, or be configured as a printed pattern having various key-like patterns (e.g., numeral keys, navigation keys, symbol keys, character keys, and the like). Also, the keypad or touchpad 155 may be provided with backlights. The backlights may be configured by using Light Emitting Diodes (LEDs) or an Electroluminescence Sheet (EL).

Further, the backlight may automatically be driven by the controller 180 according to the user's manipulation or the opening/closing operation of the folding portion 410. For example, when the folding portion is closed while specific information is being displayed on the TOLED 154, the backlights may not be driven in order to prevent the keypad from being transmitted as a background. Also, in order to prevent the keypad from being transmitted as a background even when the backlights are not driven, the keypad or touchpad 155 may preferably be implemented to be flat or with a dark color. On the other hand, in the open state of the folding portion 410, the user can input information by touching the keypad or touchpad 155. That is, the user can touch the touchpad 155 to input cursive letters or to perform a touch and drag operation when the backlight is not driven.

Next, FIG. 22 is an overview illustrating a configuration of a keypad on a folder-type mobile terminal having a single transparent display according to an embodiment of the present invention. As shown in FIG. 22, the mobile terminal may be configured such that the TOLED 154 is disposed on the folding portion 410. Also, the touchpad 155, various key patterns 156 and an EL 157 for backlights are disposed on the main body portion 400.

In addition, the EL 157 may be a material emitting light onto a space to which an electrical force can come up to. Also, an EL Sheet is a planar light source in a paper form based on EL, and has many advantages that neon or phosphor does not have. As a material in a form of flexible thin-film, it requires low power consumption and can be cut in various forms suitable for applications. Also, the input unit 130 uses multi-layered EL sheets to activate EL sheets suitable for each backlight control algorithm. For example, the EL sheet may be configured as a key pattern combining numeral keys and navigation keys, a symbol key pattern, QWERTY key pattern, and the like. The controller 180 can then activate one of such key patterns according to the user's control or a preset backlight control algorithm. The input unit 130 using the EL sheets may also be implemented by a keypad or by a touchpad.

Figure 23:
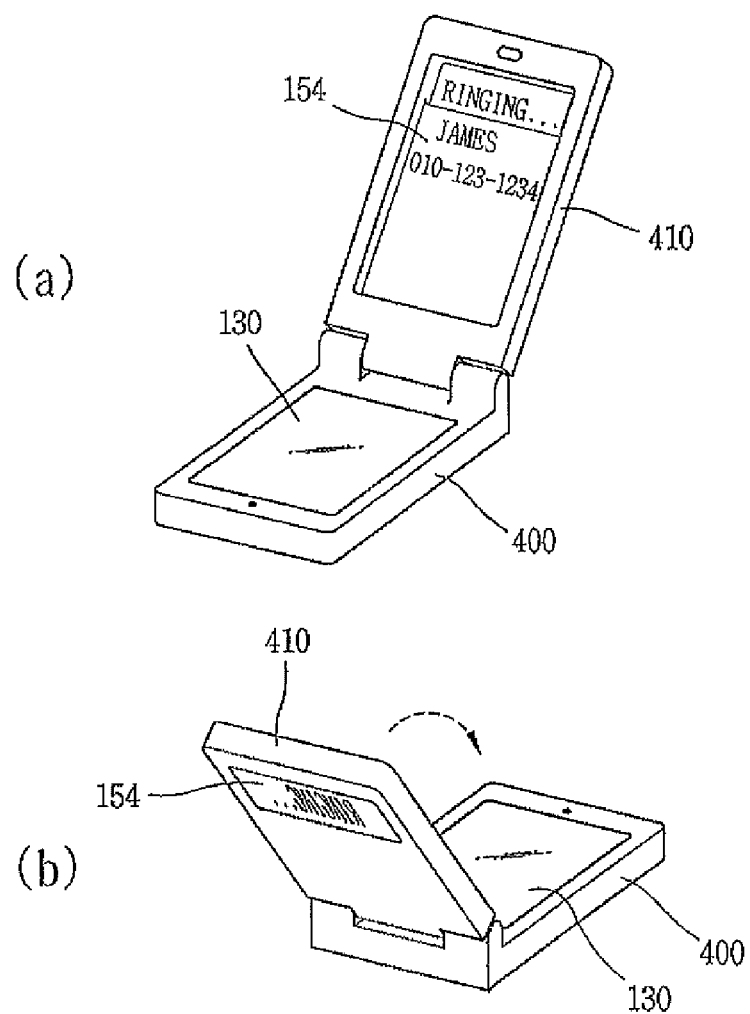
FIG. 23 is an overview illustrating a folder type mobile terminal having a transparent display according to an embodiment of the present invention, which shows a mobile terminal having a configuration capable of restricting information displayed on one surface of the transparent display.

FIG. 23 is an overview illustrating a folder-type mobile terminal having a transparent display according to an embodiment of the present invention, which shows a configuration of the mobile terminal in which information displayed on one surface of the transparent display can be restricted. As shown in FIG. 23(a), the mobile terminal may be configured such that the TOLED 154 is disposed on the folding portion 410 and the input unit 130 using a dome keypad, touch keypad, EL sheets or the like is disposed on the main body portion 400.

In the closed state of the mobile terminal, the folding portion 410 is designed to expose part of the TOLED 154 as shown in FIG. 23(b). Thus, the part of the TOLED 154 can be exposed to the user. Further, the folding portion 410 according to this embodiment may be provided with the TOLED 154 on both surfaces (i.e., inner surface and outer surface) such that displaying information can be executed both in the open and closed states of the mobile terminal.

FIG. 24 is an overview illustrating a swivel-type mobile terminal having a single transparent display according to an embodiment of the present invention. As shown in FIG. 24, the swivel-type mobile terminal may be configured with the TOLED 154 and the keypad separately disposed and the swivel hinge connecting the folding portion 410 to the main body portion 400. The swivel hinge allows the folding portion 410 to be rotated or moved to a certain angle (or position).

Further, the controller 180 can change a displaying direction of information output on the TOLED 154 according to the rotation of the folding portion 410. In addition, the TOLED 154 is allowed to display on both surfaces thereof. Accordingly, the controller 180 can allow information, which is displayed on a front surface (first surface) of the TOLED 154, to be displayed on a rear surface (second surface) thereof, according to the rotation of the folding portion 410 or the opening/closing of the folding portion 410.

Single Display—Slide-Type Mobile Terminal

Figure 25:
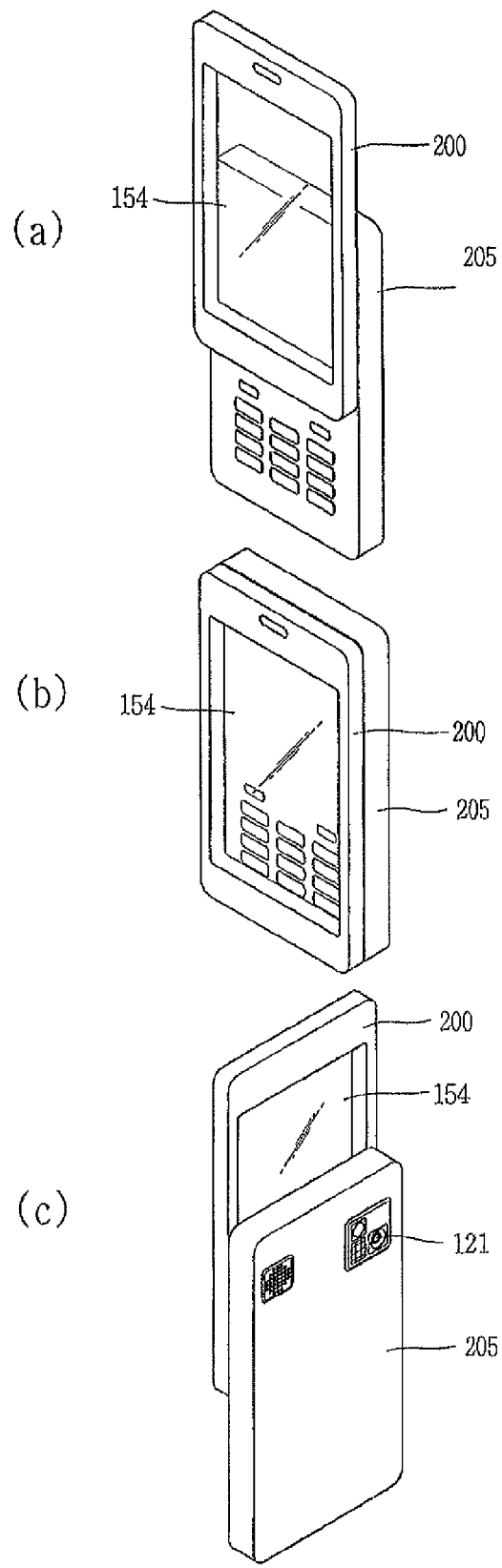
FIG. 25 is an overview illustrating a slide type mobile terminal having a single transparent display according to an embodiment of the present invention, which shows a method of displaying information on the transparent display in cooperation with an opening or closing of a sliding portion.

FIG. 25 is an overview of a slide-type mobile terminal having a single transparent display according to an embodiment of the present invention, which shows a method for displaying information on the transparent display in cooperation with the opening or closing of a sliding portion. As shown in FIG. 25, the slide-type mobile terminal may be configured to have the TOLED 154 disposed on the first body 200 and the keypad disposed on the second body 205. Also, the camera 121 is disposed at a rear surface of the second body 205.

Thus, when a user wants to photograph himself or herself using the camera 121 disposed at the rear surface, the controller 180, as shown in FIG. 25(c), can output an image reflected on the camera 121 as a preview image on a partial display region of the TOLED 154 (i.e., a display region exposed to the rear surface when the mobile terminal is slid open). Accordingly, the user can view his own image displayed on the TOLED 154 so as to photograph himself or herself more easily.

Also, as shown in FIG. 25(a), because the keypad disposed on the second body 205 is transmitted through the TOLED 154 when the sliding portion is in the closed state, the user can input information by touching keys on corresponding positions and referring to the positions of the keys transmitted and displayed on the TOLED 154. As such, the basic operations of the mobile terminal can be controlled even in the closed state of the sliding portion.

Single Display—Bar-Type Mobile Terminal

Figure 26:
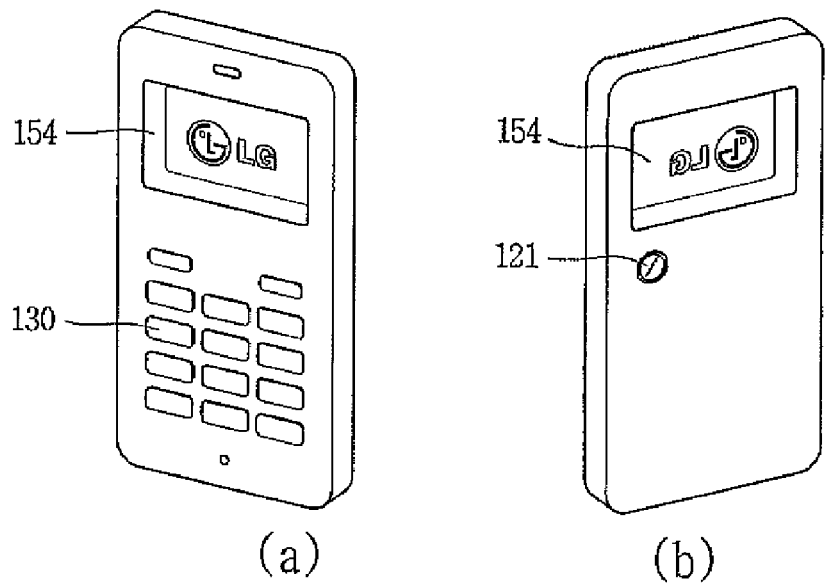
FIG. 26 is an overview illustrating a bar type mobile terminal having a single transparent display according to an embodiment of the present invention.

FIG. 26 is an overview illustrating a bar-type mobile terminal having a single transparent display according to an embodiment of the present invention. As shown in FIG. 26, the bar-type mobile terminal may be configured to have the TOLED 154 disposed at an upper portion of a front surface of a terminal body and the keypad of the input unit 130 disposed at a lower portion thereof. The TOLED 154 is also exposed to the rear surface of the mobile terminal.

Figure 27:
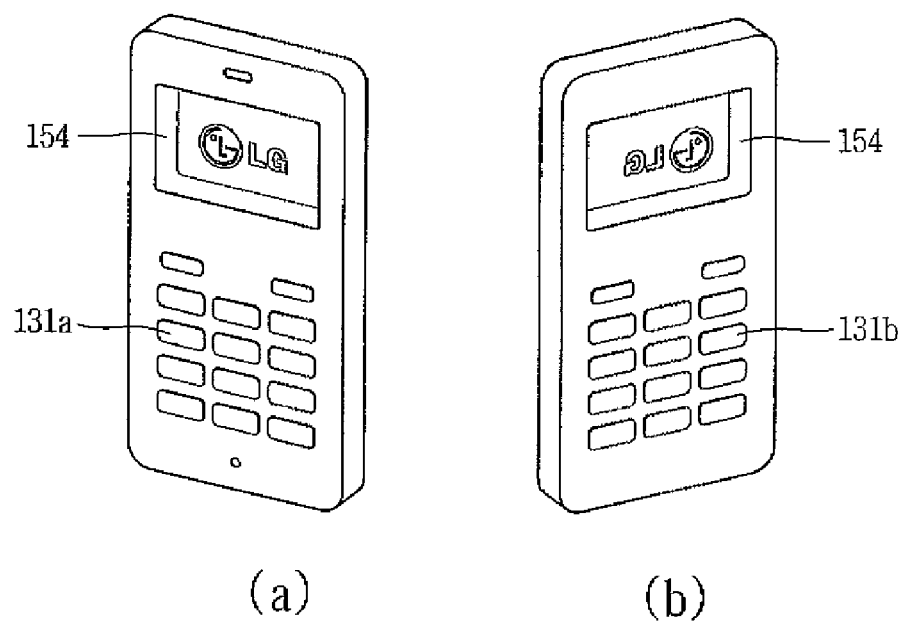
FIG. 27 is an overview illustrating a bar type mobile terminal having keypads with the same configuration disposed on both surfaces of the bar type mobile terminal of FIG. 26.

Therefore, as shown in FIG. 27, the keypad of the input unit 130 may further be disposed below the TOLED 154 shown on the rear surface of the terminal body. Accordingly, when an error is generated on a keypad (e.g., 131a) on one surface, the user can use a keypad (e.g., 131b) on another surface. Further, the information displayed on the TOLED 154 is provided in order to represent that information displayed on the front surface of the TOLED 154 is transmitted and displayed on the rear surface thereof. Such information may be displayed on any one of both surfaces of the TOLED 154, according to a keypad which the user manipulates, or be displayed by converting or rotating its displaying direction.

Figure 28:
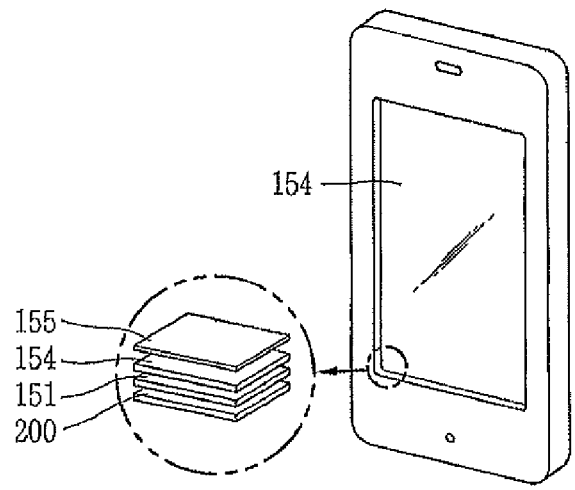
FIG. 28 is an overview illustrating a single display configured by overlapping a transparent display with a non-transparent display according to an embodiment of the present invention.

Next, FIG. 28 is an overview illustrating a configuration of a single display obtained by overlapping a transparent display with a non-transparent display according to an embodiment of the present invention. In this description, a bar-type mobile terminal having such a single display will be described. As shown in FIG. 28, the single display may be configured as a single module in which the TOLED 154 is overlapped with the LCD 151.

Also, a touchpad (or a touch film) 155 may be attached to the upper surface of the module so as to be used as a touch screen. Further, the LCD 151 and TOLED 154 having such a single display may operate as one of a main display or sub display. That is, the LCD 151 and the TOLED 154 may display different information from each other or output the same information, and can make various visual effects according to a method for outputting such information. For example, when a user manipulates and outputs a menu or image, the image or menu can be shown with a cubic effect. In addition, the display may be applied not only to the bar-type mobile terminal but also every type of mobile terminal, such as folder-type, flip-type, slide-type, rotating-type (e.g., swivel-type, swing-type), or the like), or a watch-type.

Figure 29:
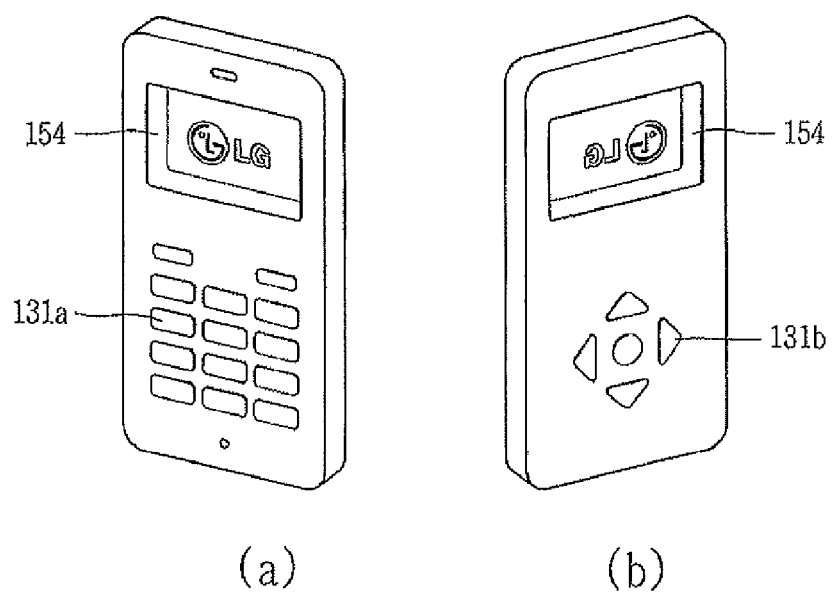
FIG. 29 is an overview illustrating a bar type mobile terminal having keypads disposed on both surfaces of the mobile terminal of FIG. 26 and each having different functions.

FIG. 29 is an overview of a bar-type mobile terminal having keypads with different functions disposed on both surfaces of the bar type mobile terminal of FIG. 26. As shown in FIG. 29, the mobile terminal is configured to have the first keypad 131a disposed below the TOLED 154 on a front surface of the mobile terminal, and the second keypad 131b disposed below the TOLED 154 on a rear surface of the mobile terminal. Further, information displayed on the TOLED 154 is provided in order to represent that information displayed on the front surface of the TOLED 154 is transmitted and displayed onto the rear surface thereof. Such information may be displayed by converting or rotating its displaying direction according to the user's manipulation.

In addition, the first keypad 131a may have keys for inputting letters and numerals and several short keys for allowing an immediate execution of certain functions. The second keypad 131b may have navigation keys and short keys for allowing an immediate execution of other certain functions. Also, the short keys may be disposed both on the first and second keypads 131a and 131b.

Accordingly, such keys having different functions can be disposed on both of the front and rear surfaces of the mobile terminal such that the keys can be arranged with wider intervals therebetween, which ensures a simple keypad configuration, thereby preventing key input errors. For example, communication functions can effectively be executed on the surface having the first keypad 131a (e.g., the keypad containing keys for letters and numerals), while various multimedia functions such as playing games can effectively executed on the surface having the second keypad 131b (e.g., the keypad containing navigation keys or function keys).

Watch-Type Mobile Terminal

Figure 30:
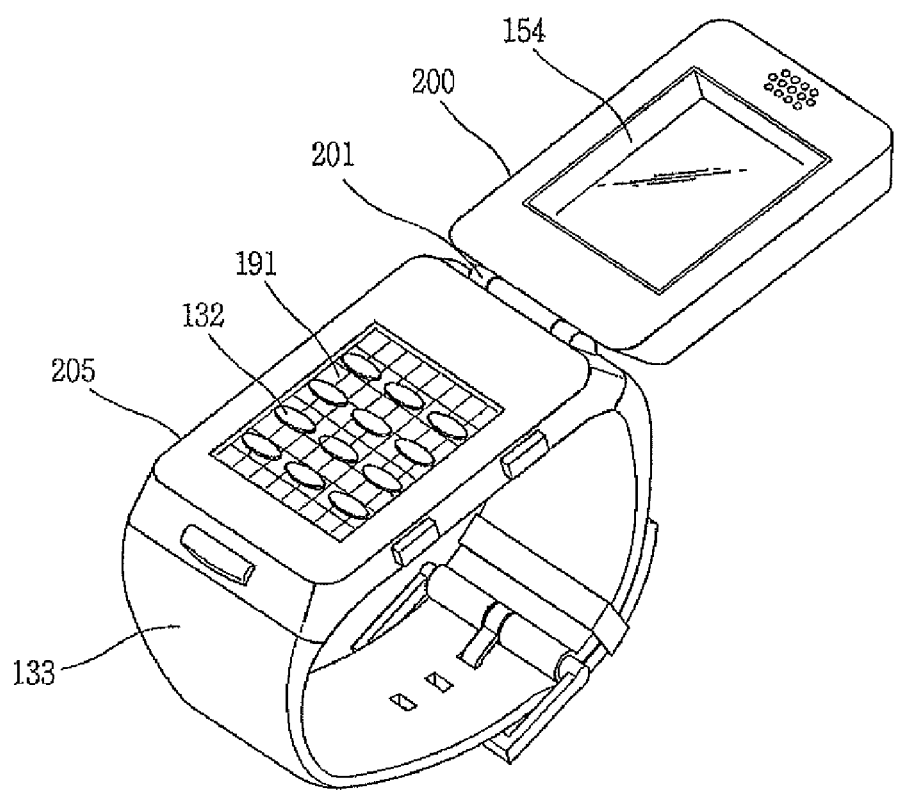
FIG. 30 is an overview illustrating a watch-type mobile terminal provided with a single transparent display and a solar cell disposed in a rear surface thereof according to an embodiment of the present invention.

FIG. 30 is an overview illustrating a watch-type mobile terminal having a single transparent display and a solar cell on a rear surface thereof according to an embodiment of the present invention. As shown in FIG. 30, the watch-type mobile terminal may include the second body 205 having a watchstrap 133 connected thereto and having a solar cell 191 disposed therein, and the first body 200 connected to one side of the second body 205 by the hinge 201 to be open or closed and having the TOLED 154. The first body 200 may also be referred to as a cover.

In addition, the solar cell 191 is disposed inside the second body 200, and the TOLED 154 is structurally disposed to cover the solar cell 191. The first body 200 having the TOLED 154 may be configured using a sliding unit or the hinge 201 such that one side of the TOLED 154 can be opened or closed with respect to the second body 205. Also, under the closed state of the first body 200, the controller 180 can receive a user's command input via a touchpad disposed on an upper portion (upper surface, upper end, outer side) of the TOLED 154.

In addition, dome keys 132 may be disposed on an upper portion of the solar cell 191. Thus, when the TOLED 154 is opened, the controller 180 can receive a command input by a user using the dome keys 132. The result of the command input using the dome keys 132 can be output on any one of both surfaces of the TOLED 154 according to the control of the controller 180. Further, the solar cell 191 can generate electricity by using light transmitted through the TOLED 154. Also, by arranging the solar cell 191 to receive light transmitted through the TOLED 154, a greater area of the solar cell 191 is ensured, resulting in an increase in an amount of electricity generated.

Figure 31:
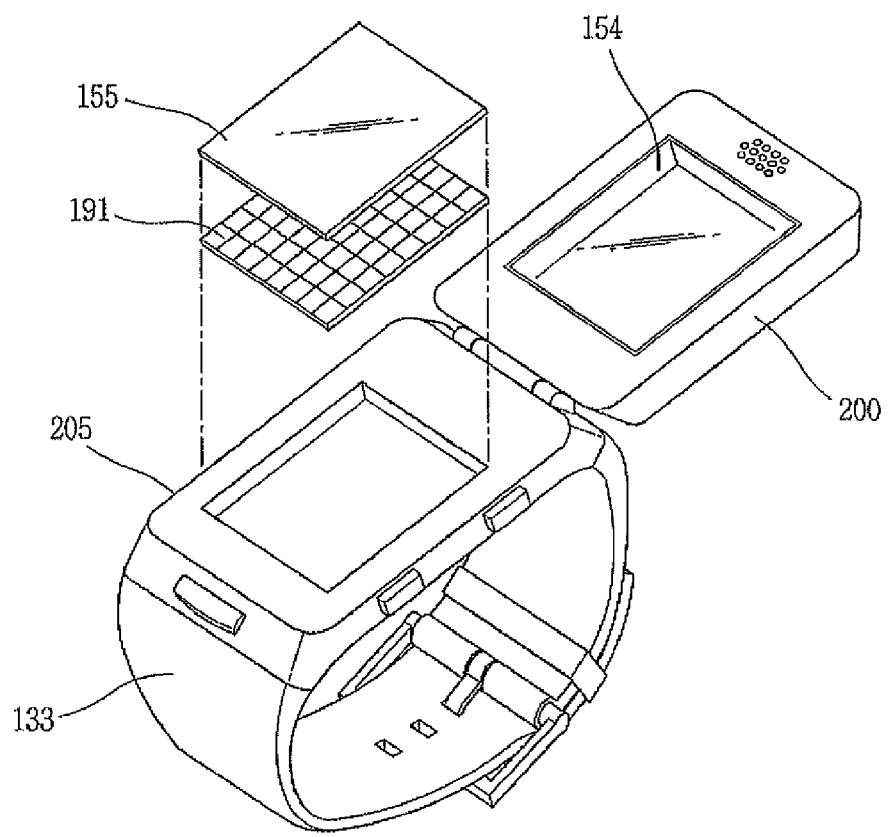
FIG. 31 is an overview illustrating a mobile terminal having a touchpad on the upper surface of the solar cell of FIG. 30.

Next, FIG. 31 is an overview of a mobile terminal having a touchpad on an upper surface of the solar cell of FIG. 30. As shown in FIG. 31, the second body 205 may include the solar cell 191 therein, and a touchpad 155 is disposed on an upper surface of the solar cell 191. Also, the first body 200 having the TOLED 154 may be configured using a sliding unit or the hinge 201 such that at least one side thereof can be opened or closed with respect to the second body 205.

Further, because the solar cell 191 is configured to be structurally covered with the TOLED 154, the solar cell 191 can generate electricity by using light transmitted through the TOLED 154 even in the closed state of the first body 200. In addition, the controller 180 may receive a command input by a user using the touchpad 155 in the open state of the first body 200. The result of the command input using the touchpad 155 can be output on any one of both surfaces of the TOLED 154 according to the control of the controller 180.

Figure 32:
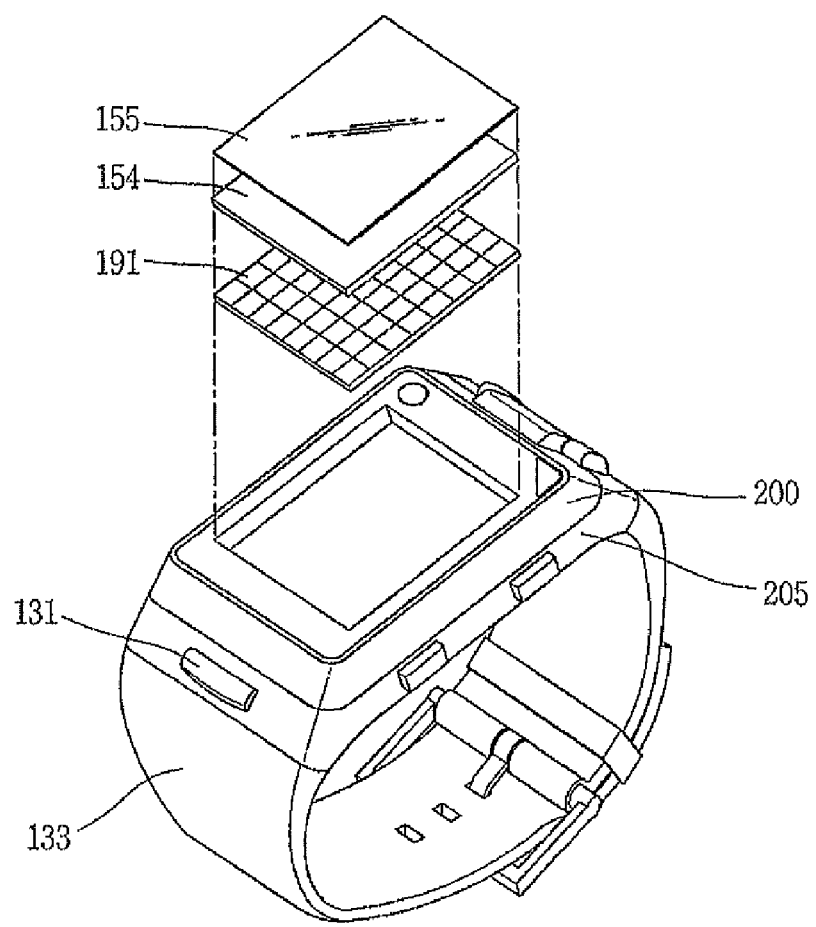
FIG. 32 is an overview illustrating a watch-type mobile terminal having a transparent display according to an embodiment of the present invention, which shows a mobile terminal having a touchpad on the upper surface of the transparent display.

In addition, FIG. 32 is an overview of a watch-type mobile terminal having a transparent display according to an embodiment of the present invention, which shows a mobile terminal having a touchpad on an upper surface of the transparent display. As shown in FIG. 32, the second body 205 may include the solar cell 191 therein, and the first body 200 is overlapped on the second body 205. Further, the first body 200 may include the TOLED 154, which is structurally located on an upper surface of the solar cell 191. The touchpad 155 is also disposed on an upper surface of the TOLED 154.

Therefore, the user can input a command through the touch pad 155 disposed on the upper surface of the TOLED 154. Further, the solar cell 191 can generate electricity using light transmitted through the TOLED 154, regardless of whether or not the TOLED 154 displays information. Also, the amount of transmitted light depends on the transmittance of the TOLED 154, and accordingly the amount of generated electricity may be different. In addition, when the solar cell 191 is configured with black color, the color sensitivity of the TOLED 154 may be effectively improved.

2. Operation of a Mobile Terminal According to an Embodiment of the Present Invention (Manipulation of User Interface (UI))

As mentioned above, a mobile terminal with a single display is configured as a display module in which a transparent display is overlapped with a non-transparent display, and a mobile terminal with a dual display is configured as two display modules in which a transparent display and a non-transparent display are separately disposed.

Further, the folder-type mobile terminal is a representative type of mobile terminal configured to have the dual display. The folder-type mobile terminal can display independent information on each display in cooperation with the opening or closing of a folding portion, or display several information associated with each other by overlapping each display. When displaying such information associated with each other by overlapping each display, a new visual effect can be generated. Next, the operations and functions of a mobile terminal having the single display configured by overlapping a transparent display with a non-transparent display will be described according to embodiments of the present invention. Further, the operations and functions may be applied to all aforementioned types of mobile terminals (e.g., flip-type, folder-type, bar-type, slide-type, swivel-type and watch-type), etc.

A detailed description will now be given of a display controlling method according to operational states of a mobile terminal having a transparent display according to an embodiment of the present invention, a power saving method, and a display controlling method in connection with a specific function (e.g., a camera function) provided in the mobile terminal.

Screen Displaying Method of the Mobile Terminal with Transparent Display

A method for displaying a screen in a mobile terminal with a transparent display according to an embodiment of the present invention may be divided into a displaying method of the LCD 151 and the TOLED 154, a controlling method related to a touching operation, and a controlling method related to a displaying operation.

Displaying Method of the LCD and TOLED

Next a description will be given of a method in which a user executes a photo album function and selects one image in the album to thereby display the selected image on a preview screen or link the image with another function according to an embodiment of the present invention. Also, in the method, the LCD 151 and the TOLED 154 are defined respectively as a main display and a sub display, and information to be displayed on each display is also classified, so as to provide a cubic or three-dimensional effect.

Figure 33:
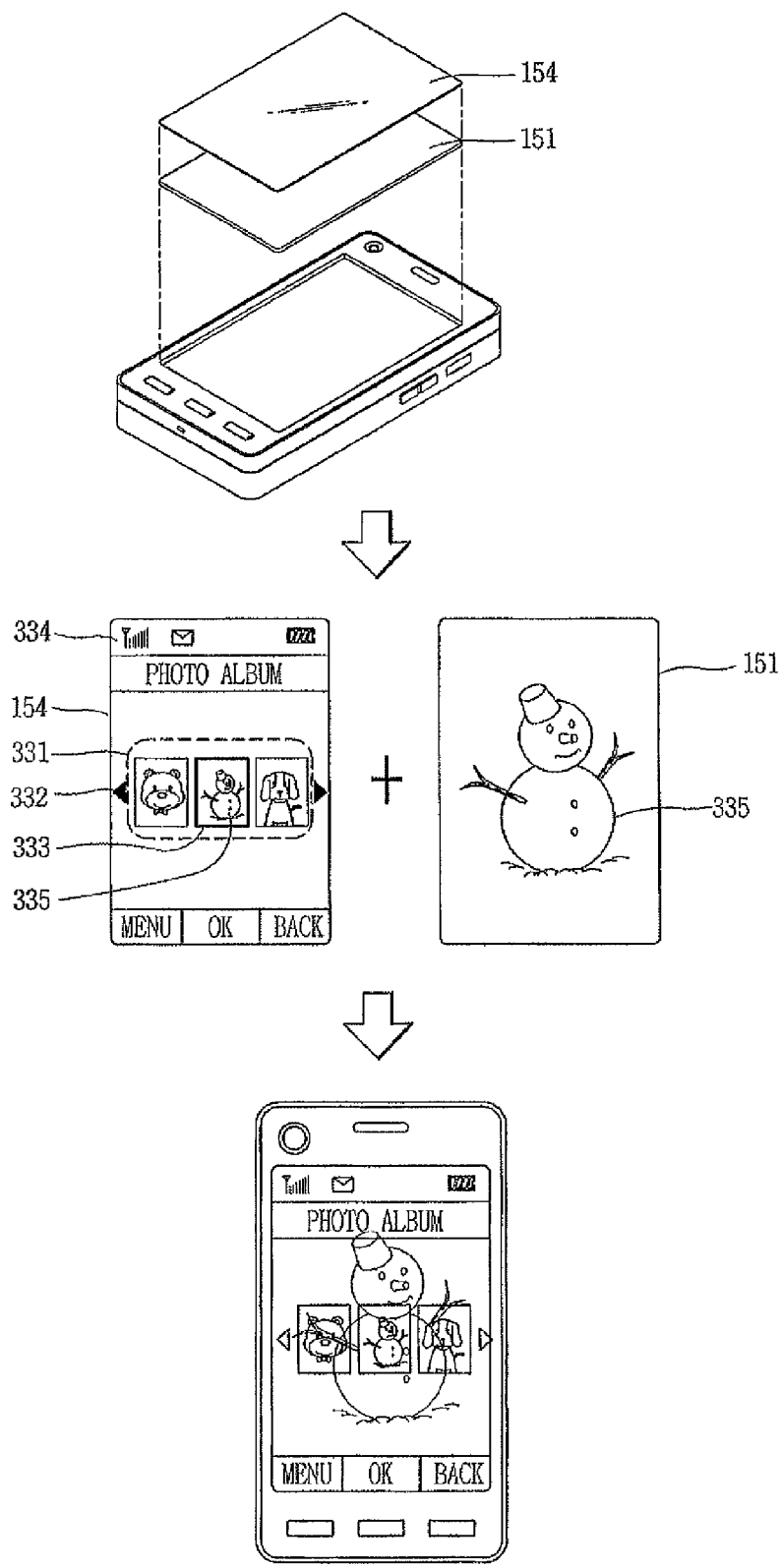
FIG. 33 is an overview illustrating a display with a LCD and a TOLED in a folder type mobile terminal having a single display according to an embodiment of the present invention.
Figure 34:
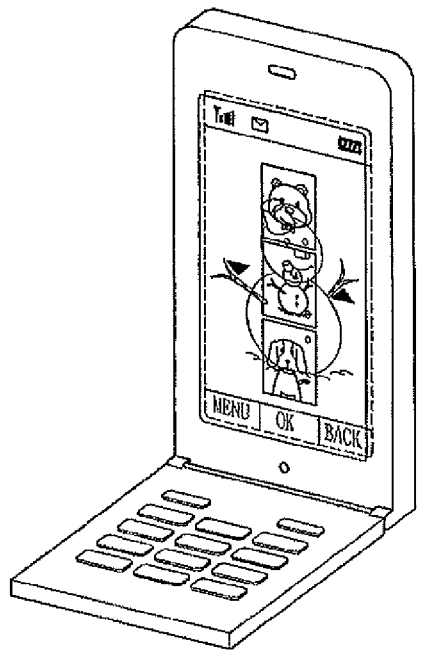
FIG. 34 is an overview illustrating a display with a LCD and a TOLED in a flip type mobile terminal having a single display according to an embodiment of the present invention.
Figure 35:
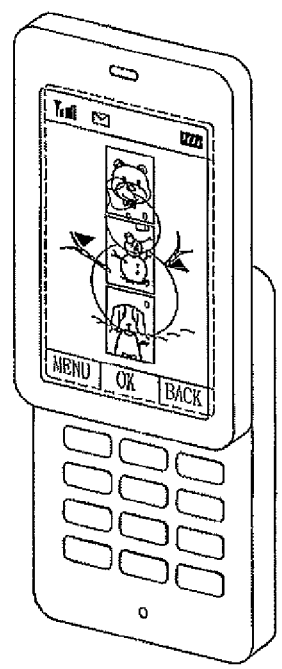
FIG. 35 is an overview illustrating a display with a LCD and a TOLED in a slide type mobile terminal having a single display according to an embodiment of the present invention.
Figure 36:
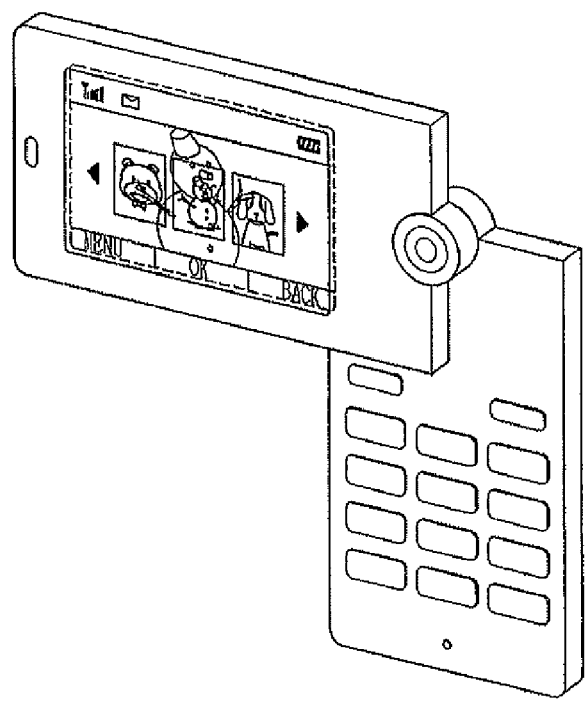
FIG. 36 is an overview illustrating a display with a LCD and a TOLED in a rotating type mobile terminal having a single display according to an embodiment of the present invention.
Figure 37:
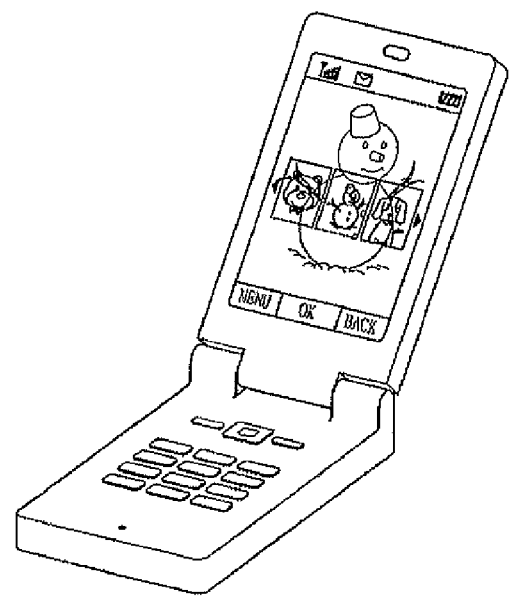
FIG. 37 is an overview illustrating a display with a LCD and a TOLED in a bar type mobile terminal having a single display according to an embodiment of the present invention.
Figure 38:
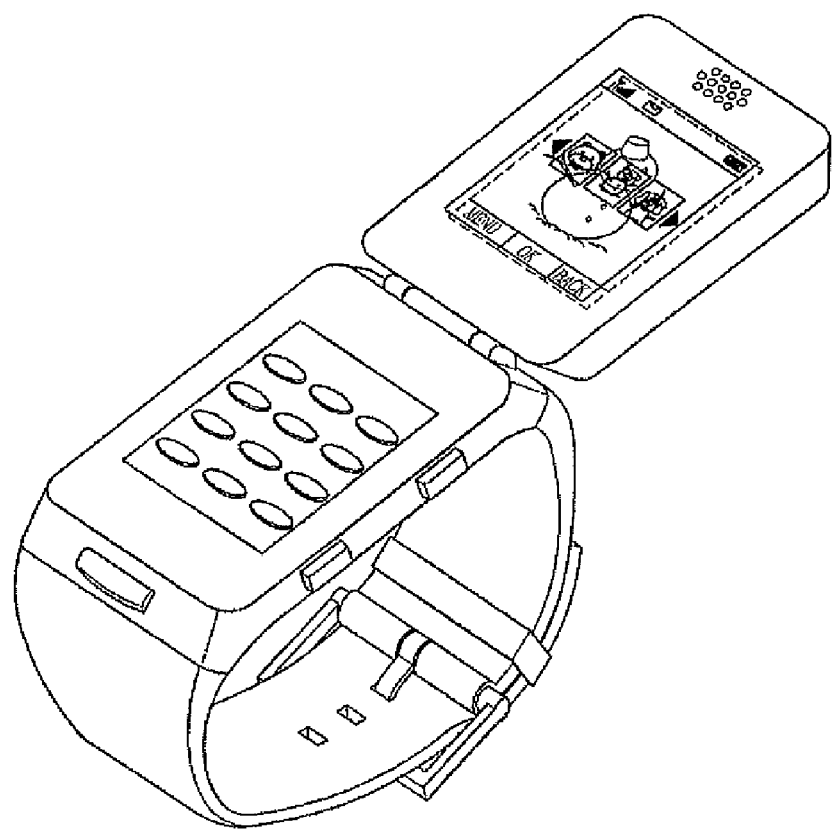
FIG. 38 is an overview illustrating a display with a LCD and a TOLED in a watch-type mobile terminal having a single display according to an embodiment of the present invention.

FIGS. 33 to 38 are overviews for illustrating a displaying control method of a mobile terminal having a single transparent display according to an embodiment of the present invention, and particularly, illustrating a displaying control method of the LCD 151 and TOLED 154 when a photo album function is executed. In more detail, FIG. 33 is an overview illustrating displaying information on an LCD and a TOLED in a folder-type mobile terminal having a single display, FIG. 34 is a overview illustrating displaying information on an LCD and a TOLED in a flip-type mobile terminal having a single display, FIG. 35 is an overview illustrating displaying information on an LCD and a TOLED in a slide-type mobile terminal having a single display, FIG. 36 is an overview illustrating displaying information on an LCD and a TOLED in a rotating-type mobile terminal having a single display, FIG. 37 is an overview illustrating displaying information on an LCD and a TOLED in a bar-type mobile terminal having a single display, and FIG. 38 is an overview illustrating displaying information on an LCD and a TOLED in a watch-type mobile terminal having a single display.

Next, a method for controlling a display provided at each type of mobile terminal will be described representatively with respect to the bar-type mobile terminal shown in FIG. 33. As shown in FIG. 33, a display disposed on each type of mobile terminal is configured by overlapping the TOLED 154 and the LCD 151. Further, the controller 180 may display a screen for executing a photo album on the TOLED 154. Also, an indicator 334 for indicating an operational state of the mobile terminal may also be displayed. The screen for executing the photo album may include images 331, navigation keys 332 (hereinafter, referred to as 'software navigation keys') for moving the images 331, and a cursor 333 for selecting one of the images 331. Also, a user can select one (e.g., image 335) of the images 331 displayed on the photo album execution screen. Further, the controller 180 can display the selected image 335 on the LCD 151 as a preview image. The controller 180 can also change the selected image 335 into an image for an idle screen of the LCD 151. FIGS. 34-38 illustrate the selected image being displayed in different configurations and on different types of mobile terminals.

In addition, the controller 180 can support an animation effect that the selected image is first dropped and then unfolded. Also, because the TOLED 154 has transmittance, even in the state of the photo album execution screen being displayed on the TOLED 154, the user can view the idle screen image set for the LCD 151. On the other hand, when the TOLED 154 is displayable on both of its surfaces, the same operation as aforementioned can be executed by controlling each front and rear surface of the TOLED 154 other than the LCD 151. In addition, a component which controls the displaying operations of the LCD 151 and TOLED 154 according to an embodiment of the present invention may be a multimedia processor or a separate processor having a control function.

Also, the controller 180 can move the object between the TOLED 154 and the LCD 151 based on a double touch operation. For example, the user can touch an object displayed on the TOLED 154 and then touch a portion of the LCD 151. Then, upon receiving a signal corresponding to the double touch operation, the controller 180 moves the object displayed on the TOLED 154 to the LCD 151 are where the user touched the LCD 151. The user can also move the object displayed on the LCD 151 to the TOLED 154 using the reverse procedure. The controller 180 can also automatically move the displayed object between the first and second displays (i.e., the TOLED 154 and the LCD 151) when there is insufficient area on a particular display (i.e., the TOLED 154 and the LCD 151).

Hereinafter, a description will be given of operations of a mobile terminal separately having the transparent display and the non-transparent display in the following embodiments. In addition, the operations of the mobile terminal having the dual display may be applied to all aforementioned types of mobile terminals (e.g., flip-type, folder-type, bar-type, slide-type, swivel-type and watch-type, etc.).

FIGS. 39 to 44 are overviews illustrating a method for controlling a display of a mobile terminal having a transparent display according to an embodiment of the present invention, which shows a method for controlling the LCD 151 and TOLED 154 when executing a photo album function in a mobile terminal having a dual display. In more detail, FIGS. 39 to 44 respectively show a folder-type mobile terminal, a swivel-type mobile terminal, flip-type mobile terminal, slide-type mobile terminal, bar-type mobile terminal, and watch-type mobile terminal.

Next, a method for controlling a display provided at each type of mobile terminal will be described representatively with reference to a folder-type mobile terminal shown in FIG. 39. As shown in FIG. 39, in the mobile terminal having the TOLED 154 and LCD 151 separately provided, the controller 180 can display a screen for executing a photo album on the TOLED 154. In addition, the controller 180 may display on the TOLED 154 the images 331, the software navigation keys 332, and the cursor 333 for selecting one of the images 331. The indicator 334 for indicating an operational state of the mobile terminal may also be displayed on the TOLED 154 as shown in FIG. 39.

In addition, the user can select one image (e.g., image 335) of the images 331 displayed on the screen for activating the photo album (see FIG. 39(*a*)), and drag or flick the selected image 335 in a direction from the TOLED 154 to the LCD 151 (see FIG. 39(*b*)). Accordingly, the controller 180 can display the dragged or flicked image 335 on the LCD 151 as a preview image (see FIG. 39(*c*)). Also, the controller 180 can change the selected image 335 to be an idle screen image of the LCD 151. In addition, the controller 180 can provide an animation effect that the selected image 335 is moved onto the LCD 151 to be then unfolded. FIGS. 40-44 illustrate the touching and dragging (or flicking) operation being performed on different types of mobile terminals.

Also, one embodiment of the present invention may separately provide a function key (hereinafter referred to as a screen switching function key) for switching contents respectively displayed on the TOLED 154 and the LCD 151. The screen switching function key may have a toggling function. Also, the screen switching function key may be configured as a software key (or an execution icon) at one side (e.g., an indicator region or the like) of the TOLED 154 or be provided as a hardware key.

Upon selecting the screen switching function key, the controller 180 can change an icon shape of the screen switching function key, and simultaneously switch contents respectively displayed on the TOLED 154 and the LCD 151. That is, the controller 180 can indicate that the screen switching function key has been selected. Afterwards, when the screen switching function key is selected again, the controller 180 converts the screen switching function key into its original shape, and then switches one more time the contents respectively displayed on the TOLED 154 and the LCD 151.

Displaying Method of LCD and TOLED According to Various Embodiments

Hereinafter, a detailed description will be given of the LCD 151 and TOLED 154 to which the displaying method is applied. For the sake of explanation, a specific type of terminal (e.g., a folder type mobile terminal having a dual display) is described; however, each embodiment herebelow may be applicable to other types of terminals stated in the present invention.

Figure 45:
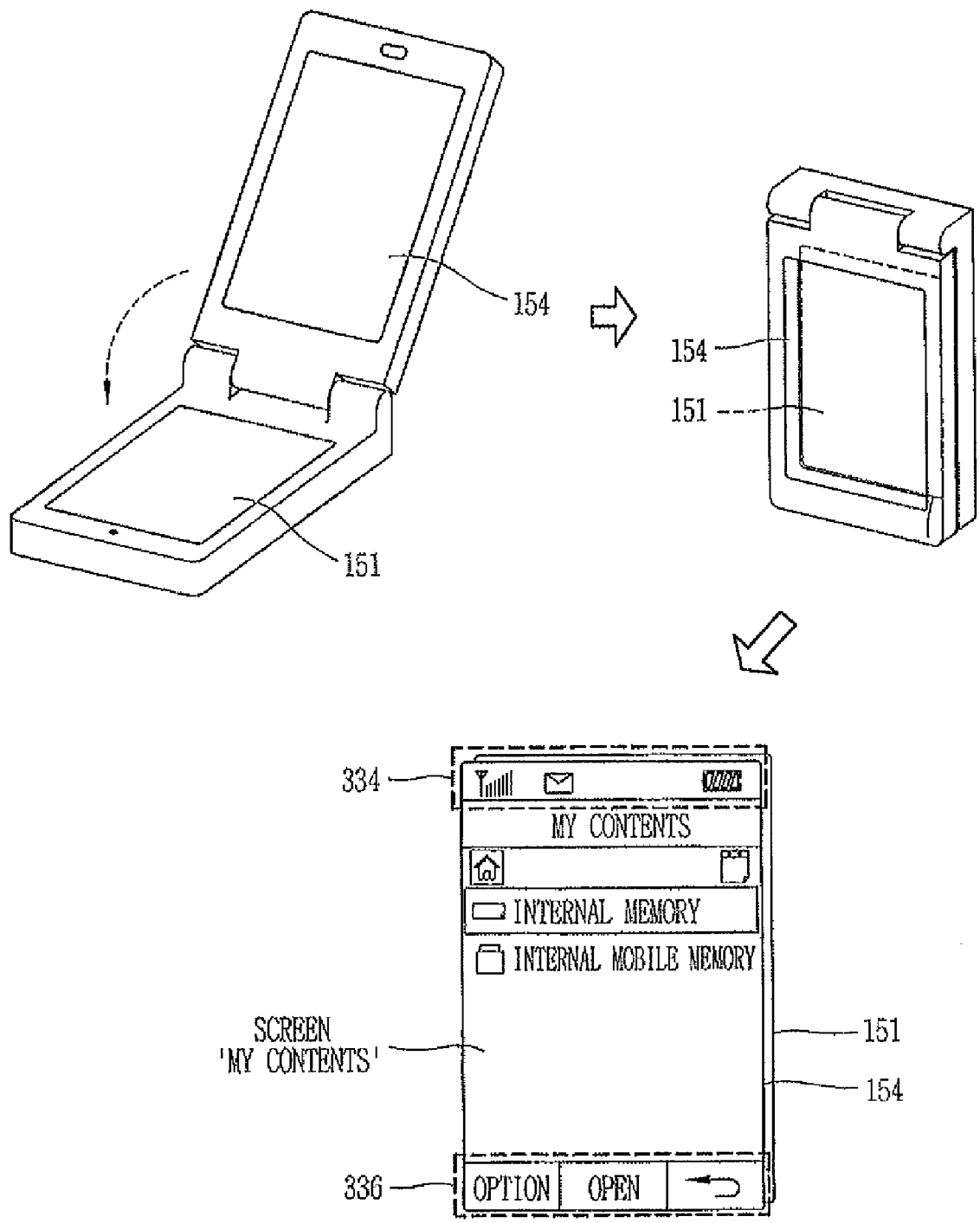
FIGS. 45 and 46 are overviews illustrating a displaying method on LCD and TOLED according to a first embodiment of the present invention.

FIGS. 45 and 46 are overviews illustrating a displaying method of the LCD 151 and TOLED 154 according to a first embodiment. In more detail, the first embodiment illustrates a displaying method in which, under a closed state of the mobile terminal, a menu 'my contents' is executed and then a full screen and a pop-up screen of the menu 'my contents' are respectively displayed on a main display and a sub display. As shown in FIG. 45, a mobile terminal according to the first embodiment is a folder-type mobile terminal having a dual display. In addition, the LCD 151 is disposed on the main body portion 400 and the TOLED 154 is disposed the folding portion 410. Further, the LCD 151 and the TOLED 154 are set to a main display and a sub display, respectively.

Figure 46A:
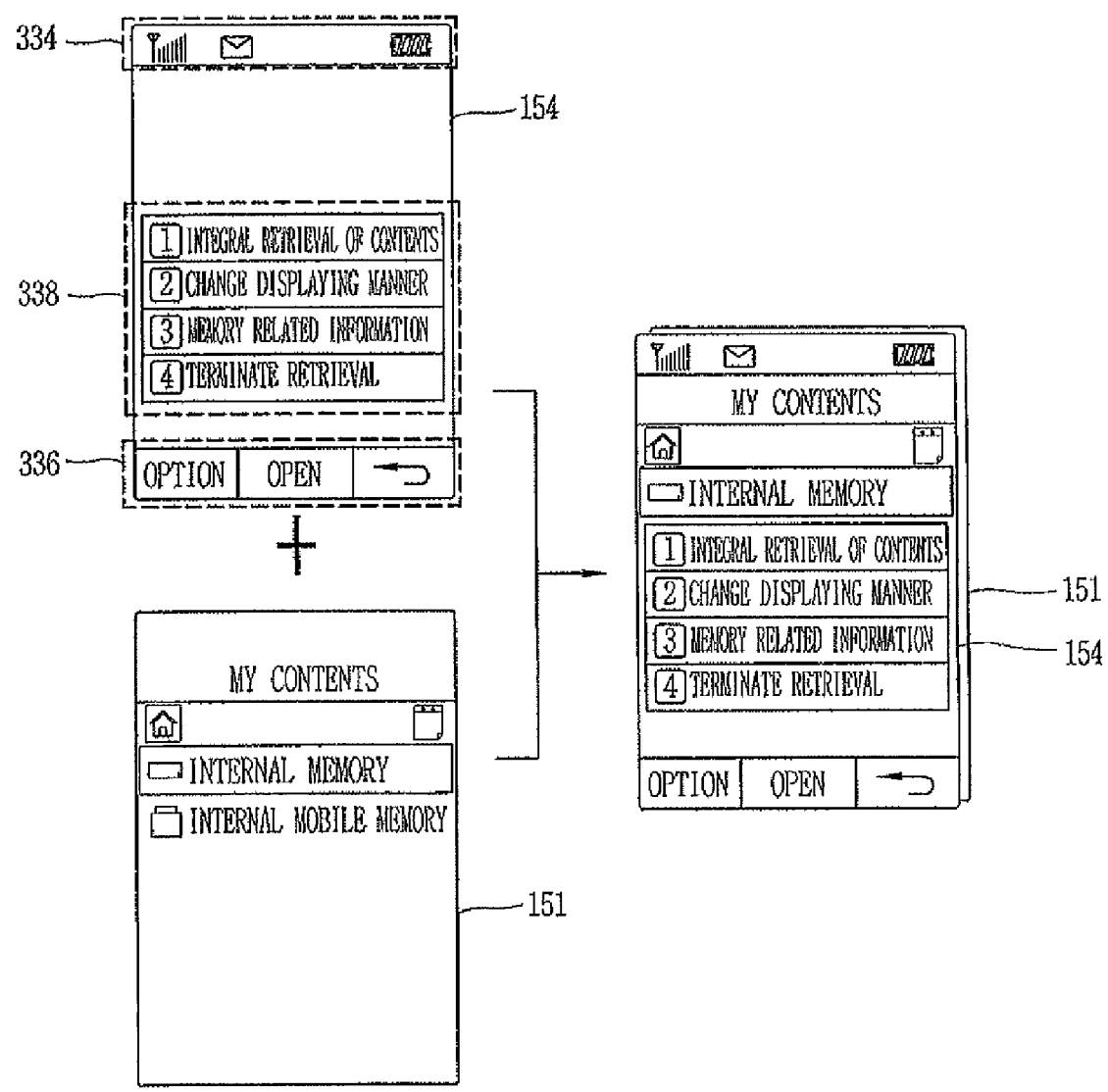

Then, upon the execution of the menu 'my contents', the controller 180 displays the 'my contents' screen on the main display (e.g., the LCD 151), and the indicator 334 and software menus 336 on the sub display (e.g., the TOLED 154). Afterwards, when a user selects the software menu 'option', as shown in FIG. 46A, the controller 180 displays the corresponding pop-up window 338 (e.g., option main menu window) on the TOLED 154.

Figure 46B:
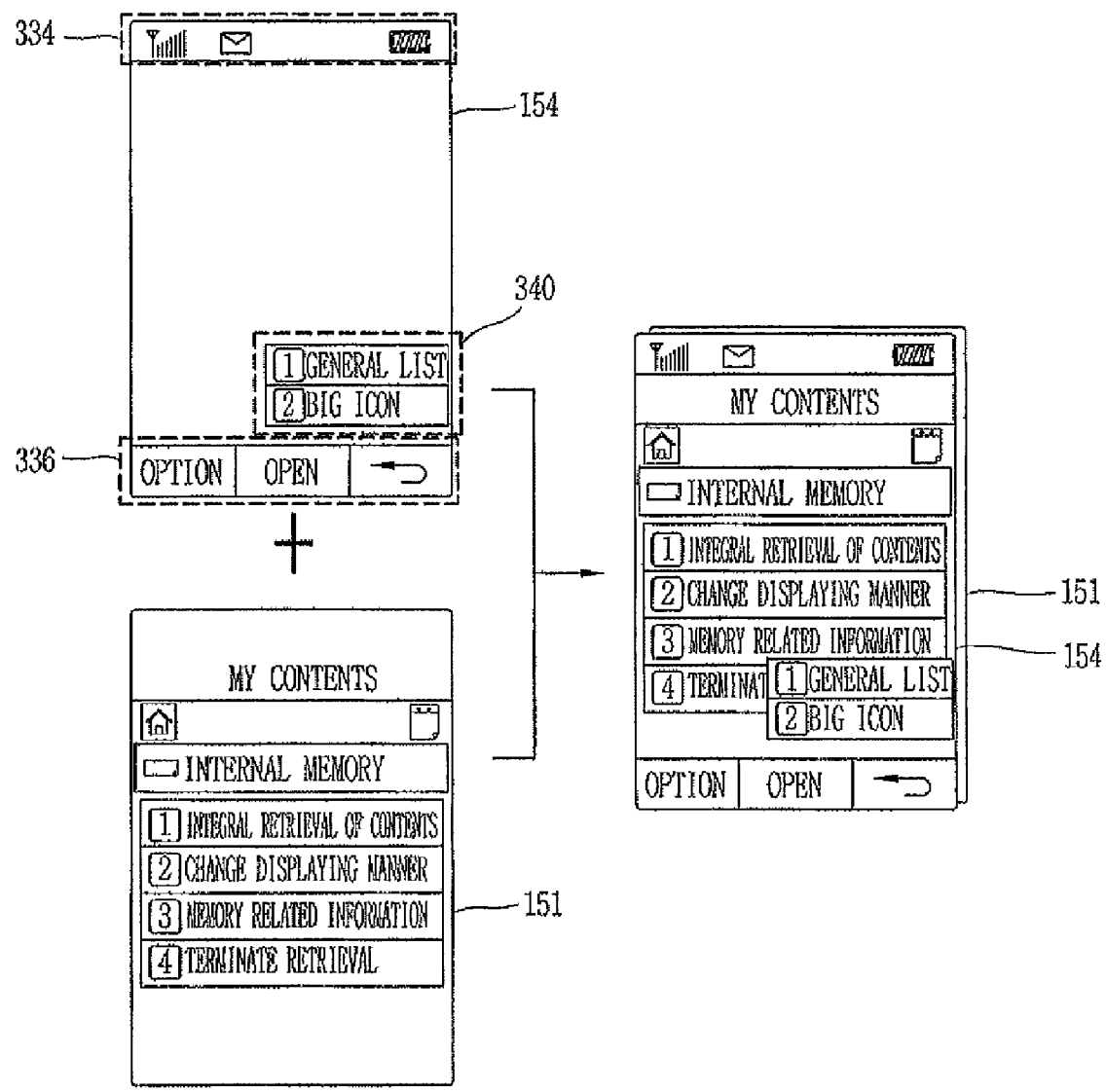

The indicator 334 and the software menus 336 having displayed on the TOLED 154 are then displayed on the LCD 151 together with the 'my contents' screen. Further, the option main menu window 338 further displayed on the 'my contents' screen is displayed through the TOLED 154 overlapped on the LCD 151, to thus provide a cubic effect to the menu screen of the mobile terminal. In addition, FIG. 46B illustrates that when an item 'change displaying manner' is selected from the option main menu window 338 of FIG. 46A, a sub menu window 340 is displayed on the TOLED 154. Even at this time, the controller 180 still displays the 'my contents' screen so as to maintain the cubic effect of the menu screen.

Figure 46C:
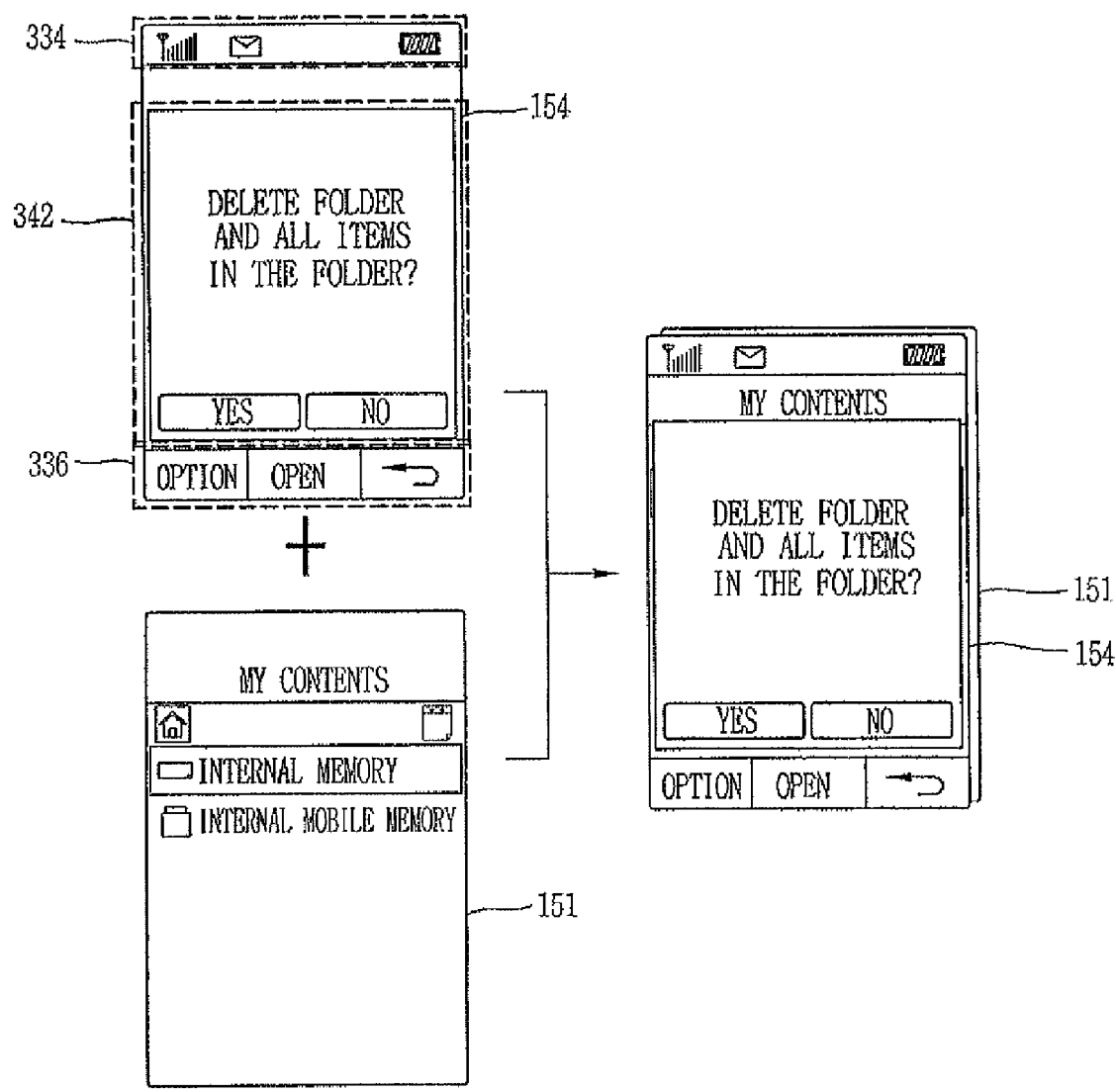
Figure 46D:
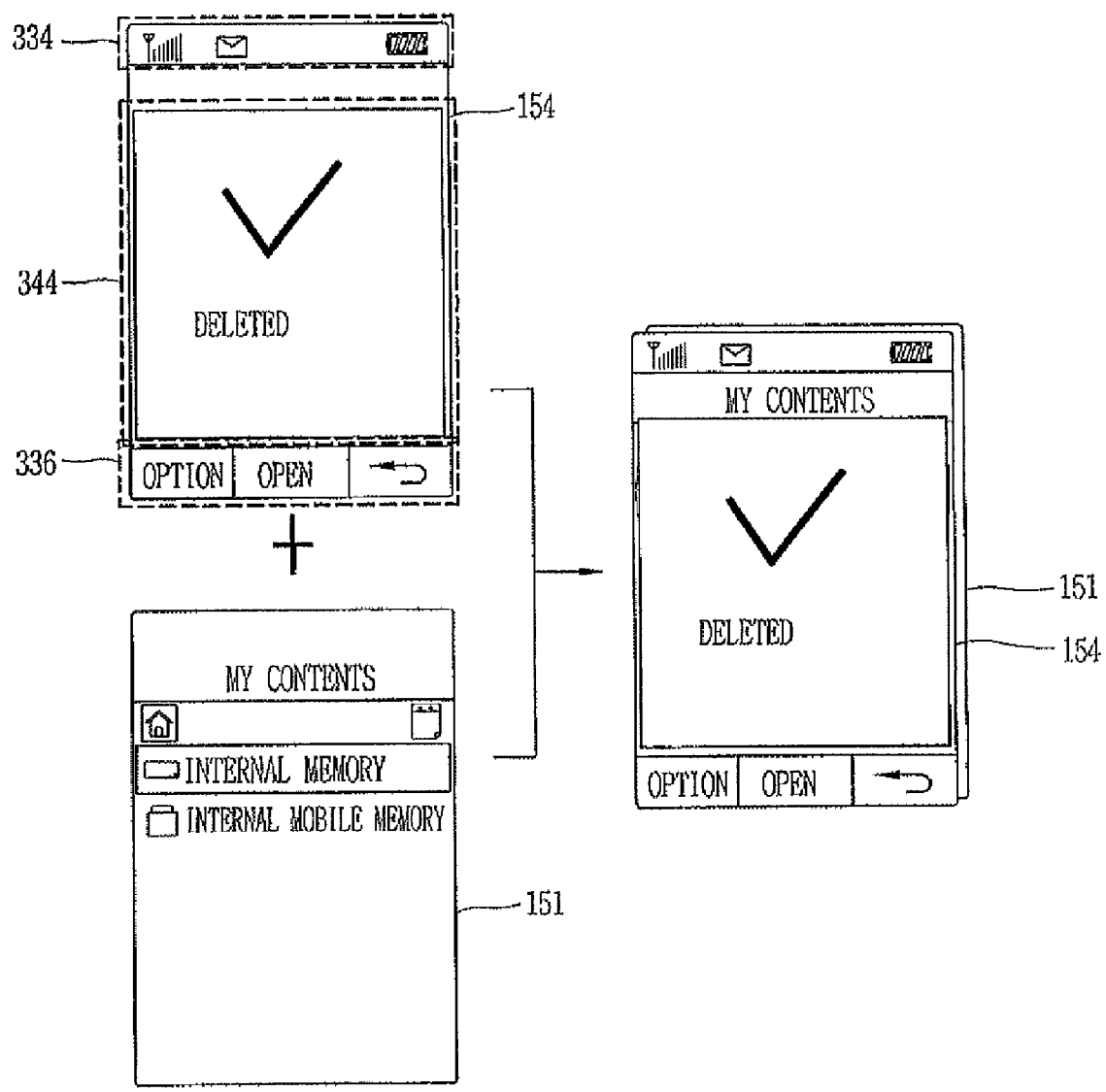

FIG. 46C illustrates one example of a pop-up selection window. When a user instructs a deletion of a specific folder, the controller 180, as shown in FIG. 46C, displays a pop-up selection window 342 for selecting 'YES' or 'NO' on the sub display (e.g., the TOLED 154). Upon selecting 'YES' from the pop-up window 342, the controller 180 deletes both the corresponding folder and every item in the folder, and then, as shown in FIG. 46D, displays a message 'successfully deleted' 334 on the TOLED 154.

Figure 47A:
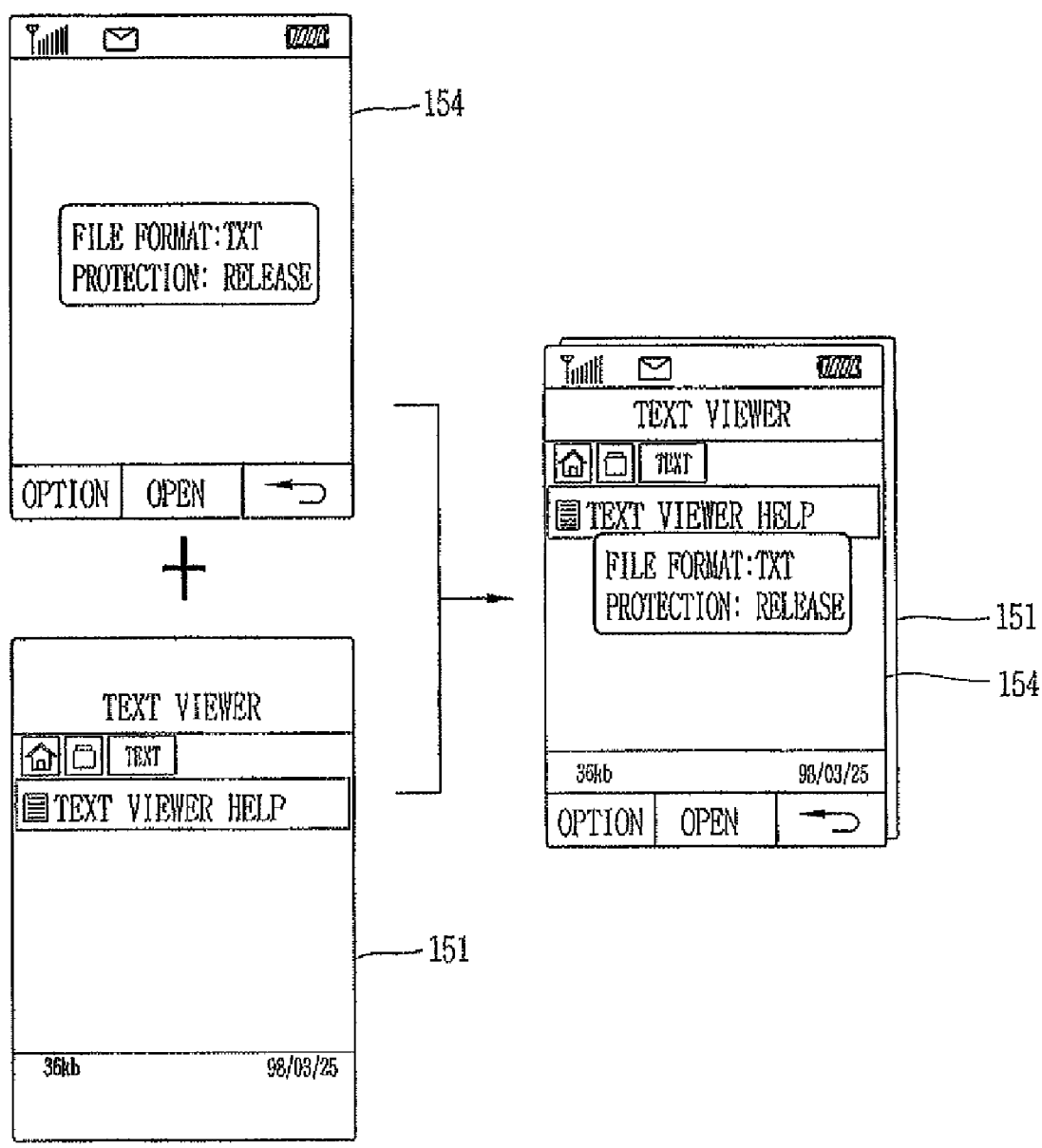
FIGS. 47A and 47B are overviews illustrating a displaying method on LCD and TOLED according to a second embodiment of the present invention.
Figure 47B:
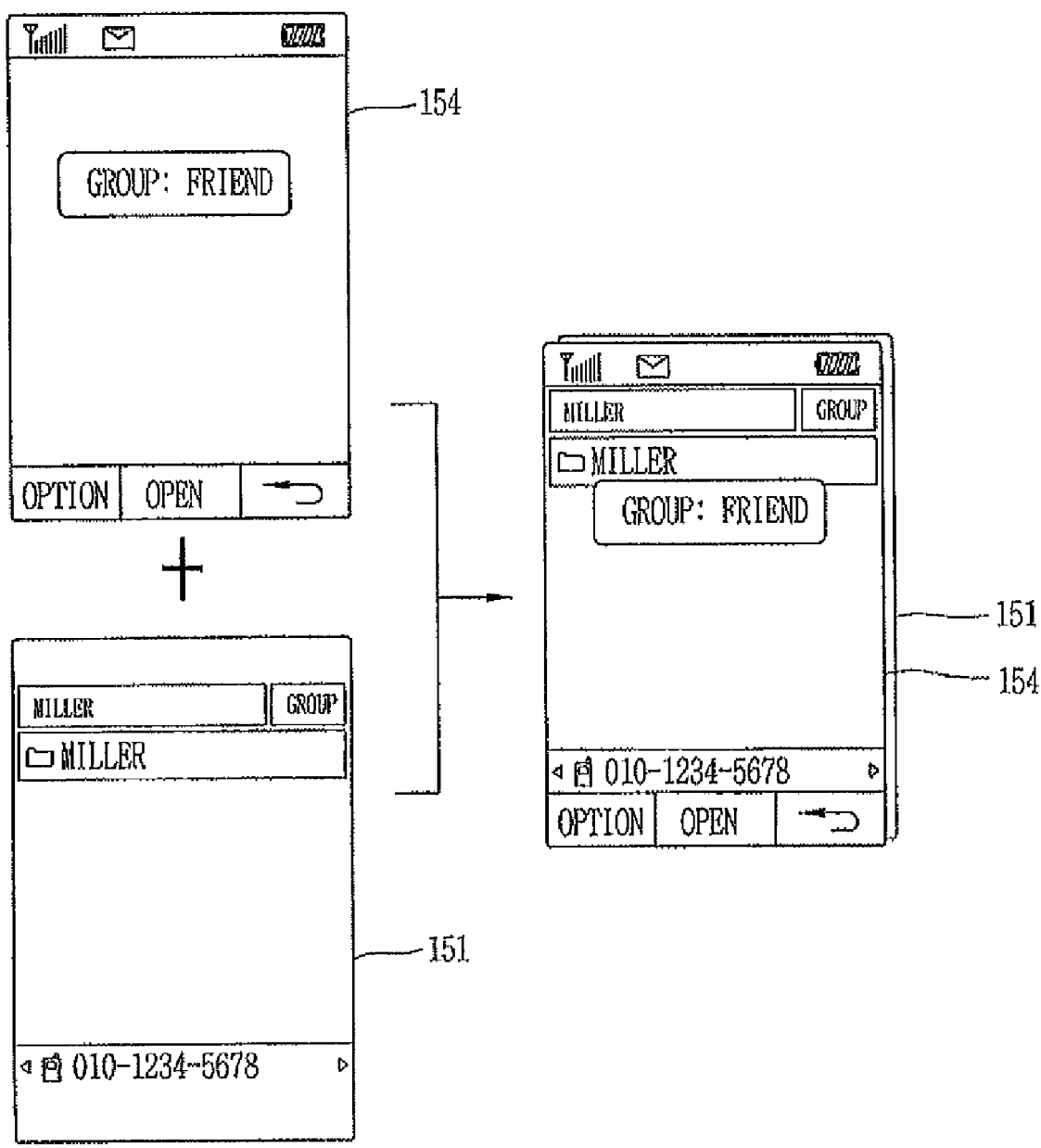

Next, FIGS. 47A and 47B are overviews illustrating a displaying method of the LCD 151 and TOLED 154 according to a second embodiment. The second embodiment illustrates a displaying method in which a screen for a specific menu (e.g., text viewer or phone book) is executed and the corresponding menu screen and detailed information (or additional information) are divided and displayed on a main display and a sub display, respectively. In this embodiment, as shown in the first embodiment of the displaying method, the LCD 151 is disposed on the main body portion 400 and the TOLED 154 is disposed on the folding portion 410. Further, the LCD 151 and the TOLED 154 are set to a main display and a sub display, respectively. Hereinafter, embodiments (third to ninth embodiments) to be described are the same to this second embodiment in the positions and settings of the displays (e.g., the LCD 151 and TOLED 154).

As shown in FIGS. 47A and 47B, when a user executes a specific function (e.g., text viewer or phonebook), the controller 180 displays a text viewer screen (or phonebook screen) on the main display (i.e., the LCD 151), and then displays detailed information (or additional information) related to the screen on the sub display (i.e., the TOLED 154).

Figure 48:
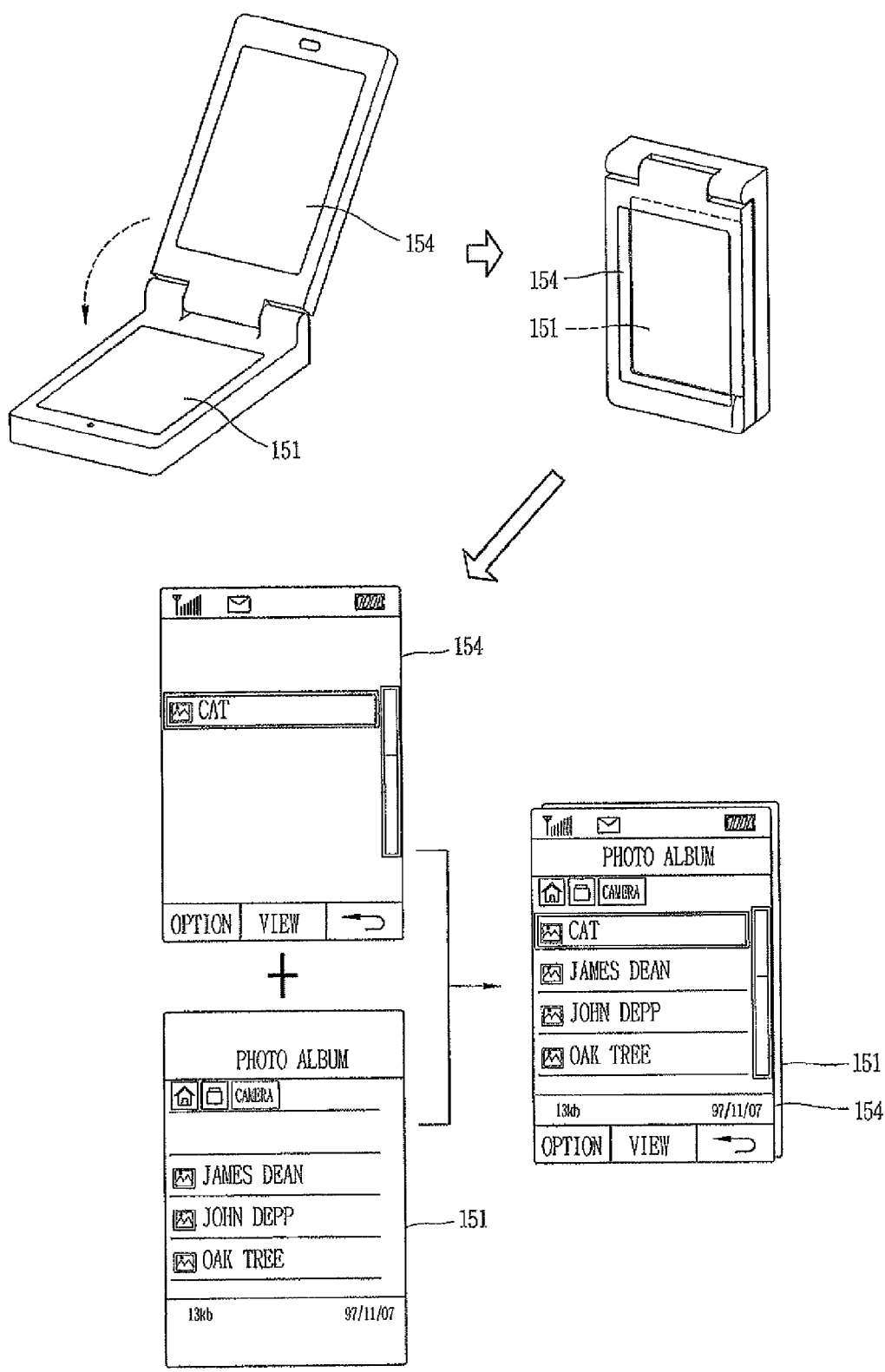
FIG. 48 is an overview illustrating a displaying method on LCD and TOLED according to a third embodiment of the present invention.

In addition, FIG. 48 is an overview showing a displaying method of the LCD 151 and TOLED 154 according to a third embodiment. The third embodiment illustrates a displaying method in which, under the closed state (i.e., an overlapped state between the TOLED 154 and the LCD 151), a specific function (e.g., photo album, etc.) is executed and a selected object and non-selected object from a menu list are displayed separately on a main display and a sub display.

As shown in FIG. 48, when a user executes a photo album, the controller 180 displays a file list of the photo album on the main display (i.e., the LCD 151), and displays a selection bar, a scroll bar and a selected object (e.g., an image file 'cat') of the corresponding list on the sub display (i.e., the TOLED 154). When the user touches a specific object of the file list, the selection bar of the list is positioned on the touched object, to thus allow the user to select the object. The controller 180 controls the displays such that the object (e.g., 'cat') having been displayed on the LCD 151 can be displayed on the TOLED 154.

Figure 49:
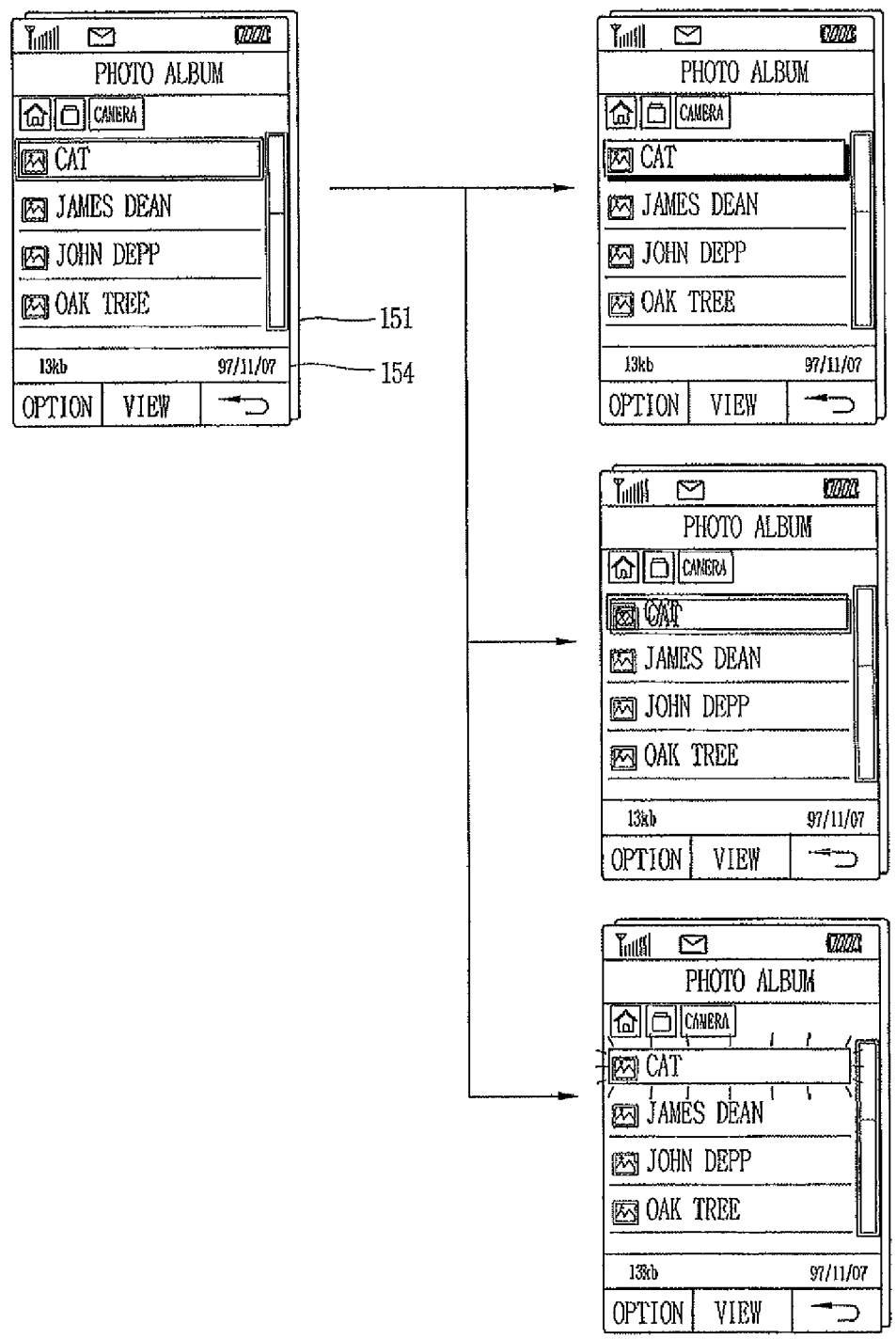
FIG. 49 is an overview illustrating various dimensional effects for displaying according to an embodiment of the present invention.

Also, for a mobile terminal having a keypad, a user manipulates navigation keys to move the selection bar of the list onto a specific object (e.g., 'cat') so as to select the object. The user also manipulates (e.g., by touch input or key input) the scroll bar on the TOLED 154, so as to enable viewing of all image files stored in the photo album. When the specific object is displayed on the TOLED 154, the LCD 151 below the displayed object, as shown in FIG. 49, can be processed in various manners, such as a shadow processing, a semitransparent processing, a duplicate displaying of the same object, a blank displaying, a background screen displaying and the like. FIG. 49 shows such various cubic or 3-dimensional effects.

Next, FIG. 50A is an overview illustrating a displaying method of the LCD 151 and TOLED 154 according to a fourth embodiment. The fourth embodiment illustrates a displaying method in which a specific menu (e.g., photo album) screen is executed in an open state of a mobile terminal, and then a file list of the photo album and a selected item are displayed separately on a main display and a sub display. As shown in FIG. 50A, upon executing the menu 'photo album', the controller 180 displays a 'photo album list' screen on the main display (i.e., the LCD 151). Afterwards, when a specific item is selected from the album list, the controller 180 displays the selected item on the sub display (i.e., the TOLED 154). Next, FIG. 50B is another embodiment of FIG. 50A, which shows a 'main menu' being executed. After executing the 'main menu', when the user selects an icon of a specific menu from the 'main menu', the controller 180 displays the selected icon on the TOLED 154.

Figure 51A:
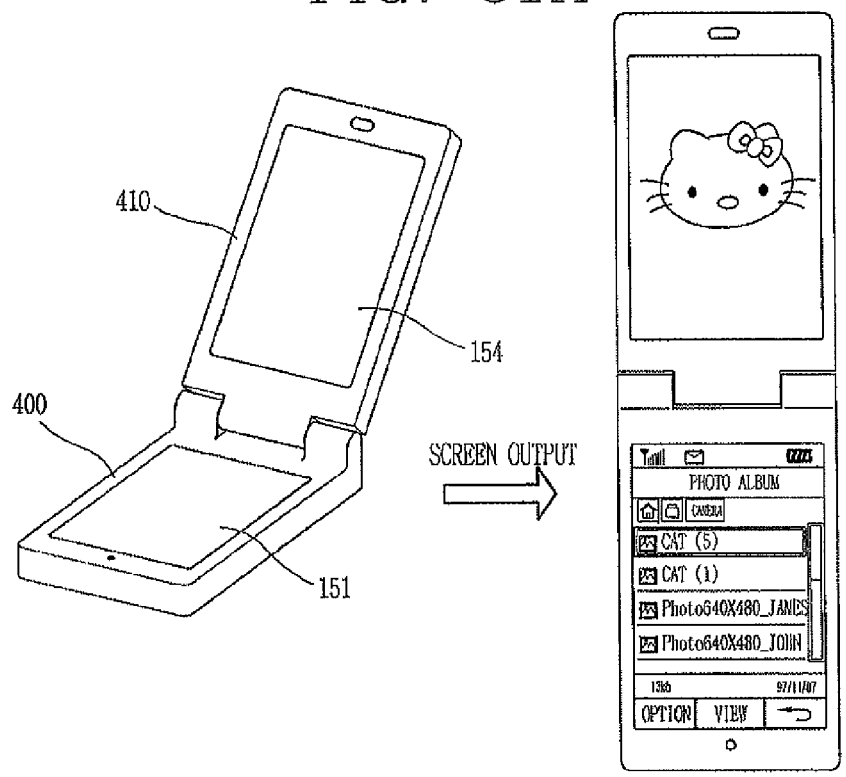
FIGS. 51A and 51B are overviews illustrating a displaying method according to a fifth embodiment of the present invention.
Figure 51B:
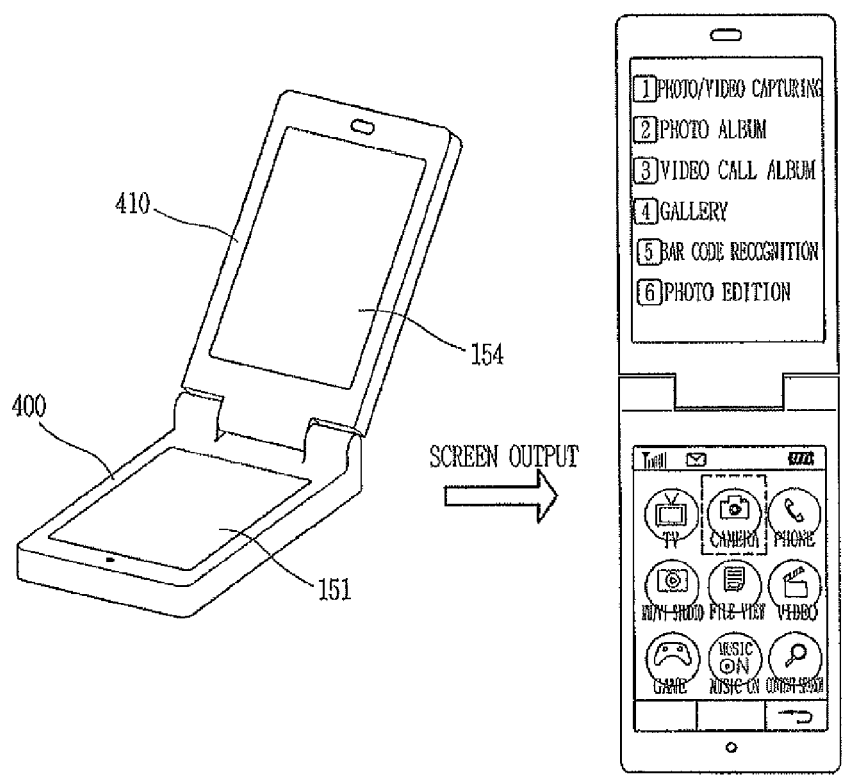

FIG. 51A is an overview illustrating a displaying method according to a fifth embodiment of the present invention. The fifth embodiment illustrates a displaying method in which a specific menu (e.g., photo album) screen is executed in an open state of a mobile terminal, and then a file list of the photo album and a selected item are displayed separately on a main display and a sub display. As shown in FIG. 51A, upon executing the 'photo album', the controller 180 displays a 'photo album image list' on the main display (i.e., the LCD 151). Afterwards, when a user selects a specific item from the image list, the controller 180 displays the image of the selected item on the sub display (i.e., the TOLED 154). FIG. 51B is another embodiment of FIG. 51A, which shows a 'main menu' being executed. After executing the 'main menu', when the user selects an icon of a specific menu from the 'main menu', the controller 180 displays a sub menu of the selected item on the sub display (i.e., TOLED 154).

Figure 52A:
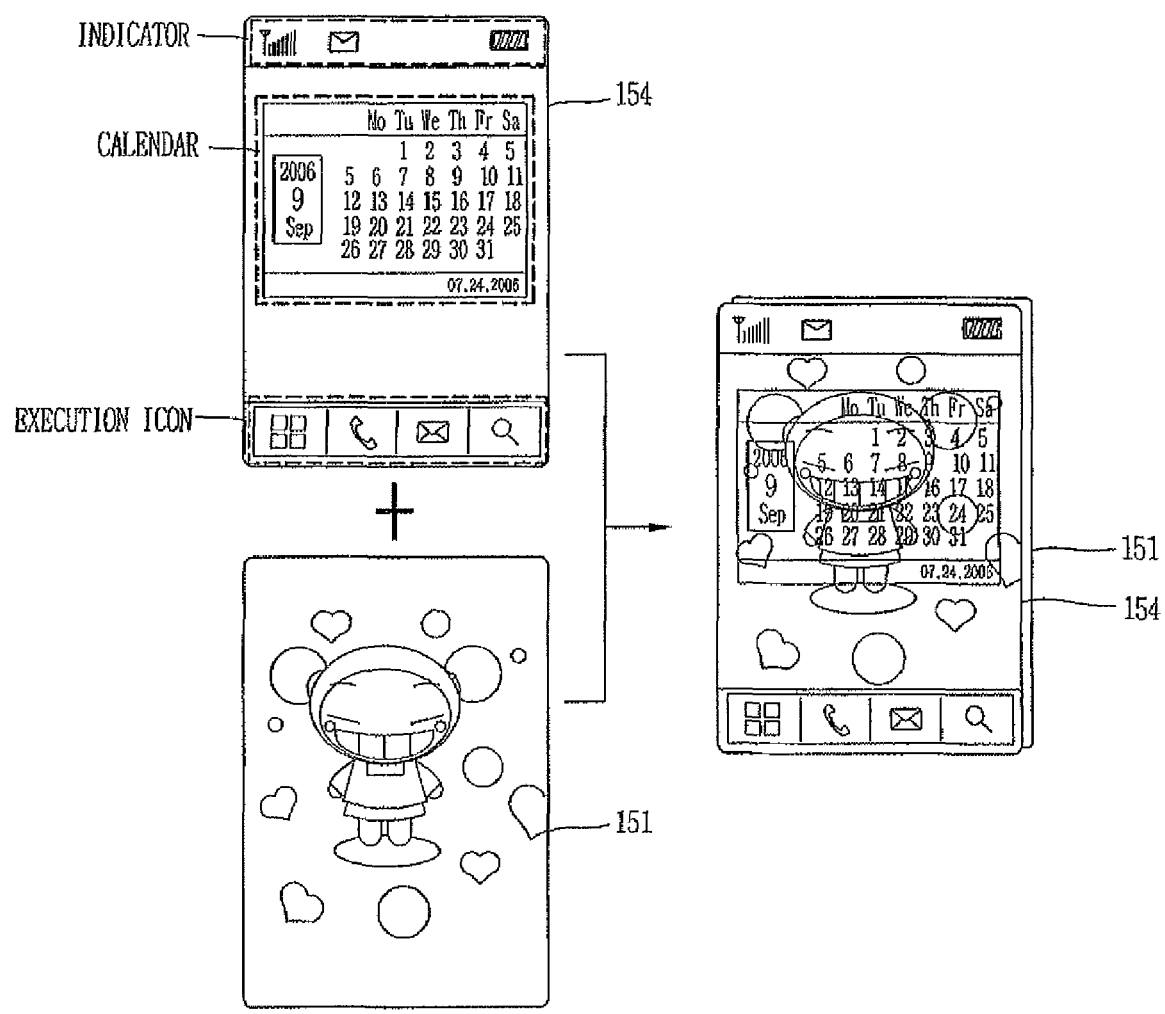
FIGS. 52A to 52C are overviews illustrating a displaying method according to a sixth embodiment of the present invention.

FIG. 52A is an overview illustrating a displaying method according to a sixth embodiment of the present invention. The sixth embodiment illustrates that when a mobile terminal is changed to an idle mode under a closed state (i.e., an overlapped state between the TOLED 154 and LCD 151), an idle screen of the mobile terminal and an object displayed by a user's setup are displayed separately on a main display and a sub display. As shown in FIG. 52A, in an idle mode of the mobile terminal, the controller 180 displays an idle screen of the mobile terminal on the main display (i.e., the LCD 151), and objects displayed by a user's setup, e.g., execution icon, indicator, calendar and the like on the sub display (i.e., the TOLED 154).

Figure 52B:
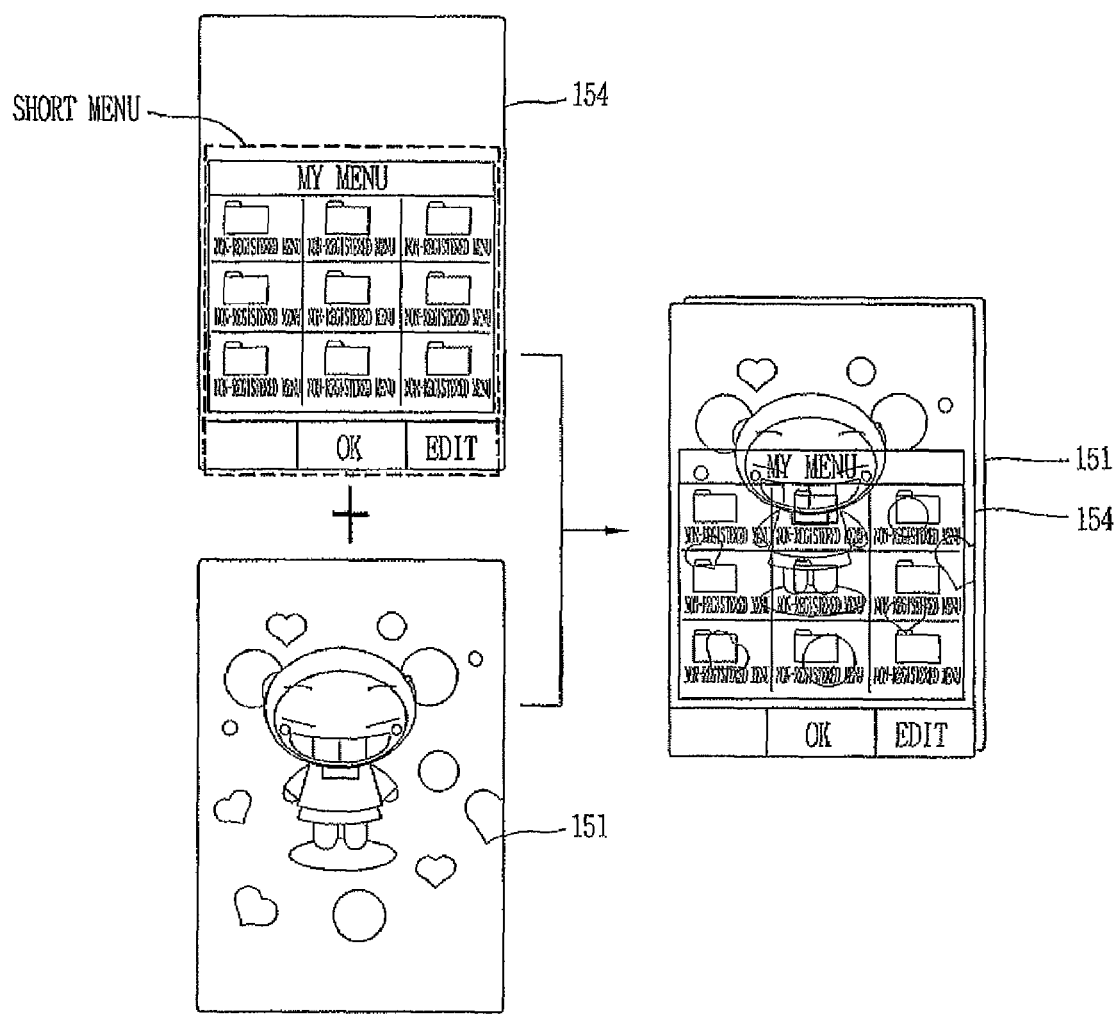
Figure 52C:
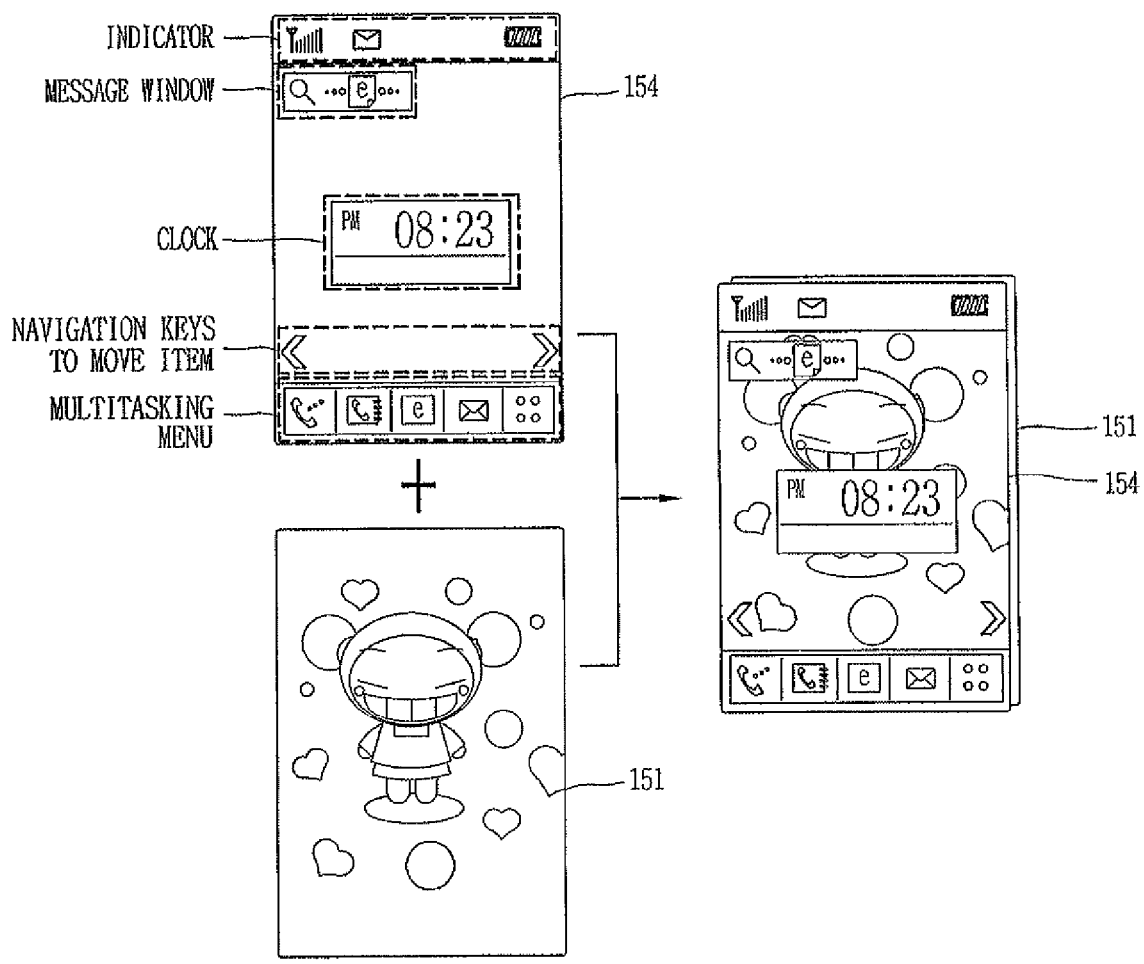

Further, FIG. 52B is an overview illustrating an idle mode according to another embodiment of FIG. 52A. The controller 180 displays the idle screen of the mobile terminal on the LCD 151 and a short menu on the TOLED 154. FIG. 52C is an overview illustrating an idle mode according to still another embodiment of FIG. 52A. The controller 180 displays an indicator, multitasking menu, clock, software navigation keys, various message windows and the like on a sub display (i.e., the TOLED 154).

Figure 53A:
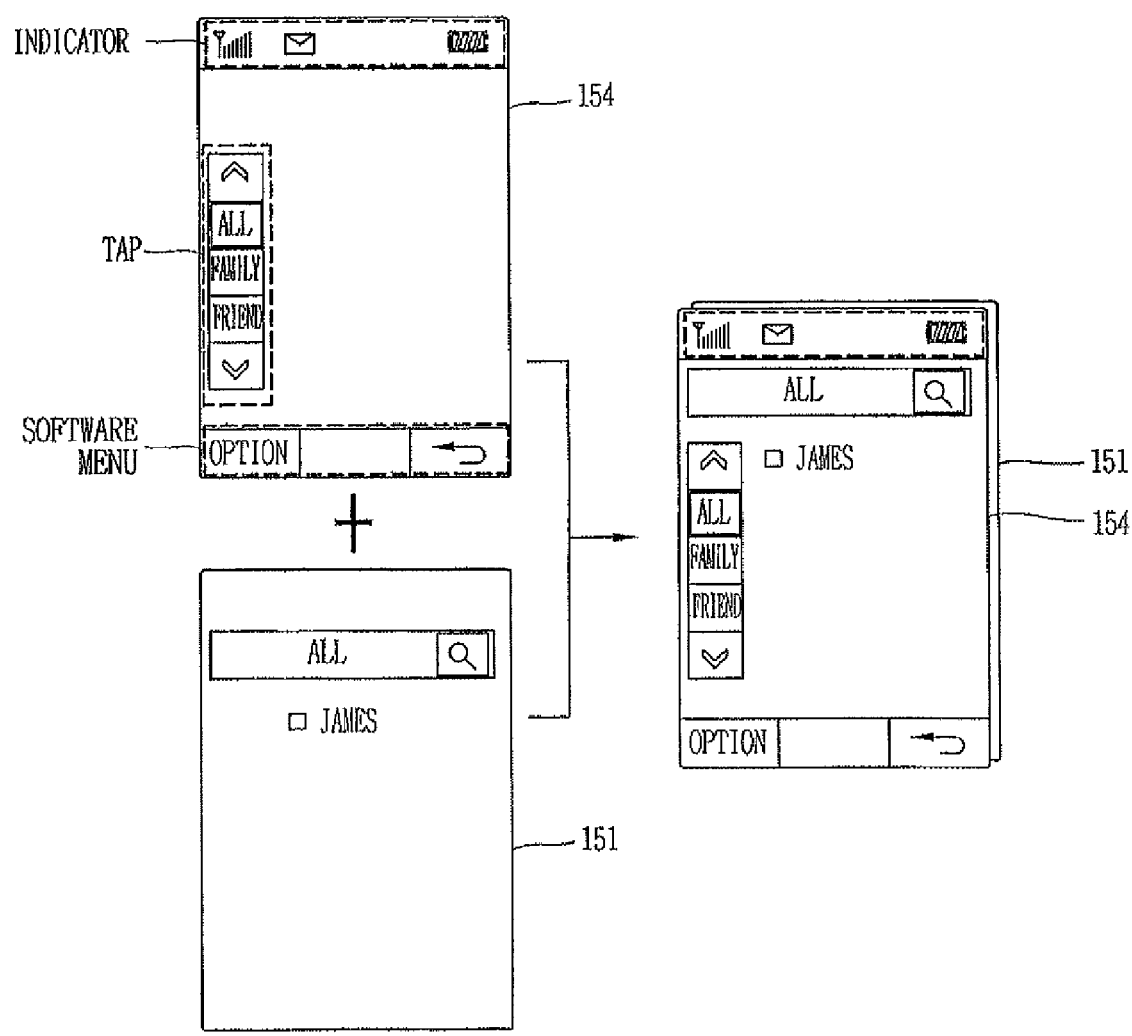
FIGS. 53A to 53H are overviews illustrating a displaying method according to a seventh embodiment of the present invention.

Next, FIGS. 53A to 53H are overviews illustrating a displaying method according to a seventh embodiment of the present invention. The seventh embodiment illustrates that upon executing a specific application in a closed state (e.g., an overlapped state between the TOLED 154 and LCD 151) of the mobile terminal, the corresponding application screen and a related specific object are displayed separately on a main display (i.e., the LCD 151) and a sub display (i.e., the TOLED 154). In more detail, FIG. 53A shows the TOLED 154 and LCD 151 when an application, such as a phonebook, which stores information by each category, is executed. As shown in FIG. 53A, upon executing a phonebook function, the controller 180 displays an execution screen of the phonebook on the LCD 151, and displays a specific object (e.g., tab, etc.) of the phonebook, an indicator, software menus and the like on the TOLED 154. Further, the indicator and the software menus may selectively be displayed either on the LCD 151 or on the TOLED 154.

Figure 53B:
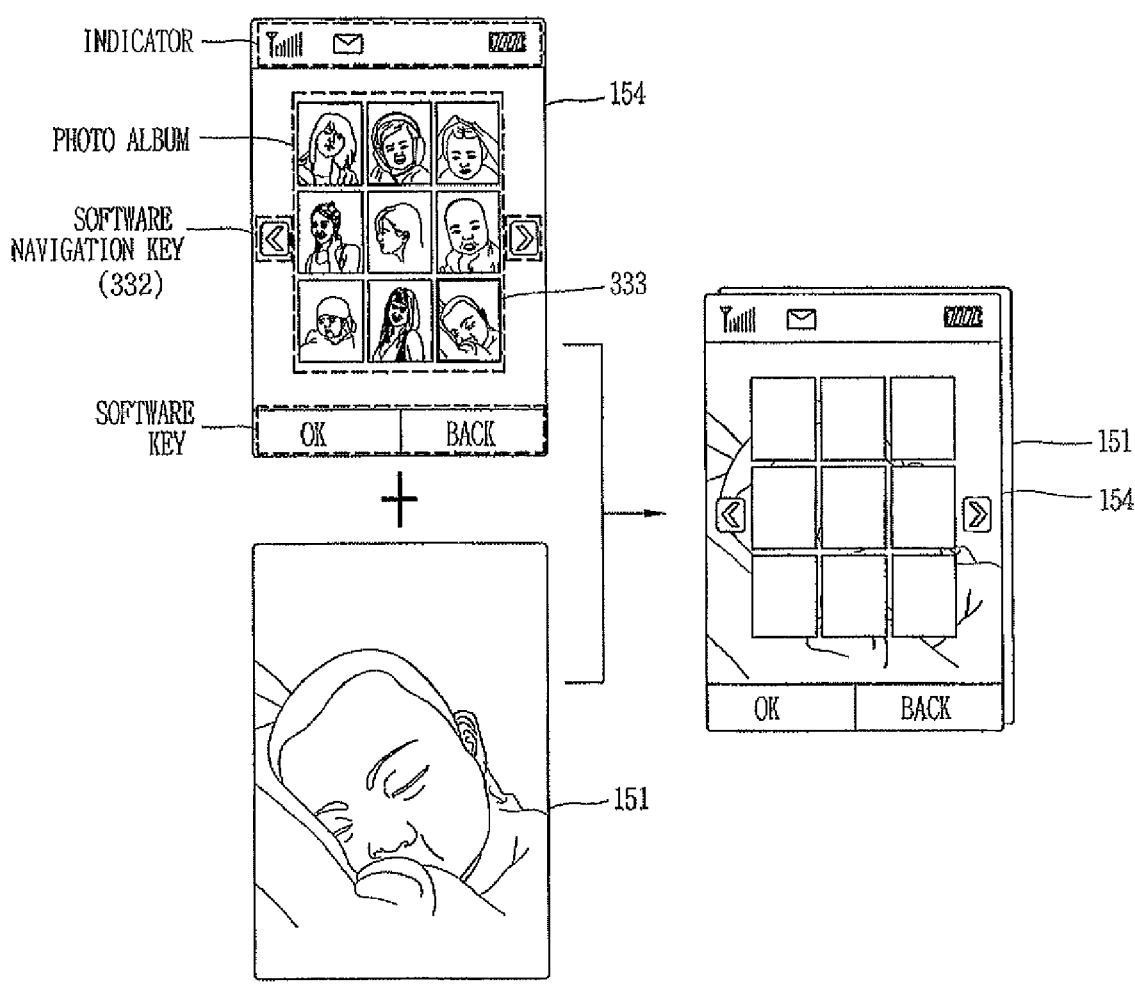

FIG. 53B shows the TOLED 154 and LCD 151 when an image viewer (e.g., photo album, etc.) is executed. As shown in FIG. 53B, upon executing the photo album, the controller 180 displays an execution screen of the photo album on the LCD 151, and a selection cursor 333 of the photo album and the software navigation keys 332 on the TOLED 154. Also, the indicator and software keys may selectively be displayed either on the LCD 151 or on the TOLED 154.

Figure 53C:
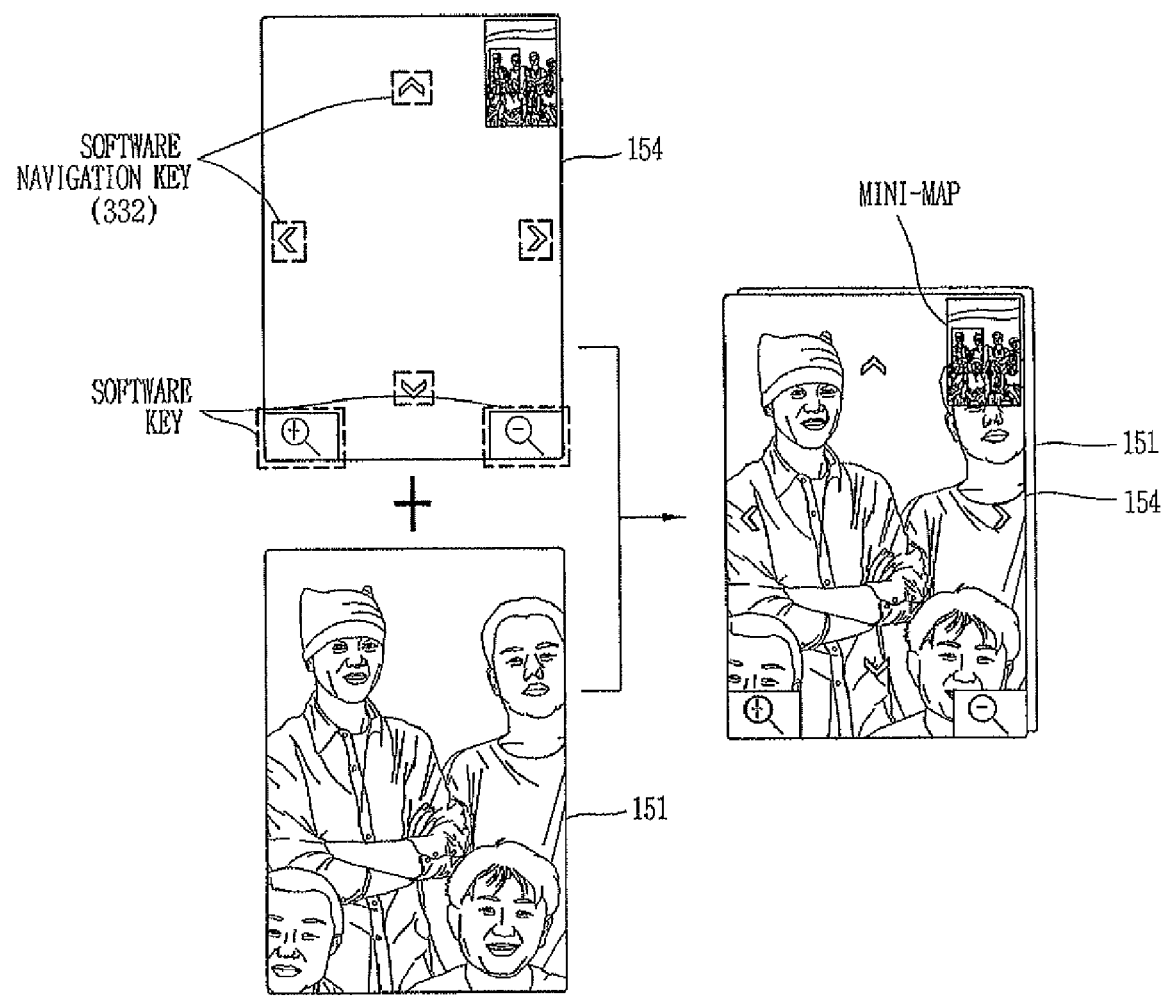

FIG. 53C is an overview illustrating the TOLED 154 and LCD 151 when an image viewer (e.g., photo album, browser, etc.) is executed. When a user selects a specific image after the photo album is executed, as shown in FIG. 53C, the controller 180 displays the selected image (in a full size) on the LCD 151, and the software navigation keys 332, a mini-map and software keys on the TOLED 154. When the selected image is greater in size than a screen, the mini-map functions to indicate to which portion of the full image corresponds to a currently displayed portion.

Figure 53D:
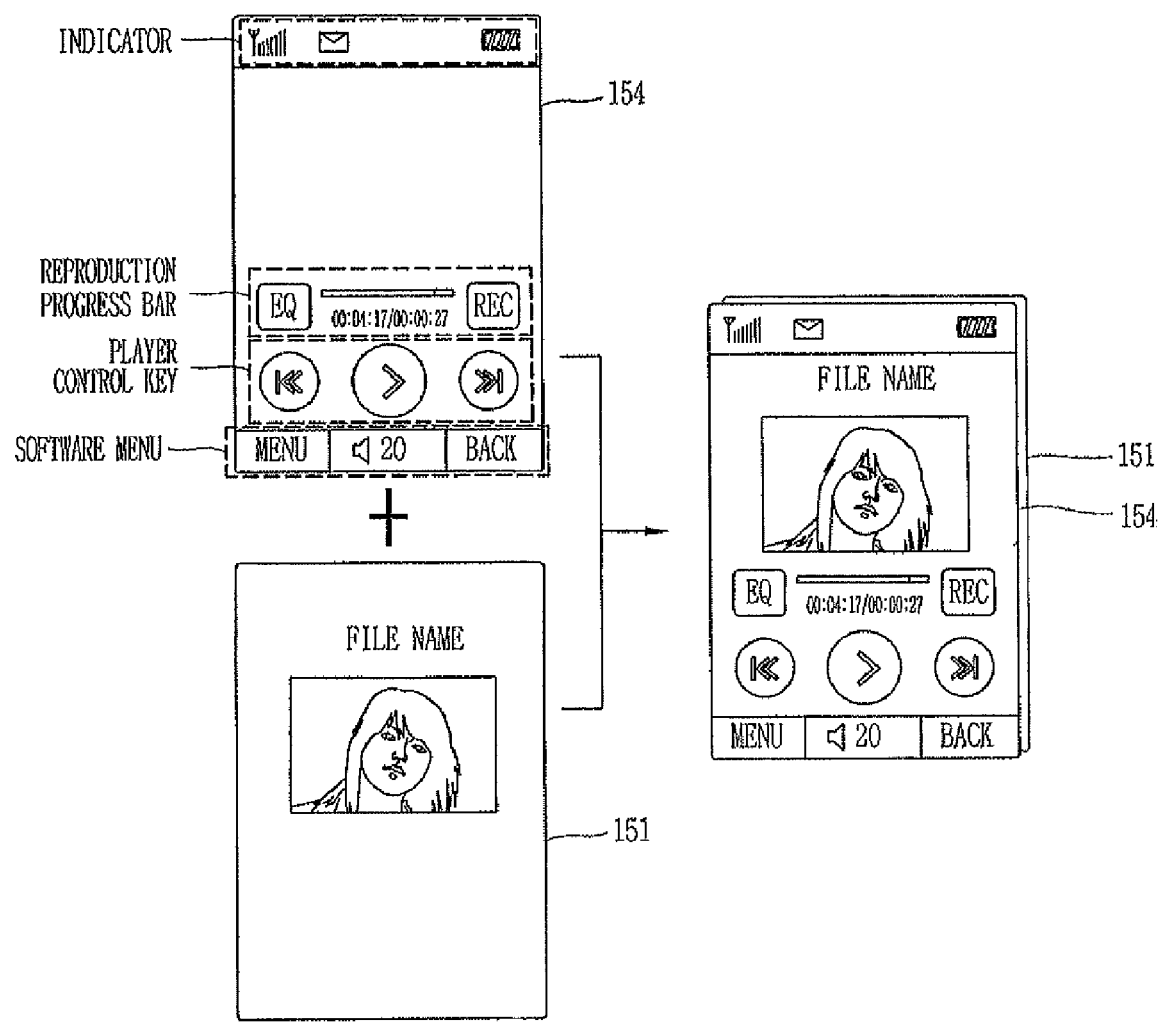

FIG. 53D is an overview illustrating the TOLED 154 and LCD 151 when various multimedia players are executed. As shown in FIG. 53D, upon executing a multimedia player, such as a video player or an MP3 player, the controller 180 displays the corresponding multimedia player on the LCD 151 while displaying an indicator, a reproduction progress bar, a player control key and software keys on the TOLED 154. The indicator and the software keys may selectively be displayed either on the LCD 151 or on the TOLED 154.

Figure 53E:
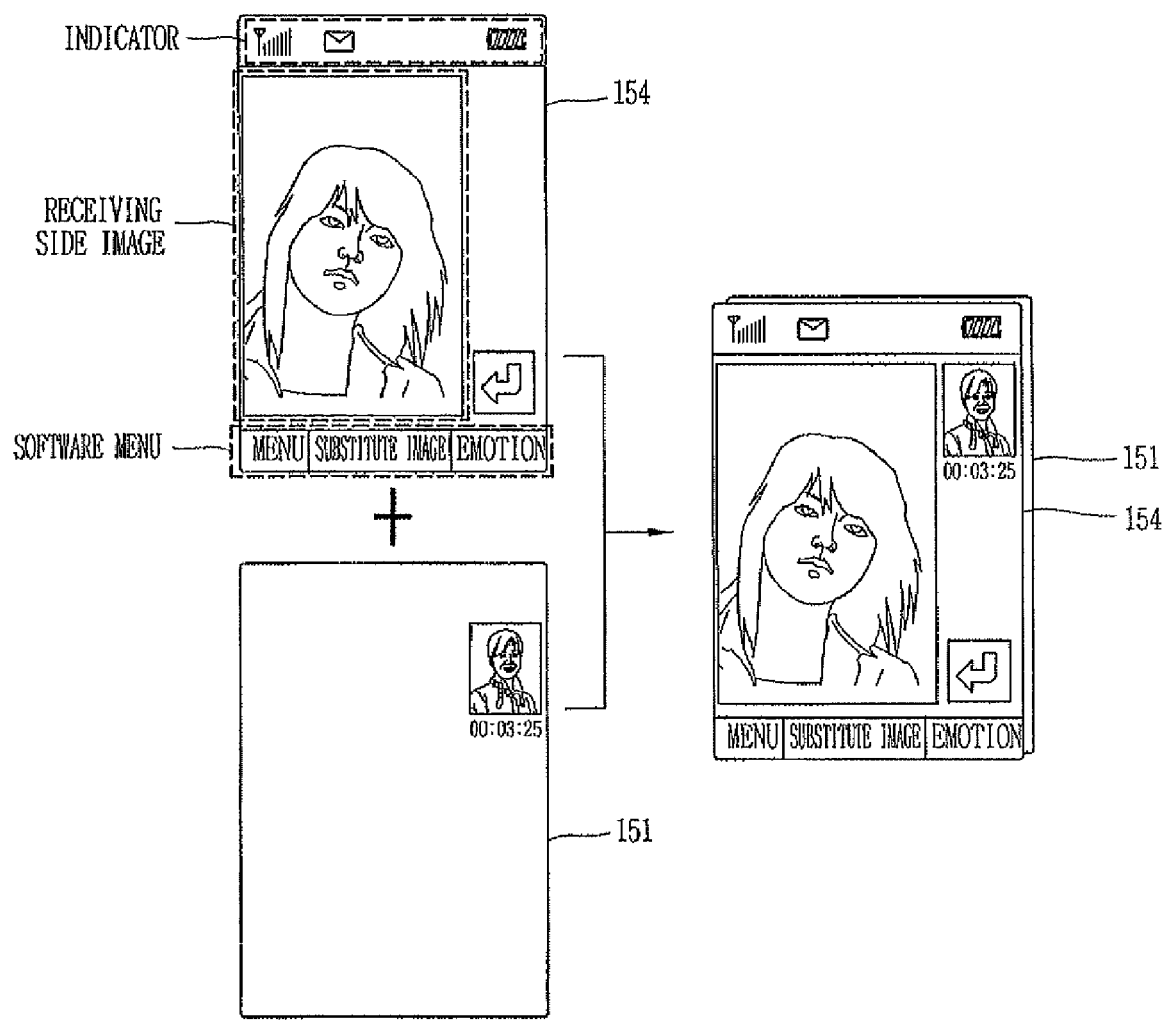

FIG. 53E is an overview illustrating a displaying method of the TOLED 154 and LCD 151 during a video call. As shown in FIG. 53E, when a video call is set, the controller 180 displays information related to a receiving side (e.g., an image of another party etc.) on the LCD 151 while displaying an image of a transmitting side, an indicator, and software menu (e.g., 'video call menu', 'substitute image', 'emotion' and the like) on the TOLED 154. The indicator and the software menus may selectively be displayed either on the LCD 151 or on the TOLED 154.

Accordingly, embodiments of the present invention allow the software menus (e.g., 'video call menu', 'substitute image', 'emotion' and the like) to be displayed on the TOLED 154, such that a user can manipulate the menu (e.g., 'video call menu') in a simply tactile input manner. According to the user's manipulation of the menu (e.g., 'video call menu'), the controller 180 can control images during the video call in various manners (e.g., enlarging a transmitting side image, enlarging a receiving side image, displaying only the transmitting side image or the receiving side image, and the like).

Figure 53F:
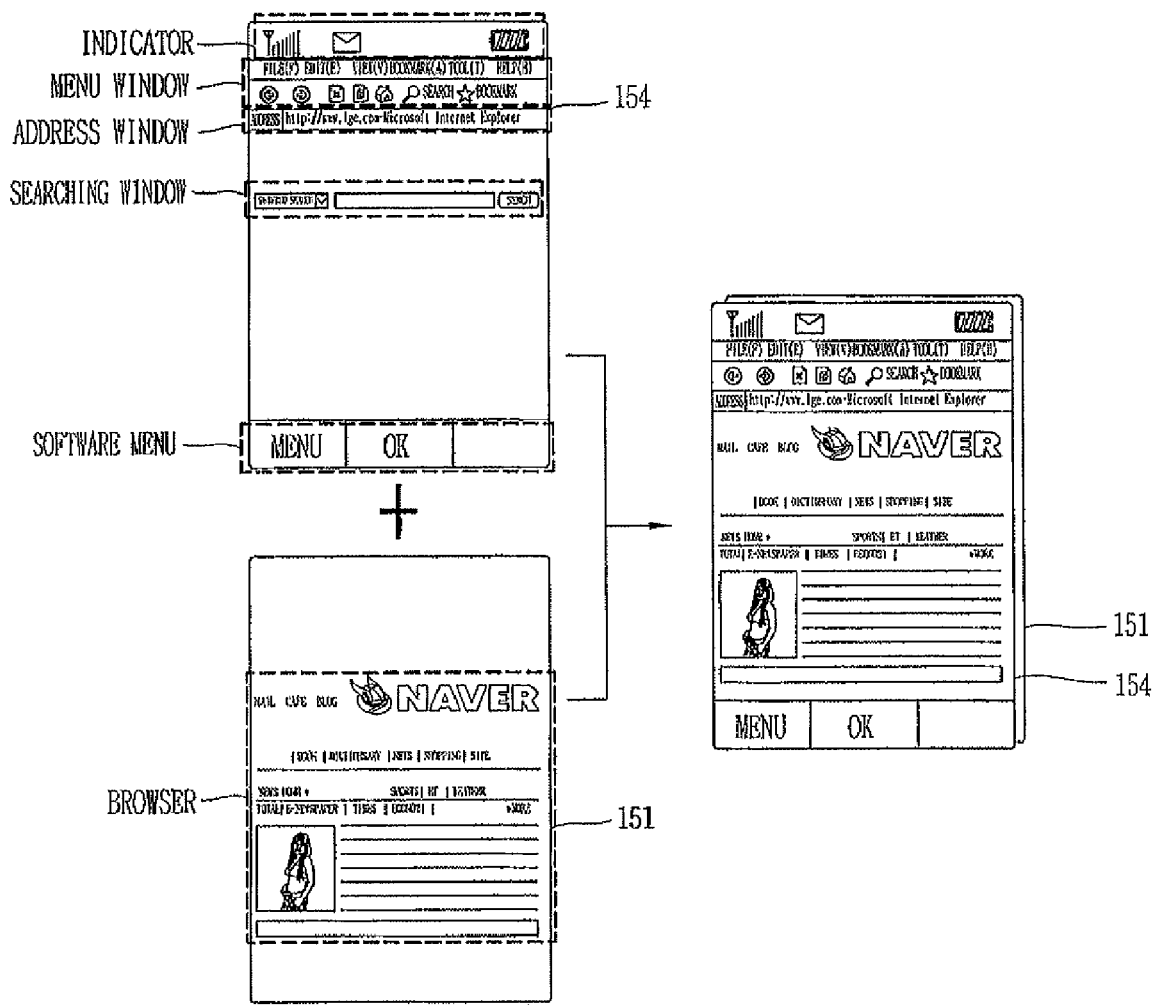

Next, FIG. 53F is an overview illustrating a displaying method of the TOLED 154 and LCD 151 when an Internet browser is executed. As shown in FIG. 53F, when an Internet browser is executed, the controller 180 displays a webpage accessed by the browser on the LCD 151, and displays an indicator, software menus, and menu window, address window and search window of the browser on the TOLED 154. Also, text each having a hyperlink set to a specific webpage may be displayed on the TOLED 154. The indicator and the software menus may also be selectively displayed either on the LCD 151 or on the TOLED 154.

Figure 53G:
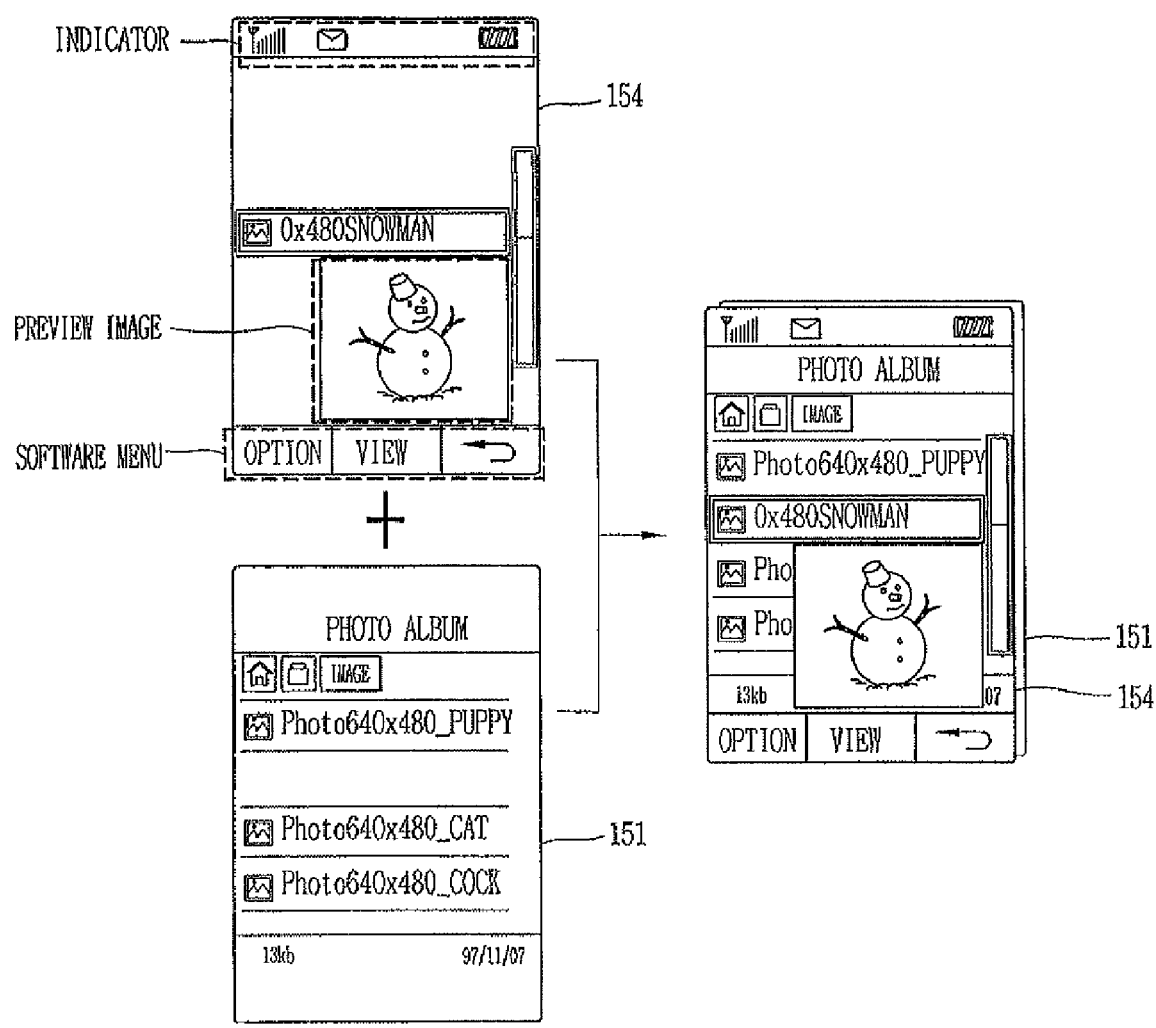

FIG. 53G is an overview illustrating a displaying method of the TOLED 154 and LCD 151 when a preview of a contents list (e.g., photo album list or the like) is executed. As shown in FIG. 53G, upon executing the photo album, the controller 180 displays an 'image list of the photo album' on the LCD 151, and displays an indicator, software menus, a selection bar, a scroll bar and a preview screen on the TOLED 154. The indicator, the software menus, the selection bar and the scroll bar may also selectively be displayed either on the LCD 151 or on the TOLED 154. Further, a preview screen of the image list, on which the selection bar is placed, is displayed on the TOLED 154, while the selection bar moves. In addition, clipboard contents or copied contents may be displayed on the TOLED 154 as a preview screen.

Figure 53H:
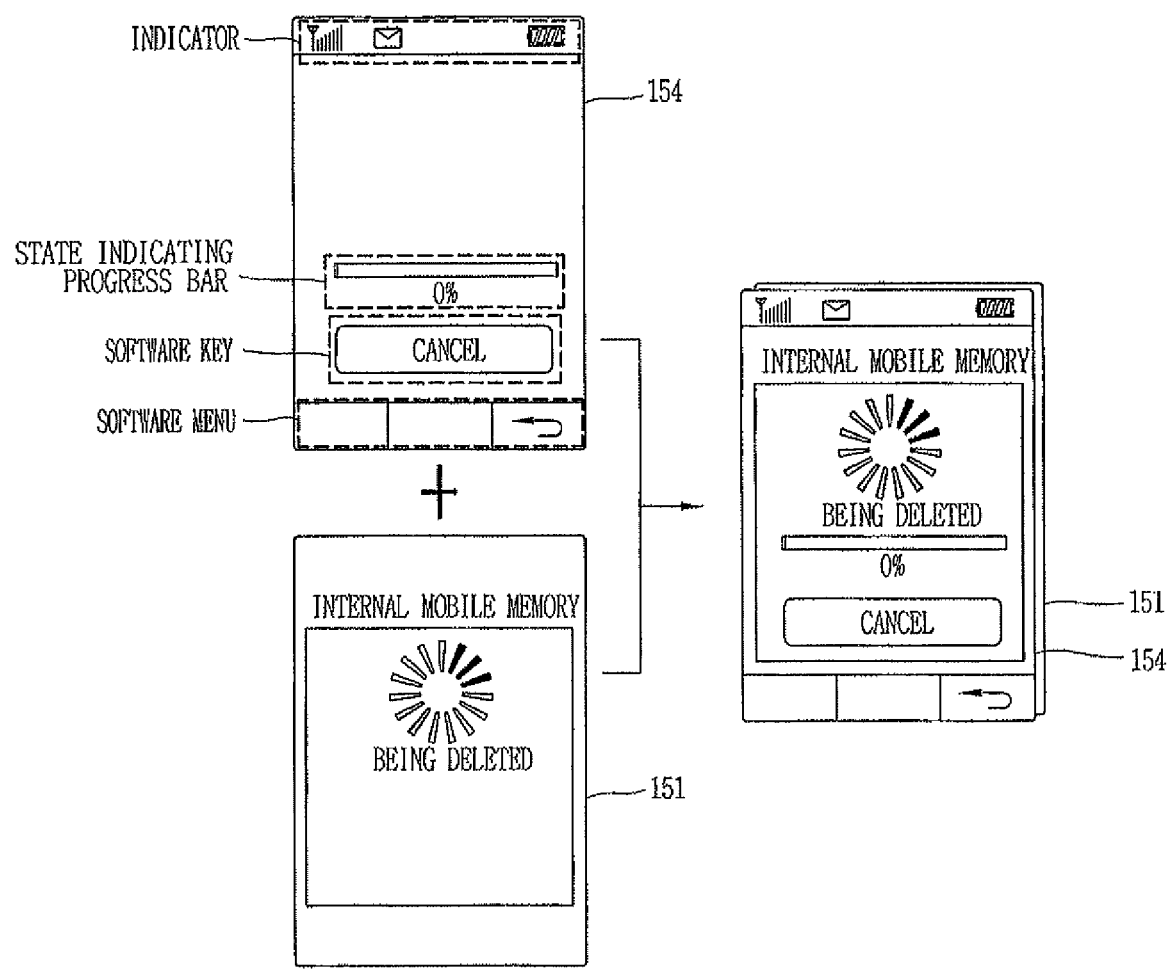

FIG. 53H is another embodiment of FIG. 53G, which illustrates a displaying method of the TOLED 154 and LCD 151 when a certain editing application is executed. When an editing application of a mobile terminal is executed, the controller 180 displays a message indicating a progressing sate of the editing operation on the LCD 151, and displays an indicator, software menus, a software key (e.g., 'back'), and a state (e.g., delete, copy, move, initiate, etc.) progress bar on the TOLED 154. The indicator and the software menus may selectively be displayed either on the LCD 151 or on the TOLED 154. Further, this embodiment (i.e., the seventh embodiment of the displaying method) can be configured such that a map (or satellite photos, etc.) and related geographic information (or map control menu, etc.) can be displayed separately on the LCD 151 and the TOLED 154.

Figure 54:
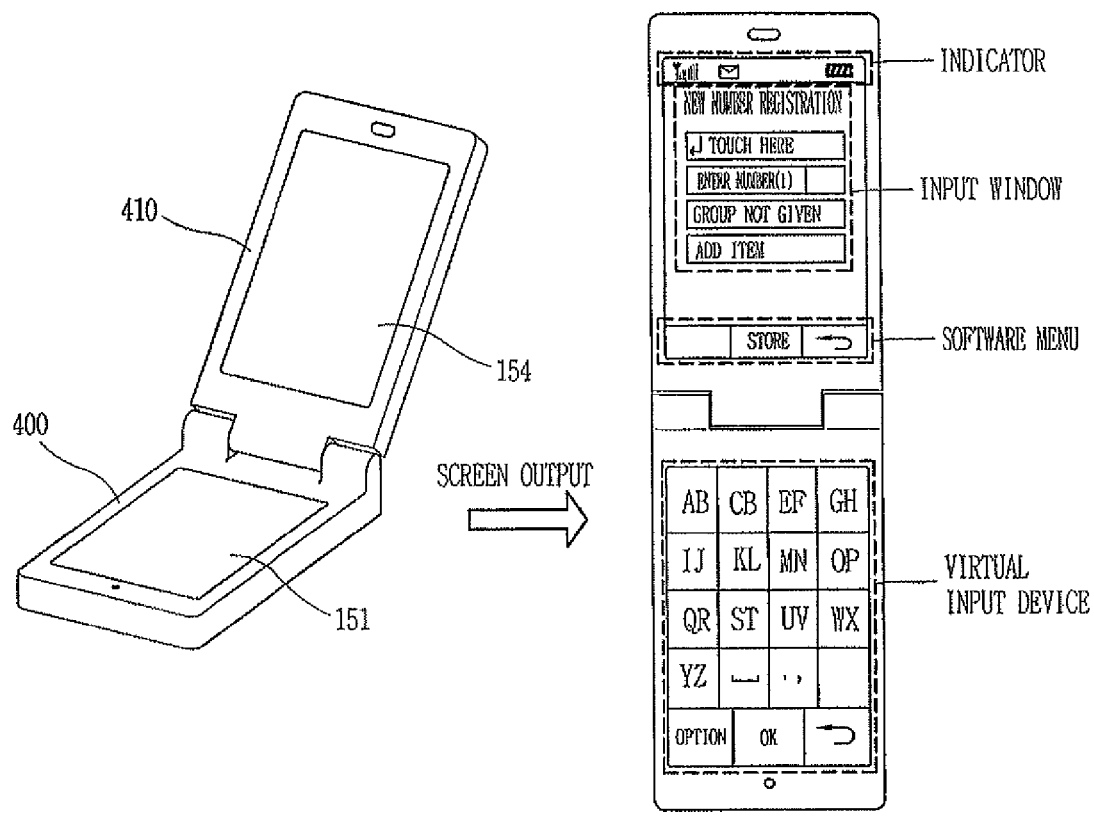
FIG. 54 is an overview illustrating a displaying method according to an eighth embodiment of the present invention.

FIG. 54 is an overview illustrating a displaying method according to an eighth embodiment of the present invention. The eighth embodiment relates to a displaying method of the LCD 151 and TOLED 154 when a virtual input device is executed in an open state of a mobile terminal. As shown in FIG. 54, upon executing a virtual input device, the controller 180 displays a 'virtual input device' on the LCD 151, and displays a corresponding input window, an indicator and software menus on the TOLED 154. The indicator and the software menus may selectively be displayed either on the LCD 151 or on the TOLED 154. Further, the locations and functions (i.e., main/sub displays) of the TOLED 154 and LCD 151 can be swapped.

Figure 55A:
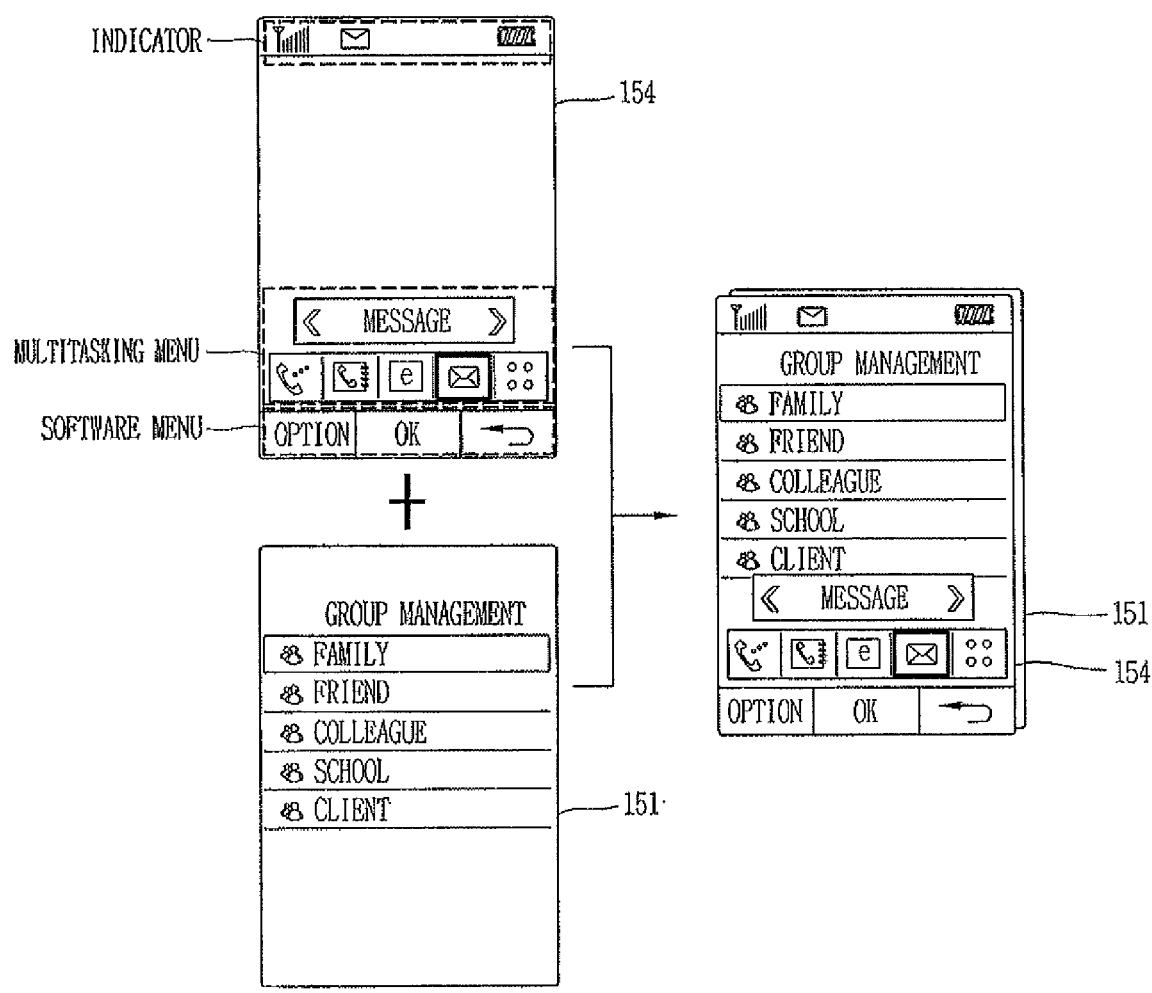
FIGS. 55A and 55B are overviews illustrating a displaying method according to a ninth embodiment of the present invention.

Next, FIG. 55 is an overview illustrating a displaying method according to a ninth embodiment of the present invention. The ninth embodiment illustrates a displaying method of the TOLED 154 and LCD 151 when at least one or more applications are executed in a closed state (e.g., an overlapped state between the TOLED 154 and the LCD 151) of a mobile terminal. As shown in FIG. 55A, when a multitasking menu is executed while a particular application (e.g., phonebook manager) is being performed, the controller 180 displays the 'phonebook manager' being performed on the LCD 151, and displays the multitasking menu, an indicator, a selection bar and software menus on the TOLED 154. The indicator, the selection bar and the software menus may selectively be displayed either on the LCD 151 or on the TOLED 154.

Figure 55B:
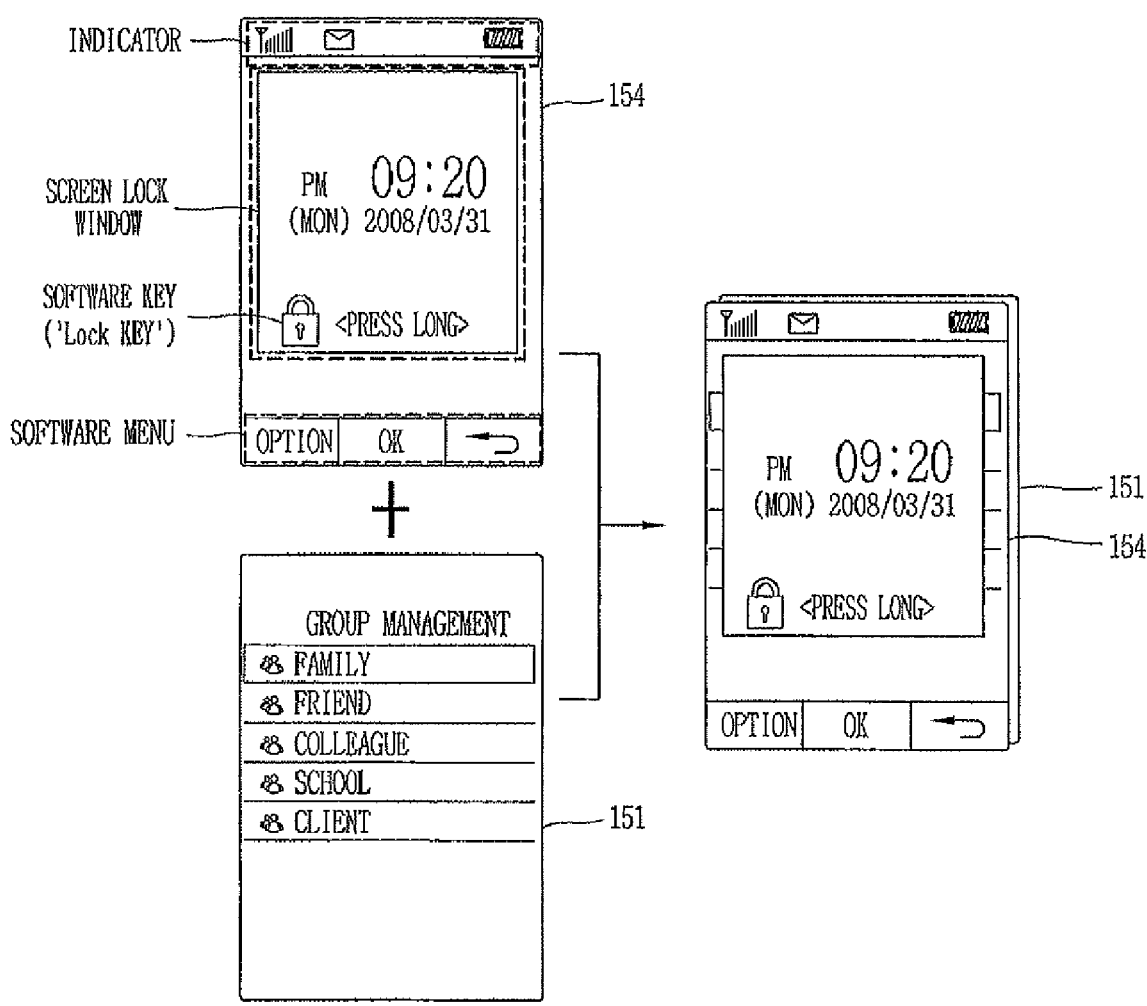

Further, FIG. 55B is another embodiment of FIG. 55A. When a screen locking function is executed while a particular application (e.g., phonebook manager) is being performed, the controller 180 displays the 'phonebook manager' being performed on the LCD 151, and displays the screen locking window, an indicator and a software menu on the TOLED 154. The indicator and the software menus may selectively be displayed either on the LCD 151 or on the TOLED 154.

A Method for Controlling a Touching Operation on the LCD and TOLED

The method for controlling the touching operation depends on overlapped states between the LCD 151 and the TOLED 154, including a completely overlapped state, a partially overlapped state and a completely separated state. The mobile terminal having the transparent display according to an embodiment of the present invention uses different touching operations according to the overlapped states between the LCD 151 and the TOLED 154.

Figure 56:
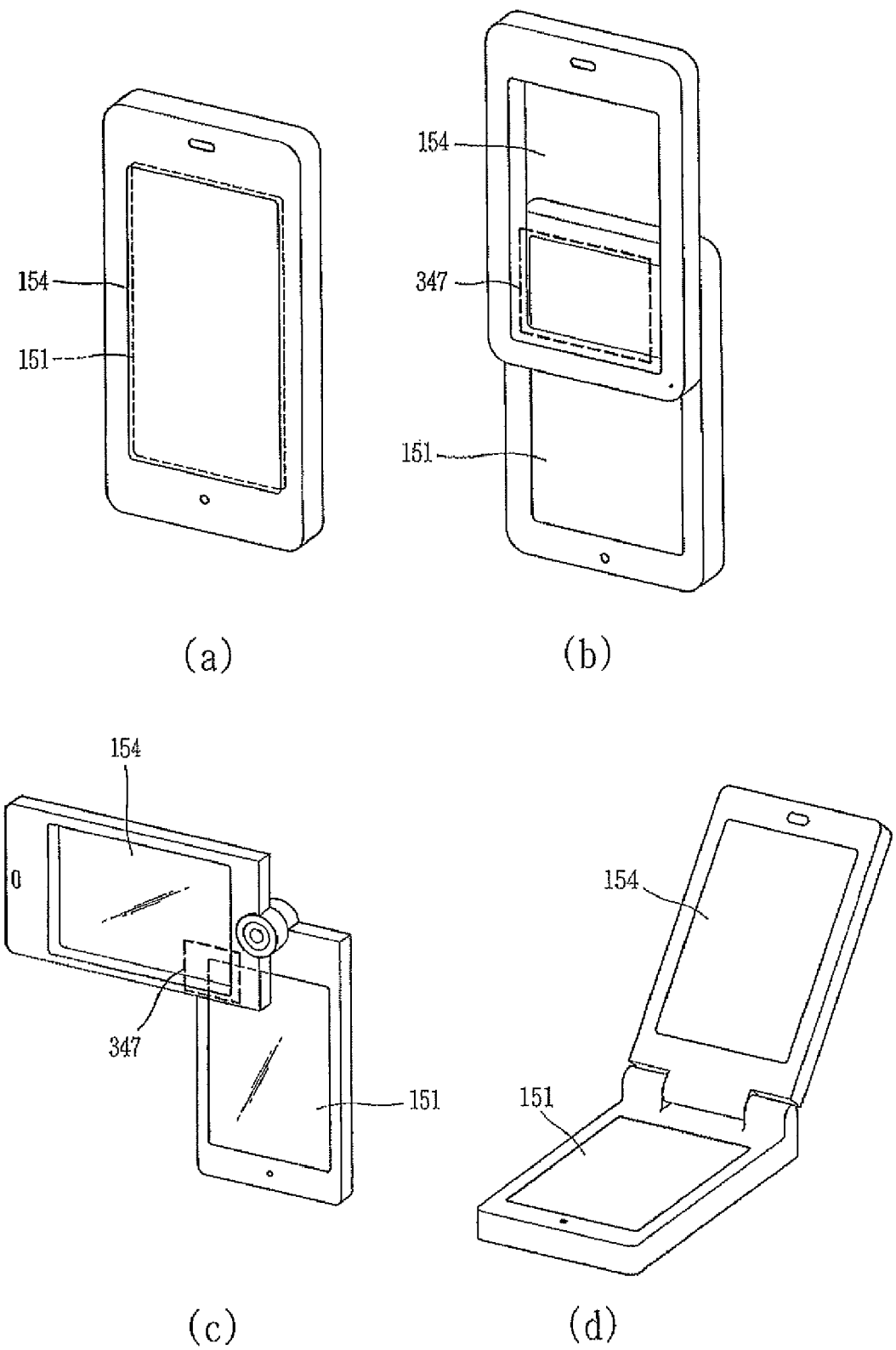
FIG. 56 is an overview illustrating a mobile terminal having a dual transparent display according to an embodiment of the present invention, which shows a method of controlling a display according to how much each display is overlapped.

FIG. 56 is an overview of a mobile terminal having a dual transparent display according to an embodiment of the present invention, which shows a method for controlling displays according to an overlapped state between the displays. Here, examples will be shown having a completely overlapped state (a), a partially overlapped state (b and c) and a completely separated state (d) between the LCD 151 and the TOLED 154.

Complete Overlapped State between the LCD and TOLED

Figure 57A:
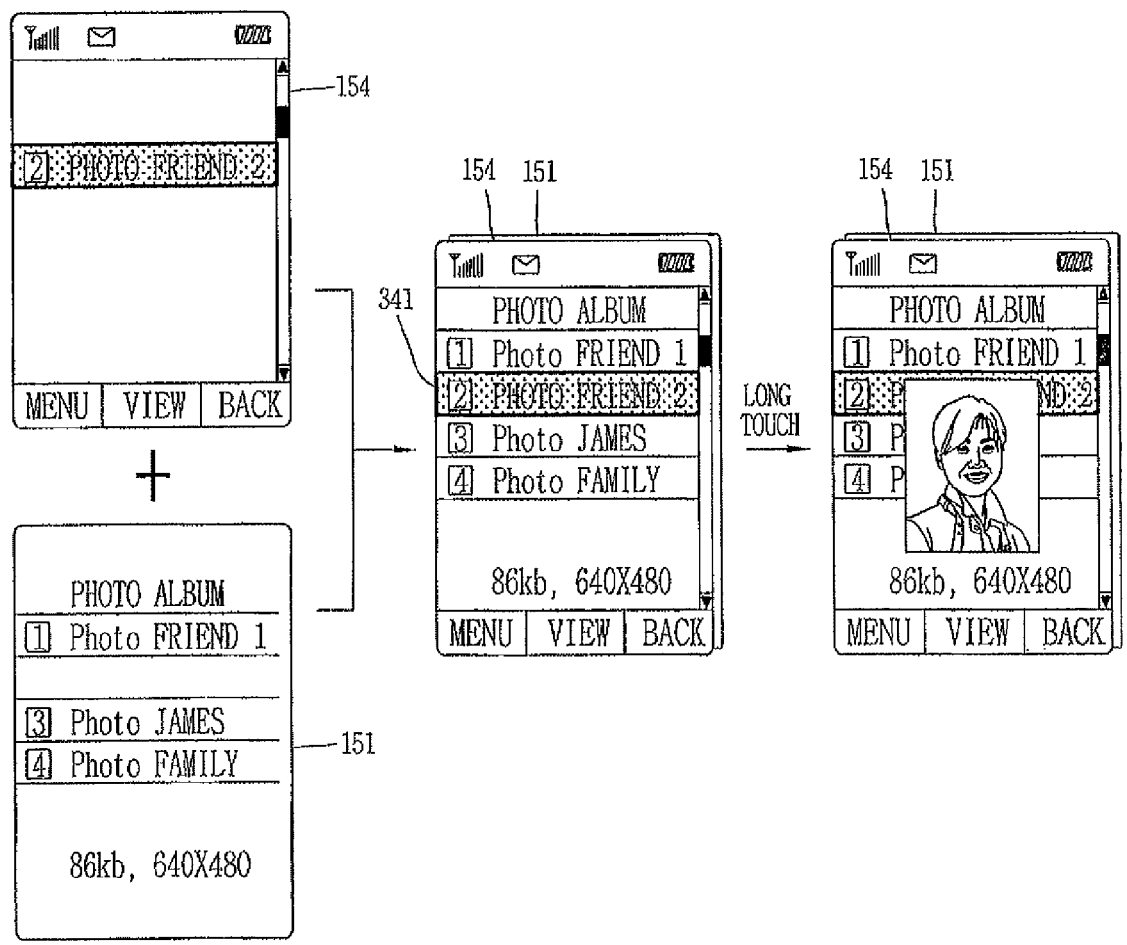
Figure 57B:
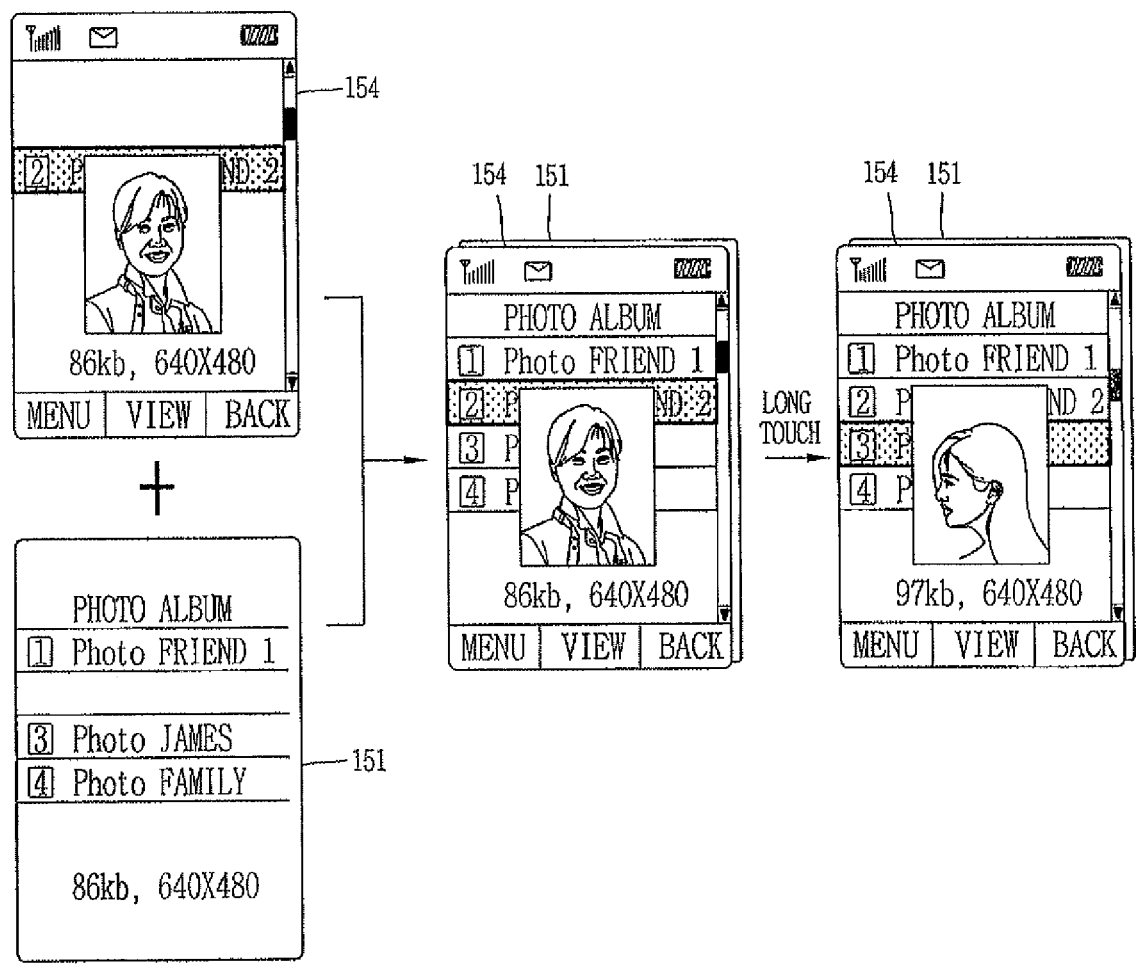

FIGS. 57A to 57C are overviews illustrating a method for controlling a touching operation in the completely overlapped state between each display shown in FIG. 56. Hereinafter, a touching operation sensed in the state that the TOLED 154 is completely overlapped on the LCD 151 will be described by being divided into a touch (or proximity-touch) operation, long touch operation, long touch & drag operation, and the like.

First, as shown in FIG. 57A, upon selecting a photo album function by a user, the controller 180 displays an image list on the LCD 151. Afterwards, when a touch (real touch) or proximity-touch is sensed from the exterior, the controller 180 selects an image corresponding to the corresponding touched point 341. Further, the controller 180 carries the selected image from the LCD 151 onto the TOLED 154 so as to display the selected image on the TOLED 154.

The mobile terminal according to an embodiment of the present invention may have various sensors for performing different sensing functions, and may further have a proximity sensor or tactile sensor provided in the sensing unit 140 for sensing the proximity-touch. As shown in FIG. 57B, if the external touch sensed is a long touch (e.g., a touch lasted for at least 2 or 3 seconds), the controller 180 runs or executes the selected image and displays it on the TOLED 154. The long touch may also be used when selectively moving a desired object among objects displayed on the LCD 151 to the TOLED 154. In addition, when the TOLED 154 is displaying many unnecessary objects, a certain touch input may be made to move objects from the TOLED 154 to the LCD 151 for display.

If a dragging operation or action is also sensed together with the long touch from the exterior, the controller 180 may display a preview screen for an image selected by the long touch on the TOLED 154 as shown in FIG. 57C. Afterwards, a selection cursor (or selection bar) 342 of the LCD 151 is moved by the dragging action, and a selected image by the selection cursor 342 is then displayed on the preview screen. After the external touch is not sensed any more, an initial image selected by the long touch action is displayed. The touching operation (i.e., long touch+drag) of FIG. 57C may equally be applied to the case of sensing a sliding (e.g., an operation of proximity-touch corresponding to the dragging) together with a long proximity touch (e.g., proximity touch lasted for at least 2 or 3 seconds) from the exterior. Also, upon sensing any touching operation other than the above-mentioned ones, the controller 180 can operate as done in a general method of controlling a touching operation.

In addition, the method for controlling the touching operation in the completely overlapped state may be applied to all types of mobile terminals having the single display (e.g., folder-type, flip-type, slide-type, rotating-type (e.g., swivel-type or swing-type), bar-type, watch-type and the like all having the single display). The method may also be applied to mobile terminals each having a dual display (e.g., a closed state of a folder-type mobile terminal, a closed state of a flip-type mobile terminal, a closed state of a slide-type mobile terminal, a closed state of a rotating-type (e.g., swivel-type or swing-type) mobile terminal, a closed state of a watch-type mobile terminal and the like).

Partially Overlapped State Between the LCD and TOLED

Figure 58A:
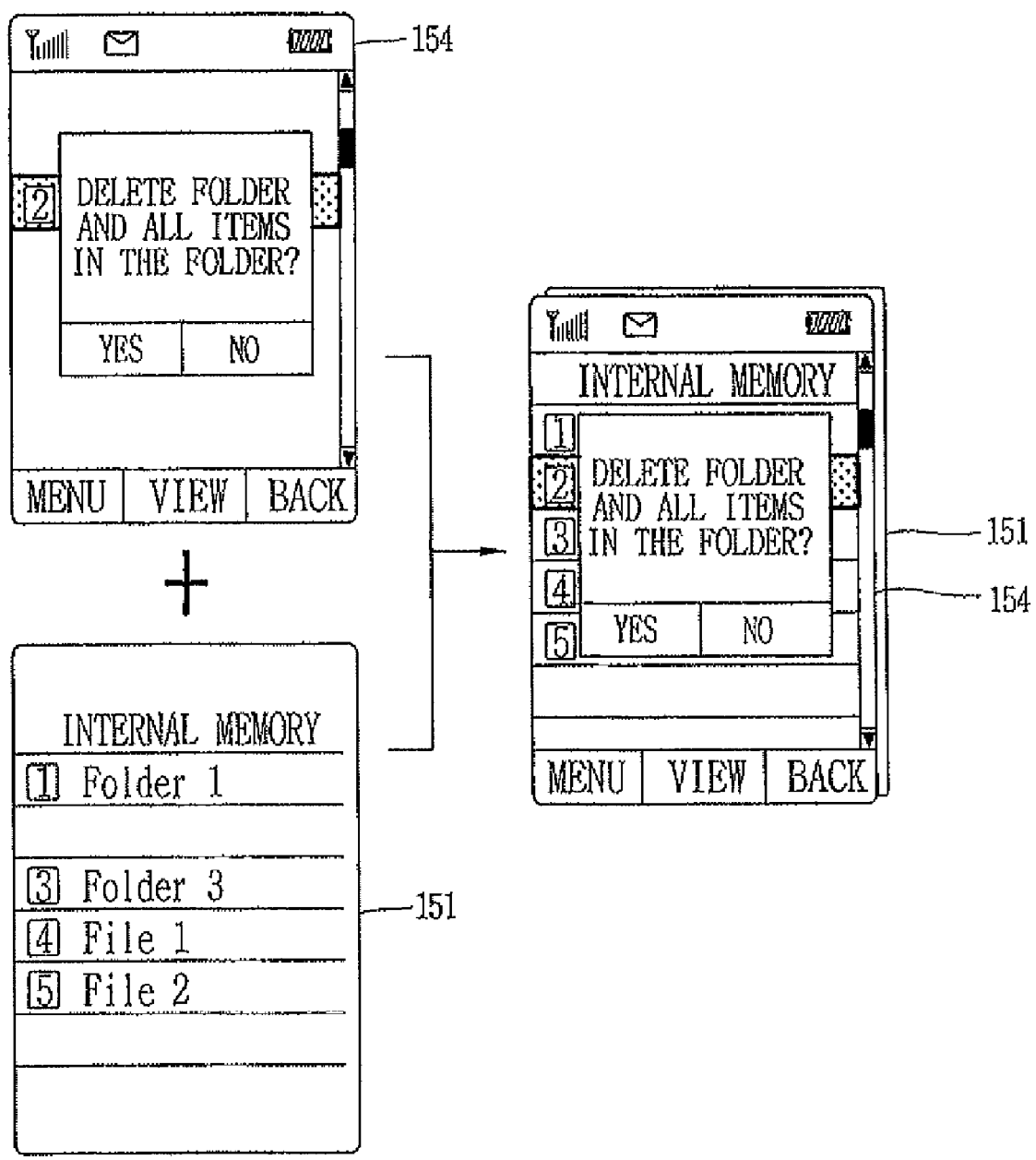
FIGS. 58A and 58B are overviews illustrating a method for controlling a touching in a partially overlapped state of each display of FIG. 56.
Figure 58B:
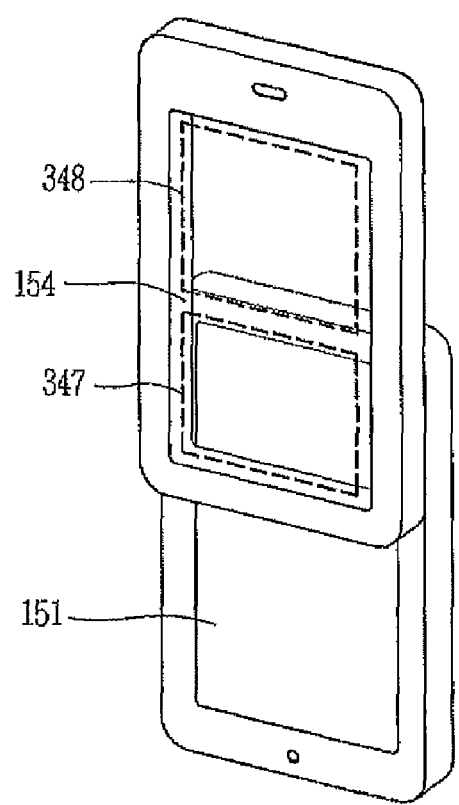

FIGS. 58A and 58B are overviews illustrating a method for controlling a touching operation in a partially overlapped state between each display. Hereinafter, a touching operation sensed in the partially overlapped state will be described by dividing the operation into a touch (or proximity-touch) operation, long touch operation, long touch & drag operation, and touch & drag operation.

FIG. 58A is an overview illustrating a pop-up selection window region of the TOLED 154. As shown in FIG. 58A, the controller 180 senses an external touch (real touch) or external proximity-touch. Upon sensing the touch, the controller 180 detects a touched point. That is, the controller 180 detects whether a pop-up selection window region has been touched or another region excluding the pop-up selection window has been touched, and thereafter performs a different processing according to the detected touched point.

For example, when a touch is sensed on the pop-up selection window region, the controller 180 may select a certain object (e.g., menu list, execution icon, or the like) and perform the function of the selected object. If the touch is sensed from the other region excluding the pop-up selection window, then the controller 180 may take no action or close or cancel the pop-up selection window.

FIG. 58B shows an overlapped region 347 and a non-overlapped region 348. As shown in FIG. 58B, if a long touch is sensed from the exterior, the controller 180 may perform a different processing depending on whether the touch is sensed on the non-overlapped region 348 or on the overlapped region 347. For example, when a touch is sensed on the non-overlapped region 348, the controller 180 may select a certain object (e.g., menu list, execution icon, or the like) and perform the function of the selected object. If a touch is sensed on the overlapped region 347, the controller 180 may apply the same method of controlling the touching operation as applied in the completely overlapped state.

Also, if a sliding of a proximity-touch is sensed together with the long proximity-touch from the exterior, the processing may be the same as that for the touching operation (i.e., long touch & drag). In addition, when a dragging is sensed together with a real touch from the exterior, the controller 180 may equally apply a method for controlling a touching operation in a separated state between the LCD 151 and the TOLED 154 which will be explained later. Even when a proximity-touch and a sliding of proximity-touch are sensed from the exterior, the controller 180 may equally apply the method for controlling the touching operation in the separated state between the LCD 151 and the TOLED 154.

As mentioned above, the method for controlling the touching operation in the partially overlapped state between the LCD 151 and the TOLED 154 can be applied to mobile terminals having a dual display (e.g., an open state of a slide-type mobile terminal, an open state of a rotating-type (e.g., swivel or swing type) mobile terminal and the like).

Completely Separated State Between the LCD and TOLED

Hereinafter, a description will be given of a touching operation sensed in the completely separated state between the LCD 151 and TOLED 154 by being divided into a touch (or proximity-touch) operation, a long touch operation, a long touch & drag operation, and the like. Thus, when a real touch (or proximity-touch) or long touch is sensed from the exterior, the controller 180 may select a certain object (e.g., menu list or execution icon) located at the corresponding touched point of the TOLED 154 and perform the function of the selected object.

If a dragging action is sensed together with the real touch from the exterior, the controller 180 may select or move the touch-selected object (e.g., menu list or execution icon) and perform the function of the selected object. For example, the TOLED 154 is allowed to display copied contents (or contents in a clipboard), and such contents are attached onto the LCD 151 by the aforementioned operation (i.e., touch & drag action).

As another example, such operation (i.e., touch & drag) is performed to move the object displayed on the TOLED 154 onto the LCD 151. As still another example, such operation (i.e., touch & drag) is performed to enlarge (or reduce) a webpage on the LCD 151, to thusly be displayed on the TOLED 154. Further, a scroll operation may also be available. Also, when a touching operation other than the above-mentioned operations is sensed, the controller 180 may operate the same as done in the general method of controlling a touching operation.

As mentioned above, the method for controlling the touching operation in the separated state between the LCD 151 and the TOLED 154 can be applied to mobile terminals having a dual display (e.g., an open state of a folder type mobile terminal, an open state of a flip type mobile terminal, an open state of a bar type mobile terminal, an open state of a watch type mobile terminal and the like).

Control Method Related to Setting of the LCD and TOLED Vibration Feedback and Sound Feedback One embodiment of the present invention may be configured to generate a separate vibration feedback or sound feedback according to which one of the LCD 151 and TOLED 154 is manipulated. Thus, by differently setting the vibration feedback or sound feedback for the LCD 151 or TOLED 154, it is possible to recognize which display (LCD 151 or TOLED 154) a user has manipulated. For example, in the completely (or partially) overlapped state between the LCD 151 and the TOLED 154, if a user's touch (e.g., a real touch or long touch) is sensed, the controller 180 controls the operation of the LCD 151 or TOLED 154 according to the type of touch input (or according to a user's purpose). Also, the controller 180 may generate different vibration or sound feedbacks when controlling the operation of the LCD 151 and the TOLED 154.

Figure 59:
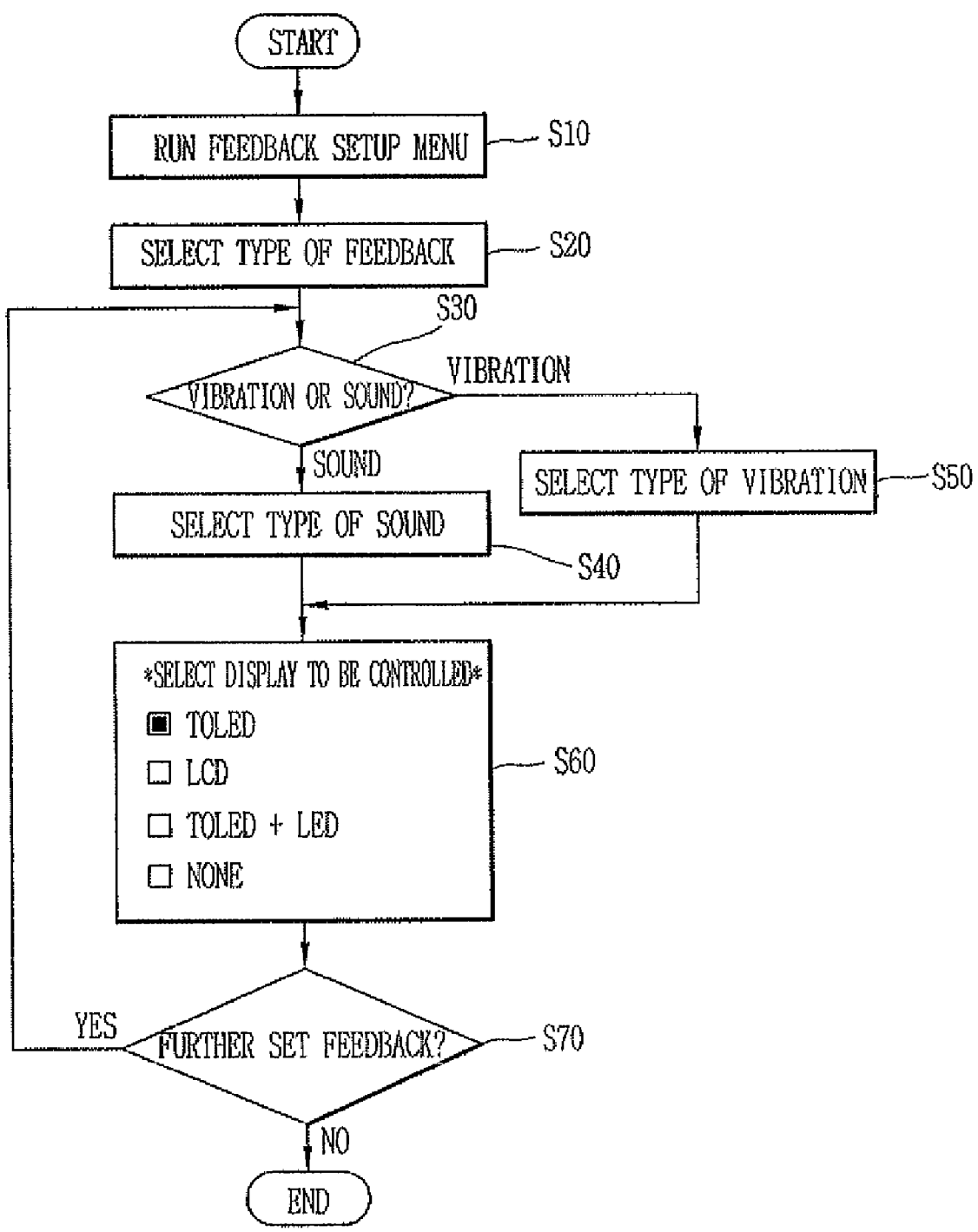
FIG. 59 is an overview illustrating a feedback setting method with respect to a manipulation of an LCD or TOLED.

Next, FIG. 59 is a flowchart illustrating a method for setting a feedback related to a manipulation of the LCD 151 or TOLED 154. As shown in FIG. 59, a user sets a feedback with respect to the manipulation of the displays (e.g., the LCD and TOLED), so as to check whether his input has been input to the LCD or TOLED. Then, when a feedback setup menu is executed (S10), the controller 180 decides a type of feedback (e.g., vibration feedback or sound feedback) according to a user's selection (S20 and S30). If the sound feedback is decided (S40), the controller 180 displays various sounds capable of being set in the mobile terminal on a screen such that the user can select a sound to be used for feedback.

Further, the type of sound can be decided by the user's selection. Upon the decision of the sound feedback, a display, to which the feedback setup decided through such steps is applicable, is selected. The controller 180 may display the applicable displays (e.g., 'LCD', 'TOLED', 'LCD+TOLED', 'None', etc.) for the user's selection (S60). Afterwards, when an applicable display is selected, the above steps (i.e., S10 to S60) are repeated, to further progress a feedback setup (S70) or terminate the feedback setup process.

Control of Color and Transparency of the TOLED

Also, one embodiment of the present invention is configured such that transparency, color or brightness of the TOLED 154 can be set according to peripheral circumstances. In order to prevent information displayed on the TOLED 154 from being obscured due to a background reflected on the TOLED 154, the color or brightness of the TOLED 154 can also be controlled according to the peripheral circumstances.

Furthermore, when providing a camera or solar cell at a rear surface of the TOLED 154, in order to solve a problem that the operation of the camera or solar cell is affected by information displayed on the TOLED 154 or transparency thereof, the transparency can selectively be controlled with respect to a certain region of the TOLED 154. In addition, the control of the transparency, color or brightness of the TOLED 154 according to the peripheral circumstances may automatically be performed by the controller 180 based upon a preset algorithm, or directly be set by a user through an environment setup option.

Concepts of Main/Sub Window of the LCD and TOLED

As discussed above, the present invention can operate displays such that the LCD 151 and the TOLED 154 can operate as a main window (or first window) and a sub window (or second window). For better understanding of a displaying method employing such concepts of the main/sub windows, an Internet browsing method will be described as one example. Further, the main and sub windows may be applied to a mobile terminal having a dual display (e.g., folder-type, slide-type, rotating-type (e.g., swivel-type, swing-type), watch-type or the like).

Figure 60:
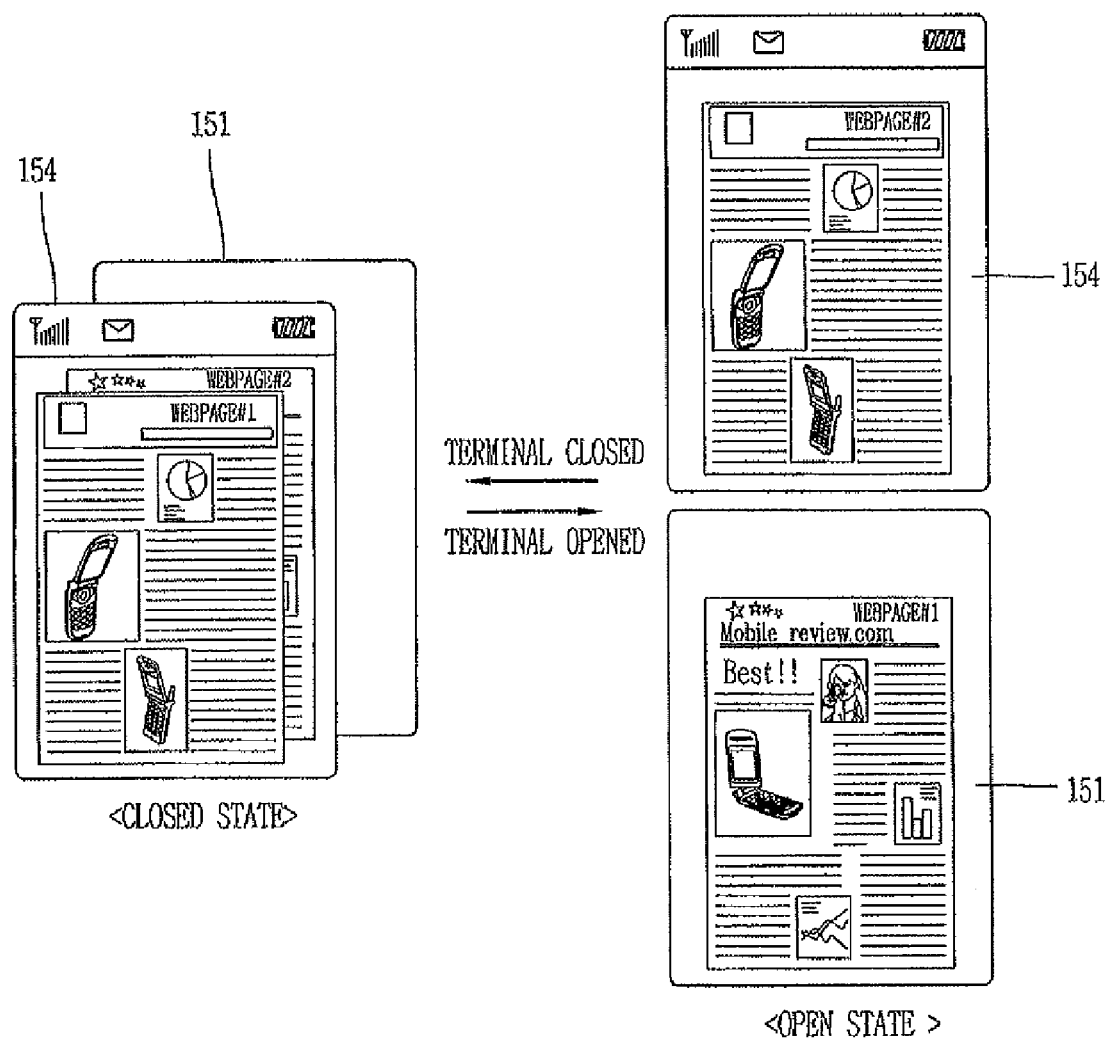
FIG. 60 is an overview illustrating a web browsing method in order to illustrate a method of operating main/sub windows in a mobile terminal according to an embodiment of the present invention.

FIG. 60 is an overview of a web browsing method for showing a method of operating main and sub windows in a mobile terminal according to an embodiment of the present invention. As shown in FIG. 60, a webpage (e.g., a main webpage) first opened when executing a web browser may be displayed on a main window (e.g., the TOLED 154), and a webpage or pop-up page linked to the first-opened webpage may be displayed on a sub window (e.g., the LCD 151).

Such webpages displayed on the main or sub windows may be displayed in an opposite window according to the environment setup option. Alternatively, when using any one of two displays provided in the mobile terminal, a webpage displayed on a display (e.g., sub window) disposed at a lower side of the mobile terminal may be moved to a display (e.g., main window) disposed at an upper side of the mobile terminal, thereby being displayed on the moved display. For example, upon closing the mobile terminal, a webpage displayed on a sub window may be moved to and displayed a main window.

Figure 61A:
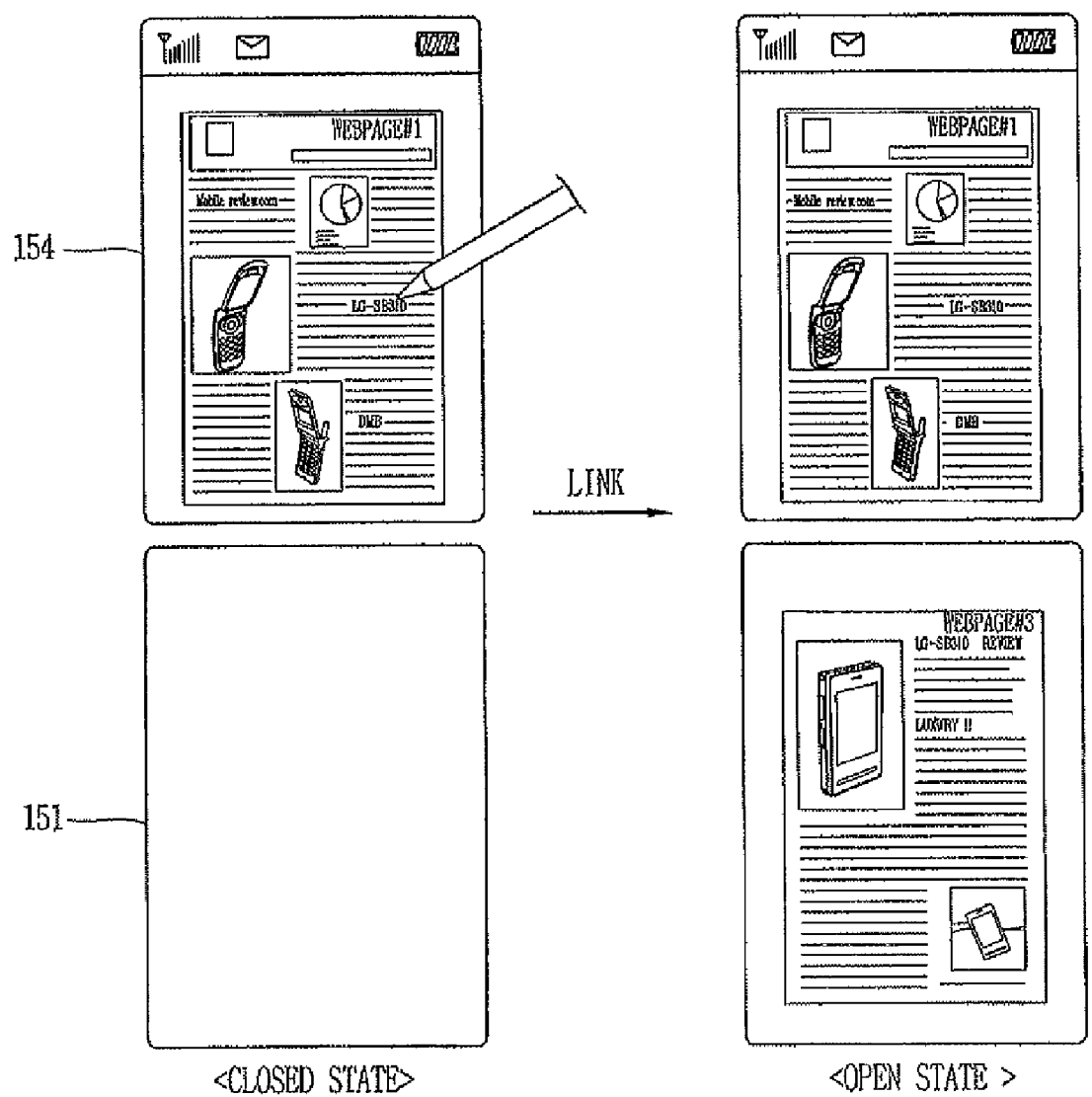
FIGS. 61A and 61B are overviews illustrating a method for displaying a web page according to a method of operating main/sub windows in a mobile terminal according to an embodiment of the present invention.
Figure 61B:
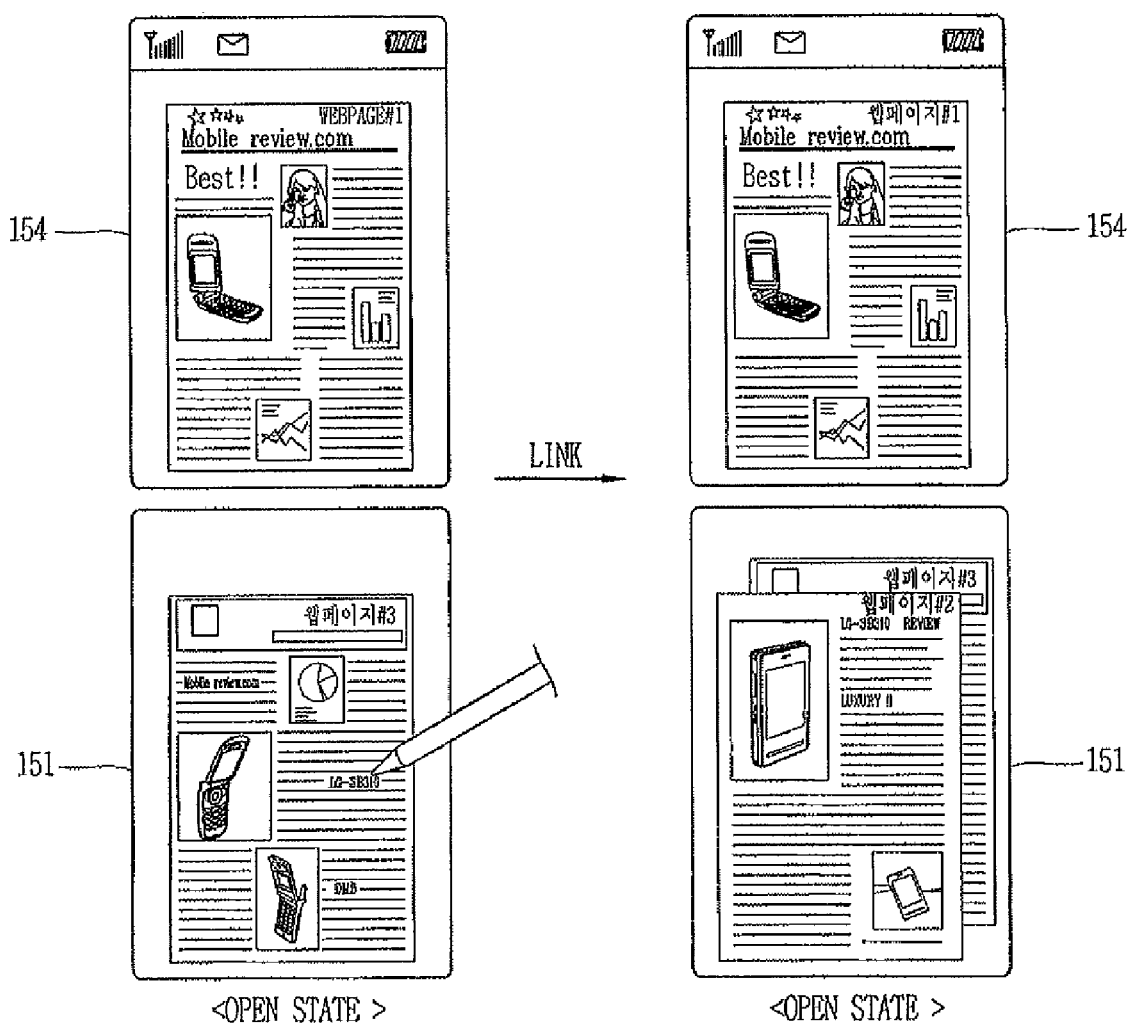

FIGS. 61A and 61B are overviews illustrating a method for displaying a webpage according to a method of operating main and sub windows in a mobile terminal according to an embodiment of the present invention. As shown in FIG. 61A, if a certain text (or certain object) on a webpage #1 displayed on a main window (e.g., the TOLED 154) is selected by a user's touch input (or proximity-touch), the controller 180 may display a webpage (e.g., webpage #3) linked to the text on a sub window (e.g., the LCD 151).

In the state that the sub window (e.g., the LCD 151) is displaying the webpage #3, as shown in FIG. 61B, if a certain text (or object) on the webpage #3 is selected, the controller 180 may display a webpage (e.g., webpage #2) linked to the selected text on the sub window (e.g., the LCD 151), as well as the webpage #3. Further, the main and sub windows may be converted by a user's selection, and also contents displayed on each window may be converted. In addition, if the user's input is a proximity-touch and touch is sensed on a certain content (e.g., text, English word, image, video, flash or the like) displayed on a main window (e.g., the TOLED 154), the controller 180 may display information related to the corresponding content on a sub window (e.g., the LCD 151). Also, if the proximity distance sensed becomes farther away, the sub window can return to its initial state.

Display Control According to an Open/Closing Operation of the Mobile Terminal

An open/closing operation of a mobile terminal denotes an opening or closing of the mobile terminal, namely, an operation of folding, sliding or rotating (swiveling or swinging) one body of a mobile terminal having at least two bodies, such as folder-type mobile terminal, flip-type mobile terminal, slide-type mobile terminal, rotating-type (swivel or swing-type) mobile terminal, watch-type mobile terminal or the like.

Figure 62A:
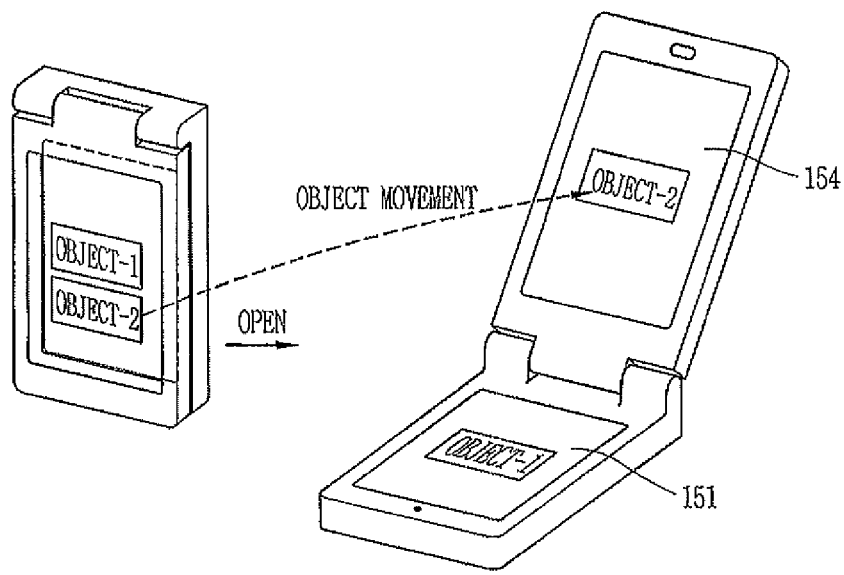
FIGS. 62A and 62B are overviews illustrating a method for moving a displayed object in cooperation with an opening/closing of a mobile terminal having a dual transparent display according to an embodiment of the present invention.
Figure 62B:
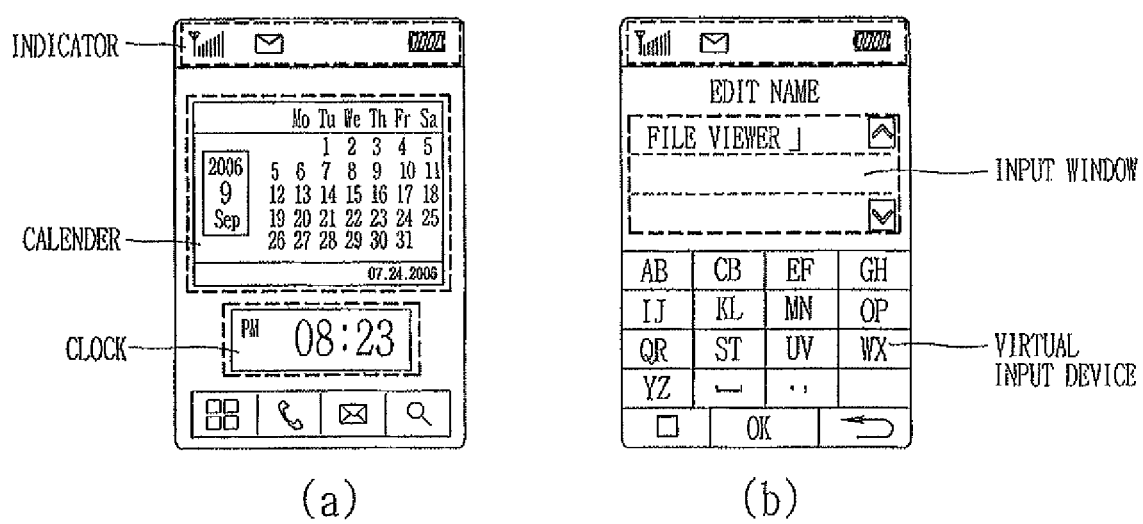

FIGS. 62A and 62B are overviews illustrating a method for moving a displayed object in cooperation with an opening/closing operation of a mobile terminal having a dual transparent display according to an embodiment of the present invention. Upon closing a mobile terminal having the LCD 151 and TOLED 154, information (or objects) displayed on each of the displays are overlapped with each other. Such overlapped information are then displayed on any one of the two displays. Hereinafter, a display having the overlapped information displayed thereon is referred to as 'main display'.

When the mobile terminal is open, the controller 180 moves and displays a part of object displayed on the main display (e.g., the LCD 151) onto a sub display (e.g., the TOLED 154). As such, an object which is moved to each display for display in cooperation with the opening/closing of the mobile terminal is referred to as 'moving object'. The moving object may include an indicator, clock and calendar, as shown in FIG. 62B(a), and further include background memo, multitasking menu, input window and the like.

As shown in FIG. 62B(b), when being displayed on a sub display, an object such as a virtual input device (e.g., keypad or wheel) may be overlapped with other objects on a main display, causing inconvenience of input. Thus, such object is preferably displayed on the main display. That is, the input window is small in size and difficult to be recognized at a glance, and thus it is displayed on the sub display in greater size. The positions of the virtual input device and the input window may be changed to each other for display.

Figure 63A:
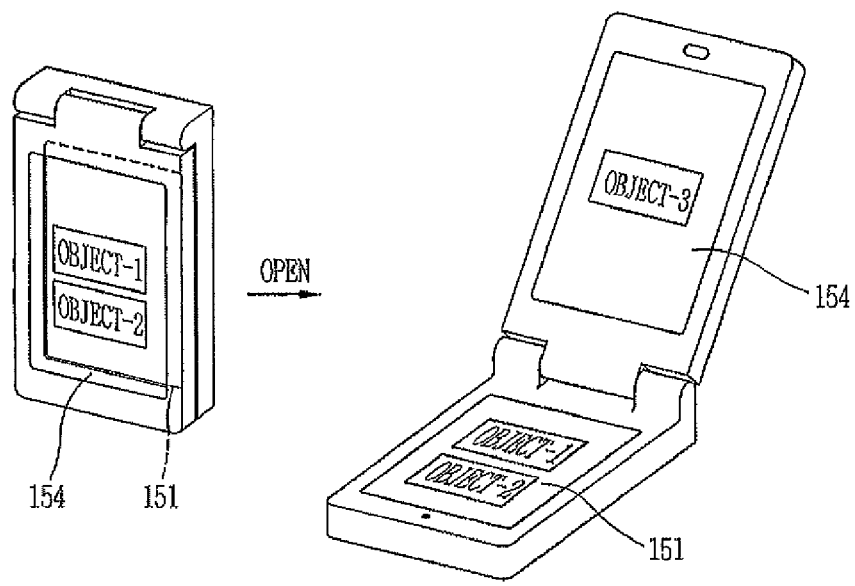
FIGS. 63A and 63B are overviews illustrating a method for generating a displayed object in cooperation with an opening/closing of a mobile terminal having a dual transparent display according to an embodiment of the present invention.
Figure 63B:
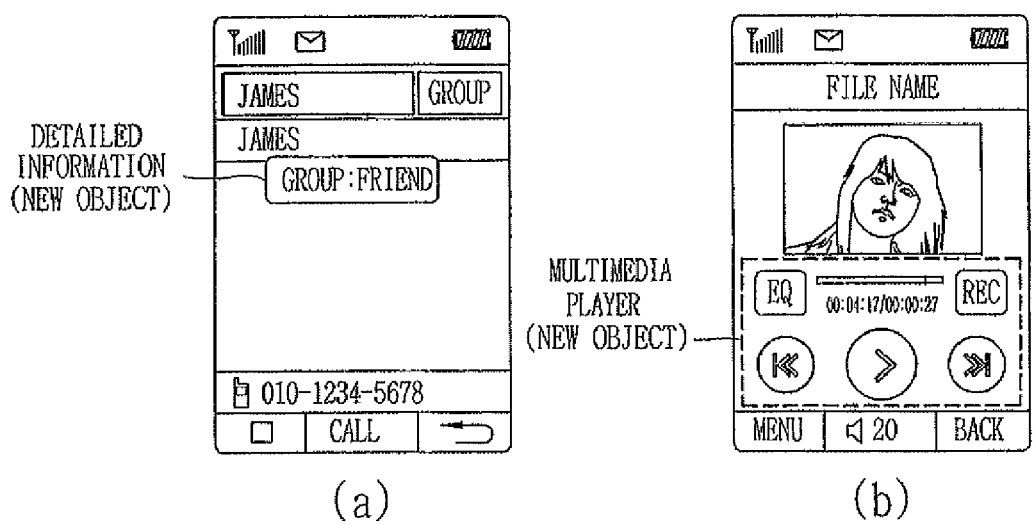

Next, FIGS. 63A and 63B are overviews illustrating a method for generating a displayed object in cooperation with an opening/closing of a mobile terminal having a dual transparent display according to an embodiment of the present invention. As shown in FIG. 63A, upon opening the mobile terminal, an object may be newly generated on a sub display (e.g., the TOLED 154). Such object is referred to as a new object. The new object is not displayed, for example, due to the lack of displaying space when two displays are overlapped with each other.

Then, when the two displays are separated after the mobile terminal is opened, the new object may further be displayed on a sub display (e.g., the TOLED 154). For example, as shown in FIG. 63B, such new objects may include detailed information (additional information) related to specific information, a sub menu for a specific list or multimedia player.

Various Embodiments of Display Control in Cooperation with an Opening/Closing of the Mobile Terminal Hereinafter, a method of controlling displays (i.e., the LCD and TOLED) in cooperation with an opening/closing of a mobile terminal will be described in detail. For the sake of explanation, it is assumed that a terminal illustrated in each embodiment is a folder-type mobile terminal having a dual display; however, the present invention is not limited to the folder-type mobile terminal having the dual display and can be applied to other types of terminals.

Also, an overlapped screen depicted in each embodiment, as shown in FIG. 62A, denotes a screen that the TOLED 154 in a non-active state (or transparent state) is overlapped with the LCD 151 in an active state, or a screen that the TOLED 154 in an active state is overlapped with the LCD 151 in a non-active (or active) state. However, for the sake of explanation, it is assumed that the overlapped screen in each embodiment is a screen that the non-active (or transparent) TOLED 154 is overlapped with the active LCD 151. It is also assumed in each embodiment that the TOLED 154 and LCD 151 are set to a sub display and a main display, respectively, and disposed on the folding portion 410 and the main body portion 400, respectively.

Figure 64:
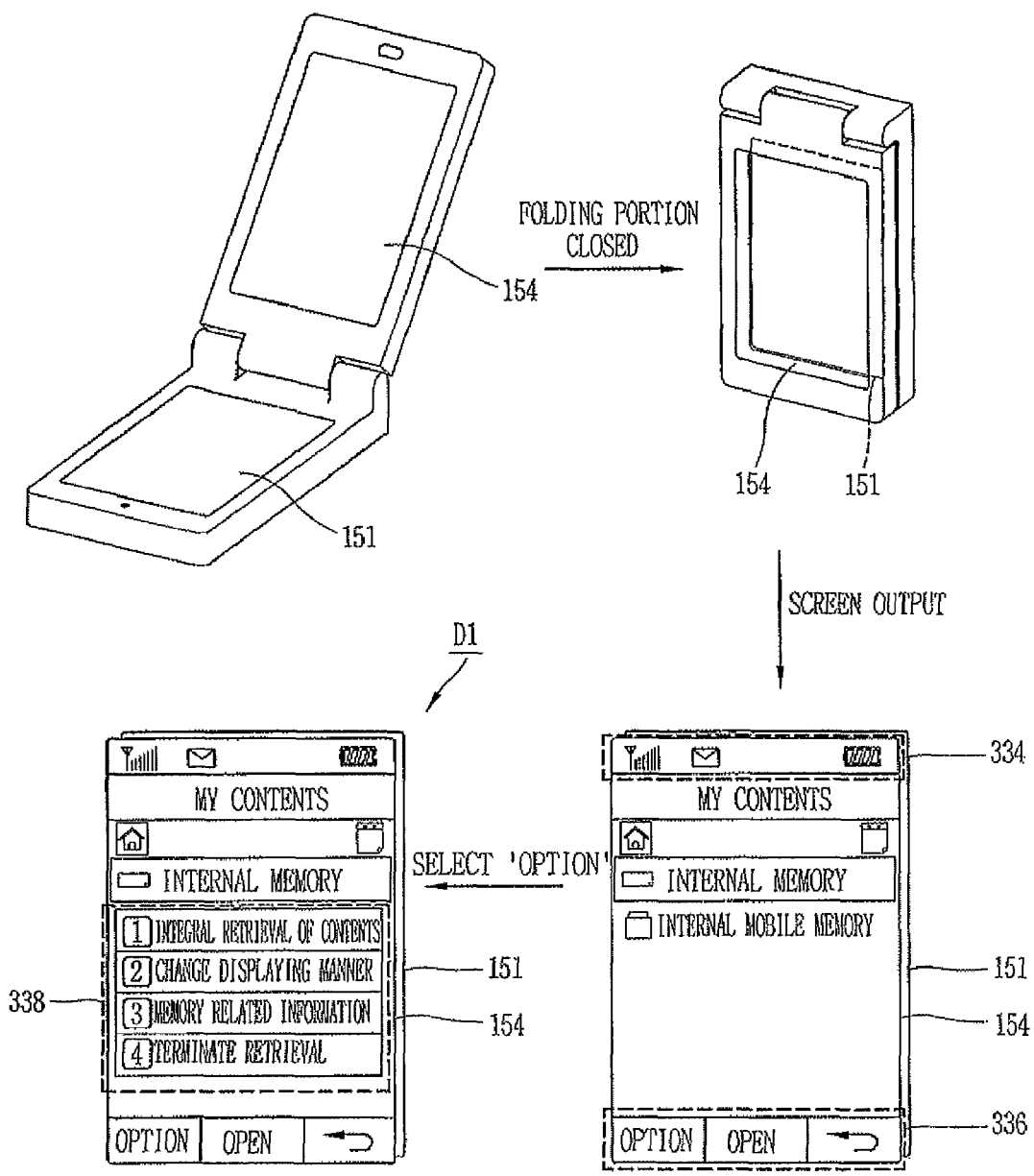
FIGS. 64 and 65 are overviews illustrating a display control in cooperation with an opening/closing a mobile terminal according to a first embodiment of the present invention.

FIGS. 64 and 65 illustrate a control of displays (LCD and TOLED) in cooperation with an opening/closing of a mobile terminal according to a first embodiment of the present invention. The first embodiment illustrates a method in which a specific menu (e.g., a menu 'my contents') is executed in a closed state of a mobile terminal (or an overlapped state between the LCD 151 and the TOLED 154), and when the mobile terminal is opened, a moving object (e.g., a movement of various pop-up windows) between the LCD 151 and the TOLED 154 is displayed.

Figure 65A:
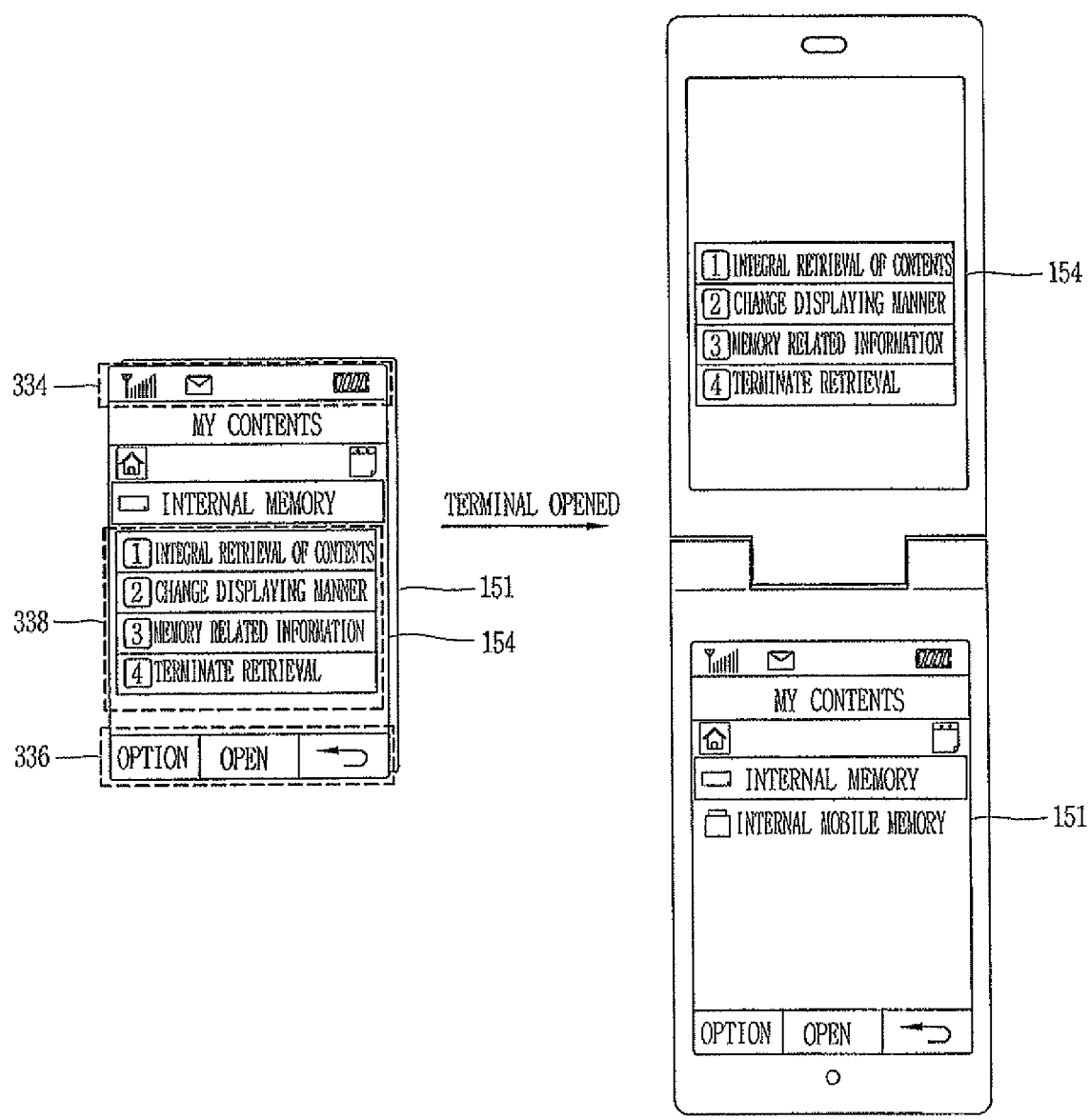

In addition, when the menu 'my contents' is executed and a user presses a software menu 'option', the controller 180, as shown in FIG. 64, displays an execution screen of the 'my contents', the indicator 334, software menus 336 and a main menu window 338 of the 'option' on an overlapped screen D1 of the LCD 151 and the TOLED 154, namely, on a main display (i.e., the LCD 151). FIG. 65A illustrates an object movement on the screen D1 of FIG. 64 when a mobile terminal is opened. A moving object of the screen D1 is the main menu window 338 of the 'option'. When the mobile terminal is opened, the controller 180 moves the main menu window 338 of the 'option' to the sub display (i.e., TOLED 154), among objects displayed on the main display (i.e., LCD 151).

Figure 65B:
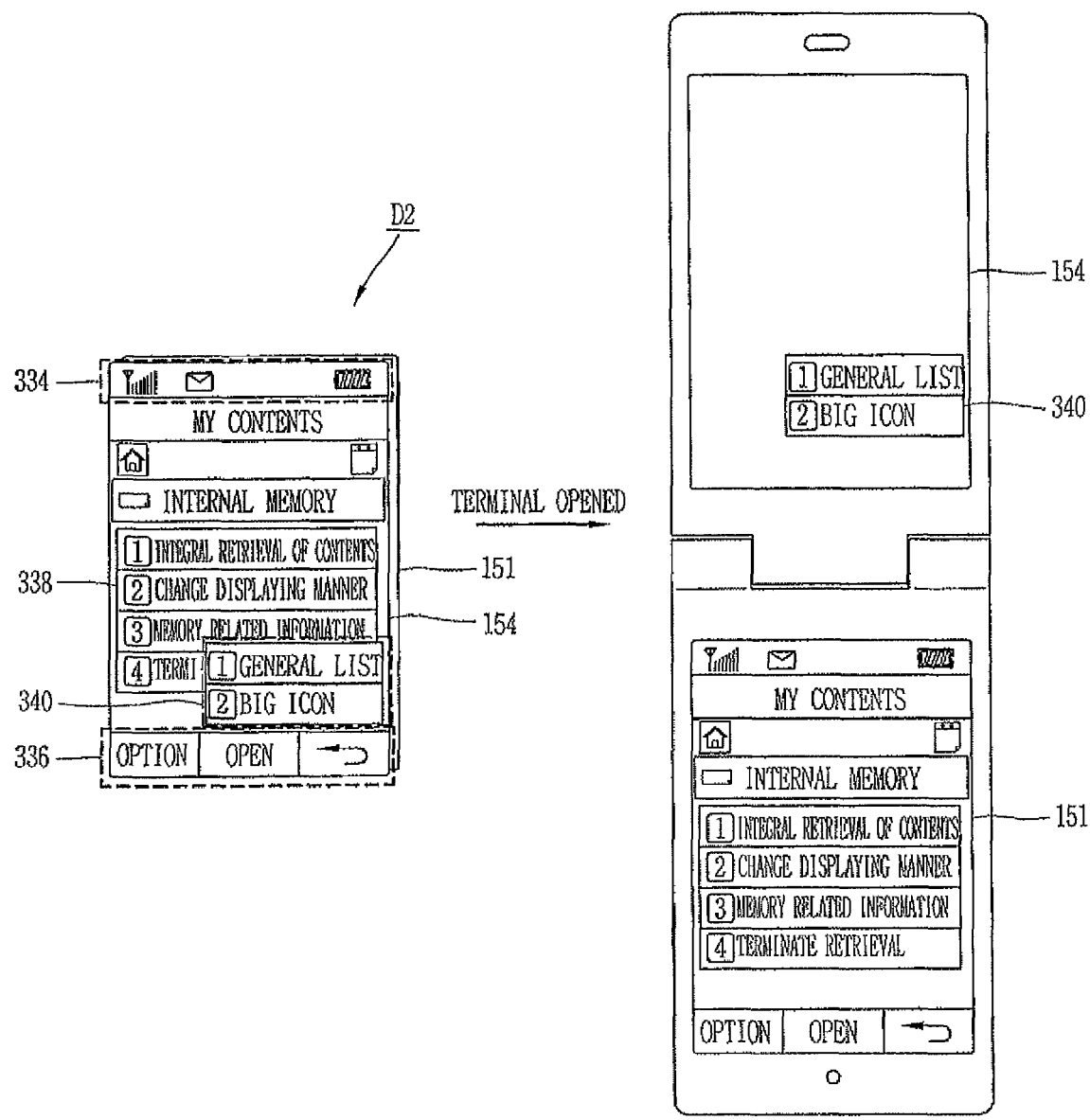

FIG. 65B is another embodiment of FIG. 65A, which illustrates an object movement when a sub menu window of the 'option' is displayed. When an item 'change displaying manner' is selected on the screen D1 of FIG. 64, the controller 180 accordingly displays a sub menu window 340 on an overlapped screen D2. The overlapped screen D2, namely, the main display (i.e., the LCD 151) displays an execution screen of 'my contents', the indicator 334, the software menus 336, the main menu window 338 of the 'option', and the sub menu window 340. A moving object on the LCD 151 corresponds to the sub menu window 340. When the mobile terminal is opened, the controller 180 moves the sub menu window 340 among the objects displayed on the LCD 151 to a sub display (i.e., the TOLED 154).

Figure 65C:
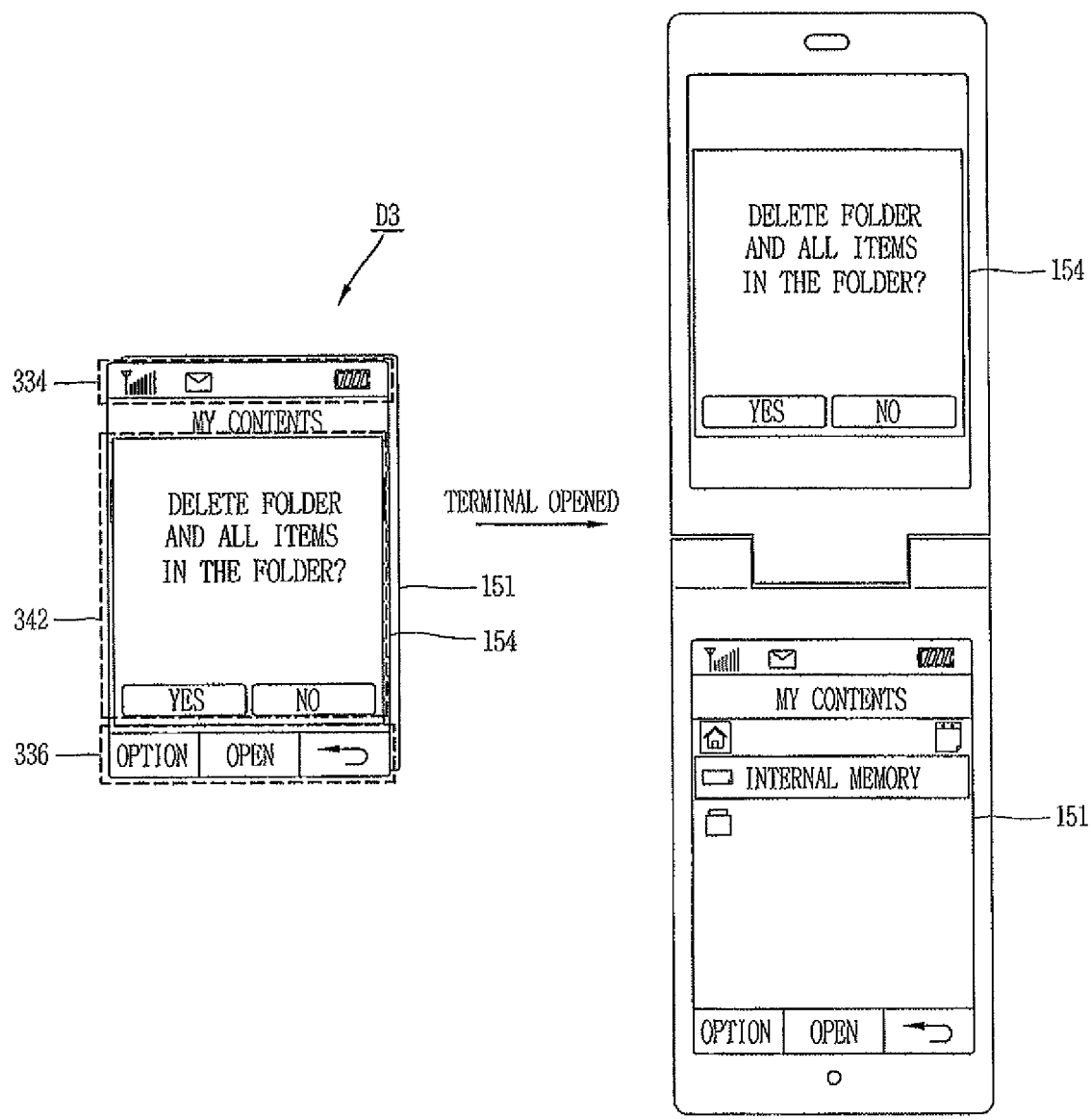

FIG. 65C is another embodiment of FIG. 65A, which shows an object movement when a pop-up selection window is displayed. When a user requests a deletion of a specific folder on the screen D1 of FIG. 64, the controller 180, as shown in FIG. 65C, displays a pop-up selection window 342 enabling the selection of 'YES' or 'NO' on an overlapped screen D3 (i.e., main display (LCD 151)). The LCD 151 thusly displays the execution screen of 'my contents', the indicator 334, the software menus 336 and the pop-up selection window 342. The moving object on the LCD 151 corresponds to the pop-up selection window 342. When the mobile terminal is opened, the controller 180 moves the pop-up selection window 342 among the objects displayed on the LCD 151 to the sub display (i.e., TOLED 154).

Figure 65D:
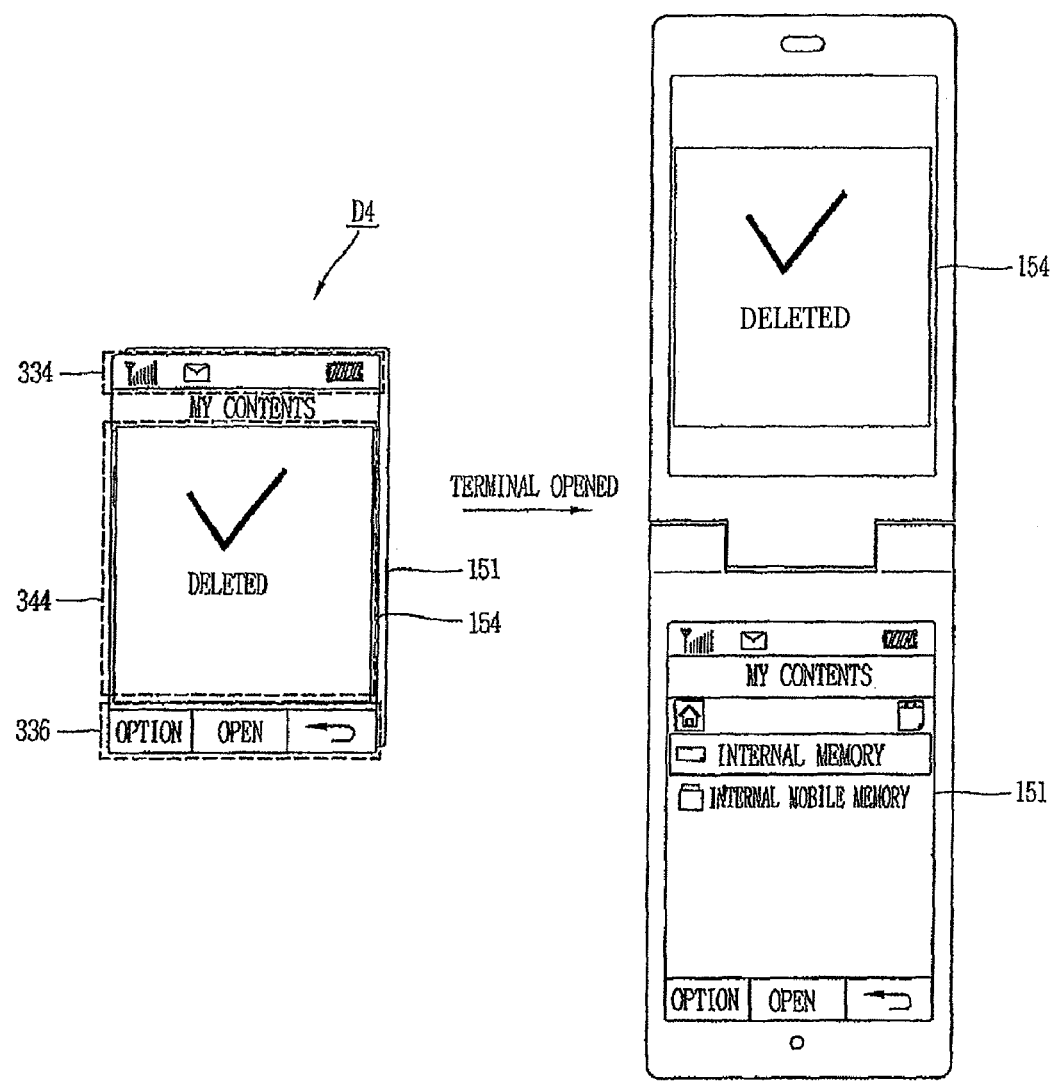

Next, FIG. 65D is an overview illustrating an object movement when a message window is displayed. When the pop-up selection window 342 is displayed on the screen D1 and then 'YES' option is selected, the controller 180 deletes a specific folder and all items in the specific folder, and displays a message window 344 indicating 'deleted', as shown in FIG. 65D, on an overlapped screen D4 (i.e., a main display (LCD 151)). A moving object on the LCD 151 corresponds to the message window (or indication window) 344. When the mobile terminal is opened, the controller 180 then moves the message window 344, among the objects displayed on the LCD 151, to a sub display (i.e., TOLED 154).

Figure 66A:
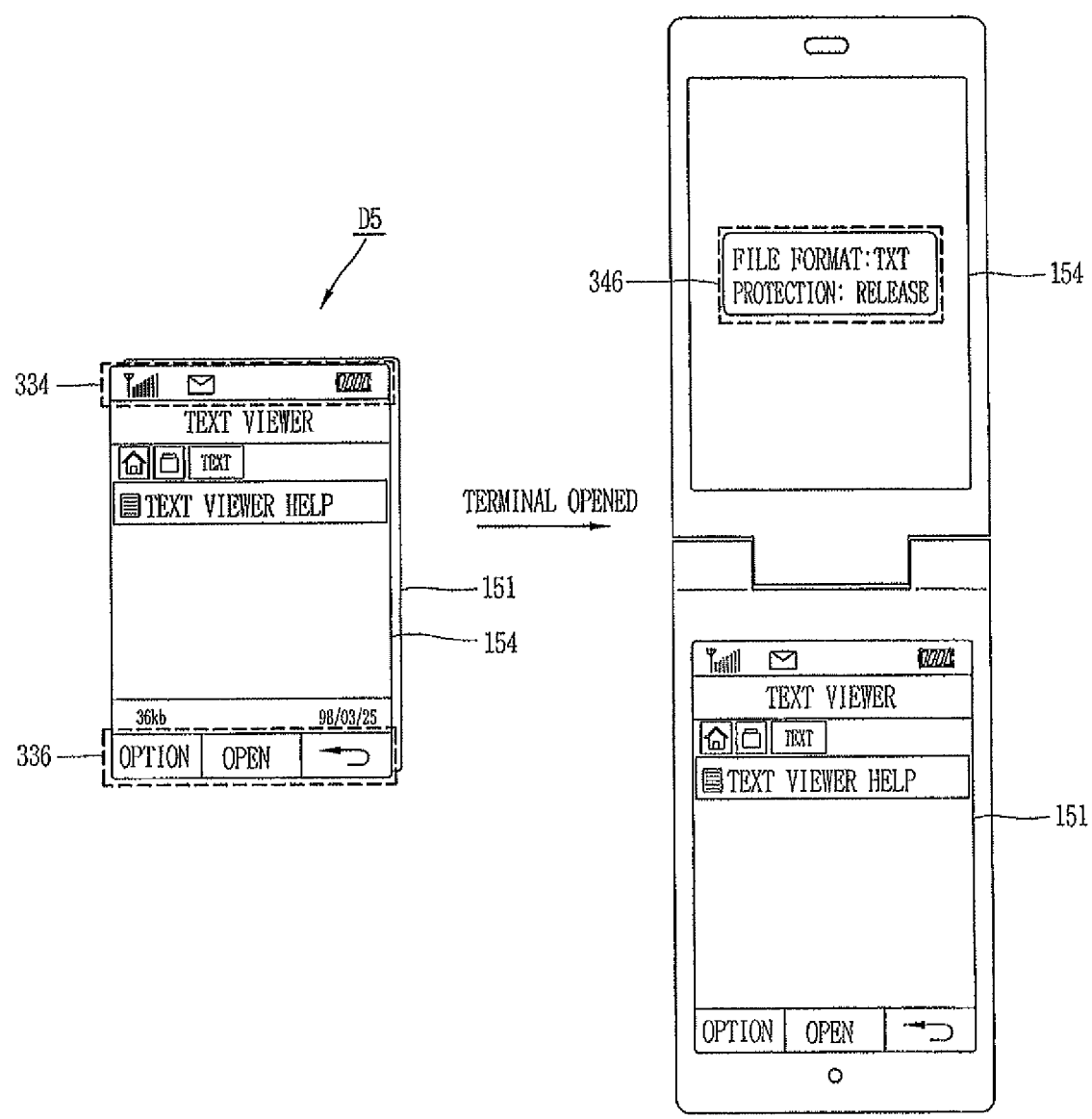
FIGS. 66A and 66B are overviews illustrating a display control in cooperation with an opening/closing a mobile terminal according to a second embodiment of the present invention.
Figure 66B:
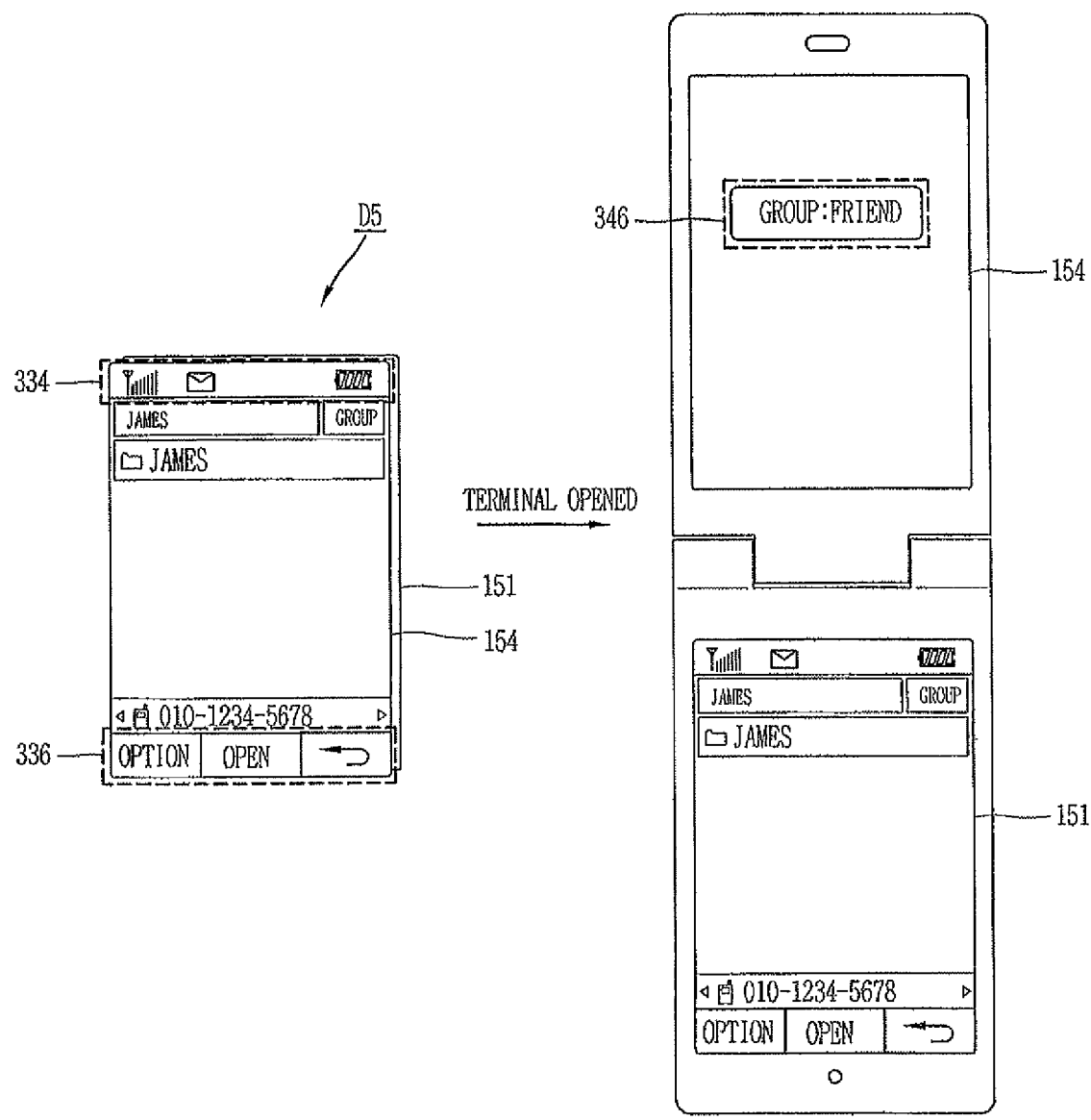

FIGS. 66A and 66B are overviews illustrating the control of displays (i.e., LCD and TOLED) in cooperation with an opening/closing of a mobile terminal according to a second embodiment of the present invention. The second embodiment illustrates a method in which a specific menu (e.g., a text viewer or phonebook) screen is executed in a closed state of a mobile terminal and then when the mobile terminal is opened, a new object (e.g., detailed information or additional information) is displayed on the LCD 151 or TOLED 154.

As respectively shown in FIGS. 66A and 66B, when a user runs a text viewer or phonebook, the controller 180 displays a text viewer screen or a phonebook screen on an overlapped screen D5 and D6 (e.g., main display (LCD 151)). Further, objects displayed on the LCD 151 may include the text viewer screen (or the phonebook screen), the indicator 334, the software menus 336, and the like. Afterwards, when the mobile terminal is opened, the controller 180 generates an object 346 (e.g., detailed information or additional information), which has not been displayed on the overlapped screen D5 and D6 (i.e., the LCD 151) due to the lack of space or the like, on the sub display (i.e., the TOLED 154).

Figure 67A:
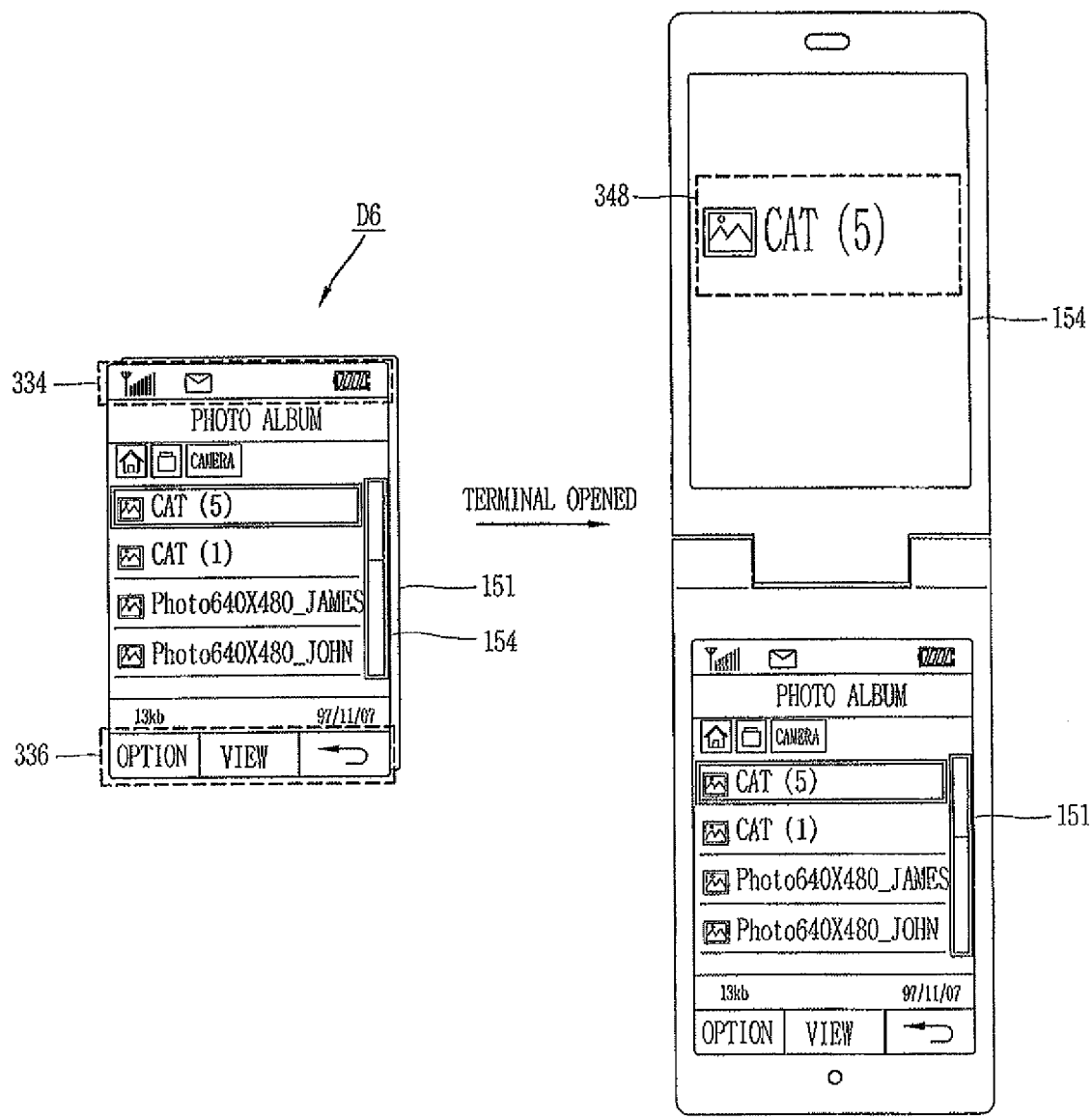
FIGS. 67A and 67B are overviews illustrating a display control in cooperation with an opening/closing a mobile terminal according to a third embodiment of the present invention.

FIG. 67A is an overview illustrating a control of displays (i.e., the LCD and TOLED) in cooperation with an opening/closing of a mobile terminal according to a third embodiment. The third embodiment illustrates a method in which a specific menu (e.g., a photo album) screen is run or executed in a closed state of a mobile terminal, and then a new object (e.g., a specific item of the photo album) is displayed on the LCD 151 or TOLED 154.

As shown in FIG. 67A, upon running or executing a menu 'photo album', the controller 180 displays a screen 'photo album list' on an overlapped screen D6 (i.e., main display (the LCD 151)). Further, objects displayed on the LCD 151 may include the screen of 'photo album list', the indicator 334, the software menus 336 and the like. Afterwards, when the mobile terminal is opened, the controller 180 generates an item 348 (e.g., cat (5)), on which a selection bar of the photo album is located, on a sub display (i.e., the TOLED 154).

Figure 67B:
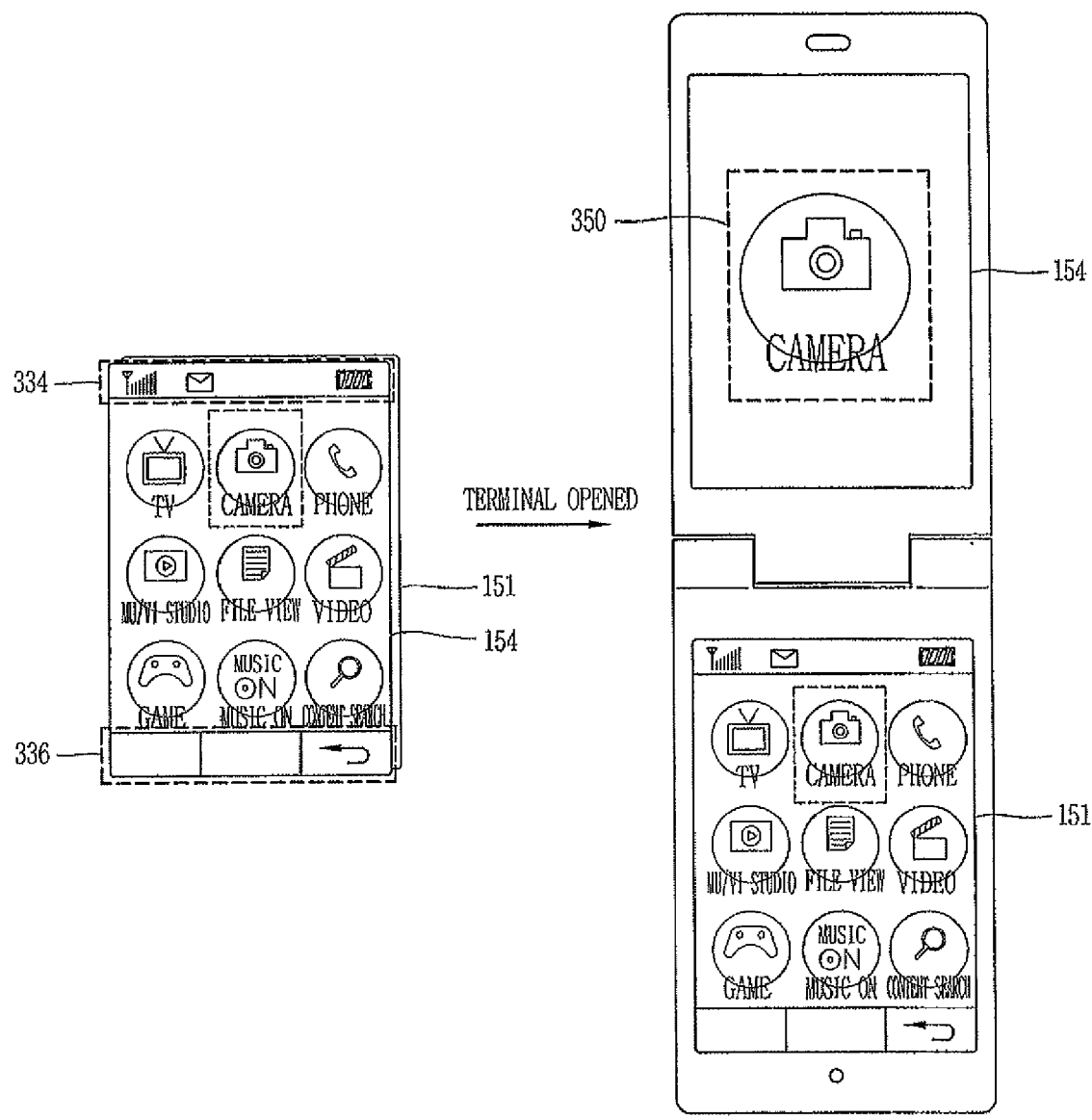
Figure 68A:
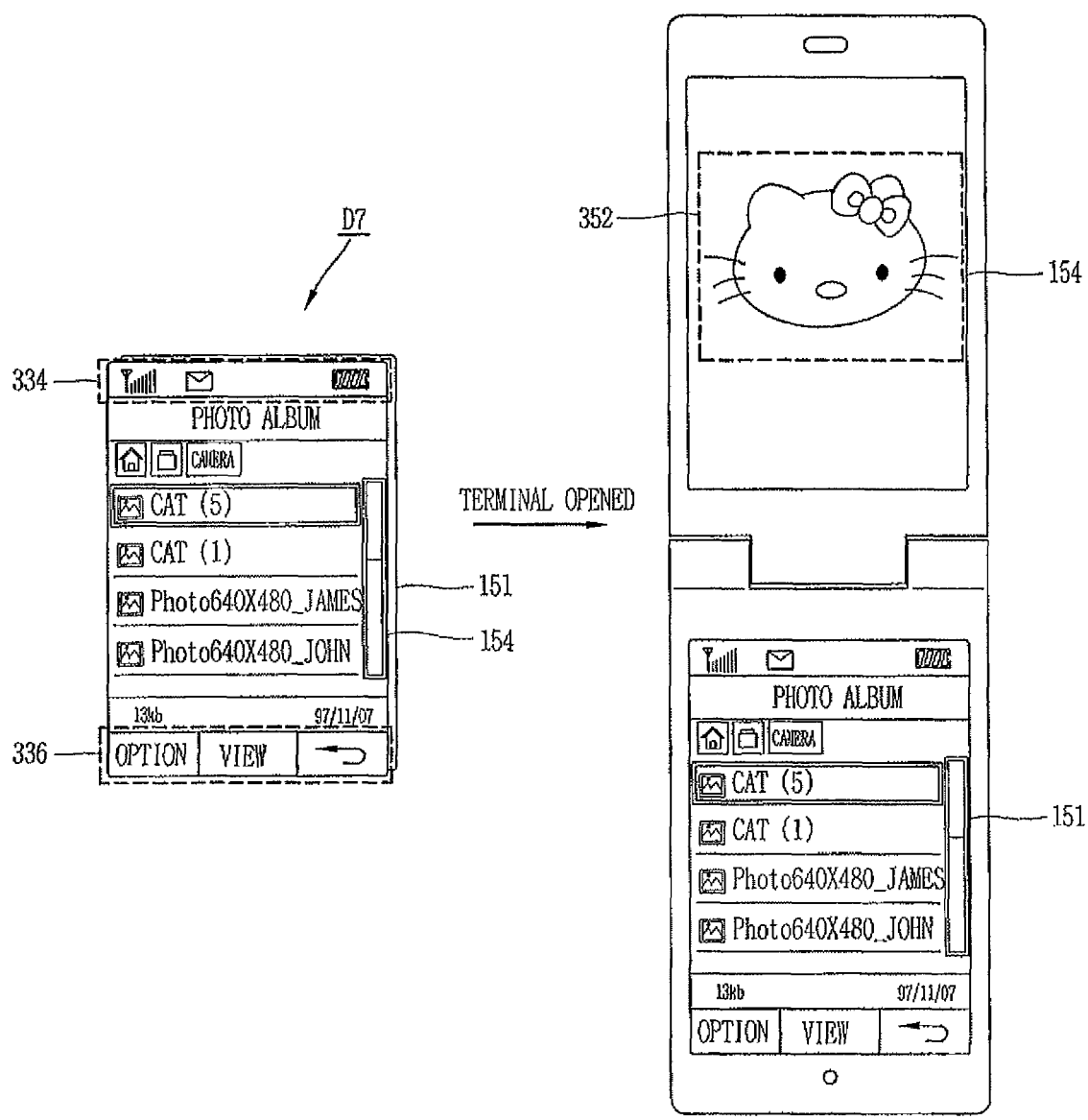
FIGS. 68A and 68B are overviews illustrating a display control in cooperation with an opening/closing a mobile terminal according to a fourth embodiment of the present invention.

FIG. 67B is another embodiment of FIG. 67A, in which the 'main menu' is run or executed. When the 'main menu is executed and the mobile terminal is opened, the controller 180 generates an icon 350 (e.g., a camera function), on which the selection bar of the 'main menu' is located, on the TOLED 154. FIG. 68A is an overview illustrating a control of displays (i.e., the LCD and TOLED) in cooperation with an opening/closing of a mobile terminal according to a fourth embodiment. The fourth embodiment illustrates a method in which a specific menu (e.g., photo album) screen is executed in a closed state of a mobile terminal, and then when the mobile terminal is opened, a new item (e.g., an execution of a specific item) is displayed on the LCD 151 or TOLED 154.

As shown in FIG. 68A, upon running or executing the 'photo album', the controller 180 displays an 'image list of the photo album' on an overlapped screen D7 (i.e., a main display (the LCD 151)). Further, objects displayed on the LCD 151 may include the 'photo album list' screen, the indicator 334, the software menus 336 and the like. Afterwards, when the mobile terminal is opened, the controller 180 executes an item on which the selection bar of the photo album is located, so as to display an image 352 (i.e., a new object) appeared by the execution of the item on a sub display (i.e., the TOLED 154).

Figure 68B:
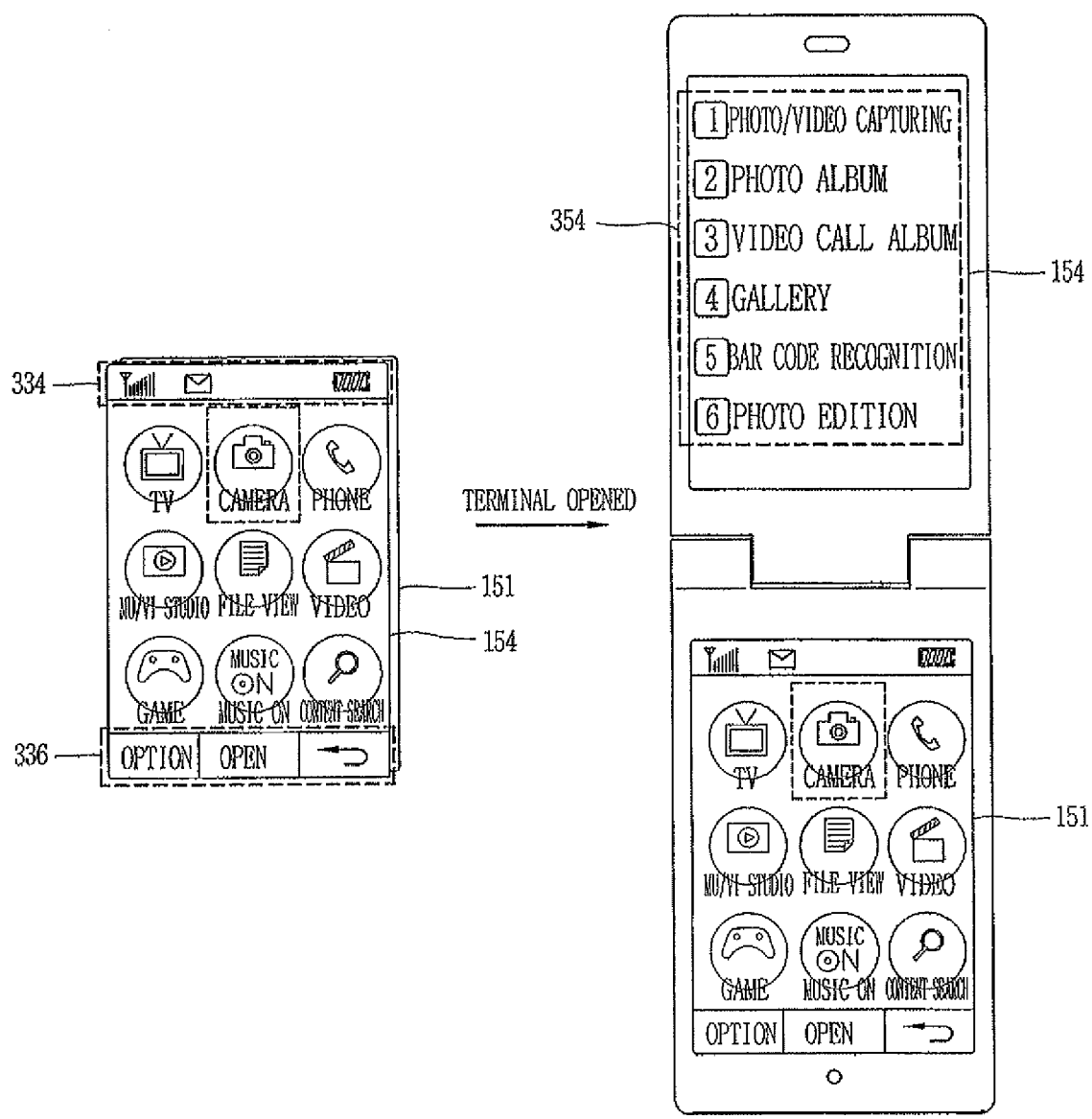

Next, FIG. 68B is another embodiment of FIG. 68A, in which the 'main menu' is executed. When the 'main menu' is executed and the mobile terminal is opened, the controller 180 executes an icon (e.g., a camera menu) on which the selection bar of the 'main menu' is located, so as to display a sub menu 354 appeared by the execution of the camera menu on a sub display (i.e., TOLED 154).

Figure 69A:
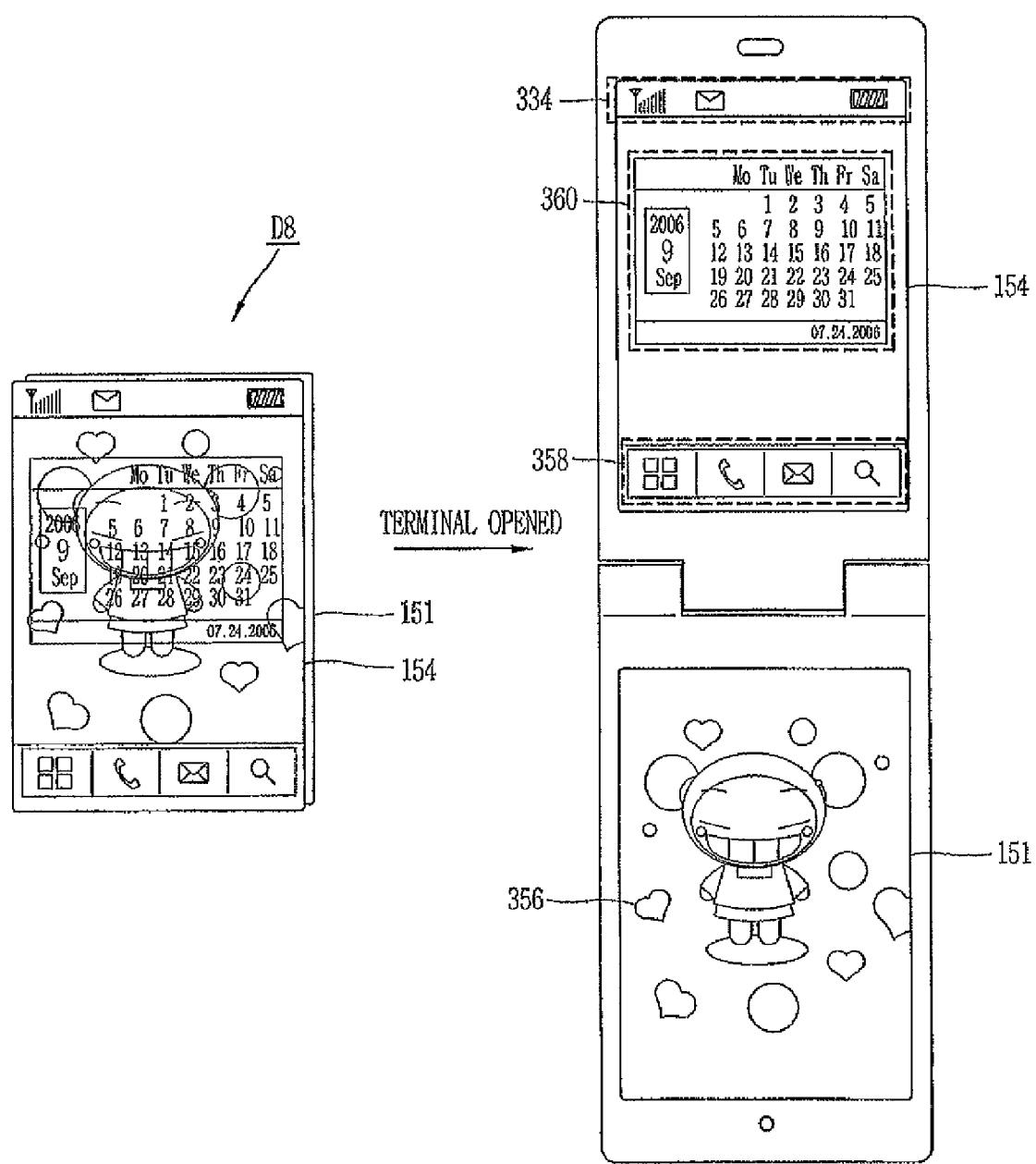
FIGS. 69A to 69C are overviews illustrating a display control in cooperation with an opening/closing a mobile terminal according to a fifth embodiment of the present invention.

FIG. 69A is an overview illustrating a control of displays (i.e., the LCD and TOLED) in cooperation with an opening/closing of a mobile terminal according to a fifth embodiment. The fifth embodiment illustrates a method in which a mobile terminal is changed from a closed state to an idle state, and then when the terminal is opened, a moving object (e.g., an object displayed by a user's setup) between the LCD 151 and TOLED 154 is displayed.

As shown in FIG. 69A, in an idle mode of the mobile terminal, the controller 180 displays an idle screen 356 on an overlapped screen D8 (i.e., main display (the LCD 151)). Also, the controller 180 displays on the LCD 151 objects displayed by a user's setup, for example, execution icons 358, the indicator 334, a calendar 360 and the like. Moving objects of the overlapped screen D8 correspond to 'objects displayed by the user's setup (e.g., the execution icons 358, the indicator 334 and calendar 360)'. Afterwards, when the mobile terminal is opened, the controller 180 can move at least one of the 'objects displayed by the user's setup', which are displayed on the LCD 151, to a sub display (i.e., the TOLED 154).

Figure 69B:
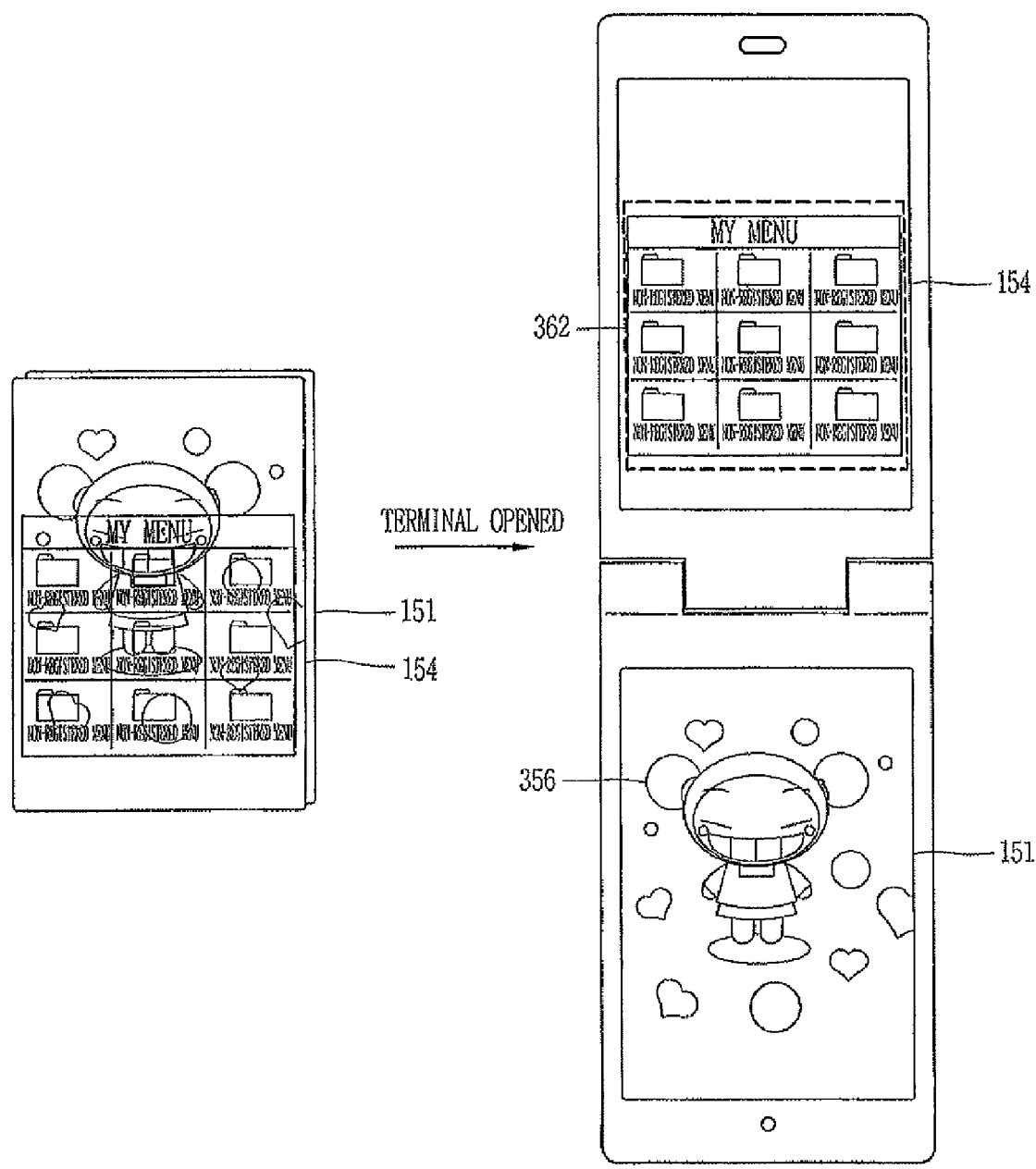
Figure 69C:
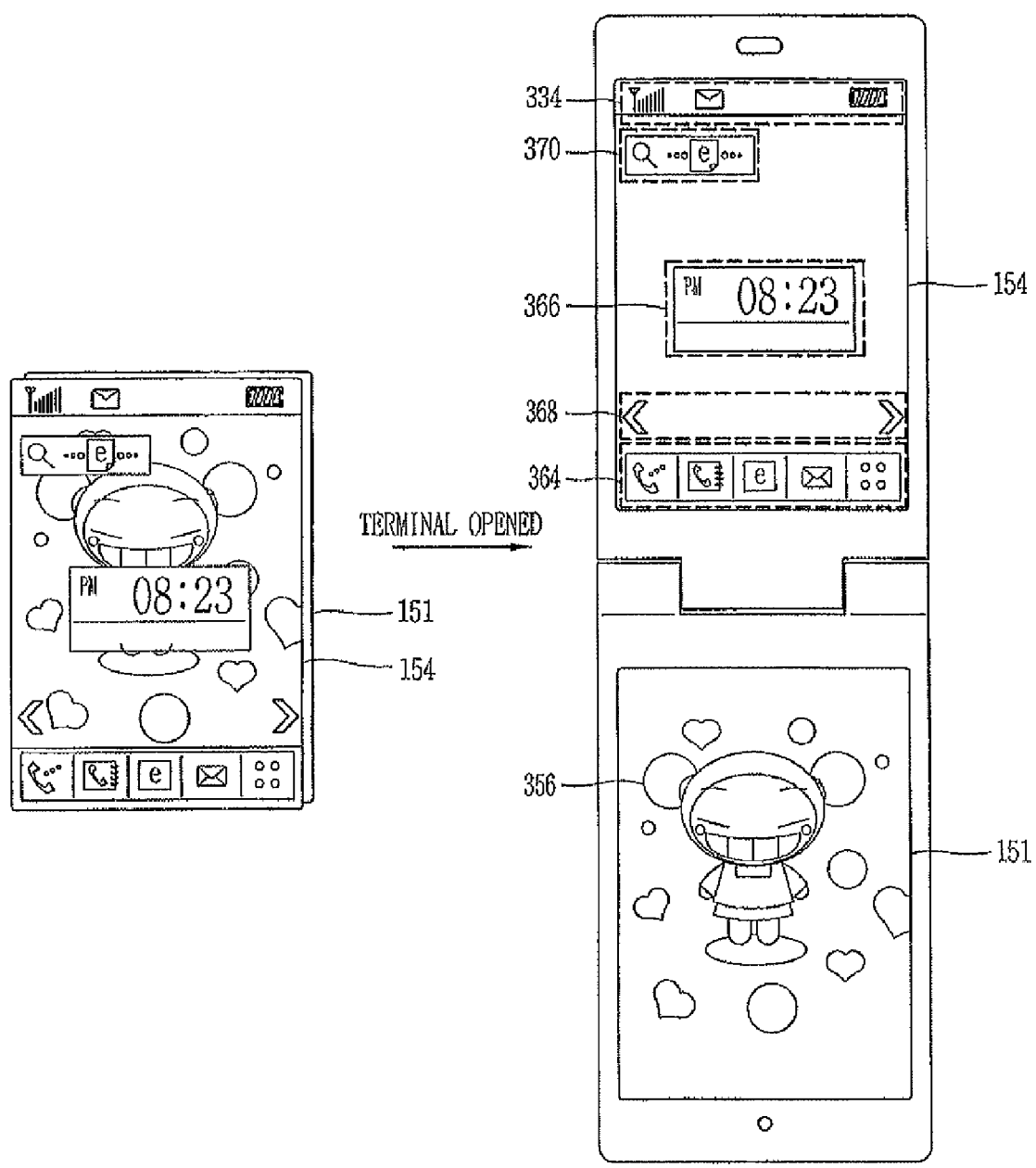

FIG. 69B is another embodiment of FIG. 69A, in which when a mobile terminal is opened, the controller 180 can move a short menu 362 to a sub display (i.e., the TOLED 154). FIG. 69C is still another embodiment of FIG. 69A, in which when a mobile terminal is opened, the controller 180 can move to a sub display (i.e., the TOLED 154) at least one of objects, including the indicator 334, a multitasking menu 364, the clock 366, software navigation keys 368, various message windows 370 and the like.

Next, FIGS. 70A to 70H are overviews illustrating a control of displays (i.e., the LCD and TOLED) in cooperation with an opening/closing of a mobile terminal according to a sixth embodiment. The sixth embodiment illustrates a method in which a specific application is executed in a closed state of a mobile terminal, and then when the mobile terminal is opened, a unique object associated with the corresponding application can be moved to the TOLED or LCD or newly generated to be displayed.

Figure 70A:
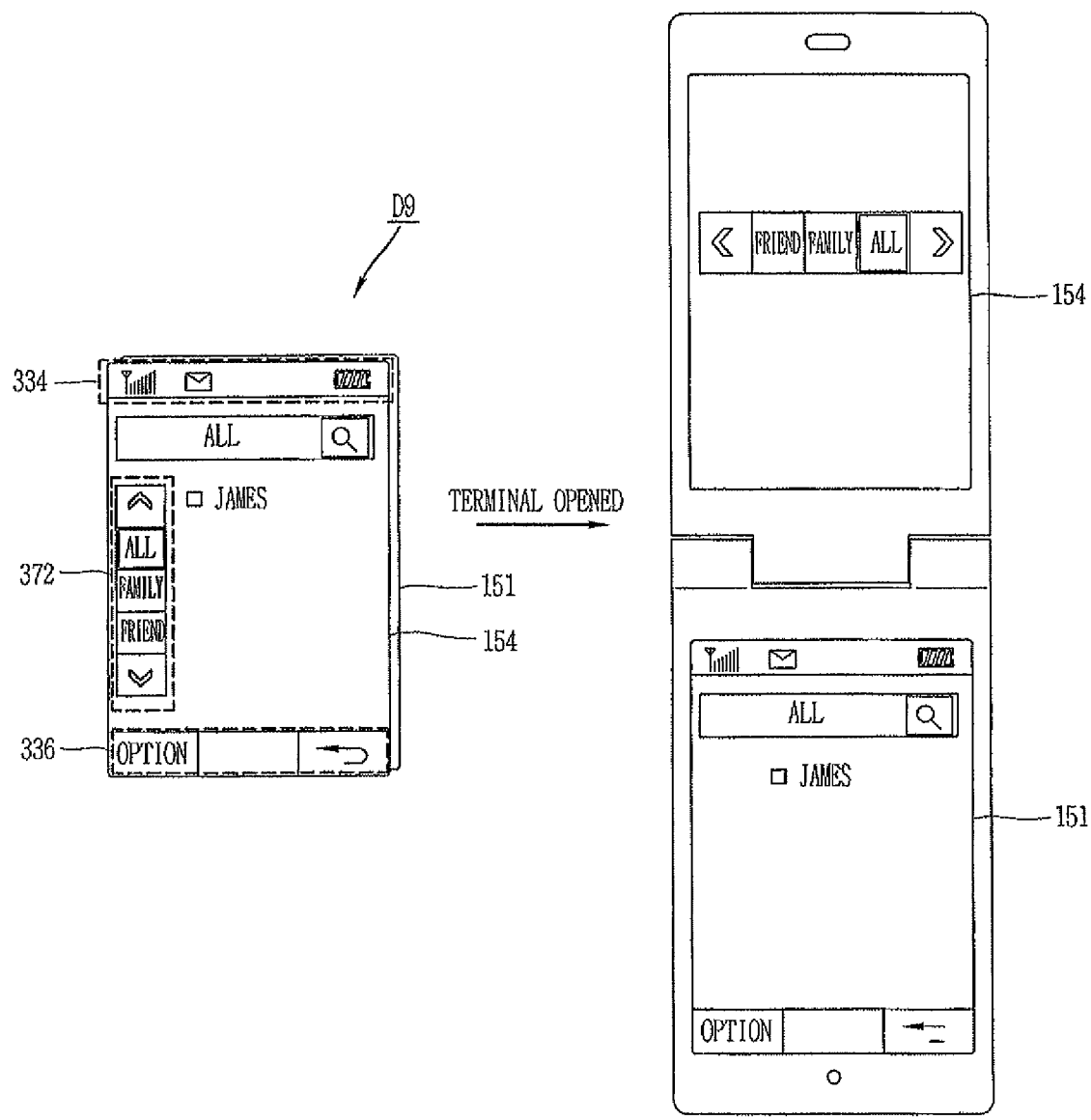
FIGS. 70A to 70H are overviews illustrating a display control in cooperation with an opening/closing a mobile terminal according to a sixth embodiment of the present invention.

In more detail, FIG. 70A shows an object movement between the LCD 151 and TOLED 154 when an application, such as a phonebook, for storing information by each category is running or executing. As shown in FIG. 70A, when a phonebook function is executed, the controller 180 displays an execution screen of the phonebook on an overlapped screen D9 (i.e., a main display (the LCD 151). Also, the controller 180 displays the tab 372, the indicator 334 and the software menus 336 on the LCD 151. Moving objects of the overlapped screen D9 correspond to the tab 372, the indicator 334 and the software menus 336. Afterwards, when the mobile terminal is opened, the controller 180 can move at least one of the moving objects to a sub display (i.e., the TOLED 154).

Figure 70B:
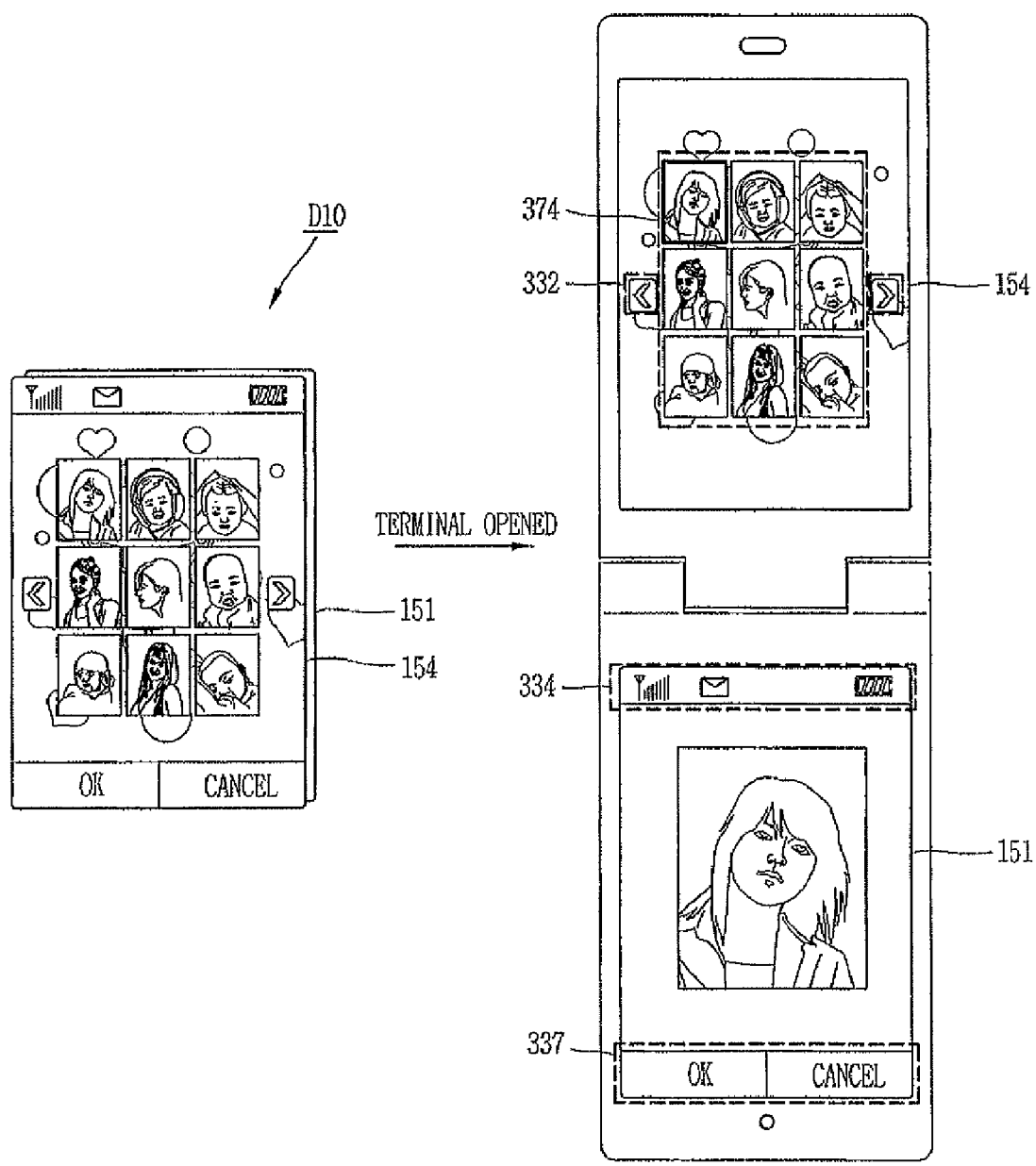

FIG. 70B is an overview illustrating an object movement between the LCD 151 and TOLED 154 when an image viewer application, such as a photo album, is executed. As shown in FIG. 70B, when the photo album is executed, the controller 180 displays an execution screen of the photo album on an overlapped screen D10 (i.e., a main display (the LCD 151)). The controller 180 also displays setup icons 374, the indicator 334, software keys 337 and software navigation keys 332. Moving objects of the overlapped screen D10 correspond to the setup icons 372 and the software navigation keys 332. Afterwards, when the mobile terminal is opened, the controller 180 can move at least one of the moving objects to a sub display (i.e., the TOLED 154).

Figure 70C:
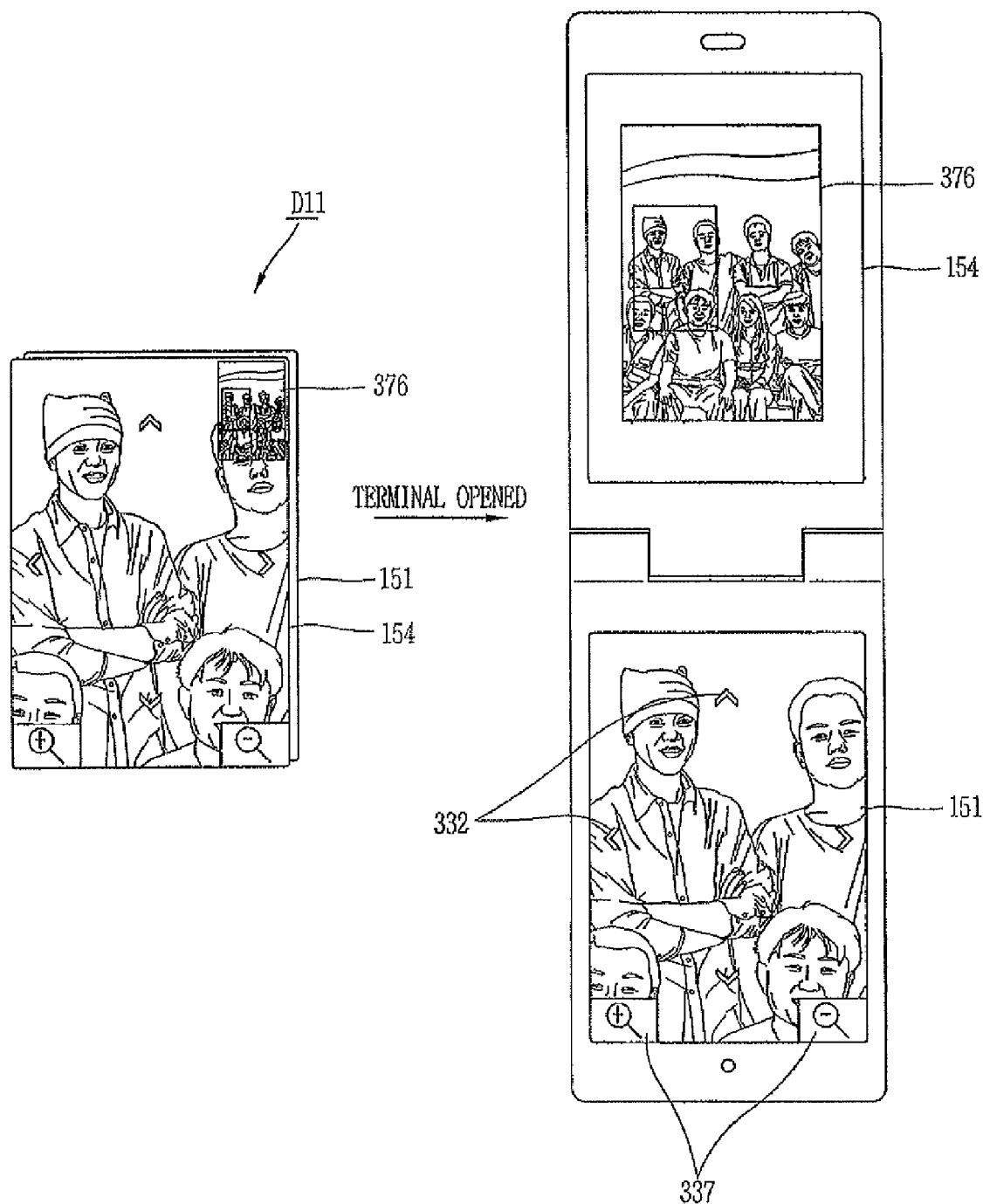

FIG. 70C is an overview illustrating an object movement between the LCD 151 and TOLED 154 when an image viewer application, such as a photo album or a browser, is running. When a user selects a specific image after executing the photo album, the controller 180 displays the selected image (in a full size) on an overlapped screen D11 (i.e., main display (the LCD 151)), as shown in FIG. 70C. The controller 180 also displays software navigation keys 332, mini-map 376 and software keys 337. A moving object of the overlapped screen D11 corresponds to the mini-map 376. Afterwards, when the mobile terminal is opened, the controller 180 moves the mini-map 376 to a sub display (i.e., the TOLED 154).

Figure 70D:
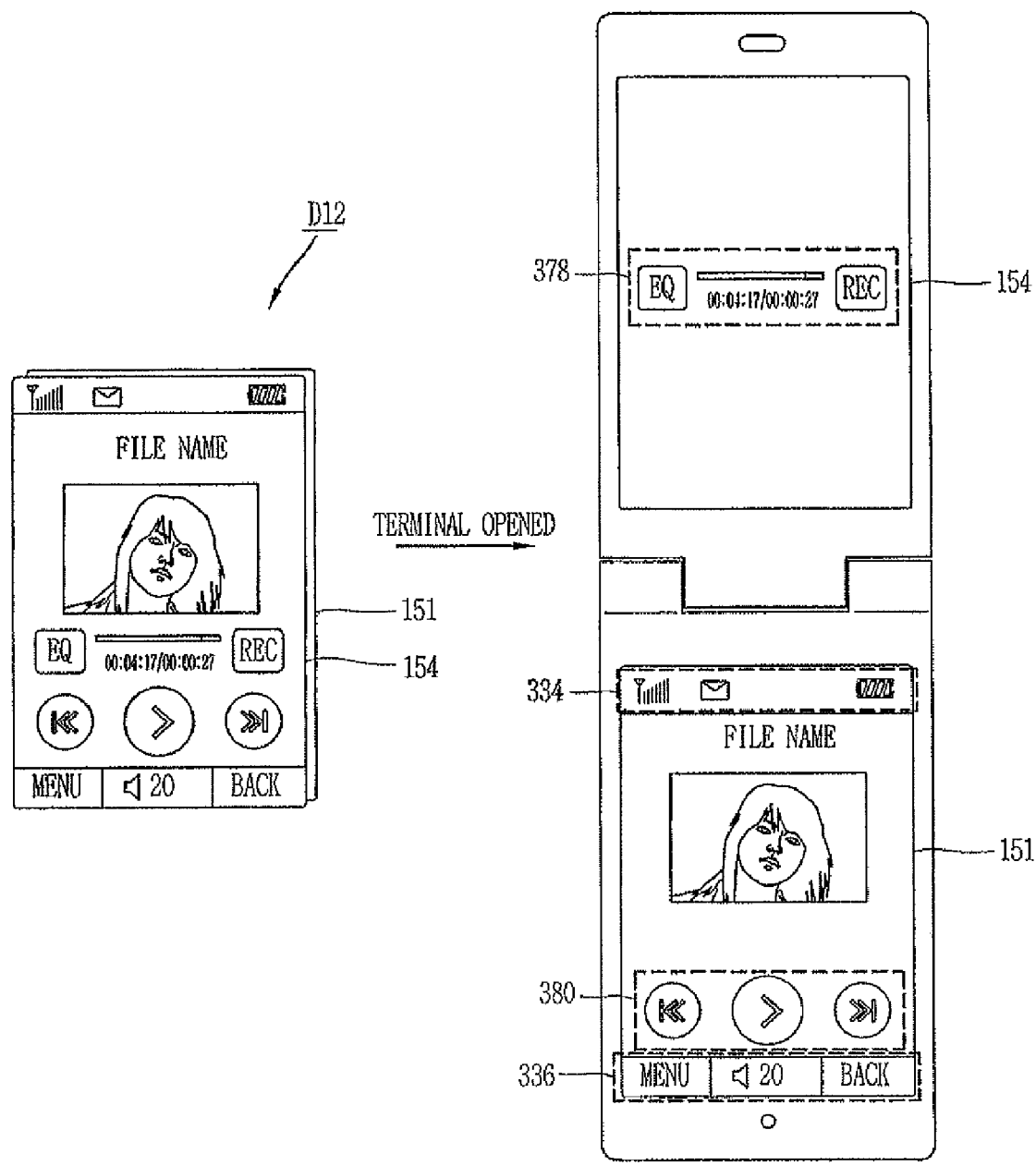

FIG. 70D is an overview illustrating an object movement between the LCD 151 and TOLED 154 when a multimedia player for music, image or broadcasting, for example, is running or executing. As shown in FIG. 70D, when a multimedia player, such as a video player or MP3 player runs, the controller 180 displays the corresponding multimedia player on an overlapped screen D12 (i.e., a main display (the LCD 151)). The controller 180 also displays the indicator 334, a reproduction progress bar 378, player control keys 380 and software menus 336. Moving objects of the overlapped screen D12 correspond to the reproduction progress bar 378 and the player control keys 380.

Then, when the mobile terminal is opened, the controller 180 can move at least one of the moving objects to a sub display (i.e., the TOLED 154). Also, when the mobile terminal is opened, the controller 180 generates new objects, such as subtitle information, image (or music) associated information to display on the TOLED 154. For the subtitle information, it is preferably enlarged for display. In addition, when the multimedia player is intended for a broadcast reception, the controller 180 generates new objects, such as menus which have not been displayed during broadcast watching or channel change scroll information, and displays such generated new objects on the TOLED 154.

Figure 70E:
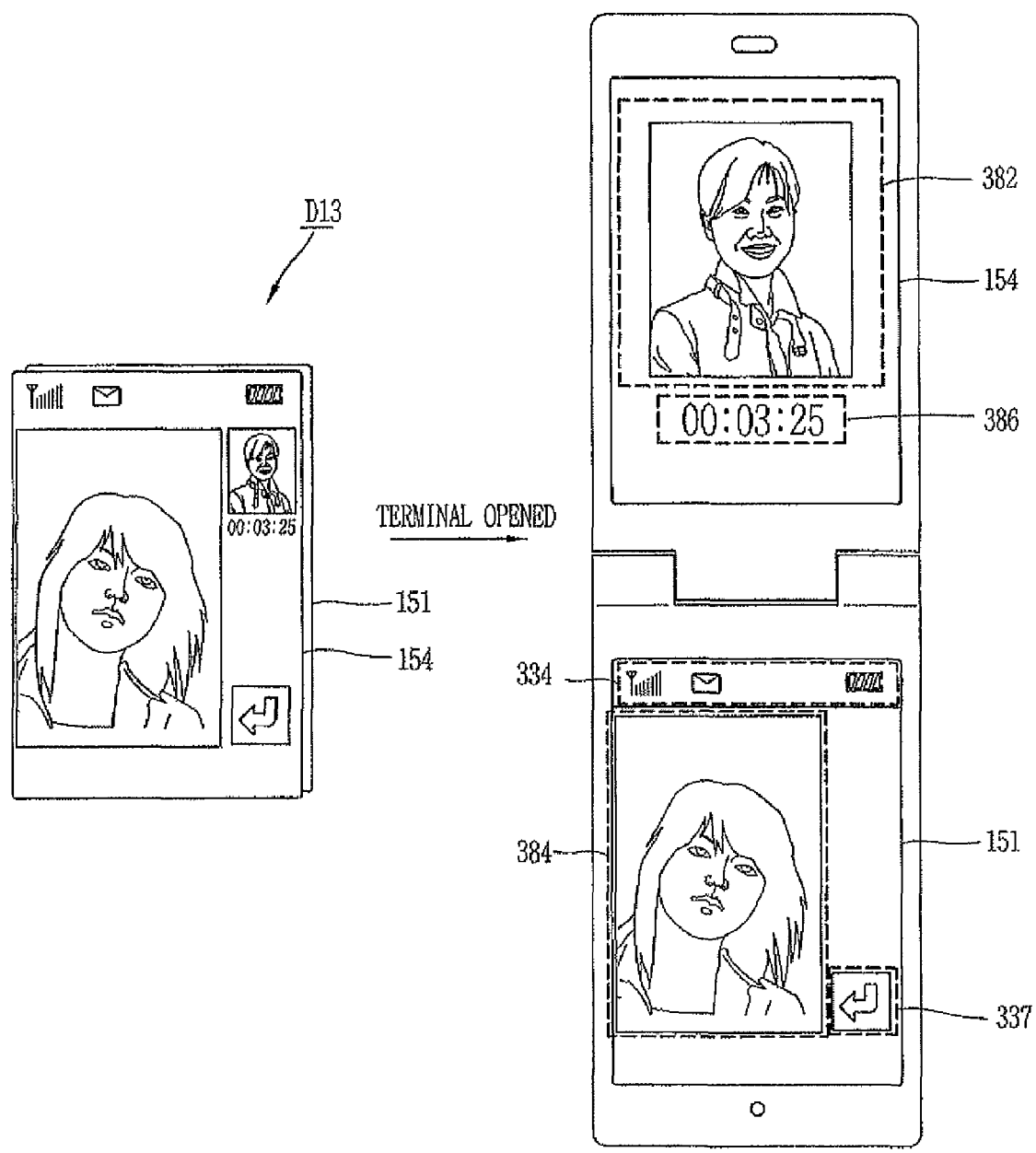

FIG. 70E is an overview illustrating an object movement between the LCD 151 and TOLED 154 during a video call communication. As shown in FIG. 70E, when a video call communication is set, the controller 180 displays images 382 and 384 of the transmitting side and receiving side on an overlapped screen D13 (i.e., a main display (the LCD 151)), together with the indicator 334, the software keys 337 and call related information 386 (e.g., a call connection time, etc.). Moving objects of the overlapped screen D13 correspond to the image 384 of the receiving side (another party) (or the image 382 of the transmitting side) and the call related information 386. Then, when the mobile terminal is opened, the controller 180 can move at least one of the moving objects to a sub display (i.e., the TOLED 154). Also, when the mobile terminal is opened, the controller 180 can generate new objects, such as software menus (e.g., 'video call menu, 'substitute image', 'emotion' and the like), and display the generated new objects on the TOLED 154.

Figure 70F:
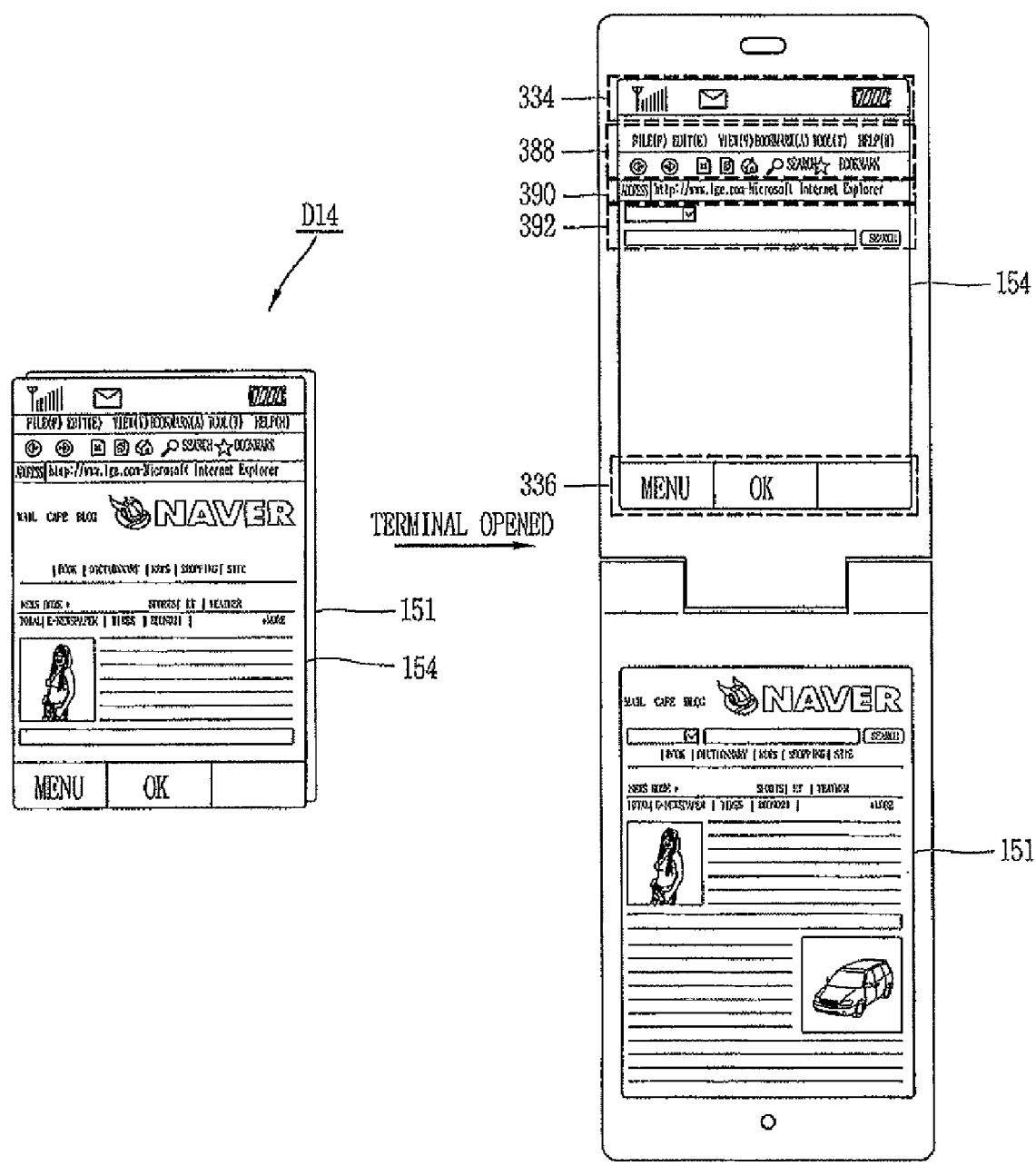

FIG. 70F is an overview illustrating an object movement between the LCD 151 and TOLED 154 when an Internet browser is running. As shown in FIG. 70F, when the Internet browser runs, the controller 180 displays a webpage accessed by the browser on an overlapped screen D14 (i.e., a main display (LCD 151)). The controller 180 also displays the indicator 334, software menus 336 and menu window 388, address window 390 and searching window 392 of the browser on the LCD 151. Moving objects of the overlapped screen D14 correspond to the menu window 388, the address window 390, the searching window 392, and text (not shown) each having a hyperlink set to a specific webpage.

Then, when the mobile terminal is opened, the controller 180 can move at least one of the moving objects to a sub display (i.e., the TOLED 154). If the menu window 388, the address window 390 and the searching window 392 of the browser have not been displayed on the LCD 151 when the mobile terminal is closed, such windows may be displayed on the TOLED 154 as new objects when the mobile terminal is opened.

Figure 70G:
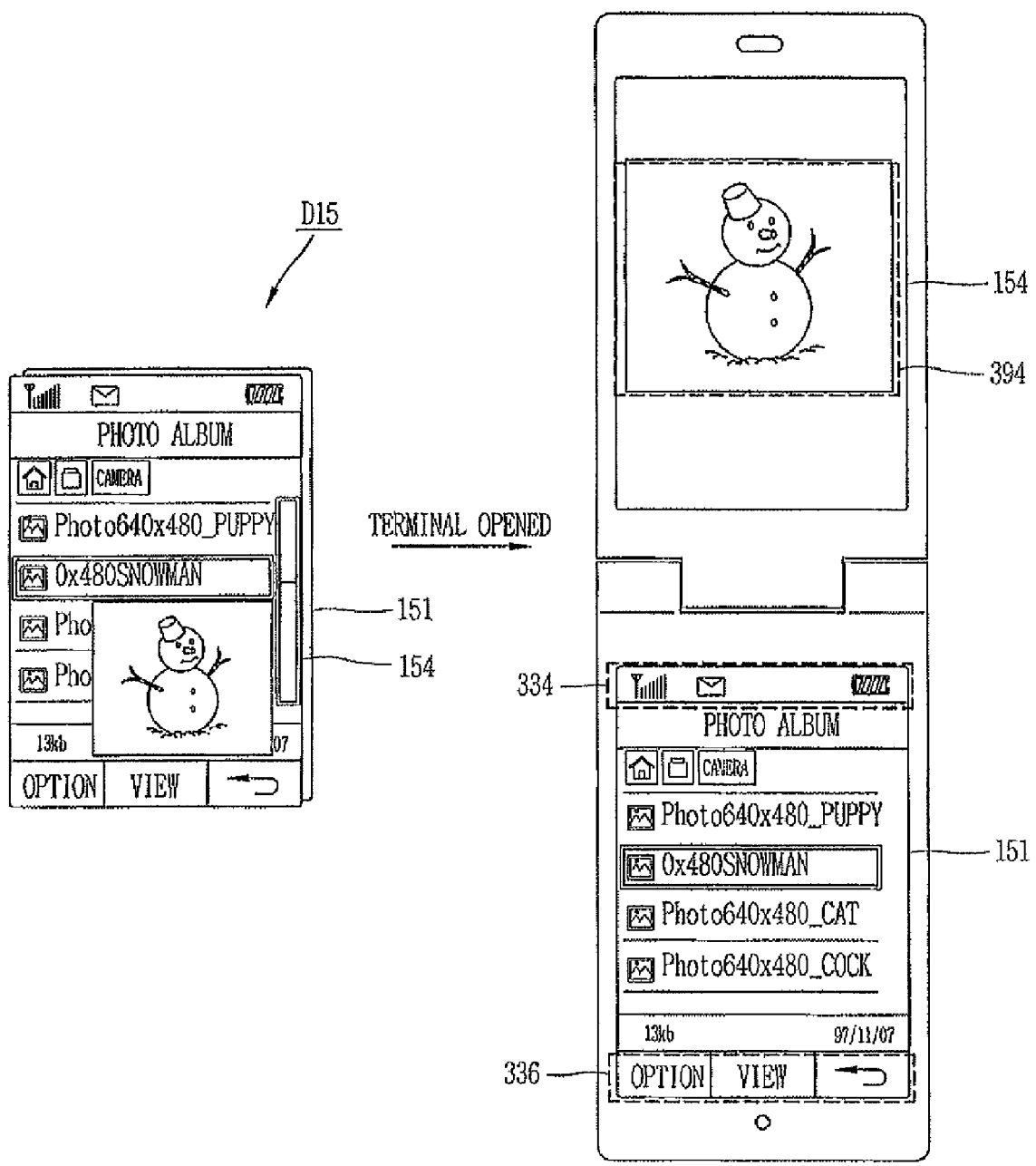

FIG. 70G is an overview illustrating an object movement between the LCD 151 and TOLED 154 when a preview of contents list (e.g., photo album list, etc.) is running or executing. As shown in FIG. 70G, when the photo album is executed, the controller 180 displays an 'image list of photo album' on an overlapped screen D15 (i.e., a main display (LCD 151). The controller 180 also displays the indicator 334, the software menus 336 and a preview screen 394 on the LCD 151. A moving object of the overlapped screen D15 corresponds to the preview screen 394. When the mobile terminal is opened, the controller 180 moves the preview screen 394 to a sub display (i.e., the TOLED 154). Also, when the mobile terminal is opened, the controller 180 can generate new objects for clipboard contents or copied contents, and display the generated new objects on the TOLED 154.

Figure 70H:
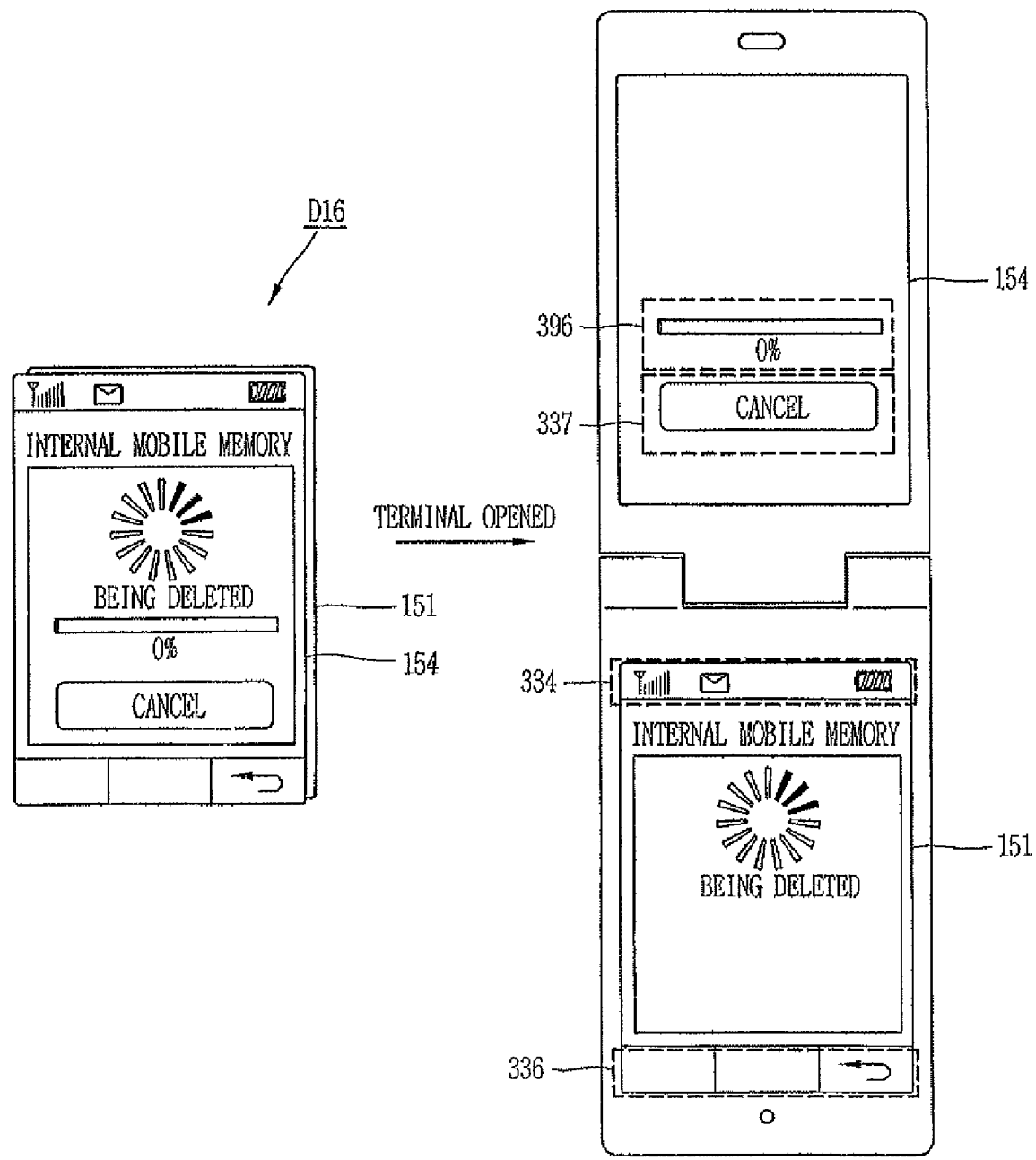

FIG. 70H is another embodiment of FIG. 70G, which shows an object movement between the LCD 151 and TOLED 154 when a certain editing application is running. When an editing application of the mobile terminal runs, the controller 180 displays, as shown in FIG. 70H, a message indicating a progressing state of the edition on an overlapped screen D16 (i.e., a main display (the LCD 151). The controller 180 also displays the indicator 334, the software menus 336, the software keys 337 and a state indicating (e.g., delete, copy, move, initialize, etc.) progress bar 396. Moving objects of the overlapped screen D16 correspond to the software keys 337 and the state indicating progress bar 396. When the mobile terminal is opened, the controller 180 can move at least one of the moving objects to a sub display (i.e., the TOLED 154).

In the embodiments of FIGS. 70A to 70H (i.e., the sixth embodiment), in addition to the aforesaid applications, when an application for a map or satellite photo function runs, geographic information or map control menu related to the corresponding map can be displayed on the TOLED 154 or LCD 151 as a new object or moving object.

Figure 71A:
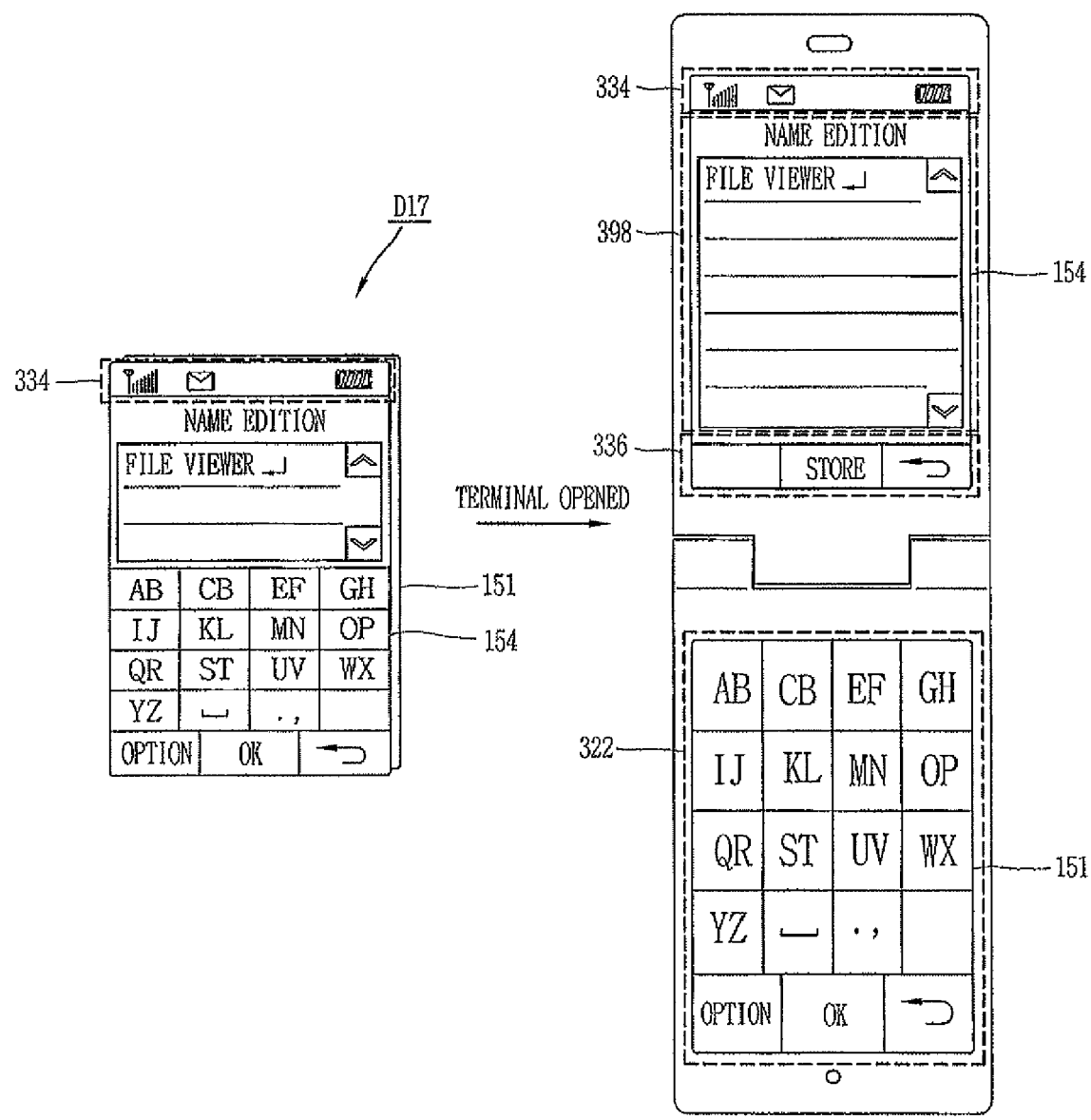
FIGS. 71A and 71B are overviews illustrating a display control in cooperation with an opening/closing a mobile terminal according to a seventh embodiment of the present invention.

FIG. 71A is a view showing a control of displays (i.e., the LCD and TOLED) in cooperation with an opening/closing of a mobile terminal according to a seventh embodiment. The seventh embodiment shows an object movement between the LCD 151 and TOLED 154 when a virtual input device is running. As shown in FIG. 71A, when the virtual input device runs, the controller 180 displays a 'virtual input device' screen 322 on an overlapped screen D17 (i.e., a main display (the LCD 151)), together with the indicator 334, the software menus 336 and an input displaying window 398. A moving object of the overlapped screen D17 corresponds to the input displaying window 398. When the mobile terminal is opened, the controller 180 moves the input displaying window 398 to a sub display (i.e., the TOLED 154).

Figure 71B:
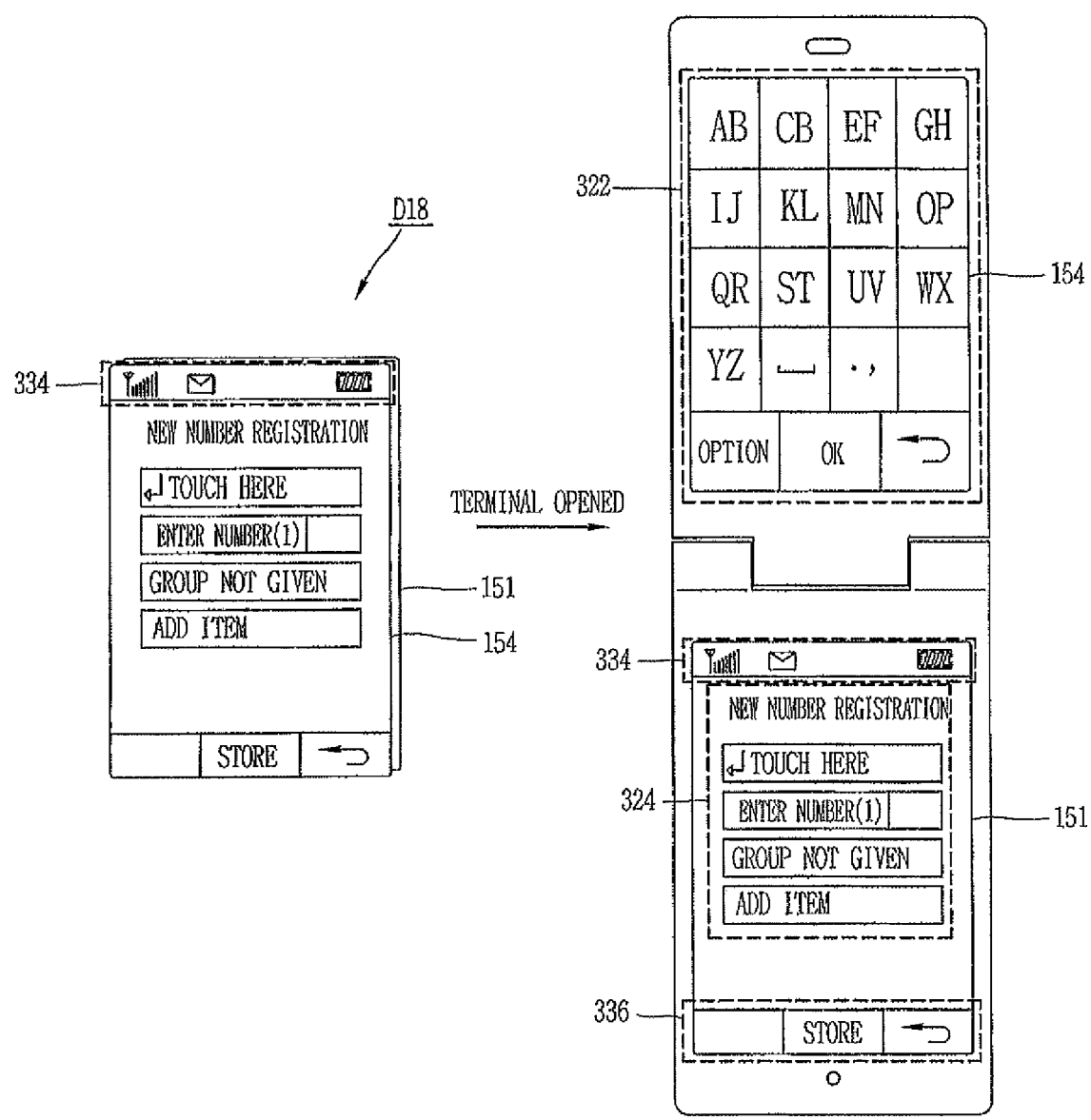

FIG. 71B is another embodiment of FIG. 71A, which shows an embodiment of displaying a new object (e.g., virtual input device) on the LCD 151 and TOLED 154 when a phonebook is running for registration of a new phone number. As shown in FIG. 71B, when the registration of phone number is started, the controller 180 displays a phone number input screen 324 on an overlapped screen D18 (i.e., a main display (LCD 151). When the mobile terminal is opened, the controller 180 executes the virtual input device 322 and displays the virtual input device 322 (i.e., a new object) on a sub display (i.e., the TOLED 154).

Figure 72A:
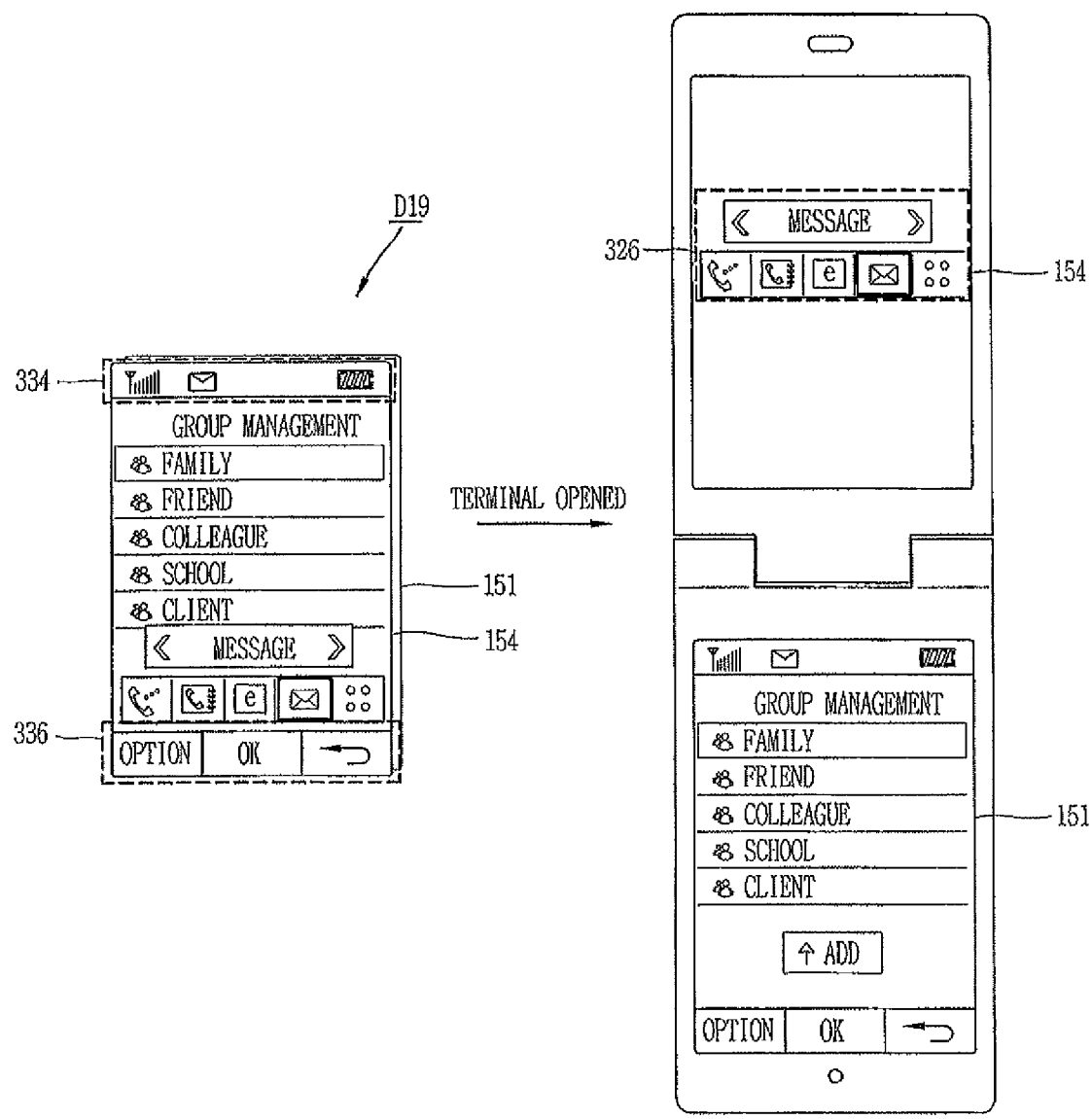
FIGS. 72A and 72B are overviews illustrating a display control in cooperation with an opening/closing a mobile terminal according to a eighth embodiment of the present invention.

FIG. 72A shows a control of displays (i.e., the LCD and TOLED) in cooperation with an opening/closing of a mobile terminal according to an eighth embodiment. The eighth embodiment illustrates an object movement between the LCD 151 and TOLED 154 when a 'multitasking menu' is executed. As shown in FIG. 72A, upon executing 'multitasking', the controller 180 displays a multitasking menu window 326 on an overlapped screen D19 (i.e., a main display (the LCD 151). The controller 180 also displays the indicator 334 and the software menus 336. A moving object of the overlapped screen D19 corresponds to the multitasking menu window 326. When the mobile terminal is opened, the controller 180 moves the multitasking menu window 326 to a sub display (i.e., the TOLED 154).

Figure 72B:
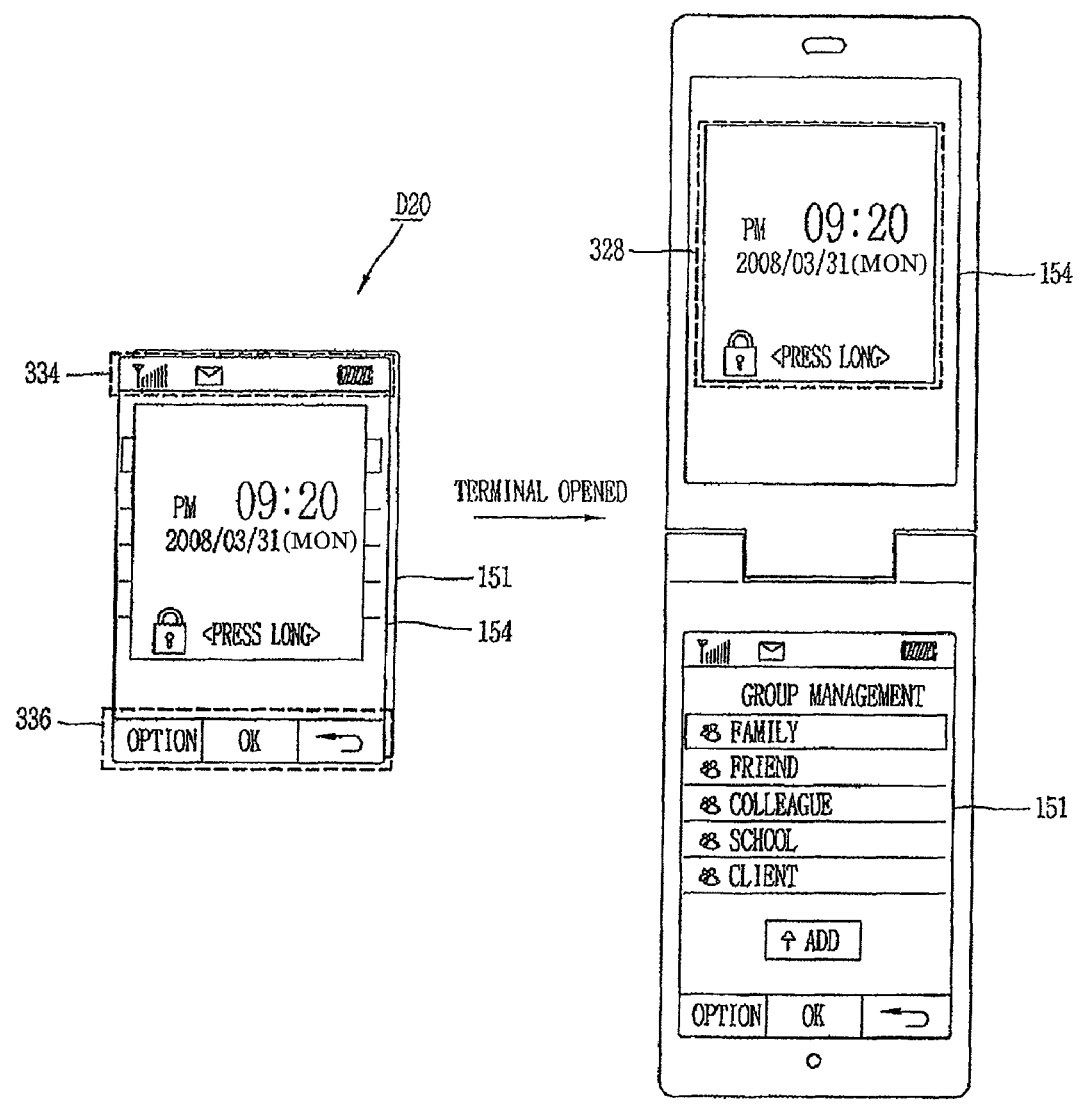
Figure 73:
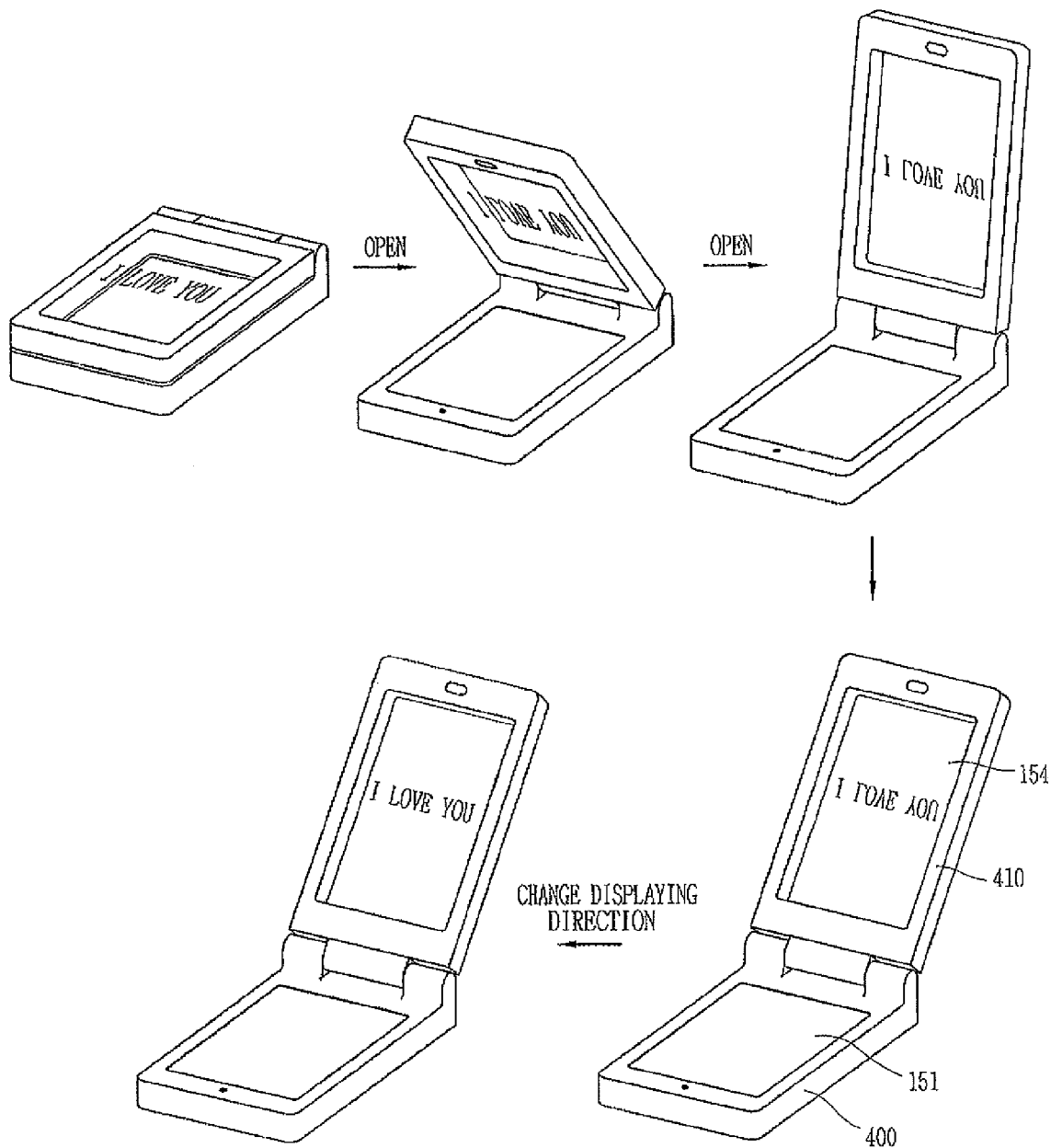
FIGS. 73 and 74 are overviews illustrating a method for changing an information displaying direction in a mobile terminal having a dual transparent display according to an embodiment of the present invention.
Figure 74:
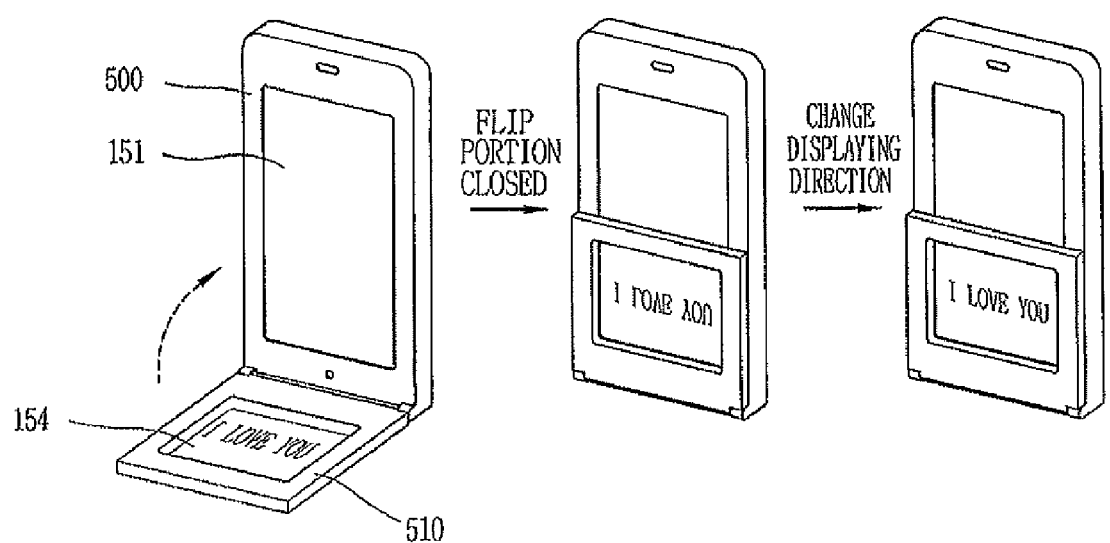
Figure 75:
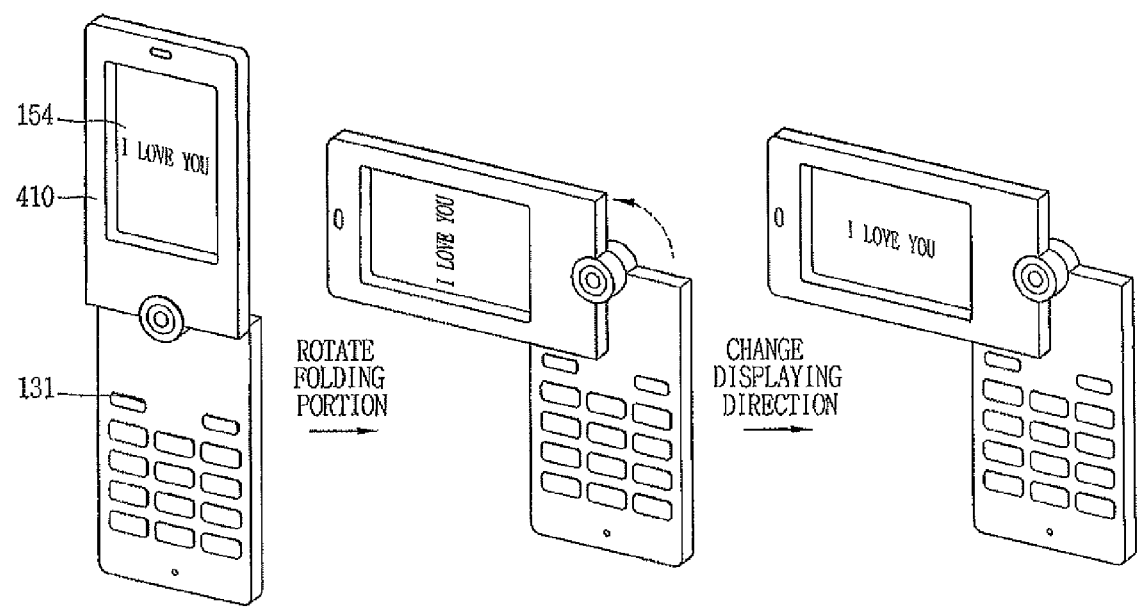
FIGS. 75 and 76 are overviews illustrating a method for changing an information displaying direction in a mobile terminal having a single transparent display according to an embodiment of the present invention.
Figure 76:
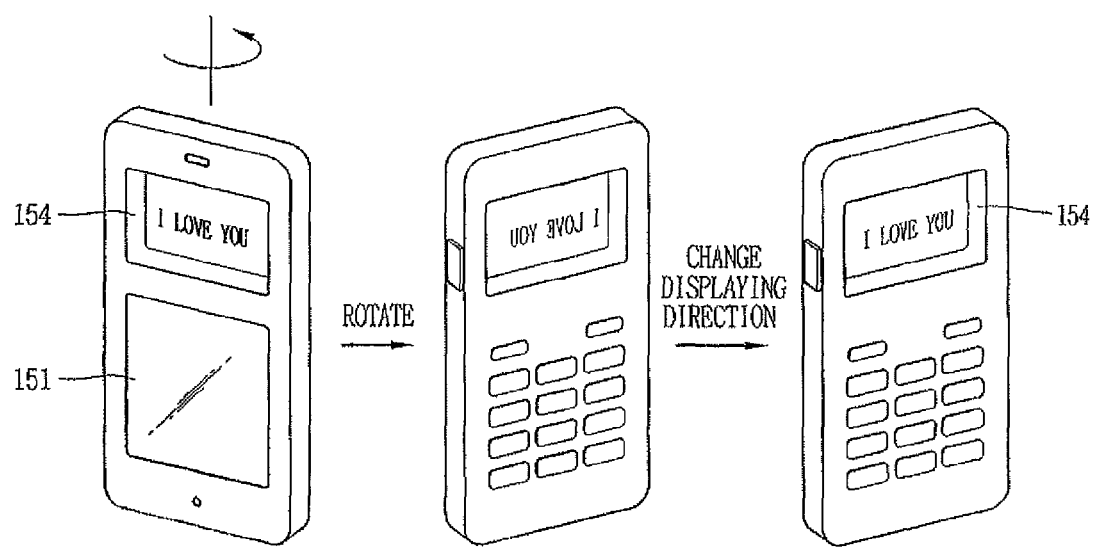

FIG. 72B is another embodiment of FIG. 72A, which shows an object movement between the LCD 151 and TOLED 154 when a screen locking function is running. As shown in FIG. 72B, when an external input is sensed while the screen locking function is running, the controller 180 displays a screen locking window 328 on an overlapped screen D20 (i.e., a main display (the LCD 151), together with the indicator 334 and the software menus 336. A moving object of the overlapped screen D20 corresponds to the screen locking window 328. When the mobile terminal is opened, the controller 180 moves the screen locking window 328 to a sub display (i.e., the TOLED 154).

Change in Information Displaying Direction on Screen of Mobile Terminal

A mobile terminal having a transparent display according to an embodiment of the present invention may be configured such that information displayed on a display can be reversed (or rotated) suitable for a user's eye in cooperation with an opening/closing of the mobile terminal (or rotating operation thereof) so as to be displayed. FIGS. 73 to 76 are overviews illustrating a method for changing an information displaying direction in a mobile terminal having a transparent display according to an embodiment of the present invention, which respectively show a folder-type mobile terminal, flip-type mobile terminal, rotating-type (swivel-type or swing-type) mobile terminal and bar-type mobile terminal.

Each type of mobile terminal is configured such that information displayed on a display can be rotated or reversed suitable for a position (pose, posture) of the mobile terminal according to the same method. For example, the controller 180 senses when the folding portion 410 or flip portion 510 starts to be opened. When the folding portion 410 is opened by more than a certain angle, the controller 180 rotates or reverses information displayed on the folding portion 410. The certain angle may be set differently depending on manufacturers or designs of mobile terminals or based on user input.

If the mobile terminal is provided with a tilt sensor (or gyro sensor), a displaying direction of information displayed on any of two displays is changed according to the posture of the mobile terminal detected by the tilt sensor. For example, if the posture of the mobile terminal which was a vertical direction is changed into a horizontal direction, the information displaying direction of the mobile terminal can be changed from the vertical direction into the horizontal direction. Also, the mobile terminal according to the present invention may be provided with a separate software key (or hardware key) for allowing a user to selectively change the information displaying direction.

Automatic Execution of Specific Function based upon Opening/Closing of the Mobile Terminal When a mobile terminal in which a locking function has been set to protect private information or prevent others from using the terminal, the controller 180 automatically displays a pop-up window to allow an input of a password, and releases the locked state of the mobile terminal when an accurate password is input. When the locking function is not yet released, if the mobile terminal is closed again, the controller 180 closes the pop-up window to obtain the password. Further, when the locking function has been set in order to simply prevent an unintended touch input or to protect a screen, when the mobile terminal is opened, the controller 180 may automatically release the locked state without requiring a password input, and automatically reset such locking function when the mobile terminal is closed.

Figure 77:
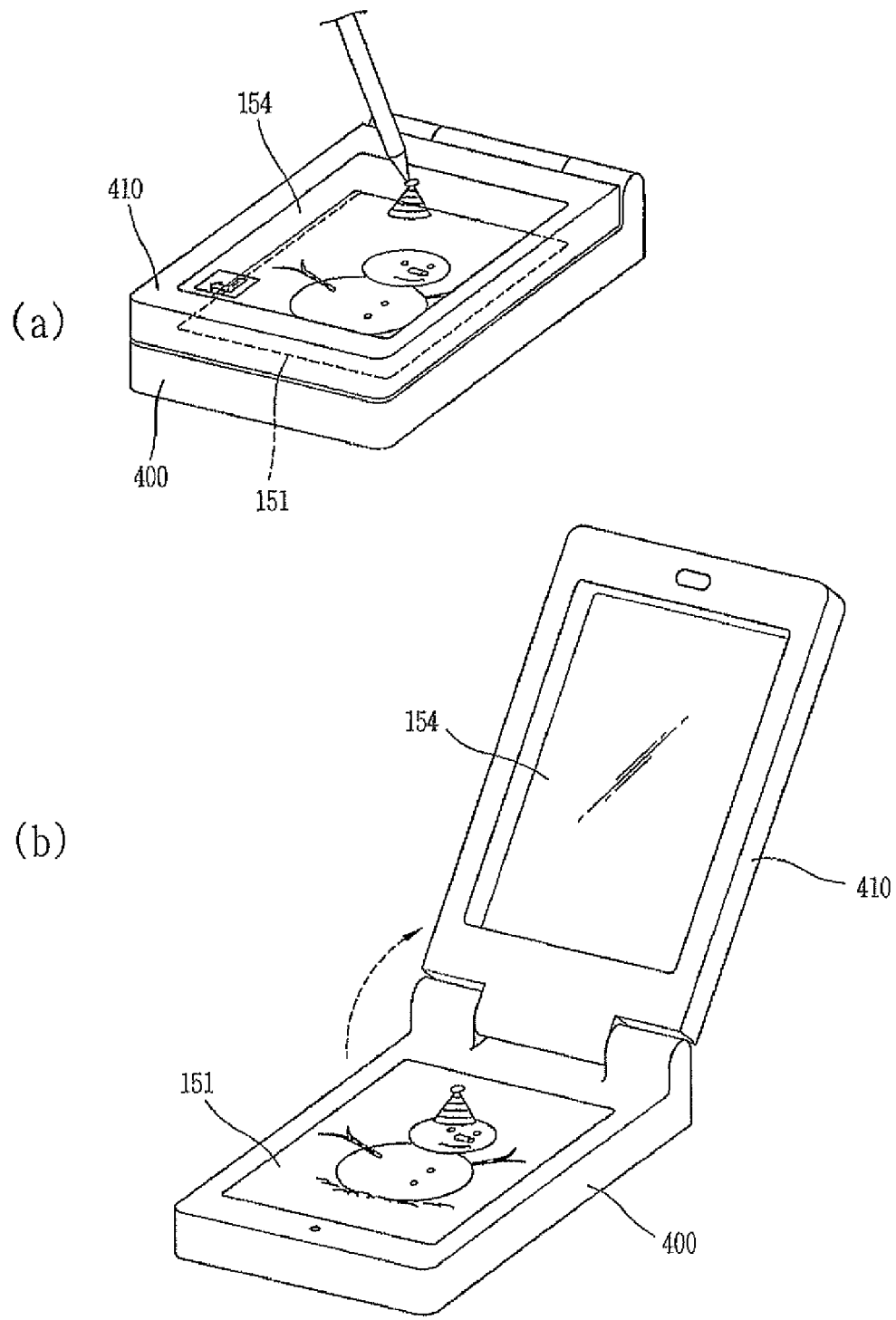
FIG. 77 is an overview illustrating an operation related to a movement of a displayed object executed in cooperation with the opening/closing of a mobile terminal having a dual transparent display according to an embodiment of the present invention.

Next, FIG. 77 is an overview illustrating operations related to the movement of a displayed object executed in cooperation with the opening/closing of a mobile terminal having a dual transparent display according to an embodiment of the present invention, and more particularly, illustrating a function of automatically reflecting an image edited on the TOLED 154 onto an image displayed on the LCD 151.

As shown in FIG. 77(*a*), it is assumed that a folder-type mobile terminal is in a closed state and an image editor is being executed on the TOLED 154. Further, a user may refer to an image displayed on the LCD 151 which is transmitted through the TOLED 154, and draw or edit a specific image (e.g., cap or hat image) related to the image (e.g., snowman image) displayed on the LCD 151 through the image editor. Also, while the user draws or edits the image, such drawing operation may not directly affect the image displayed on the LCD 151.

During the drawing operation, if it is sensed the folding portion 410 is open, the controller 180 can apply the drawn image onto the image displayed on the LCD 151. For example, the cap or hat image is displayed (attached) onto the head of the snowman image displayed on the LCD 151. When the folding portion 410 is closed, the image may not be applied thereto anymore. As such, the user can repeat the application and release an image during the drawing operation by opening or closing the folding portion 410, and also can be known as to whether the drawing operation is appropriately performed.

In addition to the above-mentioned functions, a mobile terminal according to embodiments of the present invention can output information associated with dually executed functions through a dual display (e.g., the TOLED 154 and the LCD 151). For example, the mobile terminal may output both navigation and a digital multimedia broadcast, perform both navigation and web browser functions, perform a dual electronic book (e-BOOK) function, display an original picture during picture edition, automatically display a list of devices for transmission, display a dual webpage, and the like.

Display Controlling Method for Saving Power

A mobile terminal according to an embodiment of the present invention may also control the TOLED 154 according to external environments, such as peripheral illumination, peripheral color, time slot and the like. In more detail, the mobile terminal may adjust a background transparency of the TOLED 154 according to the peripheral illumination sensed by an illumination sensor. For example, when the peripheral illumination increases, the mobile terminal decreases the background transparency of the TOLED 154, whereas increasing the background transparency when the peripheral illumination decreases.

In addition, the mobile terminal my sense the peripheral color by a color sensor and an image sensor. Accordingly, if a color which is equal to the sensed peripheral color exists in an information object displayed on the TOLED 154, the mobile terminal may adjust brightness and saturation of the corresponding color. The mobile terminal may also adjust the background transparency of the TOLED 154 according to time slots. For example, the mobile terminal may decrease the background transparency of the TOLED 154 in a daytime slot having a higher peripheral illumination, while increasing it in a nighttime slot having a lower peripheral illumination.

Various embodiments described herein may be implemented in a computer-readable medium using, for example, software, hardware, or some combination thereof. For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180.

For a software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The method for controlling transparent displays according to each embodiment of the present invention can be implemented in a medium having a program recorded as computer-readable codes. The computer-readable medium may include all types of recording apparatuses each storing data which is readable by a computer system. Examples of such computer-readable media may include ROM, RAM, CD-ROM, magnetic tape, floppy disk, optical data storage element and the like. Also, such computer-readable medium may be implemented in a type of a carrier wave (e.g., a transmission via an Internet). The computer can include the controller 180 of the mobile terminal.

A mobile terminal may be implemented using a variety of different types of terminals. Examples of such terminals include mobile/portable terminals, such as mobile phones, smart phones, notebook computers, digital broadcast terminals, Personal Digital Assistants (PDA), Portable Multimedia Players (PMP), navigators and the like, and stationary terminals, such as digital TVs, desktop computers and the like. The above description refers to the terminal as a mobile terminal. However, it can be easily understood by those skilled in the art that the configuration according to the above description can be applied to the stationary terminals except for components particularly provided for mobility. Also, the transparent display and the operating method thereof according to the present invention may not be limited to a mobile communications terminal, but applicable to each device having a display.

As described above, a mobile terminal according to embodiments of the present invention is configured such that a transparent display is further provided to a device having an LCD, thereby allowing more various and three-dimensional configuration and design of the UI.

The present invention has been explained with reference to the embodiments which are merely exemplary. It will be apparent to those skilled in the art that various modifications and equivalent other embodiments can be made in the present invention without departing from the spirit or scope of the invention. Also, it will be understood that the present invention can be implemented by selectively combining the aforementioned embodiment(s) entirely or partially. Thus, it is intended that the present invention cover modifications and variations of this invention provided they come within the scope of the appended claims and their equivalents.

What is claimed is:

1. A terminal, comprising:
   a first body;
   a second body connected to the first body;
   a non-transparent display disposed on the first body;
   a transparent display disposed on the second body; and
   a controller configured to:
   display an object on the transparent display and information on the non-transparent display through the transparent display when the first body and the second body are closed and the non-transparent display and the transparent display overlap each other, wherein a first item is selected from the information displayed on the non-transparent display in response to an input for selecting thereof while the first and second bodies are closed; and
   separately display the object on the transparent display and the information on the non-transparent display in response to a separation of the non-transparent display from the transparent display,
   wherein the first item is automatically executed on the transparent display in response to the separation of the non-transparent display from the transparent display,
   wherein the information comprises at least one WebPage, and the object comprises at least one item in the at least one Webpage, and
   wherein the controller is further configured to move a second item of the information displayed on the non-transparent display to the transparent display in response to the separation of the non-transparent display from the transparent display.

2. The terminal of claim 1, wherein the object comprises a link or item selected from the at least one Webpage.

3. The terminal of claim 1, wherein the controller is further configured to display a new displayable object on the transparent display when the first body and the second body are opened.

4. The terminal of claim 1, wherein the controller is further configured to rearrange remaining items of the information on the non-transparent display.

5. The terminal of claim 1, wherein the transparent display is a Transparent Organic Light Emitting Display (TOLED).

6. The terminal of claim 1, wherein the first item is automatically executed on the transparent display only when the non-transparent display is separated from the transparent display.

7. The terminal of claim 1, wherein the first item displayed on the non-transparent display is selected through the transparent display when the first and second bodies are closed.

8. A method of controlling a terminal, the method comprising:\
   displaying an object on a transparent display disposed on a first body of the terminal and information on a non-transparent display disposed on a second body of the terminal that is connected to the first body through the transparent display when the first body and the second body are closed and the non-transparent display and the transparent display overlap each other, wherein a first item is selected from the information displayed on the non-transparent display in response to an input for selecting thereof while the first and second bodies are closed;
   separately displaying the object on the transparent display and the information on the non-transparent display in response to a separation of the non-transparent display from the transparent display; and
   moving a second item of the information displayed on the non-transparent display to the transparent display in response to the separation of the non-transparent display from the transparent display,
   wherein the first item is automatically executed on the transparent display in response to the separation of the non-transparent display from the transparent display, and
   wherein the information comprises at least one WebPage, and the object comprises at least one item in the at least one WebPage.

9. The method of claim 8, wherein the object comprises a link or item selected from the at least one Webpage plurality of Webpages.

10. The method of claim 8, further comprising:
    displaying a new displayable object on the transparent display when the first body and the second body are opened.

11. The method of claim 8, further comprising rearranging remaining items of the information on the non-transparent display.

12. The method of claim 8, wherein the first item is automatically executed on the transparent display only when the non-transparent display is separated from the transparent display.

13. The method of claim 8, wherein the first item displayed on the non-transparent display is selected through the transparent display when the first and second bodies are closed.

* * * * *